US008645991B2

(12) United States Patent
McIntire et al.

(10) Patent No.: US 8,645,991 B2
(45) Date of Patent: Feb. 4, 2014

(54) METHOD AND APPARATUS FOR ANNOTATING MEDIA STREAMS

(75) Inventors: John P. McIntire, Palo Alto, CA (US); David W. J. Stringer-Calvert, Santa Clara, CA (US)

(73) Assignee: Tout Industries, Inc., San Francisco, CA (US)

( * ) Notice: Subject to any disclaimer, the term of this patent is extended or adjusted under 35 U.S.C. 154(b) by 126 days.

(21) Appl. No.: 11/694,836

(22) Filed: Mar. 30, 2007

(65) Prior Publication Data
US 2007/0250901 A1   Oct. 25, 2007

Related U.S. Application Data

(60) Provisional application No. 60/788,367, filed on Mar. 30, 2006, provisional application No. 60/788,368, filed on Mar. 30, 2006, provisional application No. 60/747,379, filed on May 16, 2006, provisional application No. 60/804,091, filed on Jun. 6, 2006, provisional application No. 60/866,803, filed on Nov. 21, 2006, provisional application No. 60/871,705, filed on Dec. 22, 2006.

(51) Int. Cl.
*H04N 7/16* (2011.01)
*G06F 17/00* (2006.01)
*G06F 15/00* (2006.01)

(52) U.S. Cl.
USPC ................................................. 725/34; 725/5

(58) Field of Classification Search
None
See application file for complete search history.

(56) References Cited

U.S. PATENT DOCUMENTS 5,446,919 A * 8/1995 Wilkins ........................... 725/35
6,154,771 A   11/2000 Rangan et al.

(Continued)

FOREIGN PATENT DOCUMENTS

CN   101278311 A   10/2008
JP   2003-022346 A   1/2003

(Continued)

OTHER PUBLICATIONS

International Search Report and Written Opinion for PCT/US07/65719, consists of 16 pages.

(Continued)

*Primary Examiner* — Rong Le

(57) ABSTRACT

In one embodiment, the invention is a method and apparatus for annotating media streams. One embodiment of a method for facilitating creation of an annotated media stream by a user includes receiving the media stream from the user, mapping at least one item of supplemental content to at least a portion of the media stream to produce the annotated media stream, and storing the annotated media stream. In another embodiment, a method for distributing an annotated media stream provided by a user includes receiving the annotated media stream from the user, where the annotated media stream includes at least one item of supplemental content mapped to at least a portion of a media stream to produce the annotated media stream, storing the annotated media stream, receiving a request from a viewer to view the annotated media stream, and distributing the annotated media stream to the viewer. In another embodiment, a method for distributing an annotated media stream provided by a user includes distributing the annotated media stream to a viewer, where the annotated media stream includes at least one item of supplemental content mapped to at least a portion of a media stream to produce the annotated media stream, and collecting a commission when the annotated media stream is viewed by the viewer. In one embodiment, the collecting requires further action on a part of the viewer (such as selection of a hyperlink contained in the at least one item of supplemental content or consummation of a commercial transaction).

45 Claims, 48 Drawing Sheets

(56) References Cited

U.S. PATENT DOCUMENTS

| | | | |
|---|---|---|---|
| 6,269,366 B1* | 7/2001 | Romano et al. | 707/6 |
| 6,357,042 B2 | 3/2002 | Srinivasan et al. | |
| 6,466,275 B1 | 10/2002 | Honey et al. | |
| 6,567,980 B1 | 5/2003 | Jain et al. | |
| 6,816,201 B1 | 11/2004 | Fang et al. | |
| 6,864,886 B1 | 3/2005 | Cavallaro et al. | |
| 6,876,970 B1 | 4/2005 | Silver et al. | |
| 6,877,134 B1 | 4/2005 | Fuller et al. | |
| 7,035,624 B2* | 4/2006 | Maegawa | 455/414.1 |
| 7,051,275 B2 | 5/2006 | Gupta et al. | |
| 7,068,309 B2 | 6/2006 | Toyama et al. | |
| 7,162,696 B2 | 1/2007 | Wakefield | |
| 7,539,951 B1 | 5/2009 | Molander et al. | |
| 2001/0027412 A1* | 10/2001 | Son | 705/14 |
| 2002/0049983 A1 | 4/2002 | Bove, Jr. et al. | |
| 2002/0073423 A1* | 6/2002 | Krakirian | 725/40 |
| 2002/0078446 A1 | 6/2002 | Dakss et al. | |
| 2002/0083468 A1 | 6/2002 | Dudkiewicz | |
| 2002/0107735 A1 | 8/2002 | Henkin | |
| 2002/0108112 A1 | 8/2002 | Wallace et al. | |
| 2002/0170068 A1 | 11/2002 | Rafey et al. | |
| 2003/0009380 A1 | 1/2003 | Suzuki et al. | |
| 2003/0023562 A1* | 1/2003 | Bailey et al. | 705/51 |
| 2003/0070167 A1 | 4/2003 | Holtz | |
| 2003/0093790 A1 | 5/2003 | Logan et al. | |
| 2003/0128759 A1 | 7/2003 | Prakash et al. | |
| 2003/0220866 A1 | 11/2003 | Pisaris-Henderson et al. | |
| 2004/0098743 A1* | 5/2004 | Gutta et al. | 725/46 |
| 2004/0148563 A1 | 7/2004 | Lord et al. | |
| 2004/0172593 A1 | 9/2004 | Wong et al. | |
| 2004/0189704 A1 | 9/2004 | Walsh et al. | |
| 2005/0015815 A1* | 1/2005 | Shoff et al. | 725/135 |
| 2005/0044078 A1 | 2/2005 | deVries et al. | |
| 2005/0060229 A1 | 3/2005 | Riedl et al. | |
| 2005/0076359 A1* | 4/2005 | Pierson et al. | 725/32 |
| 2005/0097451 A1* | 5/2005 | Cormack et al. | 715/512 |
| 2005/0203800 A1* | 9/2005 | Sweeney et al. | 705/14 |
| 2005/0228665 A1 | 10/2005 | Kobayashi et al. | |
| 2005/0246625 A1 | 11/2005 | Iyengar | |
| 2005/0278747 A1 | 12/2005 | Barton et al. | |
| 2006/0015378 A1* | 1/2006 | Mirrashidi et al. | 705/7 |
| 2006/0015925 A1 | 1/2006 | Logan | |
| 2006/0026067 A1 | 2/2006 | Nicholas | |
| 2006/0041926 A1 | 2/2006 | Istvan et al. | |
| 2006/0123451 A1* | 6/2006 | Preisman | 725/86 |
| 2006/0179453 A1 | 8/2006 | Kadie et al. | |
| 2007/0033531 A1 | 2/2007 | Marsh et al. | |
| 2007/0038931 A1 | 2/2007 | Allaiire et al. | |
| 2007/0061309 A1* | 3/2007 | Klein, Jr. | 707/3 |
| 2007/0077921 A1 | 4/2007 | Hayashi et al. | |
| 2007/0078714 A1 | 4/2007 | Ott et al. | |
| 2007/0083611 A1 | 4/2007 | Farago et al. | |
| 2008/0209465 A1* | 8/2008 | Thomas et al. | 725/32 |

FOREIGN PATENT DOCUMENTS

| | | | |
|---|---|---|---|
| JP | 2004-304792 A | | 10/2004 |
| KR | 10-2002-0084223 A | | 11/2002 |
| KR | 10-2004-0033766 A | | 4/2004 |
| WO | WO9926415 | * | 5/1999 |
| WO | WO 02-077750 A2 | | 10/2002 |
| WO | WO-2005/114519 | | 12/2005 |
| WO | WO 2007/041073 A1 | | 4/2007 |

OTHER PUBLICATIONS

"2007—The Year of Online Video Tools and Video Monetization", *6initiative*, ) Feb. 1, 2007, <http://www.6initiative.com/2007-the-year-of-online-video-tools-and-video-monetization/>; copy consists of 3 unnumbered pages.

"FAQ Spot", *Mojiti*, Feb. 13, 2007, http://mojiti.com/faq/spot; copy consists of 8 unnumbered pages.

Lu, Gang, "Mojiti—China's YouTube 2.0 Adds Annotation to Mix", Jan. 24, 2007. http://www.readwriteweb.com/archives/mojiti_china_youtube20.php; copy consists of 2 unnumbered pages.

Sanzalone, Robert, "Video With Annotations—Mojiti vs. Viddler", Dec. 22, 2003, http://www.pacificit.ca/article/206; copy consists of 1 unnumbered page.

International Search Report and Written Opinion for PCT/US2009/037716, Oct. 23, 2009, copy consists of 9 unnumbered pages.

Supplementary Search Report for PCT/US2007/065719, Jun. 7, 2010, copy consists of 8 unnumbered pages.

Aug. 30, 2012 Office Action in CN 200980110881.X, SRI International, Applicant, 11 pages.

Jun. 4, 2012 Office Action in JP 2009-503323, SRI International, Applicant, 4 pages.

Search Report for EP 09725385.0, Mar. 15, 2013, copy consists of 6 pages.

* cited by examiner

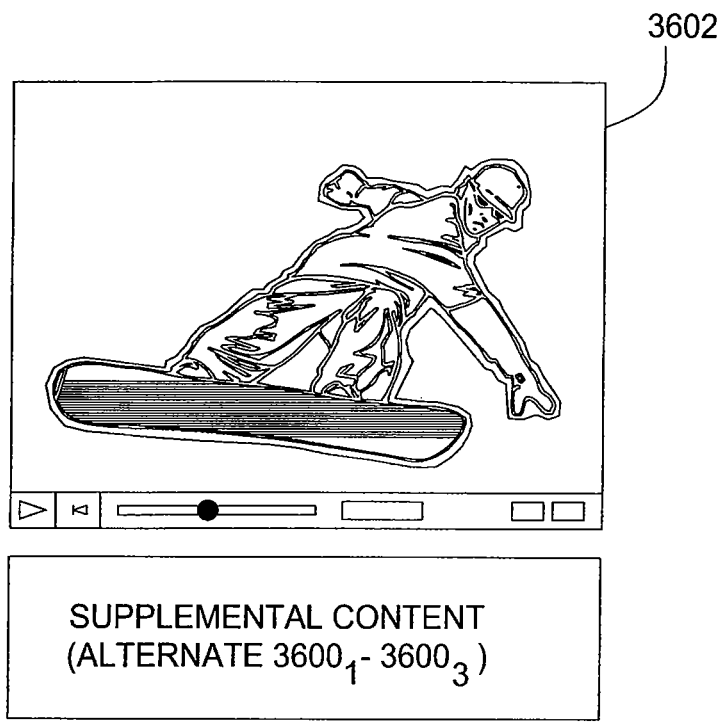
SUPPLEMENTAL CONTENT
(ALTERNATE $3600_1 - 3600_3$)
MAPPING M1
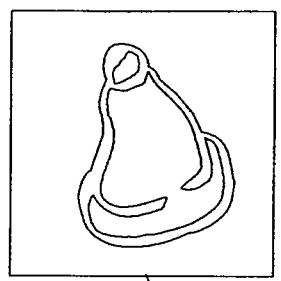
$3600_1$
MAPPING M2
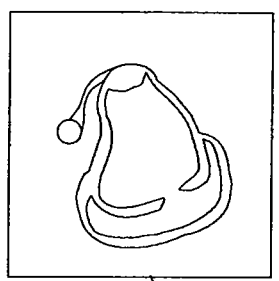
$3600_2$
MAPPING M3
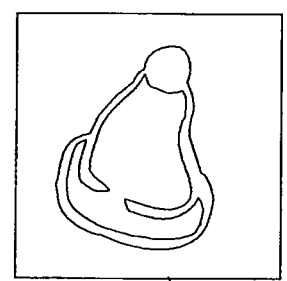
$3600_3$
FIG. 36

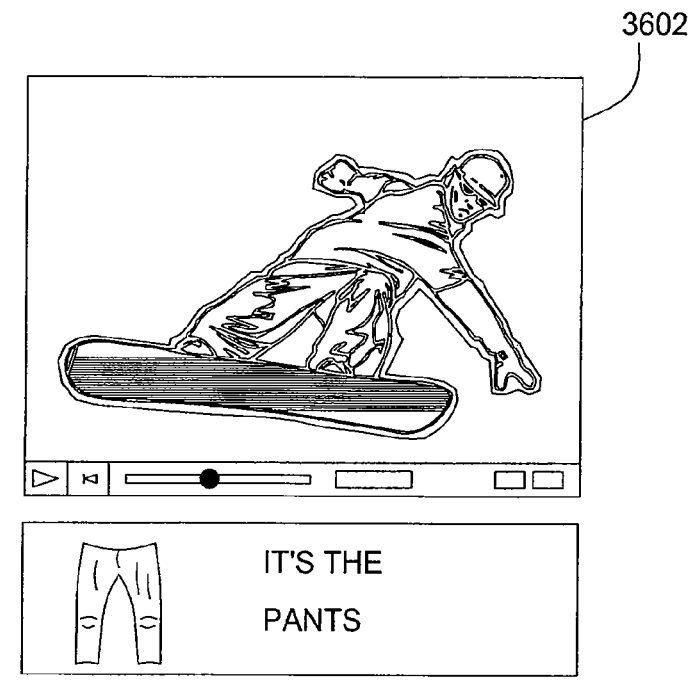
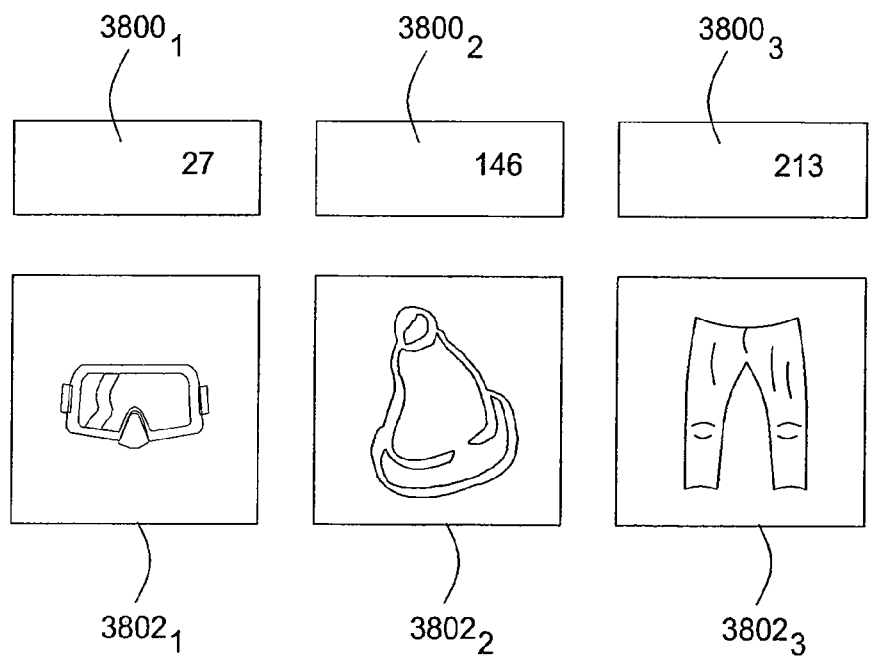
FIG. 38

METHOD AND APPARATUS FOR ANNOTATING MEDIA STREAMS

CROSS REFERENCE TO RELATED APPLICATIONS

This application claims the benefits of U.S. Provisional Patent Application Ser. No. 60/788,367, filed Mar. 30, 2006; Ser. No. 60/788,368, filed Mar. 30, 2006; Ser. No. 60/747,379, filed May 16, 2006; Ser. No. 60/804,091, filed Jun. 6, 2006; Ser. No. 60/866,803, filed Nov. 21, 2006; and Ser. No. 60/871,705, filed Dec. 22, 2006, all of which are herein incorporated by reference in their entireties.

FIELD OF THE INVENTION

The present invention relates generally to advertising and relates more particularly to advertising relating to viewable media streams.

BACKGROUND OF THE INVENTION

With the increasing use by television viewers of digital video recorders (DVRs) to avoid traditional commercial advertising on television and in similar media, product placement is increasingly becoming important as a tool for advertisers to reach consumers. For example, an advertiser may arrange for a particular article to be used in a movie by a popular actress, with the expectation that such use will project a positive product image to consumers and thereby increase sales.

However, product placement is not without its drawbacks. For one, artistic concerns typically dictate that product placement be substantially less obtrusive than traditional commercial advertising (e.g., prominent and repeated display of the name of the article is generally avoided), thus, it may not be clear to viewers what specific article or brand is being depicted. Additionally, even if the article is identifiable, a viewer's potential interest in learning more about or in purchasing the article may be eroded by the time delay between the article being depicted and the viewer having access to the information or to a purchasing opportunity.

Several methods have been proposed for allowing consumers to interact with media depicting product placements, for example to retrieve additional information about a depicted article on demand. However, the enabling technology is still in its relatively early stages, and the user interfaces are therefore typically cumbersome. Moreover, the implementation methodologies tend to be computationally complex and therefore quite expensive. In addition, if the advertising information relating to a product placement is embedded in the media stream itself, it is generally impractical or impossible to add, modify or delete this information. This decreases the value of the advertising over time, due to changes in various characteristics of the placed article, such as the article's retail price and/or availability.

Moreover, these same concerns often carry over to other popular but less traditional forms of media. For instance, services that provide on-demand access to video content over the Internet or another distribution channel (e.g., wherein a filmmaker creates and then uploads a video to an access provider and the access provider then makes the video available for viewing by others, potentially including the general public) are becoming increasingly popular. In some cases, the access provider provides additional functionality, such as enabling viewers to search for specific video content of interest, ranking the videos by viewer popularity, and allowing the community of viewers to rate and post commentary about particular videos.

Providing such services is expensive, particularly with respect to the storage costs and bandwidth transmission costs associated with presenting significant volumes of video content to a large audience. Therefore, a robust revenue stream is required to make a video access provider financially viable and sustainable. Present access providers attempt to generate revenue by various means including by charging users a video hosting fee, by charging viewers a subscription or pay-per-view fee, or, most popularly, by presenting advertising information to the viewing audience via pre-video or post-video commercials, banner ads, pop-up ads, and other types of advertising. In the latter case, revenue models for online video access providers typically face the same challenge that traditional media faces: how to associate effective advertising with the video content while not appearing to intrude on the viewer experience or on the creative integrity of the filmmaker.

In naïve advertising models, the advertising that is presented to viewers of online video is selected randomly and without reference to the subject matter or other characteristics of the specific video content being viewed. In more sophisticated models, access providers strive to improve the relevancy of the advertising they present by leveraging the data and processes that are intended primarily to enable viewers to find video content of interest. This can be accomplished, for example, by referencing information from the video itself (generated, for example, using speech recognition, text recognition, or other technologies for determining the subject matter of a given video) and/or by referencing the search terms that have been input by viewers in their efforts to locate a specific video.

Although such methods have proven to be somewhat effective in enabling video "search" in the online video context, the subject matter-related information that is obtained and/or utilized by such methods is generally too inaccurate, too misleading, too vague, too specific, and/or too voluminous to enable the effective selection and presentation of relevant advertising.

The deficiencies described above are compounded by the fact that effective advertising targeting requires subject matter information to be comprehended within the context of the overall viewing experience. Currently, the automated systems that are necessary to deal with the tremendous volume of videos that are hosted by successful online video access providers (particularly with respect to "user-generated" content) are incapable of addressing such contextual elements. For example, even if an automated system were to recognize that a given video contained subject matter regarding "buying a new sport utility vehicle (SUV)," the system might fail to comprehend and/or take into account the fact that the context of the subject matter was a warning about the adverse impact of SUVs on global warming (and, as such, represented an undesirable advertising placement for an SUV manufacturer).

Furthermore, current advertising targeting systems lack the capacity to address the important connection between the subject matter and context of a video and the demographics and interests of likely viewers of such video. For example, absent specific instructions that have been formulated in advance (and are, therefore, very costly to provide on a large scale), current systems are incapable of surmising that a viewer who is interested in viewing a video warning against purchasing an SUV might also be interested in viewing advertising about seemingly unrelated subject matter such as organic foods, energy-saving light bulbs, trips to see the melting glaciers of Kilimanjaro or the campaign of a local "Green" politician.

Finally, many of the methods that are typically used by access providers to present advertising (e.g., pre-roll, pop-up, or overlay advertising) are intrusive and/or disruptive of the viewing experience, thereby interfering with the filmmaker's creative control over the presentation of his or her video and marring the quality of the viewer's viewing experience.

For these and other reasons, advertising methods conventionally used by online video access providers cause filmmakers to be less willing to create or share videos, viewers to be less willing to watch videos, and advertisers to place a lesser value on the advertising "inventory" offered for sale by the access providers. As a result, online video access providers fail to maximize the potential revenue opportunity represented by their viewing audiences.

Thus, there is a need in the art for a method and apparatus for annotating media streams such as television, hosted online video and the like to provide more effective, user-friendly advertising.

SUMMARY OF THE INVENTION

In one embodiment, the invention is a method and apparatus for annotating media streams. One embodiment of a method for facilitating creation of an annotated media stream by a user includes receiving the media stream from the user, mapping at least one item of supplemental content to at least a portion of the media stream to produce the annotated media stream, and storing the annotated media stream.

In another embodiment, a method for distributing an annotated media stream provided by a user includes receiving the annotated media stream from the user, where the annotated media stream includes at least one item of supplemental content mapped to at least a portion of a media stream to produce the annotated media stream, storing the annotated media stream, receiving a request from a viewer to view the annotated media stream, and distributing the annotated media stream to the viewer.

In another embodiment, a method for distributing an annotated media stream provided by a user includes distributing the annotated media stream to a viewer, where the annotated media stream includes at least one item of supplemental content mapped to at least a portion of a media stream to produce the annotated media stream, and collecting a commission when the annotated media stream is viewed by the viewer. In one embodiment, the collecting requires further action on a part of the viewer (such as selection of a hyperlink contained in the at least one item of supplemental content or consummation of a commercial transaction).

BRIEF DESCRIPTION OF THE DRAWINGS

The teaching of the present invention can be readily understood by considering the following detailed description in conjunction with the accompanying drawings, in which:

FIG. 36 illustrates three items of similar supplemental content for potential mapping to a segment identifier associated with a segment of a media stream;

FIG. 38 illustrates click-through counters for different respective items of rotated supplemental content;

FIG. 42 illustrates an exemplary display in which results of a search such as that enabled by the display of FIG. 41 are presented;

To facilitate understanding, identical reference numerals have been used, where possible, to designate identical elements that are common to the figures.

DETAILED DESCRIPTION

Figure 1:
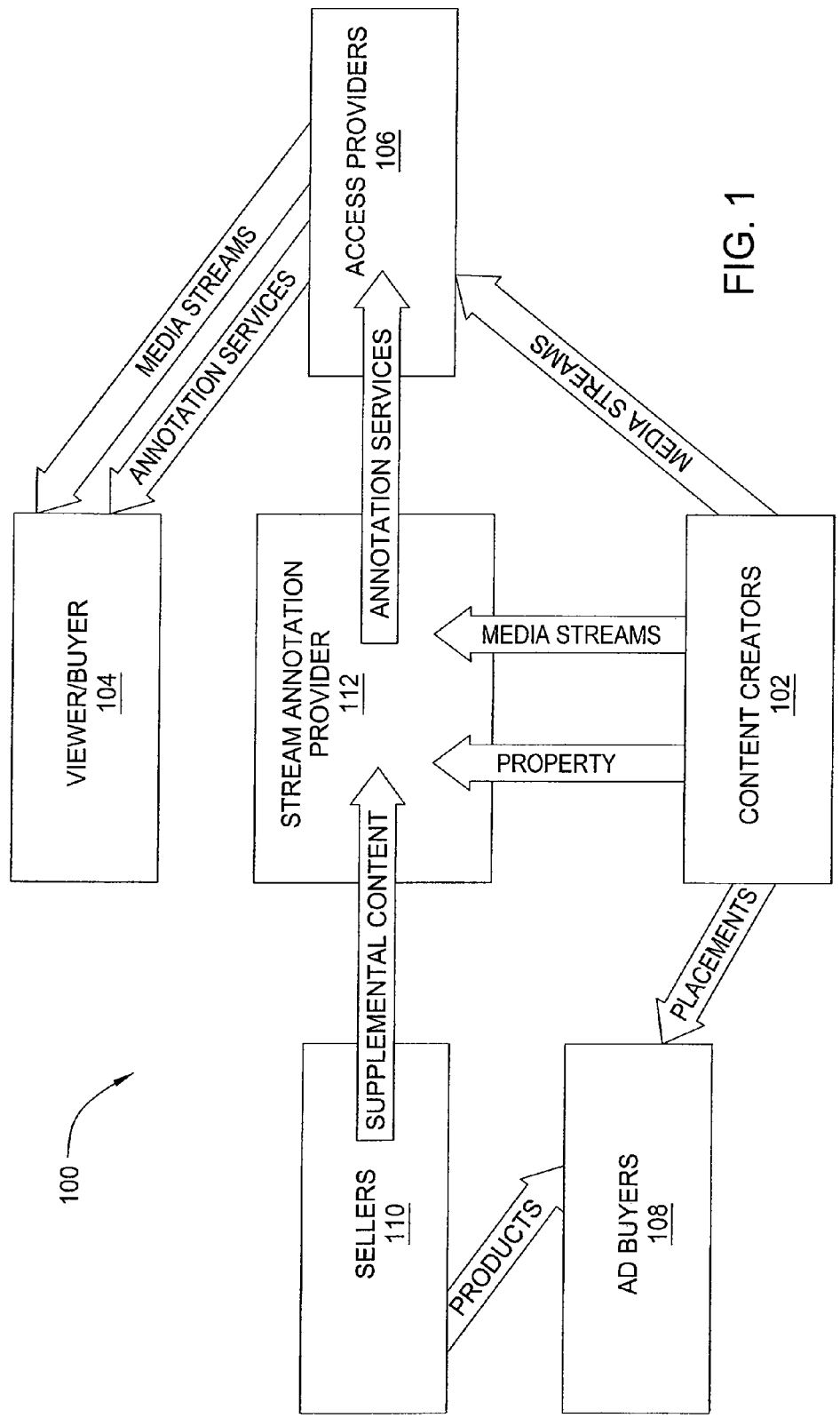
FIG. 1 is a schematic diagram illustrating one embodiment of a television value chain, according to the present invention.

In one embodiment, the present invention relates to the annotation of media streams, including video signals. Embodiments of the invention enable users (e.g., advertisers, content creators and the like) to annotate media streams such as television shows, commercials, infomercials, trailers, shopping channel segments, music videos, movies, VHS or DVD recordings, video-on-demand content, video games (e.g., interactive television games, personal computer games, online games, handheld games and console-based games), "podcasts", webcasts (e.g., teleconferences, educational broadcasts, etc.), hosted online video and the like with a mapping to supplemental content relating to, for example, advertising copy for articles that appear in or are otherwise related to the media streams (e.g., commercial articles, actors, songs, etc.). Thus, product placement and the presentation of related advertising may be implemented in a manner that is computationally simplified from a technical perspective and substantially unobtrusive from a viewer perspective. Moreover, embodiments of the invention enable the generation of a robust revenue stream that may, in turn, provide support for infrastructure and encourage use by content creators, advertisers and viewers. In addition, media streams may be annotated and mapped to items of supplemental content of a non-commercial nature, such as content that is merely informative or aesthetic.

In one embodiment, the annotated media stream is a viewable media stream. By "viewable", it is meant that the media stream comprises at least a video signal, and may additionally comprise other components, such as an audio signal or a text signal. In an alternative embodiment, the media stream does not have a viewable component, but comprises at least an audio component (e.g., streaming music, radio station broadcasts, audio feeds stripped from video streams) or a text component (e.g., streaming text, rich site summary, really simple syndication (RSS) or real-time simple syndication feeds, internet relay chat channels). For example, in one embodiment, the media stream comprises a video signal for display on a display device such as at least one of: a television, a personal computer, a mobile telephone, a personal digital assistant, a portable media player, an in-flight or in-vehicle system display, or a "head-up" display. Where the media stream comprises an audio signal, the user device may comprise at least one of: earphones, headphones or speakers.

In a specific embodiment of the invention, methods are provided for annotating media streams (such as video content) uploaded to an online video distribution and access provider with mappings to supplemental content. The specific content and presentation of the supplemental content, including advertising and viewer interactive opportunities, may be dictated by the user who uploads the media stream (e.g., the content creator), or this user may permit collaborators to select and associate the supplemental content. By enabling the uploading user to control the selection of supplemental content, the invention enables him/her to leverage his/her contextual understanding of the media stream content and of what items of supplemental content may most appeal to likely viewers of the media stream. As a result, more relevant and, thus, more effective advertising is presented to viewers. Further, as a component of a business model, the invention allows the uploading user (and potentially collaborators) to monetize the media stream content.

Thus, unlike current methods for presenting advertising in the online video context, embodiments of the present invention leverage the fact that presenting media streams on the Internet creates a unique potential for viewers to interact with associated advertising (e.g., viewer "click-throughs") and for that interaction to be monitored, analyzed, and acted upon. Also leveraged is the fact that, unlike conventional television distribution, hosted media and video-on-demand is presented and viewed at times selected by each individual viewer, and not simultaneously by a large number of viewers according to a schedule. Thus, as viewing events for the same media stream in a hosted media context are distributed across a range of time, viewer interactions may be monitored and used to enhance the experience of subsequent viewers. Embodiments of the present invention take advantage of this opportunity to optimize the presentation of advertising, for example by showing different selections of advertising to the early viewers of a media stream (e.g., the first 1,000 viewers), monitoring viewer response to each of those advertisement selections, and then using that information to identify and present the most compelling advertising to all subsequent viewers of the media stream and/or to those early viewers when they view this, or other, media streams in the future.

FIG. 1 is a schematic diagram illustrating one embodiment of a broadcast value chain 100, according to the present invention. Specifically, the value chain 100 depicts a television value chain, but those skilled in the art will appreciate that the general concepts embodied therein may be extended to application substantially in any form of media distribution. The value chain 100 comprises a number of entities, including at least: one or more content creators 102, one or more viewers 104, one or more access providers 106, one or more advertisement buyers 108, one or more sellers 110 and a stream annotation service provider 112.

Content creators 102 comprise studios, independent production companies and even individuals who create media streams for distribution to viewers, such as television shows, movies, commercials and videos available over the Internet. The content creators 102 provide the media streams to one or more access providers 106, such as cable, satellite, Internet and telecommunications service providers or World Wide Web hosting sites, who in turn provide the media streams to the viewers 104 who receive the media streams (e.g., via televisions, personal computers, personal digital assistants or other display devices). In accordance with the present invention, the viewers 104 may interact with these media streams via graphical user interfaces operated in conjunction with display devices, remote controls, set top boxes and/or other input/output (I/O) devices.

Sellers 110, such as retailers, manufacturers, and service providers, produce products and services for selling to consumers (e.g., viewers 104). As described above, a common way of advertising such products and services is to purchase advertising time in media streams (e.g., in the form of traditional commercials that interrupt the main program content or in the strategic placement of products within the main program content) from content creators 102. Often the purchase of advertising time or product placement is brokered by an advertisement buyer 108, such as a product placement agent or an advertising agency, who tracks new media releases, purchases advertising time or placements directly from the content creators 102 and places advertisements or products on behalf of the sellers 110. As described above, this brokering often must balance competing concerns, such as the sellers' desire to have their articles placed in a recognizable manner and the content creators' desire to maintain the artistic integrity of the content, not to mention the viewers' desire not to be inundated or bothered by overly intrusive advertising content. Conventionally, with respect to purchasers of advertising time, the seller 110 or its agent then provides the advertising content, possibly brokered by the advertisement buyer 108, to the access provider 106, who then inserts the advertising content in the media stream for distribution to the viewers 104.

According to the present invention, a stream annotation service provider 112 is an intermediary who facilitates the balance of competing concerns by enhancing the efficacy of traditional product placement. As will be described in further detail below, the stream annotation service provider 112 works with the content creators 102, the sellers 110 and/or the access providers 106 to create substantially unobtrusive advertising for media streams that are distributed to viewers 104. In one embodiment, the stream annotation service provider 112 receives specially coded media streams from the content creators 102. In particular, the media streams are coded into a plurality of segments identified by (possibly unique) segment identifiers, an index of which is provided to the stream annotation service provider 112. The index may specify, by segment identifier, which particular segments of the media stream depict particular articles or types of articles that may be suitable for association with advertising content. In addition, the stream annotation service provider 112 receives advertising content from the sellers 110. In accordance with the present invention, the stream annotation service provider 112 then maps the advertising content to segment identifiers associated with segments of the media stream (e.g., in accordance with the index) and stores this mapping. The mapping is then provided to the access providers 106, who can then provide the advertising content to the viewers 104, in accordance with the mapping and the segments of the media stream being viewed.

For example, suppose a content provider 102 has created a media stream comprising a television show, and, at a given point in the television show, an actress is depicted wearing a particular sweater. A retailer (e.g., a seller 110) who sells the sweater could, in accordance with the present invention, contact the stream annotation service provider 112 for assistance in advertising the commercial availability of the sweater. In one embodiment, the stream annotation service provider 112 maps advertising content relating to the sweater to one or more segment identifiers associated with the corresponding segments of the media stream, such that when the media stream is distributed to viewers 104, a viewer 104 can access the advertising content on-demand by sending a signal to the access provider 106 at an appropriate time. The advertising content could include commercial information about the sweater (e.g., sellers from whom it is commercially available, materials, colors, etc.), as well as an option to immediately purchase the sweater (e.g., via the seller's Internet web site, or by interactive television shopping facilities).

In further embodiments described in greater detail below, the stream annotation service provider 112 may also perform data mining tasks in addition to facilitating effective product placement advertising. For instance, the access provider 106 and/or stream annotation service provider 112 may log received viewer signals as a means of gauging the interests of individuals or groups of viewers 104 (e.g., by analyzing the types of products and services for which the viewers 104 request advertising). Such information can be provided to sellers 110 and/or advertisement buyers 108 to aid them in tailoring the advertisements made available to certain individuals or groups of viewers 104, thereby allowing sellers to maximize the efficacy of their product placements. In addition, such information can be useful in assessing the efficacy of particular product placements and in determining appropriate pricing models for these placements.

Although the above describes a particular arrangement in which discrete entities perform certain tasks or functions, those skilled in the art will appreciate that in further embodiments, some entities could provide multiple functionalities. For instance, in an alternative embodiment, stream annotation functionality, as provided by the stream annotation service provider 112 above, could be provided by another party, such as by an access provider 106 or a content creator 102. Alternatively, the stream annotation service provider 112, the access provider 106 or the ad buyer 108 may be responsible for indexing the segment identifiers of the media stream for mapping to advertising content. In further embodiments still, the content creator may be responsible for not only creating the media stream, but for creating advertising content and mappings. Thus, the present invention contemplates many different arrangements for carrying out the same tasks. Stream annotation services according to the present invention thus leverage the existing television value chain.

It may not be cost effective for the content creators to invest much time in pursuing the sellers of the many "minor" products depicted in a given media stream (e.g., articles that appear for only a short time, articles that aren't amenable to generating a viewer response, etc.). Put another way, it is relatively easy and inexpensive for the content creator to simply record the name and seller of each article in a property list; however, it is relatively time intensive to go out and try to "sell" placement of an article.

In one embodiment, the stream annotation service provider 112 hosts a website that lists articles (e.g., products, services, music, people) or types of articles that appear in a given media stream or set of media streams (e.g., a bronze lamp from the 1960s). Sellers may view the website and search for articles of interest, potentially as such articles have been placed within a library or ontology of articles, as discussed in greater detail below. For example, a lamp seller may wish to provide supplemental content (e.g., advertising content) for presentation to viewers featuring an article that is similar to an article actually depicted in a media stream, but that may not be the exact depicted article. If the seller is sufficiently interested, the seller may immediately pay a fixed fee cost for mapping his/her supplemental content for display to viewers (e.g., a picture of the article, more information etc.). The revenue derived from this service may be shared with the content creator who created the media stream, with actors featured in the media stream and the like.

In one embodiment, the stream annotation service provider 112, instead of acting as the market enabler for media stream annotation (i.e., providing the technical infrastructure), the market maker (i.e., the service division brokering placement deals), or the clearing house for the entire media stream market, the stream annotation service provider 112 could choose to be an active participant in the market. That is, the stream annotation service provider 112 could purchase the right (for, say, a flat fee) to associate supplemental content with respect to a particular media stream, and then sell this right (in whole or in parts) to the highest bidder after adding the value of clickstream targeting information. Utilizing this approach, the content creator is provided with a predictable price for its content, the stream annotation service provider 112 bears the risk (and the resulting profit potential) of making the resale, and the sellers benefit because the stream annotation service provider 112 provides a single point of coordination.

Figure 2:
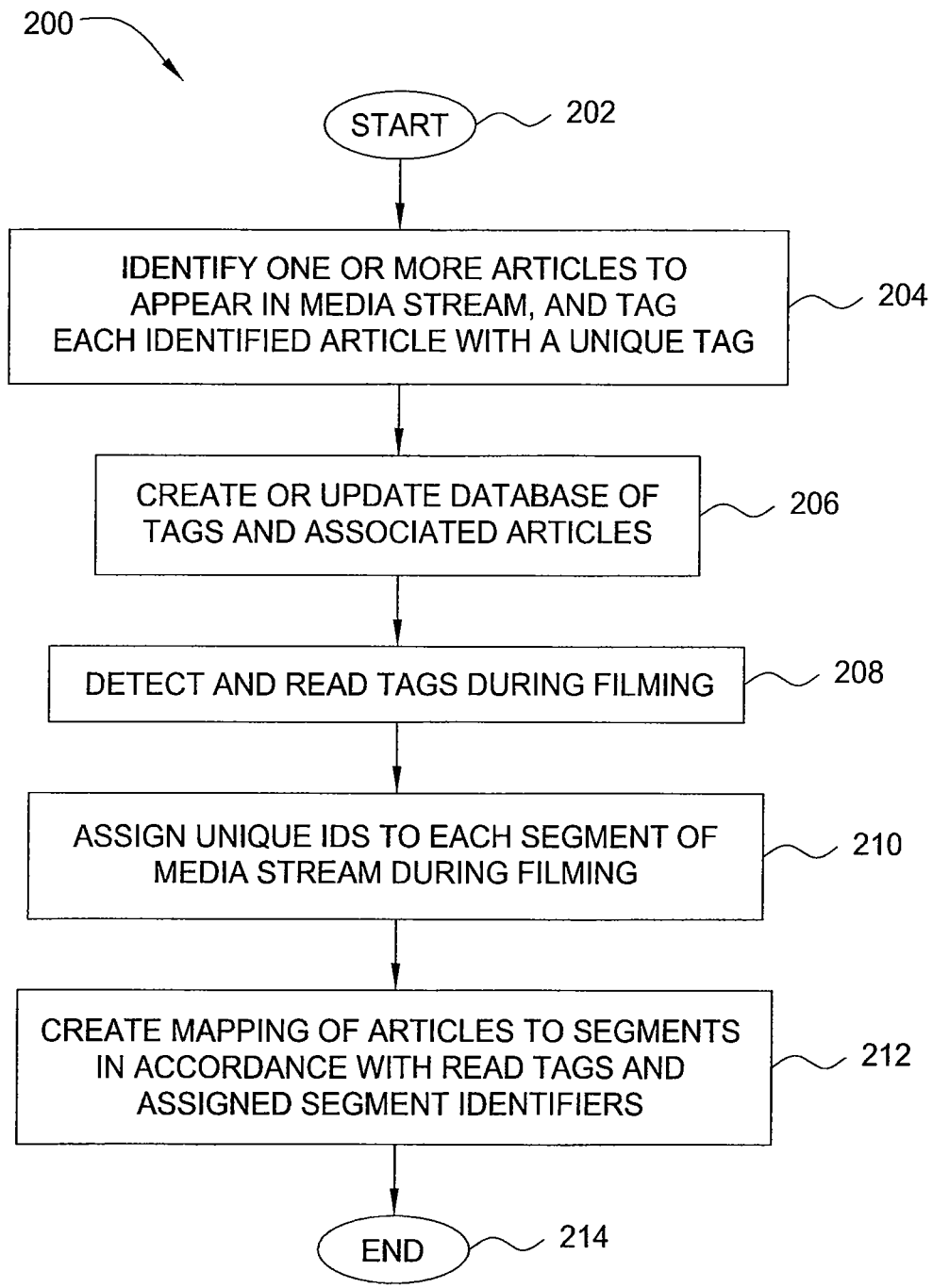
FIG. 2 is a flow diagram illustrating one embodiment of a method for producing coded media streams.

FIG. 2 is a flow diagram illustrating one embodiment of a method 200 for producing coded (i.e., indexed) media streams. The method 200 may be implemented, for example, by a content creator 102 such as those illustrated in FIG. 1, in order to facilitate media stream annotation by a stream annotation service provider such as the stream annotation service provider 112. Alternatively, the method 200 could be implemented entirely at the stream annotation service provider 112.

The method 200 is initialized at step 202 and proceeds to step 204, where the method 200 identifies one or more articles to appear in the media stream (i.e., prior to filming of the media stream) and tags each of the identified articles with a (possibly unique) tag. For example, FIG. 23 illustrates an exemplary filming location 2300 in which a plurality of articles are tagged (i.e., "RFID").

In one embodiment, every article to appear in the media stream is identified and tagged. In one embodiment, the articles are tagged with random tags. In another embodiment, one or more particular articles are allocated specific, unique tags for use in all media streams (e.g., soft drink X will always be tagged with tag Y, regardless of the media stream(s) in which soft drink X is being used and/or regardless of the content creator filming the media stream). In this embodiment, a universal database accessible by the content creator might specify the appropriate tag to be used for a given article. Such a database could be built and maintained by, for example, the stream annotation service provider 112. In one embodiment, the identified articles are tagged with unique radio frequency identification (RFID) tags.

Figure 23:
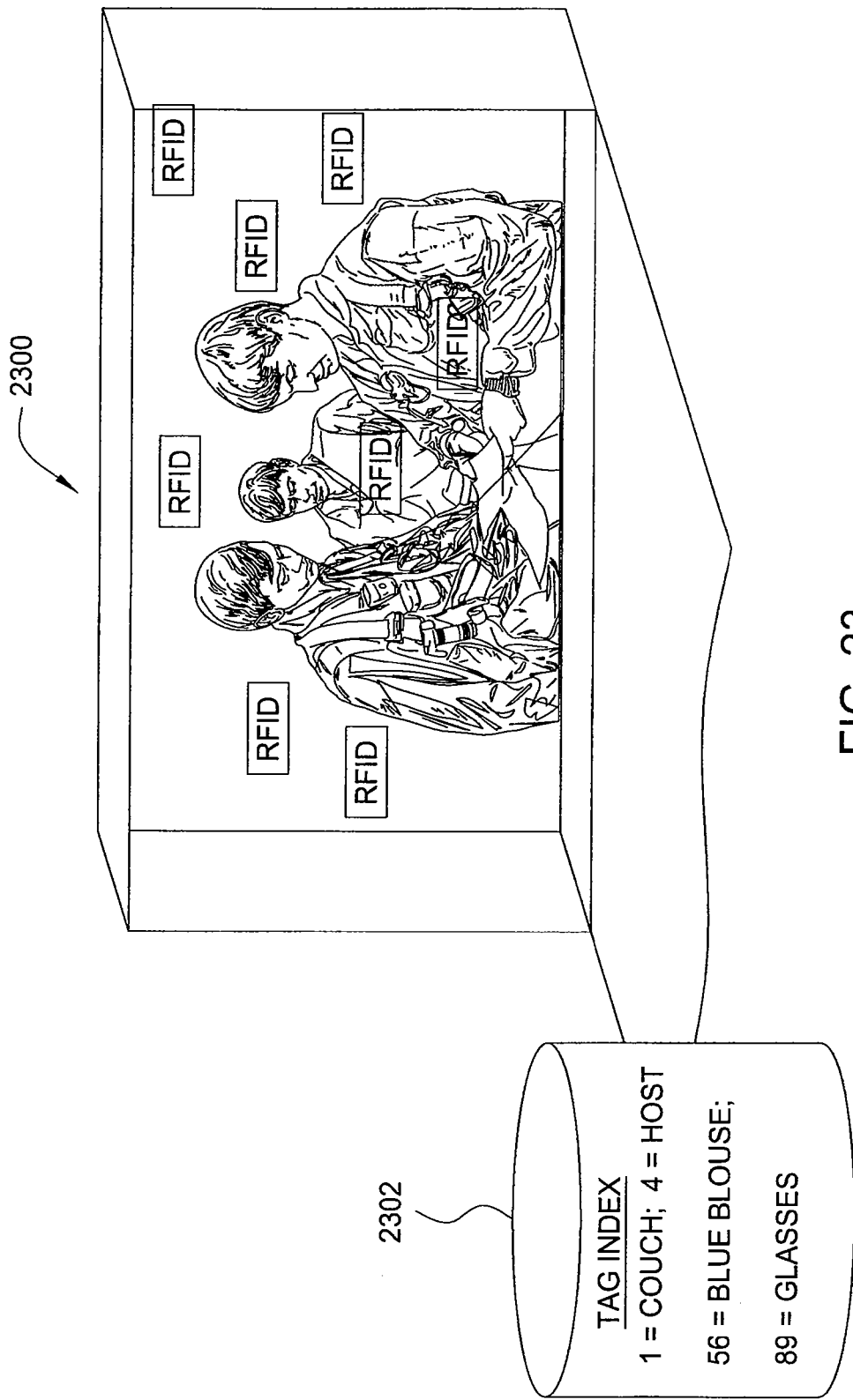
FIG. 23 illustrates an exemplary filming location in which a plurality of articles are tagged.

In step 206, the method 200 creates or updates a database of tags and associated articles (e.g., database 2302 of FIG. 23). In one embodiment, the database entry for an article includes, in addition to the ID of the associated tag, information about the article itself (e.g., as supplied by the seller 110 of the item). In another embodiment, the database entry for an article includes at least one of: a description of the article, an image of the article or a hyperlink or other identifier indicating that the article is already registered with the stream annotation service provider 112 (in which case, information about the article could be pre-loaded in accordance with the seller's wishes). In a further embodiment, the database entry for an article includes a measure of compensation that a seller of the article is willing to provide in exchange for placement and advertising of the article in a media stream.

In step 208, the method detects and reads the tags on tagged articles, in substantially real time as the media stream is filmed. In one embodiment, tags are detected and read by a sensor system that is deployed at the site at which the filming of the media stream occurs (and deployed at an appropriate read distance from the set including the tagged articles). In an alternative embodiment, the sensor system is built into the set (e.g., into the ceiling, the floor and/or the microphone system), rather than linked to the image capturing device(s), to minimize read distance issues. The latter embodiment would be efficient and cost effective particularly for filming locations that are re-used (i.e., not mobile). In another embodiment, the sensor system is a handheld sensor system operable by an individual who walks around the filming location either before or after filming and scans the tagged articles. In this case, information recorded by the handheld sensor system is sent (e.g., via a wireless transmitter or via a network to which the sensor system may be connected) to a decoder for further processing. In another embodiment still, the sensor system is integrated into an image capturing device's field of view or is built into articulating arms that are calibrated and programmed to move in coordination with the image capturing device(s), such that only tags on articles appearing in the image capturing device's field of view (i.e., what is actually filmed as being "in the shot") are read. This embodiment could be achieved in conjunction with a triangulation system to exclude tags outside of the image capturing device's field of view. In the embodiment where the tags are RFID tags, the sensor system is an RFID sensor system that is capable of interrogating the RFID tags.

Figure 24:
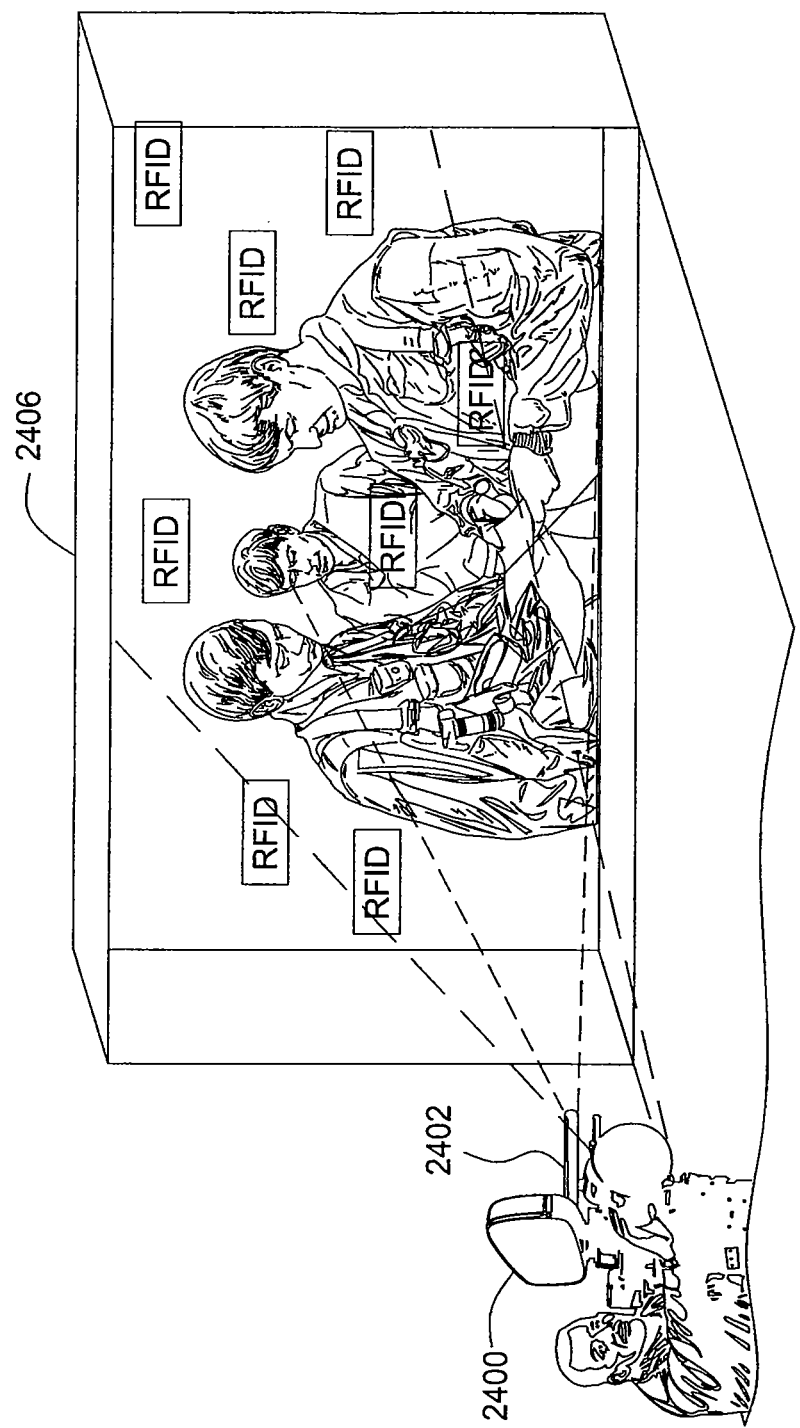
FIG. 24 depicts an image capturing device with integrated RFID sensor system.

For example, as illustrated in FIG. 24, which depicts an image capturing device 2400 with integrated RFID sensor system 2402, the field of filming defined by the image capturing device's field of view and the field of tag activation defined by the sensor system's range highlight the same area of the filming location 2406. Thus, tags that are activated by the sensor system 2402 are read as the tagged articles appear in the image capturing device's field of view.

Figure 20:
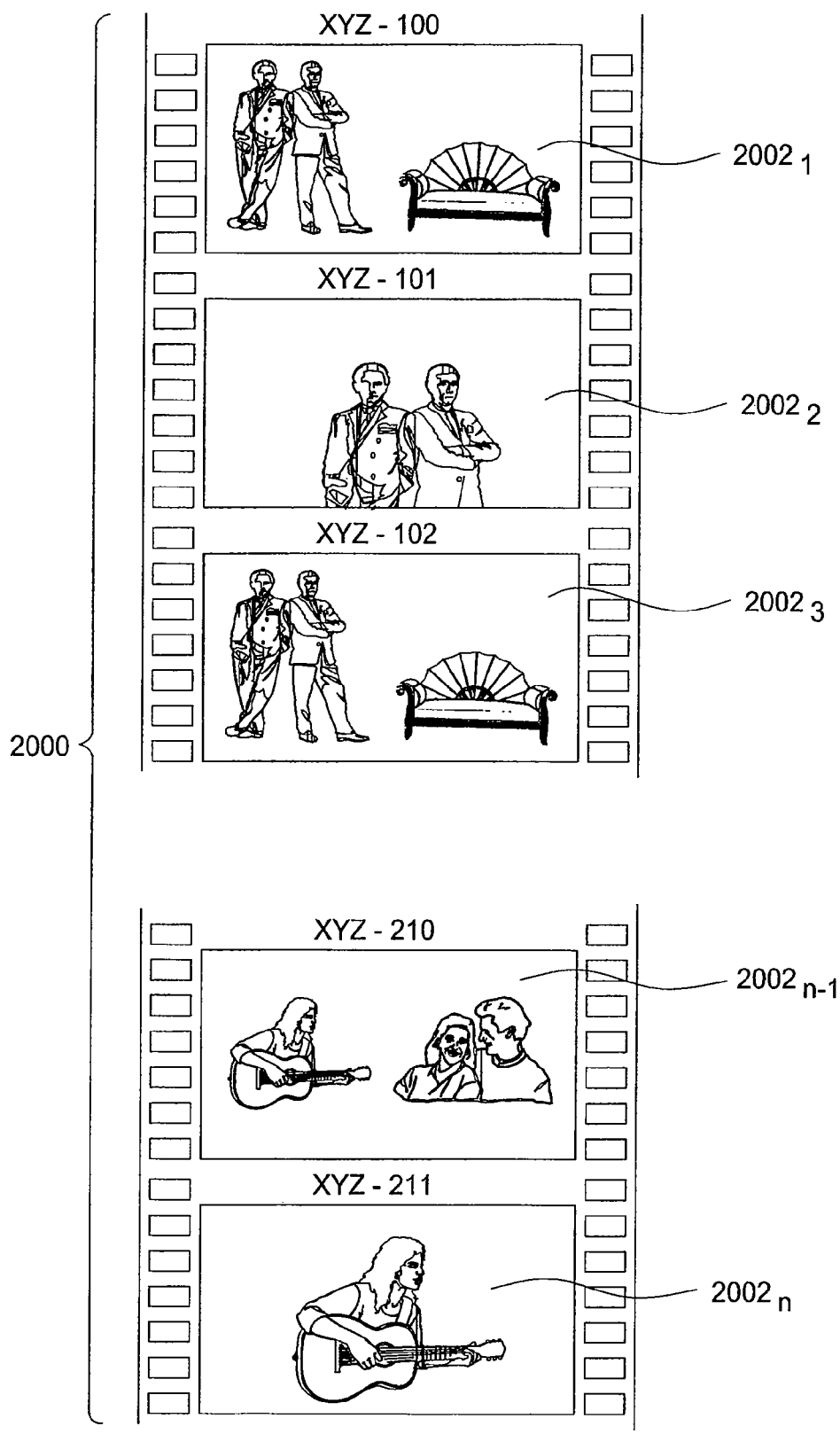
FIG. 20 illustrates an exemplary media stream that has been logically divided into a plurality of segments.

In step 210, the method assigns (possibly unique) identifiers to each frame of the media stream, in substantially real time as the media stream is filmed. In one embodiment, identifiers are assigned to filmed segments (e.g., individual frames) in accordance with an encoder that is communicatively linked to the image capturing device(s) (e.g., video camera, still camera or the like) that is filming the media stream. FIG. 20, for example, illustrates an exemplary media stream 2000 that has been logically divided into a plurality of segments $2002_1$-$2002_n$ (hereinafter collectively referred to as "segments 2002"). In the illustrated example, each segment 2002 comprises one frame of the media stream 2000. Moreover, as illustrated, each segment 2002 is assigned a unique segment identifier—for example, the segment identifier identifying segment $2002_1$ is "XYZ-100"; the segment identifier identifying segment $2002_2$ is "XYZ-101"; the segment identifier identifying segment $2002_3$ is "XYZ-102"; and so on. The "XYZ" portion of the segment identifier is a program identifier identifying the media stream 2000, and the numerical portion of the segment identifier is an identifier identifying the specific segment in the media stream 2000.

It is to be noted that the identifiers assigned to the segments in step 210 may not be the "final" segment identifier that will be transmitted with the completed (and potentially edited) media stream, but the assigned identifiers could be used to generate the final segment identifiers, such as when the streams generated by multiple different image capturing devices that have filmed the same scene are edited together into a single, integrated media stream. Put another way, later-stage encoding may embed the identifiers assigned in step 210 in metadata or the like, as described in greater detail below.

In one embodiment, the segment identifier is embedded as standard "text" in a closed captioning stream associated with the media stream, but with the text altered so that it is invisible to viewers of the media stream and closed captioning stream (e.g., the text of the embedded segment identifiers is presented in the same color as the background or is transparent). This approach would leverage existing systems for adding embedded information to media streams.

In one embodiment, an encoder "reads" the media stream it is encoding in order to obtain the program identifier (e.g., the International Standard Audiovisual Number or ISAN) that is embedded in the media stream, and then performs one or more of the following operations: (a) generating a segment identifier for each segment (possibly unique as compared to the identifiers of the other segments in the media stream); (b) combining the program identifier with the segment identifier, potentially preceded by a unique signifier that identifies that the program and segment identifiers are to be used by a relevant processor (e.g., a set-top box, an access provider's system) to differentiate the program and segment identifiers from other information that may be embedded in the media stream; and (c) automatically embedding the entire code in whatever form(s) are required, such as in the "invisible" text of the closed captioning, the "metadata" section of an Internet Protocol Television (IPTV) frame, the vertical blanking interval, a watermark or the like.

Different types of media streams have different properties (e.g., different frames-per-second rates), and when one media stream that has been encoded with segment identifiers in a first format is translated into a second format, it may be necessary for the segment identifier coding to also change so as to be consistent with the second format. In one embodiment, an encoder reviews the coding embedded in a "master" media stream, references the appropriate adjustment factors (e.g., the adjustments necessary to account for the differing frame rates or other characteristics), and then encodes a "subordinate" media stream with the adjusted coding. This process may be undertaken simultaneously with more than one subordinate media stream.

Referring back to FIG. 2, once the tagged articles have been read and the segments of the media stream have been assigned segment identifiers, the method 200 proceeds to step 212 and creates an index of articles to segment identifiers, in accordance with the data gathered and/or assigned in steps 208 and 210. In the embodiment where an encoder is used to assign identifiers to segments of the media stream, the encoder may be communicatively linked to the sensor system so that, as each segment of the media stream is created during filming, the RFID codes on the RFID tags are read and simultaneously recorded. The index may then be stored in a database (e.g., resident in the encoder or at a central collection point linked via a network).

The method 200 terminates in step 214.

The method 200 thereby enables the automated, real-time indexing of articles appearing in a media stream to segment identifiers of the media stream in which the articles appear. These indices are then provided to the stream annotation service provider 112 to facilitate markup of the media stream with metadata related to the articles appearing therein, as described in greater detail below. It should be noted that while such an index could also be performed by an individual armed with a property list of articles appearing in the video, who watches the media stream and records frames in which the articles appear, the method 200 greatly simplifies the indexing process. For example, the method 200 substantially reduces the number of people and the amount of time required to produce the index, thereby lowering cost and speeding production. In one embodiment, where scenes (i.e., ranges of frames) are cut from the final version of the media stream, the raw encoding or index may be replaced with a final index that is ultimately provided to the stream annotation service provider 112. The frames of this final index may be associated with both their raw identifiers and their final identifiers.

In one embodiment, segments of the media stream (i.e., sequences of frames) are identified (e.g., in the stored index) by (possibly unique) segment identifiers. In one embodiment, the segments identifiers comprise sets of frame numbers associated with the segments (e.g., frames a through c). In another embodiment, the segment identifiers comprise a generated number (e.g., generated by hashing, and then optionally encrypting, frames of the segment). For example, in one embodiment, the segments are temporal segments identified by timecodes or sets of timecodes (e.g., t through t+3) associated with one or more frames of the media stream that occur during the temporal segment. In some embodiments, Moving Picture Experts Group (MPEG) or Society of Motion Picture Television Engineers (SMPTE) time-codes may be used as segment identifiers. In one embodiment, the segment identifiers are associated with segments in a manner such that, when a media stream comprising segments is edited or otherwise transformed, the segment identifiers continue to be associated with the same portion of the program content (e.g., by embedding the segment identifiers in the media stream such that the segment identifiers are directly associated with individual frames).

In an alternative embodiment, the segments correspond to observed times within the media stream (e.g., similar to, for example, stopwatch readings where a stopwatch is started at the same time as the media stream), thereby comprising timing information relative to a known position (e.g., the start of the media stream or the start of a scene within the media stream). Alternatively, the number of frames within the media stream from a known position is used. Preferably, the offset is a positive offset (i.e., relates to a point in the media stream that occurs after the known position), although it is contemplated that the relative position may also be negative.

In a further embodiment still, the media stream may be divided into a relatively small number of first-level segments (e.g., divide a television show into segments corresponding to entire scenes or portions occurring between commercial breaks or a chapter of a DVD), each of which is further associated with a series of second-level sub-segments, comprising time identifications (e.g., stopwatch readings) relative to the start of the first-level segment. For example, the media stream could be divided into n first-level segments, $S_1$, $S_2, \ldots, S_n$. Each of these first-level segments is then further associated with relative timing information that corresponds to particular sub-segments of the first-level segment, according to the embodiments described earlier herein, just as if the first-level segment were the complete media stream. This would improve the accuracy of the association implied by the index, given that the times associated with each segment start from a fixed point in a (presumably) uninterrupted stream.

In further embodiments of the method 200, entries in the index (i.e., entries for articles and corresponding frames) are further augmented with scene information (e.g., actors appearing in the scene, location of the scene, etc.). This additional annotation could aid sellers and advertisement buyers in understanding the contexts in which their articles are to be presented. Alternatively, this augmentation could be performed by the stream annotation service provider 112.

In a further embodiment still, an index entry identifies a frame or series of frames that depict an indexed article to its greatest advantage. For example, the frame or frames may depict a "best" view of the article from a seller's (or buyer's) standpoint, such as the segment in which the entire article is visible for an extended period of time. In this embodiment, the article may be associated with multiple different "scenes", such as a "full" or theatrical scene that depicts the article in an advantageous context (e.g., a particular article is features in a crowd-pleasing scene involving two popular actors), and an "advertising" scene that depicts a few seconds before, during and after the article appears. In one embodiment, a user may be enabled to select a scene from the index entry based on specified parameters (e.g., "all shoes worn by the lead singer in any music video featuring the band XYZ").

In one embodiment, a database of tags and articles is maintained in order to identify articles that are mapped to different tags but that are likely the same article. For example, one content creator might identify a particular pair of sunglasses as the "Brand X Model Y, Men's Sunglasses" whereas another content creator might use the phrase "Model Y Sunglasses by Brand X." By identifying such potential matches, a user could easily review such possible connection, change the descriptions so that the descriptions are more uniform, and/or formalize a link between the two articles so that tasks such as updating related advertising output can be done more easily and accurately. This search/identification process would potentially reach out into databases maintained by different content creators and/or by an access provider or stream annotation service provider.

In one embodiment, a user is not permitted to modify data from an outside database (e.g., a third-party provided catalog of articles). The user is granted read access only, but is provided with a mechanism to easily notify the relevant parties of the potential link between two articles and to administer parallel changes. For example, a revised description that both parties can download could be provided by a third party such as an access provider or stream annotation service provider. Alternatively, a collaborative tool may be provided in which both parties (and perhaps third parties such as advertisement brokers or sellers) could offer their suggestions before finalizing the new description.

In one embodiment, one or more RFID tags are recorded by the content creator to include information regarding a particular filming situation. For example, an entire segment might comprise an action sequence involving martial arts, and the film crew (e.g., at the direction of their marketing department) might want to have that information recorded. For example, knowing that the scene involves martial arts might enable certain marketing information/metrics to be generated when a viewer ultimately signals an interest in obtaining supplemental content during presentation of the segment, as discussed in further detail below (e.g., it could be learned that a particular viewer or class of viewers responds well to video game advertising that follows action sequences). Other examples might be to record a segment as a "musical sequence," as something involving Venice Beach (e.g., a particular location), as employing a certain type of filming technique (e.g., black and white only) or the like. All of these types of information are independent of any given article in the segment but may nonetheless be of significant interest for the purposes of targeting supplemental content.

In such circumstances, it will be useful to supplement the RFID tagging process discussed previously with RFID indexing that is article-independent, but that is still provided "live on set." Accordingly, the "segment RFID tag" could be placed in close proximity to each RFID sensor located on an image capturing device, so that the segment RFID tag is always indexed during filming, even though the segment RFID tag is not in the field of view of the image capturing device. For example, the segment RFID tag could be inserted in a holding bracket that is above the image capturing device lens but that is within range of the RFID sensor beam. In one embodiment, instead of using an RFID tag, an input device such as a keyboard could be used to input segment specific, item independent information for indexing in the film along with the RFID-sensed articles.

In one embodiment, if certain articles are physically too small in size to accommodate an RFID tag (or, indeed, there may be no article at all but merely a "concept"), an RFID tag could be placed in proximity with the actual article so that the film is indexed properly. For example, a wrist watch might be too small to accommodate an RFID tag, but the shirt sleeve appearing right next to the watch would provide sufficient proximity to ensure accurate indexing.

Figure 3:
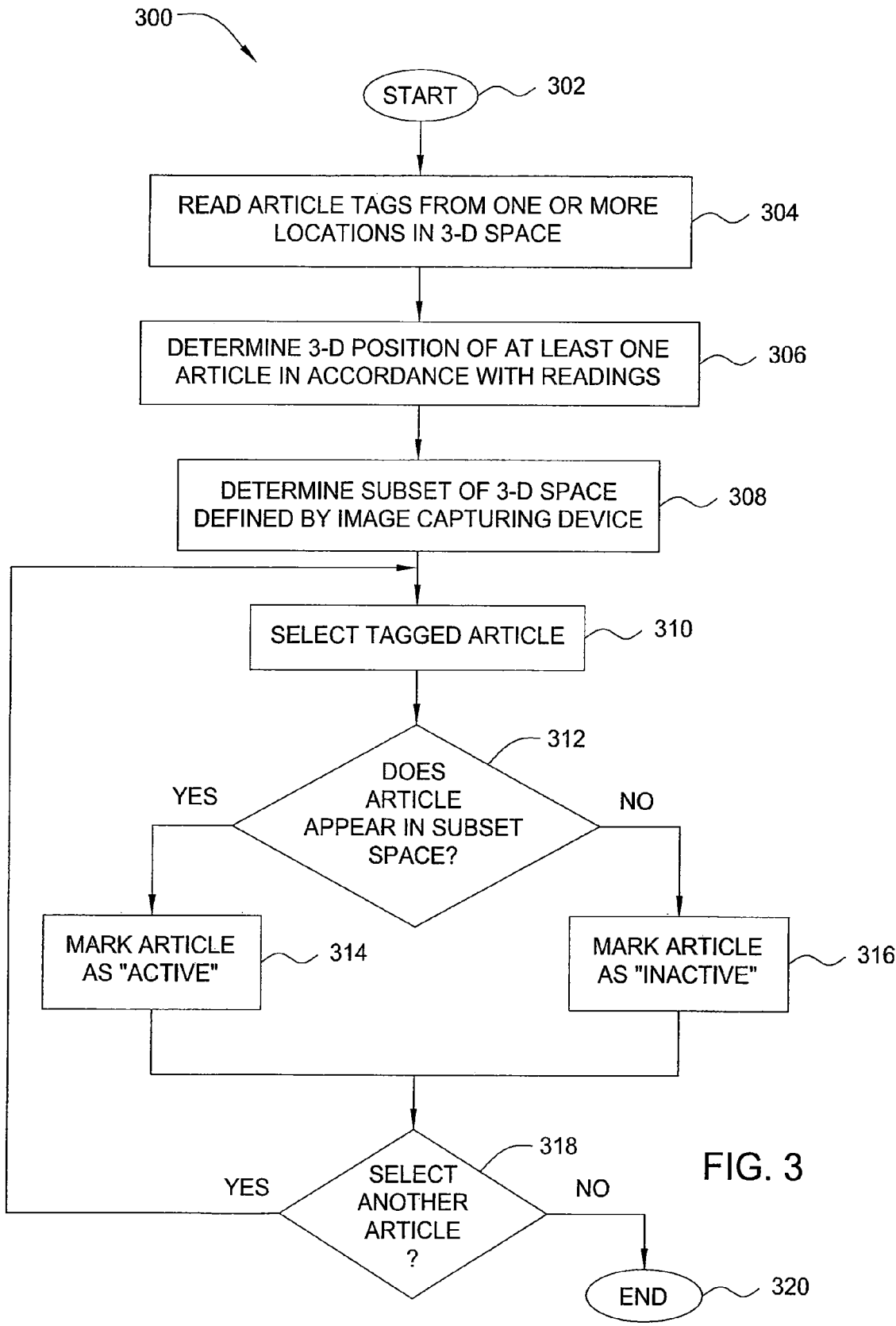
FIG. 3 is a flow diagram illustrating one embodiment of a method for detecting and readings tags on articles appearing in a media stream, according to the present invention.

FIG. 3 is a flow diagram illustrating one embodiment of a method 300 for detecting and readings tags on articles appearing in a media stream, according to the present invention. In particular, the method 300 provides a means of detecting and locating tagged articles in a three-dimensional space (e.g., a film set), via use of a sensor array as discussed above. The method 300 may be implemented, for example, in accordance with step 208 of the method 200.

The method 300 is initialized at step 302 and proceeds to step 304, where the method 300 reads one or more article tags from one or more locations in the three dimensional space (e.g., defined by sensors placed in the ceiling and/or floor, or in other locations such as a microphone boom).

In step 306, the method 300 determines the three-dimensional (i.e., x, y, z) position of one or more of the articles, in accordance with the readings. In one embodiment, the determination of an article's three-dimensional position is assisted by readings reflecting the relative signal strength of the article's tag. For example, if a sensor in the ceiling is positioned ten feet from the floor and it is known (e.g., by ultrasound, laser or other means) that a signal strength of s indicates a distance of four feet from the sensor, the "height" of an article whose tag emits a signal of strength s in the three dimensional space can be calculated as approximately six feet from the floor.

In step 308, the method 300 identifies a subset of the three-dimensional space detected by the sensor array that is defined by the range of view of an image capturing device. In one embodiment, this subset space is determined by a framing process that first locates the image capturing device within the three-dimensional space (e.g., by physically measuring the location of the image capturing device or by tagging the image capturing device itself with a tag that is readable by the sensor array). This places the image capturing device relative to the scene being filmed for the media stream. Once the image capturing device's relative position is known, readings are obtained from the image capturing device to determine the three-dimensional direction in which the lens of the image capturing device is pointed along with the zoom/field of view of the image capturing device (e.g., a panoramic shot versus a "tight" shot). These readings are then combined to produce the three-dimensional subset space. This subset space is continuously recalculated as filming takes place, since it will change as the image capturing device pans, tilts and zooms.

In step 310, the method 300 selects a tagged article in the three-dimensional space defined by the sensor array. The method 300 then proceeds to step 312 and determines whether the selected article appears in the subset space determined by the framing process (i.e., step 308). This may be done by comparing the output of step 306 to the output of step 308.

Figure 25:
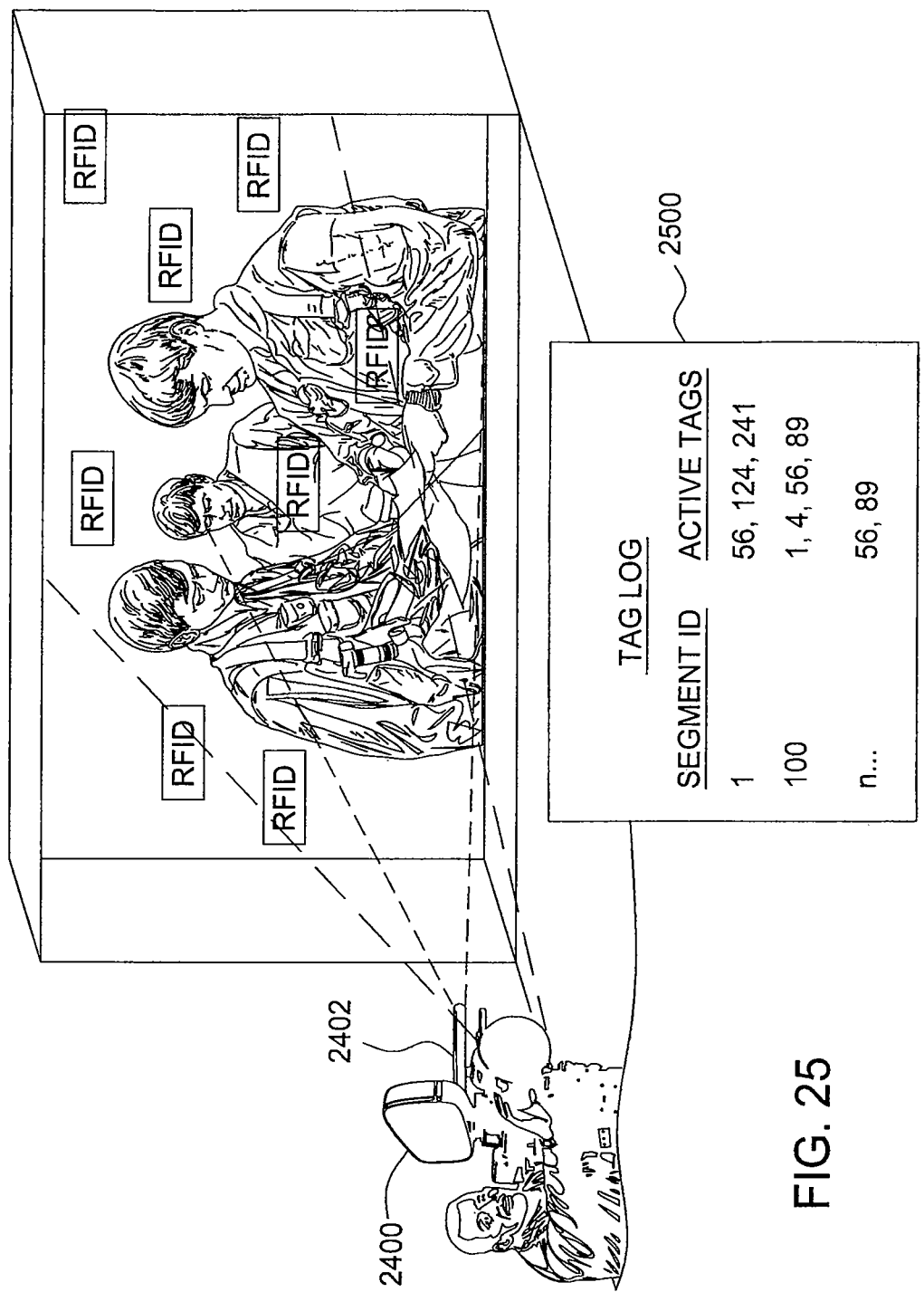
FIG. 25, for example, illustrates an exemplary tag log that identifies the active tags associated with each segment identifier identifying a media stream segment.

If the method 300 concludes in step 310 that the selected article appears in the subset space, the method 300 proceeds to step 314 and marks the selected article as "active" in a tag log. FIG. 25, for example, illustrates an exemplary tag log 2500 that identifies the active tags associated with each segment identifier identifying a media stream segment.

Alternatively, if the method 300 concludes in step 310 that the selected article does not appear in the subset space, the method 300 proceeds to step 316 and marks the selected article as "inactive". In one embodiment, a first article that is associated with a second article (e.g., a pair of eyeglasses worn by an actor) may be marked as active within the subset space whenever the second article is marked as active, even if the first article is marked as inactive within the subset space or is not marked at all.

In step 318, the method 300 determines whether to select another tagged article in the three-dimensional space defined by the sensor array. In one embodiment, the method 300 selects another tagged article if there is at least one tagged article that has not yet been located and marked as active or inactive. If the method 300 concludes in step 318 that another tagged article should be selected, the method 300 returns to step 310 and proceeds as described above to select another tagged (but not yet marked) article. Alternatively, if the method 300 concludes in step 318 that another tagged article should not be selected, the method 300 terminates in step 320. Thus, the method 300 repeats or iterates until all tagged articles that are meant to be marked (as active or inactive) are marked.

As described above with respect to FIG. 2, a substantially simultaneous process during filming could encode the frames of the media stream with (possibly unique) segment identifiers. A log file could match these segment identifiers with a list of articles that are "active" at the moments in time that the frames were created. In one embodiment, this log file is organized article-by-article such that each article is listed only once, but is associated with all of the relevant segment identifiers of the media stream.

In one embodiment, the method 300 could be adapted to encode a live content feed. In such a case, the raw segment identifiers would be the only identifiers associated with the segments of the media stream. In such a case, a live operator could supplement the index with additional articles that should be associated with the segment identifiers but that aren't marked as "active" (e.g., articles that were not tagged or that are associated with "concepts" suggested by the media stream, such as a beach vacation, rather than with tangible, visible goods). In addition, such non-marked articles could be associated with an edited index (i.e., as opposed to a raw index created for a live content feed). In addition, the operator may be enabled to edit the active/inactive designations of articles marked by the method 300 (e.g., to correct any inaccuracies). For example, the operator might access the set of "inactive" articles in order to add articles to the index that were perceived by the automated method 300 to be just out of a scene, but did, in fact, appear.

Figure 4:
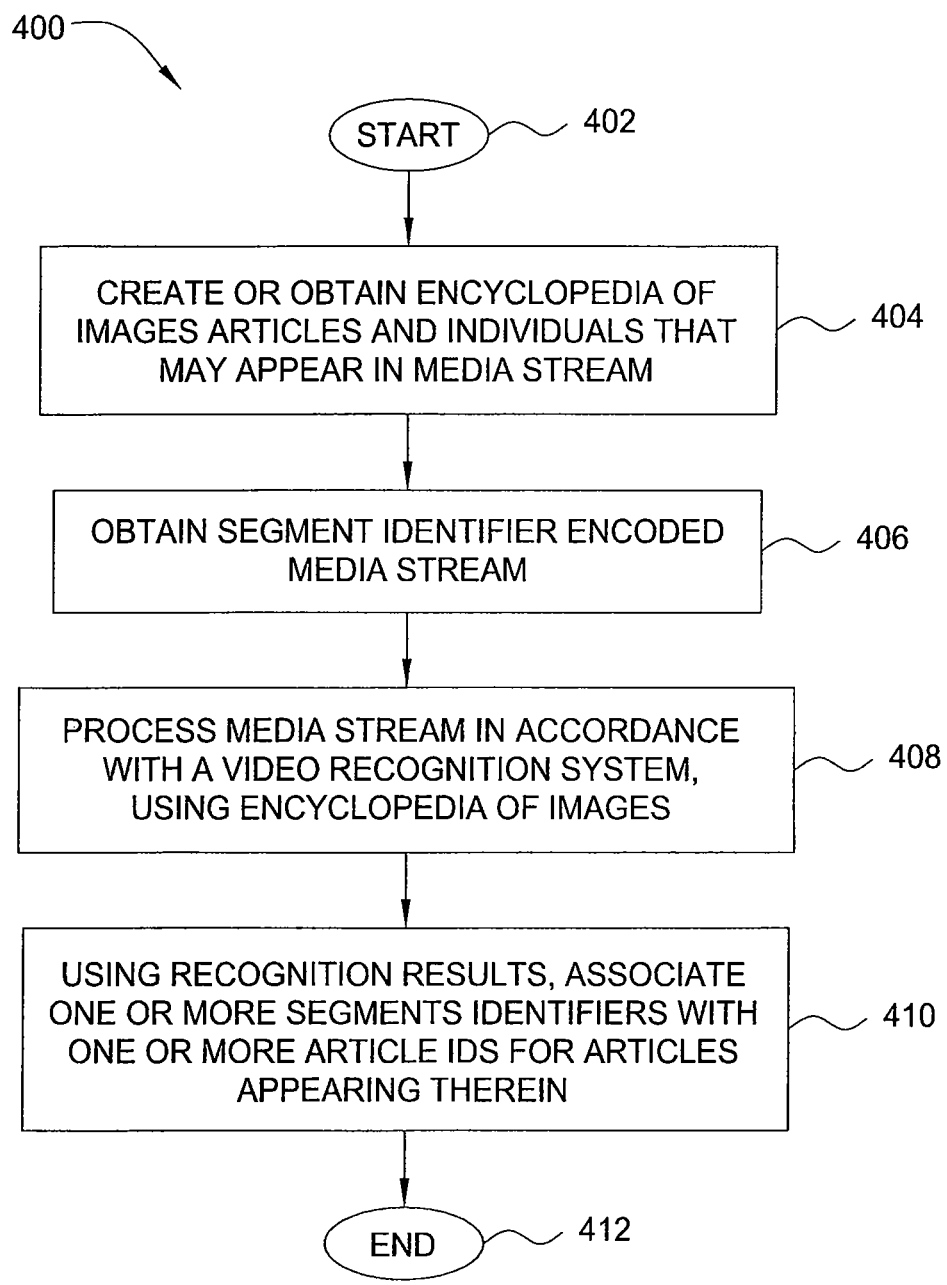
FIG. 4 is a flow diagram illustrating another embodiment of a method for producing coded media streams.

FIG. 4 is a flow diagram illustrating another embodiment of a method 400 for producing coded media streams. Like the method 200, the method 400 may be implemented by a content creator 102 in order to facilitate stream annotation by the stream annotation service provider 112. Alternatively, the method 400 could be implemented entirely at the stream annotation service provider 112.

The method 400 is initialized at step 402 and proceeds to step 404, where the method 400 creates or obtains an "encyclopedia" (i.e., a database) of images of one or more articles and/or individuals (e.g., actors) that will potentially appear in a media stream. In one embodiment, the images in the database are optimized for video recognition purposes. This might include, for example, filming an article or individual from multiple angles or with different lighting to facilitate later recognition (so that the article may be recognized regardless of how the article is actually filmed, such as in daytime versus nighttime scenes). In one embodiment, a database entry for an article or individual includes, in addition to one or more images, one or more of the following: textual identifying information about the article or individual, an identification number that uniquely identifies the article or individual, an indication of whether the article or individual is likely to be moving in the media stream (e.g., a car) or static and other data characterizing certain attributes that may enhance the accuracy of a video recognition system (e.g., luminance, hue, or reflectivity). In another embodiment, the filming location is included as an entry in the database (e.g., an outdoor scene featuring snow and ice versus an indoor scene featuring the inside of a tent), enabling differentiation of foreground objects from the background scene. In another embodiment, a database entry for an article or individual could be selected from entries in another encyclopedia.

In step 406, the method 400 obtains a segment identifier-encoded media stream (i.e., a media stream whose segments have already been encoded with identifying information). The method 400 then proceeds to step 408 and processes the media stream in accordance with a video recognition system, using the encyclopedia of images created in step 404 as an input to facilitate recognition. The relatively small size of the encyclopedia should enable more accurate recognition of articles appearing in the media stream.

In step 410, the method uses the recognition results to associate one or more segment identifiers of the media stream with one or more article (or individual) IDs for articles (or individuals) appearing in the corresponding segment(s). In one embodiment, association of segment identifiers and article (or individual) IDs is contingent upon human verification of the recognition results. Thus, an index of articles (and individuals) to segments is created. This index may then be provided, for example, to the stream annotation service provider 112 for further use and processing, as described in greater detail below. The method 400 then terminates in step 412.

In further embodiments of the method 400, the video recognition processing that is performed on the media stream (i.e., as in step 408) is performed simultaneously with the filming of the media stream (as opposed to being performed on a previously filmed media stream). If segment identifiers are unique, the accuracy of the resultant index should be maintained regardless of any subsequent editing.

In a further embodiment still, the tagging techniques of the method 200 could be combined with the method 400 for enhanced recognition results. For example, a tag ID reading could be used to cross-verify video recognition processing results.

In one embodiment, a video recognition system is programmed to "learn" that certain combinations of articles tend to move together (e.g., eyeglasses and earrings are likely to be in the same field of view and to be positioned near each other).

In another embodiment, a number representing the "zoom" of the media stream is encoded therein (e.g., using the image capturing device(s) that filmed the media stream). This might be useful in terms of helping determine the true size of shapes depicted within a segment of the media stream. For example, knowing that a given segment of the media stream depicts a "tight" shot and that both an earring and a necklace are depicted in the segment might enable an automated recognition system to accurately differentiate the earring from the necklace.

In one embodiment, the image capturing device(s) filming the media stream is linked with a segment identifier encoder and with a video recognition system (which is in turn linked to an encyclopedia of articles appearing in the media stream). In this case, both the segment identifier encoding and the mapping to supplemental content are performed simultaneously with the filming of the media stream. If all segment identifiers are selected so as to be unique, no matter how the media stream is ultimately edited, the segment identifiers will still refer to the same items of supplemental content.

In one embodiment, each media stream's encyclopedia of articles depicted therein is uploaded to an access provider, a stream annotation service provider or other central hosting service. Then, an individual doing "entry" camera work on another media stream to populate the encyclopedia could capture an image of each article and enter very basic information. The image and basic information could be sent to the access provider, where the image and basic information would be compared with information already on file. The access provider would then send back "probable" matches that a user could simply adopt or reject. This would simplify the process of inputting the initial information into the encyclopedia.

In one embodiment, the encyclopedia of articles appearing in a media stream is uploaded to an access provider prior to filming of the media stream to facilitate various aspects of the product placement process (e.g., sending an email to an advertiser stating that "your article will be appearing in a media stream—contact the access provider for additional information regarding how you can provide targeted advertising and immediate purchase opportunities").

Video recognition may also be used to identify segments of a media stream in which personalized product placements can be digitally added. For example, a video recognition system might recognize a soft drink can appearing in a media stream represents an "old" can design used by the seller of the soft drink. This knowledge could allow the seller to determine the segments of the media stream in which a new image depicting a more current design of the can could be inserted. Alternatively, data mining techniques could be implemented in order to determine optimal articles to depict with respect to a given viewer (e.g., a soft drink versus a can of beer versus a glass of milk).

Figure 5:
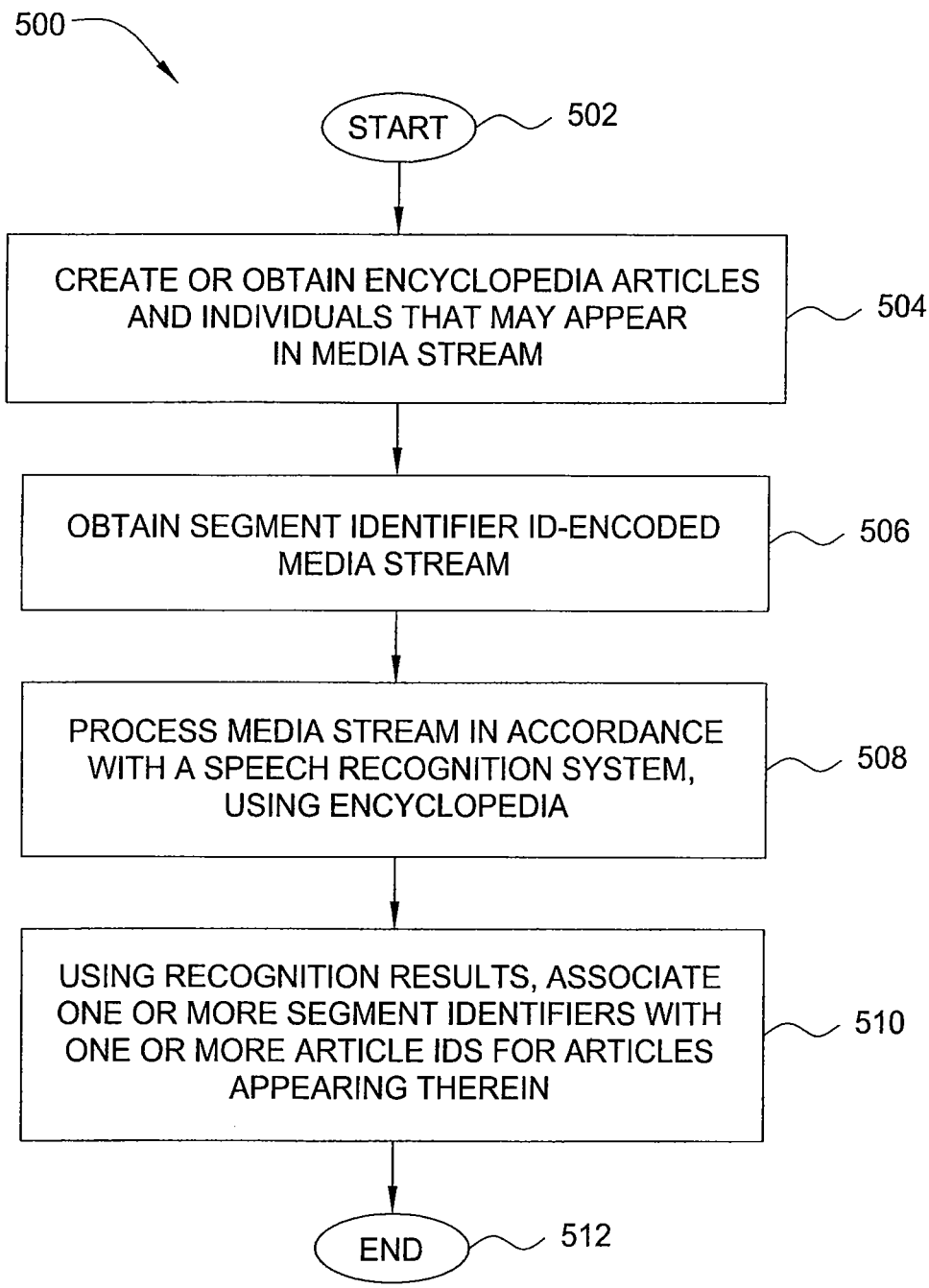
FIG. 5 is a flow diagram illustrating another embodiment of a method for producing coded media streams.

FIG. 5 is a flow diagram illustrating another embodiment of a method 500 for producing coded media streams. Specifically, the method 500 produces coded media streams based on audio cues in the original media stream (i.e., as opposed to video cues). That is, the method 500 allows mapping of metadata related to articles that are mentioned verbally, but may not necessarily be depicted visually, in the media stream. Like the methods 200 and 400, the method 500 may be implemented by a content creator 102 in order to facilitate stream annotation by a stream annotation service provider 112. Alternatively, the method 500 could be implemented entirely at the stream annotation service provider 112.

The method 500 is initialized at step 502 and proceeds to step 504, where the method 500 creates or obtains an "encyclopedia" (i.e., a database) of one or more articles and/or individuals (e.g., actors) that will potentially appear in a media stream. In one embodiment, a database entry for an article or individual includes at least one of: an identifying name for the article or individual, one or more images of the article or individual, textual identifying information about the article or individual, an identification number that uniquely identifies the article or individual, an indication of whether the article or individual is likely to be moving in the media stream (e.g., a car) or static and other data characterizing certain attributes that may enhance the accuracy of a video recognition system (e.g., luminance, hue or reflectivity). In another embodiment, a database entry for an article or individual could be obtained by comparison to entries in another encyclopedia, simplifying this initial step. In another embodiment, the database is further populated by automatically generating a range of potentially relevant supplemental database entries whenever a new entry is created (e.g., a new entry for the Eiffel Tower automatically triggers generation of entries associated with Paris, such as an entry for Notre Dame).

In step 506, the method 500 obtains a segment identifier-encoded media stream (i.e., a media stream whose segments have already been encoded with identifying information). The method 500 then proceeds to step 508 and processes the media stream in accordance with a speech recognition system, using the encyclopedia created in step 504 as an input to facilitate recognition. The relatively small size of the encyclopedia should enable more accurate recognition of articles mentioned in the media stream.

In step 510, the method uses the recognition results to associate one or more segment identifiers of the media stream with one or more article (or individual) IDs for articles (or individuals) appearing in the corresponding segment(s). In one embodiment, association of segment identifiers and article (or individual) IDs is contingent upon human verification of the recognition results. Thus, an index of articles (and individuals) to segments is created. This index may then be provided, for example, to the stream annotation service provider 112 for further use and processing, as described in greater detail below. The method 500 is then terminates in step 512.

In further embodiments of the method 500, the recognition processing that is performed on the media stream (i.e., as in step 508) is performed in accordance with closed captioning information (i.e., a text search) rather than with audio information.

In a further embodiment still, the tagging techniques of the method 200 could be combined with the method 500 for enhanced recognition results. For example, a tag ID could be used to verify audio or text recognition processing results.

Figure 6:
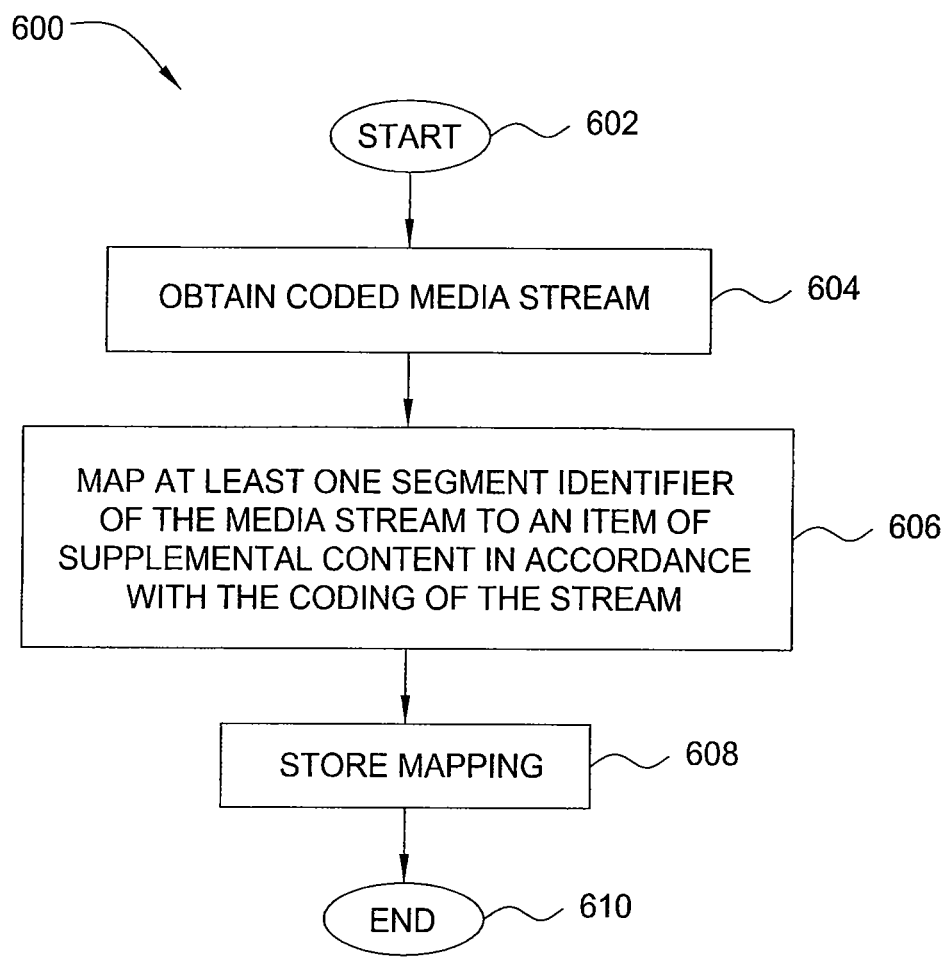
FIG. 6 is a flow diagram illustrating one embodiment of a method for annotating media streams, according to the present invention.

FIG. 6 is a flow diagram illustrating one embodiment of a method 600 for annotating media streams, according to the present invention. The method 600 may be implemented, for example, by an entity that produces or edits media streams for release (including release by traditional television distribution means or by distribution on a network, including the Internet). For instance, the method 600 may be implemented in its entirety by the stream annotation service provider 112 of FIG. 1. Alternatively, the method 600 may be implemented by the stream annotation service provider 112 in conjunction with a content creator 102.

The method 600 is initialized at step 602 and proceeds to step 604, where the method 600 obtains a coded (i.e., indexed) media stream, e.g., as created by the content creator 102. As discussed above, at least a portion of the coded media stream is logically divided into a plurality of identified segments comprising one or more frames of the media stream. These segments are further associated with one or more articles appearing therein.

In step 606, the method 600 maps at least one of the segment identifiers to at least one item of supplemental content or metadata (e.g., data about the media stream that is underlying the video signal). In one embodiment, the supplemental content comprises information (such as commercial information or documentary sources) relating to one or more articles that appear in the media stream. As discussed above, the article may be a commercial product appearing in the media stream (e.g., a sweater worn by or a beverage consumed by an actress), an individual appearing in or associated with the media stream (e.g., an actor or director) an audio signal that is part of the media stream (e.g., a soundtrack song) or a "concept" suggested by at least a portion of the media stream (e.g., a beach scene may suggest a vacation, a restaurant scene may suggest restaurant reservations, or a media stream comprising a film might suggest obtaining tickets for a screening of a sequel). In further embodiments, the supplemental content may comprise coupons for commercial products. Redemption of such coupons may be enabled, for example, by allowing a viewer to store a given segment identifier from a media stream, which will trigger the storage of a token under the viewer's account with a service provider. In one embodiment, the token may be printed and presented to a seller. To prevent using the same token for multiple different purchasers, data regarding a transaction consummated in a connection with the token may be recorded.

Thus, for example, the item of supplemental content may be a filmography of an actor appearing in the media stream (or listed in the credits), a list of albums released by a band heard in the media stream, information (such as a real-time World Wide Web hyperlink) about a commercially available product appearing in the media stream, or information about a travel service where an image of a location (e.g., a beach, mountains, etc.) is depicted, a smell representative of an article (e.g., a perfume) appearing in the media stream or even a physical response related to the media stream (e.g., similar to the feedback given by vibrating video game controllers). In one embodiment, any given segment identifier identifying a segment of the media stream may be mapped to supplemental content relating to one or more articles appearing in the media stream.

In one embodiment, the mapping associates items of supplemental content with segment identifiers that identify segments that convey information that is relevant to the items of supplemental content (e.g., supplemental content relating to a particular brand of soft drink might be mapped to a segment identifier identifying a segment that in which the soft drink is depicted or in which an actor mentions the name of the soft drink). In another embodiment, the mapping associates items of supplemental content with segment identifiers identifying segments associated with menus or summaries of articles that are depicted or mentioned in various other segments (e.g., "Articles appearing in the following media stream and for which additional information is available include x, y and z"). In another embodiment, the supplemental content is associated with the entire media stream (all segments, e.g., as in the case of a film soundtrack or supplemental content related to purchasing alternative versions of the media stream, such as a DVD of the media stream or tickets to a theatrical screening of the media stream).

Figure 21:
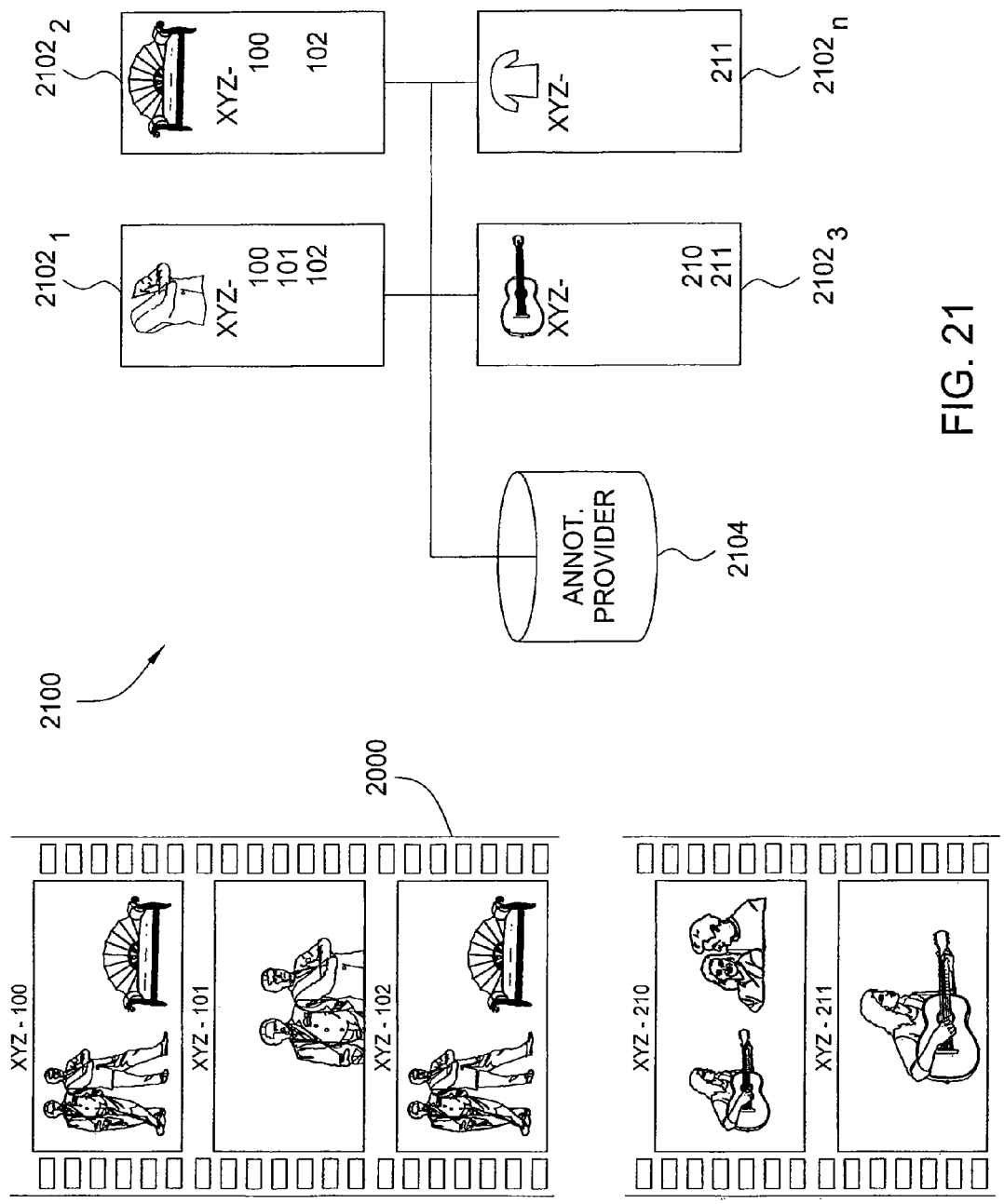
FIG. 21 illustrates an exemplary mapping in which segment identifiers identifying segments of the media stream of FIG. 20 are mapped to items of supplemental content.

FIG. 21, for example, illustrates an exemplary mapping 2100 in which segment identifiers ("XYZ-100" through "XYZ-211") identifying segments of the media stream 2000 of FIG. 20 are mapped to items $2102_1$-$2102_n$ of supplemental content (hereinafter collectively referred to as "items 2102"). The items 2102 relate to articles (e.g., clothing, furniture) appearing in the segments of the media stream 2000. For example, the item $2102_1$ for a men's shirt indicates that the shirt is related to the segments of the media stream 2000 that are identified by segment identifiers "XYZ-100" through "XYZ-102".

In one embodiment, mapping of an item of supplemental content to a segment identifier includes mapping the item of supplemental content to a segment identifier identifying a number of frames occurring after the segment in which the associated article appears (i.e., temporally). This provides a time delay that, as described in greater detail below, allows a viewer some time to react to the depiction of an article in the media stream in which he or she may be interested. In one embodiment, the time delay is adjusted in accordance with one or more parameters that may be useful in compensating for the reaction time inherent in a specific viewer signifying an interest in accessing supplemental information about a depicted article, or in compensating for the occurrence of quick cuts in the media stream (i.e., where articles appearing in the media stream may change rapidly).

Figure 22:
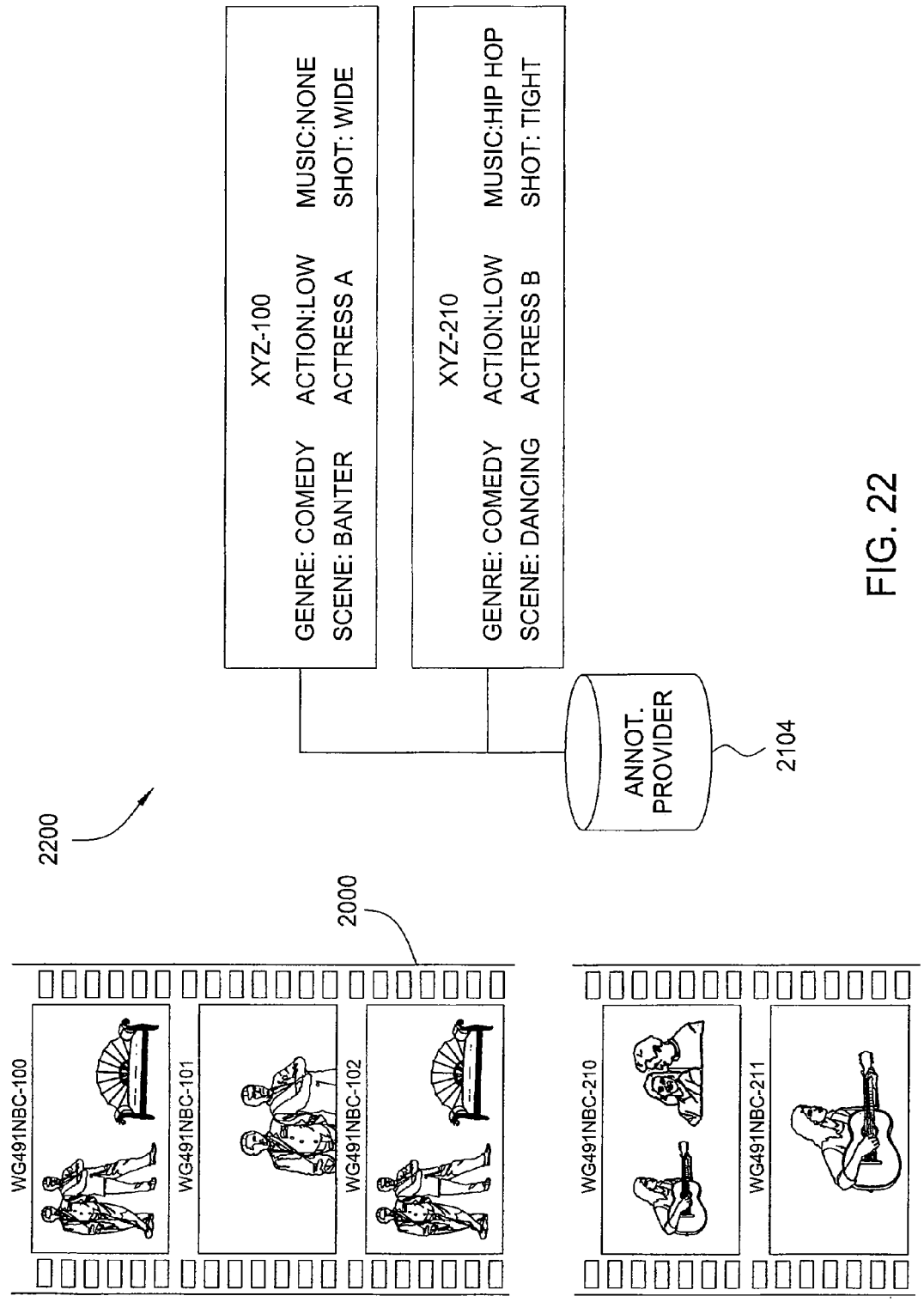
FIG. 22 illustrates an exemplary mapping in which segments of the media stream illustrated in FIG. 20 are associated with supplemental information.

In further embodiments, the supplemental content includes information useful in performing data mining. For example, FIG. 22 illustrates an exemplary mapping 2200 in which segments of the media stream 2000 illustrated in FIG. 20 are associated with supplemental content such as: segment genre, the scene depicted by the segment, the level of action occurring in the segment, actors featured in the segment, music featured in the segment and the type of "shot" represented by the segment. For instance, as illustrated, segment identifier XYZ-100 is mapped to supplemental content indicating that the associated segment of the media stream 2000 represent the "comedy" genre, includes a scene of "banter" and features "Actress A," among other information.

In step 608, the method 600 stores the mapping of segment identifiers to items of supplemental content. In one embodiment, the mapping is stored in a store (e.g., database 2104 of FIG. 21) that is indexed according to a unique program identifier for the media stream. This program identifier identifies the entire media stream, in contrast to the segment identifiers which identify individual segments of the media stream.

The method 600 is terminated in step 612.

Mapping the segment identifiers identifying segments of the media stream to supplemental content is computationally simpler than conventional product placement markup techniques, such as those that embed supplemental content in the media stream itself, because it requires minimal special coding to implement. Accordingly, it is expected that the technique embodied in the method 600 is more cost effective than known techniques for associating supplemental content with media streams. Moreover, the simplicity of the present approach affords greater flexibility in terms of when supplemental content may be associated with the media stream and what kinds of supplemental content can be associated. For example, a business providing the association of supplemental content may provide such association for a limited period of time in exchange for appropriate consideration, and thereafter remove the association without having to re-code the media stream itself.

In one embodiment, the method 600 allows a content creator and/or mapper to visually review the supplemental content mapping associated with the media stream, so as to confirm that items of supplemental content are mapped to the proper segment identifiers. In one embodiment, this is enabled by a split screen display where a first portion of the display depicts the media stream and a second portion of the display automatically depicts all of the items of supplemental content that are associated with the currently depicted segment of the media stream. In one embodiment, all of the associated items of supplemental content that are associated with a given segment of the media stream, regardless of viewer type, are displayed simultaneously (e.g., items of supplemental content that will be shown to males and items of supplemental content that will be shown to females; the "hip hop" version, etc.). In one embodiment, the items of supplemental content are presented in various summary formats, such as a written descriptor (i.e., without an image of the supplemental content), a "thumbnail" image, and other similar means. In one embodiment, all of the items of supplemental content that would appear to a viewer are shown to a user reviewing the mapping, so that the user can easily review the overall viewer experience (e.g., verify the order in which the items of supplemental content appear on a viewer display). In one embodiment, the user is allowed to review all items of supplemental content that include a particular element of information (e.g., a particular article), so that uniformity across various items of supplemental content can be preserved and/or differences among items of supplemental content can be confirmed as being intended.

In one embodiment, for training or other purposes, an individual or group of individuals creating a mapping (e.g., content creators, collaborators, a third-party stream annotation service provider or the like) is presented with a display that includes the media stream and a coding produced by an expert, so that the individual(s) creating the mapping can view the actual coding (i.e., including both the supplemental content to be displayed to viewers and information that is not intended to be displayed to viewers). In one embodiment, the coding is not presented until after the individual(s) creating the mapping has made his/her selections of supplemental content for the mapping. In one embodiment, mistakes made by the individual(s) creating the mapping (e.g., deviations from a coding produced by an expert) are tracked, in order to show the individual(s) creating the mapping examples of his/her problematic coding, so that he/she has additional opportunities to practice coding techniques that are more difficult for him/her. In one embodiment, the approach described above may be utilized for quality control purposes, whereby an expert reviews and confirms, declines, or modifies mappings created by the individual(s) creating the mapping.

An access provider or stream annotation service provider may find it useful to ensure that all mappings utilize a common approach with respect to substantive aspects of "what" should be mapped (e.g., for how many segments must an image appear before the image is logged), "how" it should be mapped (e.g., "action" versus "romance"), and the actual notation for the mapping (e.g., "romance" versus "romantic"). To facilitate the commonality of approach, the individual(s) creating the mapping may need to be trained to a specific standard. In one embodiment, one or more individuals (e.g., employees of an access provider or stream annotation service provider) view a media stream simultaneously and create and map appropriate supplemental content and/or add appropriate information regarding the subject matter or other information about the media stream (e.g., log a particular segment of a media stream as "action" instead of "romance"). In one embodiment, a number of individuals create a mapping for the same media stream, but a final mapping is determined by a majority choice of the individuals (e.g., two individuals designated one segment of media stream as "action" while eight individuals designated the same segment as "adventure"). Alternatively, mapping performed by any number of individuals (potentially utilizing the ability of the Internet to easily allow multiple individuals to collaborate on the same project) are presented in bulk to another individual who "picks and chooses" from among the proposed mappings to select the final, authoritative mapping. In one embodiment, the mapping is then provided in whole or in part to one or more third parties for review and comments (e.g., to the content creator who created the media stream, to advertisers whose supplemental content is included in the mapping, etc.).

In one embodiment, each media stream is divided into segments with a log-in system to ensure that no one individual collaborating on the creation of a mapping sees more than one segment from the same media stream with which the mapping is associated. This may be useful, for example, for avoiding "burnout" of the individuals creating the mapping or to avoid revelation of plot points.

In one embodiment, an online system enables teams of individuals to collaborate in creating the mapping. In one embodiment, a log-in/log-out system ensures that all mapping work is maintained, but with changes shown from prior mapping sessions. In one embodiment, the individuals creating the mapping are provided with the capability to leave notes for each other regarding decisions that they make with the mapping.

Figure 7:
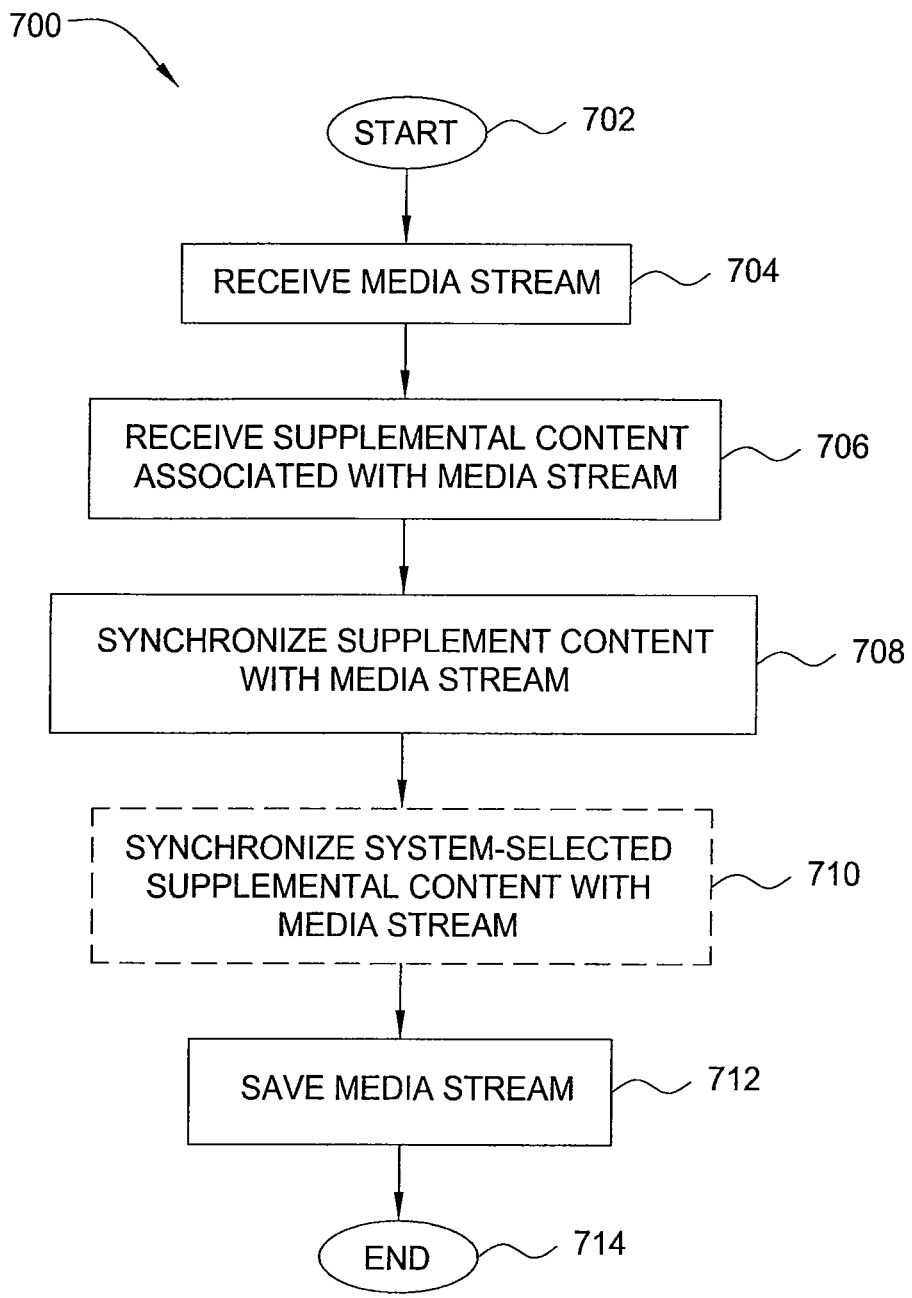
FIG. 7 is a flow diagram illustrating another embodiment of a method for annotating media streams, according to the present invention.

FIG. 7 is a flow diagram illustrating another embodiment of a method 700 for annotating media streams, according to the present invention. In particular, the method 700 allows content creators, sellers or ad buyers to annotate a media stream by creating mappings of segment identifiers to supplemental content (e.g., mapping by an intermediate party is not necessary). In one embodiment, a content creator who annotates a media stream in accordance with method 700 is an individual (e.g., as opposed to a studio or broadcaster), or even a viewer. Thus, in one embodiment, the method 700 is implemented at the stream annotation service provider 112 or at an access provider 106. Although further discussion of embodiments that allow users to create and annotate their own media streams will be discussed in the context of a service provided by an access provider, those skilled in the art will appreciate that such applications may alternatively be provided by, for example, a stream annotation service provider or other types of service providers.

The method 700 is initialized at step 702 and proceeds to step 704, where the method 700 receives a media stream. The media stream may be provided, for example, by a content creator 102. In one embodiment, the media stream is a final media stream (i.e., where raw footage has been subjected to editing and other production steps). In one embodiment, the media stream is received in a digital format, such as MPEG. In one embodiment, receipt of the media stream involves transcoding from a first file format to a second file format (e.g., from MPEG to Flash, a video format supplied by Adobe, Inc. of San Jose, Calif.). In one embodiment, the receipt of the media stream also includes the receipt of metadata associated with segment identifiers of the media stream (e.g., indicating, for example, scene changes, "mood" changes, shot changes, or the like). This information may be useful later in selecting supplemental content to associate with the identified segments.

In one embodiment, the method 700 receives the media stream in substantially real time (i.e., as the media stream is being filmed). This would allow the method 700 to inform sellers when their articles are being filmed (e.g., by sending an automated email notification to a pre-registered account), if the article is tagged in accordance with some sort of recognizable tagging scheme (e.g., an RFID tag, as discussed above). This also allows the "rough cut" of the scene to be displayed to seller, so that the seller can see how an article is being used and determine if it wishes to pay for more substantial advertising (i.e., in the form of mapped supplemental content).

In step 706, the method 700 receives supplemental content that is associated with the media stream (e.g., as dictated or requested by the content creator). In one embodiment, such associations are made with respect to temporal segments of the media stream (e.g., segment identifier X, which identifies the first x minutes of the media stream, is associated with supplemental content Y). In another embodiment, the associations are made with respect to metadata included in (or provided with) the media stream (e.g., segment identifiers identifying segments defined by segment identifiers, cue points or the like). In one embodiment, multiple items of supplemental content that are associated with a common segment of the media stream are associated as a set, rather than associated individually. Thus, the supplemental content associated with a given segment of the media stream may comprise as few as one item of supplemental content, or as many as a plurality of individual items of supplemental content.

In one embodiment, the supplemental content comprises any form of content, including, but not limited to: text, audio, video, multimedia presentations, photographs or other images, uniform resource locators (URLs), computer applications, data, commentary and advertising copy.

In further embodiments, supplemental content includes elements that enable interactive participation by a viewer and that may be initiated by the viewer using one or more modalities (such as pressing a key or button on a computer mouse, keyboard, or other input device; a verbal request processed by speech recognition technology; a signifying motion processed by a motion recognition system or the like). One example of supplemental content that enables such viewer interactivity is supplemental content that enables a viewer to signify an interest in receiving secondary information or services related to the primary supplemental content (e.g., "Click here to learn more about this DVD and to receive a discount coupon"). Other examples include enabling a viewer to register a vote on a particular issue, to activate "short cut" controls over a display device (such as controls that allow advancing of the media stream to a specific scene, e.g., "Click here to skip forward to the car chase" or "Click here to 'see that again'"), or to view a replacement or complementary media stream either in a primary or in a secondary viewing screen (e.g., replacing the media stream with an alternate media stream or presenting an alternative media stream in a supplemental viewing screen).

In further embodiments still, supplemental content includes instructions, commands, or other information that is intended to be processed or activated automatically upon the occurrence of a particular event. For example, such instructions may "pause" the media stream for a set period of time (e.g., to allow the viewer to view the supplemental content without being distracted by the media stream) or "lock out" the fast-forward functionality of the display device until a specific item of supplemental content has completed certain processes (e.g., presenting an entire animation), or until the viewer has made a specific selection (e.g., answering "yes" or "no" in response to a question). Other examples include instructions for utilizing a specific "skin" (i.e., a specific graphical "look and feel") for the display device or media player or for activating or directing the presentation of certain information or applications that are independent of the supplemental content (such as opening the viewer's email system).

In some embodiments, supplemental content includes keywords, tags, instructions or other identifying or indexing information that may be associated with the media stream but that is intended to identify or activate an independent process or system, such as may reside on a third party website. For example, if a unique identifier (perhaps a tax identification number, URL, or another number assigned by the access provider) signifying a certain brand of snowboard manufacturer has been embedded within the supplemental content, when the media stream is viewed on a website, the appropriate processing system at that website may process the identifier in order to select and display banner advertising related to that specific snowboard manufacturer.

In some embodiments, supplemental content includes keywords, tags, instructions or other identifying or indexing information that is intended to assist in the identification and retrieval of subject matter of interest. Many methods currently utilized for subject matter tagging of this type are less than optimal due to the fact that the tags are generally applied to an entire media stream rather than more specifically applied to only the relevant segments of the media stream. For example, a user uploading a thirty minute home video of a trip to Africa to a video access provider and utilizing generalized terms to describe the subject matter of the entire video would likely tag such video as "Africa" and "travel," whereas much of the value of such to the viewing community may be in the fact that the video contains three minutes of Kilimanjaro at sunset footage, six minutes of Ngorongoro Crater footage, thirteen minutes of Serengeti footage (of which ten minutes are focused on lions and three minutes are focused on giraffes), etc. The present invention provides a superior approach to tagging because tags can be applied as specifically as frame-by-frame to identify the information being conveyed by a media stream.

Further embodiments of the invention allow a user to identify specific categories of content tags, so as to aid in the identification of specific types of information. Such categorized tagging improves search functionality by enabling the ability to search for specific types of content by differentiating tags that are derived from or relate to the audio portion of a media stream (e.g., the subject matter being discussed in a video) as "audio-derived" tags, the images appearing in the media stream as "image-derived" tags, the general mood of the media stream as "mood-derived" tags, and the like. This would enable a viewer to search, for example, for an audio-derived tag on the topic of "global warming" with the image-derived tag regarding Kilimanjaro. In one particular embodiment, a "thumbnail" representation of the specific media stream segment to which the intra-stream content tag applies can be generated (e.g., a small image of a frame of the video presenting Kilimanjaro), and this thumbnail may be presented to other users in the search results that they obtain.

Further embodiments of supplemental content include data useful for facilitating commercial transactions, such as between or among a content creator, a viewer, an access provider, a contributor of certain supplemental content, and/or the owner of a website or service on which an annotated media stream is hosted. For example, a content creator may wish to include a unique identifier that identifies a particular media stream or a particular item of supplemental content as having been provided by the content creator (e.g., perhaps utilizing an account number associated with the content creator) so that the content creator may be properly "credited" by an access provider for having made such contributions. Other examples include information relating to payment mechanisms (e.g., the content creator's bank account routing number), commission information (e.g., the specific percentage fee to be paid to the content creator if a viewer completes a transaction via the supplemental content contributed by the content creator), fee information (e.g., the fee to be paid to the content creator for each time a certain item of supplemental content is viewed), and the like.

Other embodiments of supplemental content include variable data, such as a data table that records the number of times that a given item of supplemental content has been presented. For example, each time that a media stream is displayed for the amount of time necessary to have activated the presentation of a particular item of supplemental content, a variable data field may be updated to register the "viewing". This data could then be made available to other systems within an access provider, facilitating detailed tracking analysis and reporting (such as tracking the number of times that a particular item of supplemental content has been viewed by a particular viewer during a specific time period).

In some embodiments, supplemental content includes descriptors of the nature of the annotated media stream, such as descriptors identifying "family friendly" media content, "weapons related" advertising content, "adult themed" content, and the like. This information may be used by individual viewers or others or by automated filtering systems and the like to restrict viewing or other access to such types of information.

In one embodiment, supplemental content is intended to be visible to a viewer of the annotated media stream (as would be the case with respect to most advertising copy). In another embodiment, supplemental content is intended to be only indirectly apparent to the viewer (as would be the case with some of the "display device or media player control" types of supplemental content described above, in which only the impact of the supplemental content upon the media stream would be evident to the viewer). In yet another embodiment, supplemental content is intended to be invisible to the viewer (as would be the case with respect to supplemental content consisting of subject matter identifiers, transaction facilitation data, and the like).

All of the types of supplemental content described above may be brought together in various combinations. For example, a composite item of supplemental content could be created by combing subsets of individual items of supplemental content for: (1) pausing the media stream; and (2) and allowing a viewer of the media stream to register a vote on a particular issue.

In one embodiment, a first item of supplemental content may be made dependent upon a second item of supplemental content. For example, if a first item of supplemental content conveys that the media stream is intended for an adult audience, then a second item of supplemental content may be programmed to present a particular type of advertisement. In further embodiments, items of supplemental content may also be made dependent upon viewer interaction with a first item of supplemental content. For example, if a first item of supplemental content is a composite item created by combining individual items of supplemental content for pausing the media stream and for allowing a viewer to register a vote on a particular issue, then a second item of supplemental content could provide instructions for fast-forwarding the media stream to the portion of the media stream that is most relevant to the vote registered.

In further embodiments, supplemental content can be specifically created for access provider purposes (e.g., information placed with the access provider regarding a specific product or uniform resource locator (URL) hyperlink to a custom e-commerce store). Alternatively, supplemental content can be created to showcase a particular set of articles, such as articles created and/or offered for sale by the content creator him/herself (e.g., a garage band's own DVD). In another embodiment, supplemental content includes pre-existing information or services that are independent from the access provider (e.g., an entry in a public web encyclopedia or an e-commerce website).

In one embodiment, primary supplemental content is linked to secondary supplemental content comprised of the same range of information and/or functionality as the primary supplemental content. Such secondary supplemental content may be intended, for example, to be presented by various means such as by replacing the primary supplemental content (i.e., a "roll over", such as when a viewer cursors over a particular area of the viewing screen and additional information is presented), by presenting the secondary supplemental content in a separate viewing area or by opening a separate web browser to a relevant web page.

In one embodiment, the supplemental content is created by the creator of the media stream. In another embodiment, the supplemental content is selected by the creator of the media stream from a library of supplemental content (e.g., provided by the stream annotation service provider 112 or by a media stream access provider). In one embodiment, the library of supplemental content includes pre-approved advertising information. A library of supplemental content may consist of any number of entries (i.e., for specific articles, people, concepts, etc.), and each entry may in turn be comprised of any number of items of relevant supplemental content. Each entry and/or item of supplemental content may consist of the same range of information and/or functionality as comprises the supplemental content described above. For example, a library entry for a given article may include commercial and/or non-commercial images of the article, textual or audio information about the article, a short "commercial" about the article, a hyperlink to buy the article in real time, a retail price of the article or to other third-party applications or other advertising. This content may be obtained through an affiliation with sellers 100 and/or ad buyers 108.

Figure 44:
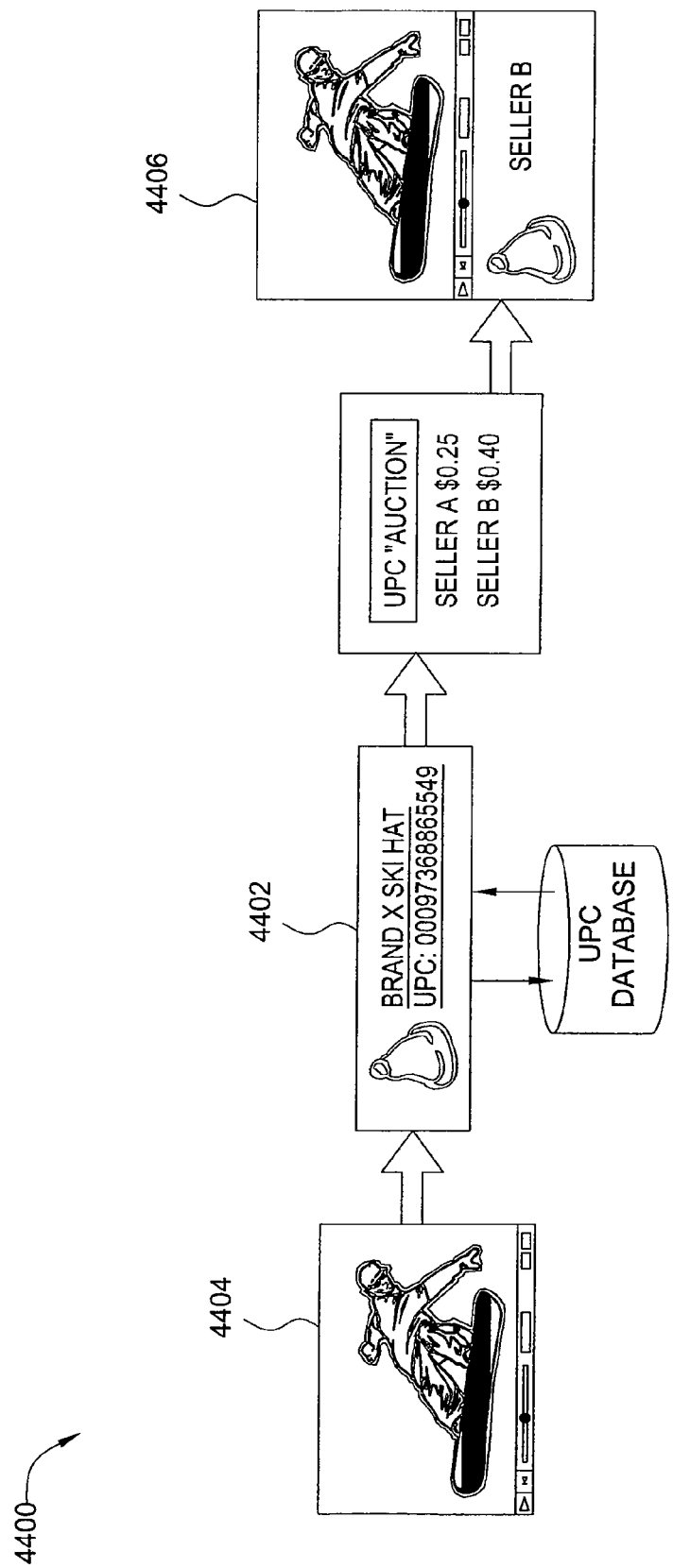
FIG. 44 illustrates an exemplary scenario in which the ability to provide an item of supplemental content relating to a given article appearing a media stream is auctioned off to various sellers.

In further embodiments, a library entry for an article includes an amount of money that a provider of the article (e.g., a seller) is willing to pay to have the article depicted in a media stream and/or to have the article associated with supplemental content via a mapping (e.g., possibly subject to specified factors such as media stream content or genre or the like). This would allow a content creator to "shop" according to certain parameters in order to identify articles that will bring the greatest commercial value. For example if the content creator knows that an actor will be depicted wearing sunglasses in a particular segment of a media stream, the content creator can search for all types of sunglasses listed in the library and see the relative value of filming the actor wearing specific pairs of sunglasses (e.g., brand X is willing to pay more than brand Y to have their sunglasses placed) or alternatively filming the actor wearing a "generic" pair of sunglasses that would potentially facilitate association of the media stream with supplemental content relating to any number of brands of sunglasses. In one embodiment, the method 700 may provide an auction-type environment in which sellers can bid for placement of an article in a media stream. For example, FIG. 44 illustrates an exemplary scenario 4400 in which the ability to provide an item of supplemental content relating to a given article 4402 (e.g., a ski hat) appearing a media stream 4404 is auctioned off to various sellers. As illustrated, the item of supplemental content contributed by the seller who is willing to pay the most to have their article placed (e.g., Seller B) is selected for the final mapping 4406.

In further embodiments still, a library entry for an article includes tracked data regarding the popularity of the article with viewers of annotated media streams (e.g., number of click-throughs received per-article or per-media stream). This would allow content creators to create associations between media streams and supplemental content more effectively. In a further embodiment, a library entry for an article recommends other similar or alternative articles. This may help content creators to, for example, identify more effective articles for depiction in a media stream (e.g., supplemental content for article X attracts twice as many viewers as supplemental content for article Y), or to identify other effective associations that may not have been considered (e.g., viewers that view supplemental content for article A also tend to view supplemental content for article B). In yet another embodiment, a library entry for an article includes a demographic identifier (e.g., "young and hip", "golden oldie", "teen rebel", etc.). These demographic identifiers may be automatically provided, or may be customized by a user of the library.

In one embodiment, the library is organized for easy search/browsing by a number of methods. For example, content in the library may be organized according to: a hierarchical structure (e.g., men's clothing, sportswear, skiwear, jackets, down jackets); keywords (e.g., brand or article name); most recent additions/uploads; most popular articles (optionally organized by demographics such as age, gender, affinity group, etc.); a percentage commission that an associated seller is willing to pay (e.g., x dollars to have content listed first); or as suggested by a description of the media stream (e.g., keywords). In one embodiment, the library allows a user to select supplemental content for actual or potential association with the media stream by at least one of the following methods: drag and drop, check box, article number entry or article number selection.

In one embodiment, the library of supplemental content is "live linked" with third party sources from which the supplemental content is derived (e.g., sellers, such as seller 110 of FIG. 1), thereby allowing the library to remain as up to date as possible. For example, library entries containing items of supplemental content contributed by third party sources may be automatically updated in response to changes in the contributor's product inventory, pricing, or marketing. Such "placeholders" may be populated, for example, by using automated "bots" to obtain information from third party web sites (e.g., pulling all guitars for sale on an online classifieds site) or by referencing remotely hosted databases through APIs provided by the data owner (e.g., accessing an online auction site's "current auctions" database through a web services API).

In one embodiment, a third party source of supplemental content may specialize in providing particular types of supplemental content, such as "discount"-oriented content, "luxury"-oriented content, "locally available"-oriented content or foreign language-oriented content.

In one embodiment, a portion of the library that is relevant to the articles of a given seller (e.g., merchant, supplier or manufacturer) is made accessible to the seller through a password secured system that allows the seller to securely update its respective portion of the library. In a further embodiment, articles having entries in the library may be linked to articles that have been filmed and are currently being presented to viewers by an access provider at which the method 700 executes (as described in greater detail below), so that active mappings can be updated to reflect new information. In one embodiment, when a seller removes an entry relating to a particular article from the library, a notice (e.g., created automatically or by an individual authorized by the seller) is sent to content creators who have provided media streams that are associated with the removed article. In one embodiment, any annotation in the media stream that is associated with the removed entry is automatically rendered "invisible" or inaccessible to viewers of the media stream (but the association is not removed or modified until approved by the party that provided the media stream).

In one embodiment, the individual items of supplemental content contained in a library entry for a given article may comprise various categories of information such as raw information (e.g., the specific price of a given article, the specific name of the article, such as "Brand X MP3 Player—3 GB," a specific URL for purchase fulfillment or the like), stylized information (e.g., the name of the given article presented using several different fonts, or several different images of the same article), composite content (e.g., combinations of individual items of supplemental content, such as raw information and stylized information, combined to form a single item of supplemental content, such as a stylized "Buy Now" image that includes an embedded URL to enable a viewer to access a purchasing opportunity), or compiled information (e.g., various combinations of raw, stylized, and composite information that form a comprehensive entry).

An entry within a library may include functionality that is not directly related to the selection or creation of specific items of supplemental content. For example, within a given library entry, a library user may be enabled to view a summary (perhaps via "thumbnail" representations of media streams or some other form of summary data) of all media streams with which certain items of supplemental content have been deployed (i.e., a visitor to a specific library entry will be able to view all media streams deploying some or all of the items of supplemental content contained in the library entry).

In one embodiment, library entries include "placeholders" that facilitate the assignment of any of a number of different characteristics or data to an individual item of supplemental content. For example, a number of different sellers may offer the same brand of shoe, and in order to simplify the library for users by "grouping" like entries, a service hosting the library may choose to list the particular shoe under a single library entry. However, because of the number of sellers that can provide that shoe, the entry needs to be able to accommodate the multiplicity of sellers that have identified themselves to the library host as providing that shoe. To facilitate this capability, the library entry may include a "placeholder" that is comprised of or is linked in some manner to any number of equivalent items of supplemental content. In turn, the equivalent items of supplemental content may be placed within a prioritization hierarchy so that certain of the equivalent items of supplemental content have priority, perhaps as determined by reference to specific rules or instructions. For example, in the shoe example described above, a placeholder relating to "Seller's Name" may reference three equivalent items of supplemental content: the names of Seller 1, Seller 2, and Seller 3. The three seller names could be placed in a prioritization hierarchy such that Seller 1 is displayed as the "Seller's Name" as a default when a user accesses the library entry (and/or when that library entry is embodied within a specific item of supplemental content), unless certain other conditions are met (in which case one of the other sellers' names is displayed). A user accessing the library entry may access, select, and utilize a single item of supplemental content (perhaps even without an awareness that multiple different equivalent items of supplemental content are linked to an associated placeholder) in the creation of a mapping. The equivalent items of supplemental content may also consist of multiple variations of the same basic item of supplemental content, such as multiple photographs of the same product shot from different camera angles. In such cases, the user may be enabled to select a particular one or more of the equivalent items of supplemental content.

In another embodiment, more than one library entry may be made available in the library with respect to a particular product, such as relating to a single product that is offered by multiple different sellers at differing prices. The library entries may be organized and grouped according to various criteria (e.g., supplemental content including "low price" or "in stock now" advertisements, supplemental branding content as opposed to advertising content, supplemental content with or without music, graphics heavy supplemental content, supplemental content targeted at particular demographics, geography or languages, and the like). As discussed earlier herein, library entries and items of supplemental content contained therein need not comprise advertising or commercial material (e.g., they may consist of items of artistic expression, software "mini-apps," etc.), but may, nonetheless, be included in the hierarchical organization of the library, for example under more abstract or general headings such as "subtitles," "animations," or "photos."

The items of supplemental content contained in a given library entry may come from any number of sources including from the service hosting the library, from users of the library, from specific advertisers, or from "affiliate" programs of online merchandisers and aggregators. Inclusion of library entries or items of supplemental content included therein in a library and/or the "placement" prioritization of library entries may be made dependant upon reference to various prioritization hierarchies, such as a hierarchy based on a fee that is negotiated between the access provider and the contributor of a given item or group of items of supplemental content (e.g., the manufacturer of a featured product who wishes for the library entry for the product to be prominently featured to a certain class of library users). Such fees may be charged directly (e.g., a flat fee for the library entry to appear at the top of all search results within a specific category) or indirectly (e.g., if a seller has agreed to pay a relatively higher flat-rate and/or a percentage commission to the access provider with respect to each product sold to a customer who was directed to the seller's site by the access provider, then the access provider's prioritization hierarchy for presenting library entries may take that information into account).

A library, or portions thereof, may be created or assembled by any number of organizations or individuals, potentially including advertisers, "artists," user groups formed within the access provider, and the like. For example, a particular manufacturer may create a library populated solely by library entries relating to the manufacturer's product offerings. A seller may create a library comprised solely of library entries relating to articles available in the seller's specific stores. "Celebrities" or others may create libraries comprised of library entries of interest to them (e.g., a rock star may create a "My Favorites" library). Some libraries may be generated by charitable organizations, and a portion of the revenue derived by the access provider or others from use of the library would be shared with the charitable organization. Individual users could also make their own libraries comprised of library entries from other, pre-existing libraries or from their own contributions.

Any of these various types of libraries can be opened to uses by all users, opened only with respect to certain uses (e.g., open to viewing, but not open to modification), or kept private within a group of authorized users. In recognition of the analysis and effort that has been expended to create the library or subsets thereof, access to and/or use of particular library entries may be offered as a premium service such that users may access library entries from a given library only after payment of a fee or after satisfying certain conditions (such as creating or distributing a media stream that has generated a certain level of viewer popularity). In addition, the creator of a library may charge a fee to others who wish to copy library entries for inclusion in their own libraries (e.g., Rock Star A may charge a 1% commission on all transactions that are derived from library entries that are included in her branded library), or the creator of a library may impose certain other restrictions, such as eliminating all library entries (or individual items of supplemental content contained therein) that fail to meet certain success parameters (e.g., library entries that are accessed or used by fewer than a specified percentage or number of users).

An access provider may provide tools to assist users in creating libraries (e.g., sub-libraries of the access provider's more comprehensive library), for example by providing these tools in the form of downloadable software programs to be used on a user's system or as a hosted service (provided by the access provider or by a third party) that is accessed over a network. For example, the access provider may provide tools that enable a user to create a "home page" within a larger library by enabling the user to customize "his" library by selecting particular background colors, pictures, and other information desired by the user.

The access provider may provide tools to assist users in creating library entries, for example by providing these tools in the form of one or more software programs to be used on a user's system or as a hosted service (provided by the access provider or by a third party) that is accessed over a network. Such tools may include various means to ensure consistency among data that is contributed on a self-service basis by various users. For example, such tools may provide menus or other uniform presentations of "template" library entries that include fields for supplemental content items of various specific categories to be completed by the user (e.g., fields for seller name and price, for which the user must provide the specific name and dollar amount). Further, such templates may be utilized with respect to specific items of supplemental content, such as uniform items for "product_picture," "retail_price," and the like. By preserving consistency of this sort, the access provider is enabled to provide methods and processes that may be used by and shared among all users of the service, but that still permit individual creativity. In addition, such tools may allow users to create "live links" between multiple items of supplemental content and/or data provided by sources independent of the access provider. By making available a common set of Application Programming Interfaces (APIs), the access provider can enable users to embed certain items of supplemental content in a library entry (e.g., a retail price item within a product advertisement item), and such items of supplemental content would be able to access the source of such data within the user's or a third party's systems that have been enabled to interact via such APIs and/or other input parameters. Also, the tools may provide menus or other uniform presentations of "classification" determiners to enable the library entries to be searched, such as identifying the category of a specific entry (e.g., athletic shoe) within the ontology of the library as a whole.

As will be evident to one of skill in the art, all aspects of the library functionality described herein (i.e., hosting, creating, providing access, updating, etc.) could be provided by a third party that makes such information available to one or more media stream access providers, to stream annotation service providers, to individual users, to interested third parties (e.g., advertising companies interested in studying how particular library entries are being used), and the like.

A library entry and/or the items of supplemental content comprising a library entry may be "locked," perhaps by the contributor(s) of the supplemental content, by other users, or by the access provider, so that the library entry or the items of supplemental content making up the library entry may not be directly viewed, edited, reformulated, and/or reformatted by users or by a specific class of users (e.g., "new" users may be excluded from editing library entries). Alternatively, library entries or items of supplemental content may be held "open" for users or for a sub-set of users to utilize as they wish (e.g., using an image of a product, but not the price) without any restriction.

Each library entry (or individual items of supplemental content therein) may be placed within an ontology, so that information can be more easily located and reviewed. For example, when one of the items of supplemental content in a particular library entry is the "retail price" of a particular product, this item of supplemental content can be tagged or otherwise identified by the library as being retail pricing information. The tagging of items of supplemental content may be undertaken in any number of ways, such as by the individual contributor via reference to a specific set of online or offline tagging information (e.g., an "ontology list" that identifies retail price information as being coded against the tag "Ret_Price_Current"), by requiring all library contributions to be input using specific forms or templates (so that individual items of supplemental content are automatically tagged by the system, e.g., data input into the "retail price" field of the form will be tagged as the retail price), or by using an automated technology that utilizes analysis of the raw data to determine the characteristics of various items of supplemental content (e.g., the system may be instructed to label all numbers that follow a currency symbol "$" or "£" to be a "Retail Price").

Library entries may consist of items of supplemental content that are designed to be associated with all of the other items of supplemental content in the library entry, so as to describe certain characteristics or properties of the other items of supplemental content. This functionality may be enabled by embedding certain descriptive characteristics within one or more items of supplemental content in a library entry, by adding one item of supplemental content to a library entry that is then paired or embedded in every other item of supplemental content within the library entry, or even by adding an item of supplemental content that is separate for any particular library entry but that is embedded or paired with all items of supplemental content of a certain type within the entire library. This complementary type of supplemental content item may or may not be intended to be viewed and/or edited by users. For example, with respect to a library entry relating to a commercial product offering, the addition of a complementary item of supplemental content may result in every composite item of supplemental content in which any individual item of supplemental content in the library entry is incorporated to be identified as "commercial" supplemental content (as opposed to, for example, artistic or commentary-oriented supplemental content). Other such items of supplemental content may identify "family friendly" content, "weapons related" content, "adult" content, or the like. For example, the access provider may reference such identifying data to determine if the supplemental content should be "locked" (e.g., to ensure that all of the items of supplemental content within an "adult content" entry are embedded with signifiers that identify the items of supplemental content as relating to adult content, so that such supplemental content cannot be accessed or viewed by users younger than a certain age).

If a library entry were removed for any reason from the library (or only for a specific category of reasons) or, alternatively, if the library entry were placed on "hold" by the access provider or by the library entry contributor, after items of supplemental content contained in the library entry were associated with a media stream that will potentially be presented to viewers, a notification could be sent to all users who have provided or distributed media streams that are associated with the relevant items of supplemental content. Such notice could be performed by a person or could be automatically created (e.g., through an automated email notice or web announcement). In such linked embodiments, "dead" library entries (i.e., library entries containing information that is no longer up-to-date or that is no longer provided by a particular information source) could be automatically replaced with default information (e.g., information regarding the general class of articles or a message from the access provider stating that the library entry is no longer available) or could be excluded entirely from the library. In each of these cases, users or various sub-categories of users could be automatically notified of such changes, or other changes such as updates to a particular library entry that the user has previously indicated to be of interest (e.g., "Click 'Yes'" if you would like to be notified when changes are made to this entry"). In one embodiment, once a library entry or item of supplemental content contained therein is removed or otherwise placed into question, any use of the library entry or the item of supplemental content (including, in one embodiment, a composite item of supplemental content that incorporates the given item of supplemental content) is automatically rendered "invisible" to viewers of the library (e.g., if item 2 is removed, item 3 would follow item 1) or is replaced with a "default" screen, but the portion of a mapping associating the item of supplemental content with a media stream would not actually be removed until approved or modified by the creator of the media stream. The display viewed by the content creator may continue to show the associated item of supplemental content, but the display may be marked to graphically show that the item of supplemental content is no longer visible to viewers (e.g., overlaying with a red X). Alternatively, the content creator may be given the option to include "alternative" items of supplemental content to be presented under certain conditions (e.g., instructions to present item A of supplemental content until date X, then present item B).

Items of supplemental content that are contributed to the library may be, either automatically or upon the contributor's request, reformulated, reformatted, or otherwise modified by various processes and for various purposes, such as ensuring that all images are of the same data format (e.g., .gif or .jpg), ensuring that certain parameters are satisfied (e.g., the size of an image, or the maximum size font), or embedding in all photographs a watermark or other elements for the purposes of copyright protection.

In one embodiment, the contributor of a library entry may be allowed to "open" or "lock" certain items of supplemental content within a the library entry, category, or library (e.g., other contributors may be allowed only to change the stylistic items of supplemental content within the library entry, but not the product-related items of supplemental content). For example, the initial contributor of a library entry may "open" the "style" items in a library entry by allowing other contributors to provide alternative "style" items of supplemental content (e.g., allow the background color and fonts of certain items of supplemental content to be changed), but "lock" the product image, retail price, and actual ad copy by preventing other contributors from providing alternative items in these categories. This "lock," "unlock," or other types of controlled access functionality could be enabled by simply checking a box with respect to each item of supplemental content or template field associated therewith.

In one embodiment, the access provider or library creator(s) is enabled to establish "categories" of contributors, and the access functionality described above may be made specific to these contributor categories. For example, a "default" category of contributors may be permitted to provide commentary about a given item of supplemental content (e.g., "A green background would be more effective") or to contribute alternatives, but may not be allowed to actually change any items of supplemental content within the library entry. Another category of contributors, such as contributors who have been provided with specific permission by the access provider or who, through various actions such as the contribution of a set number of library entries, may be entitled to "administrator" access that allows them to directly edit and/or delete items of supplemental content within a library entry or even to edit and/or delete entire library entries. For example, a particular advertiser who establishes an "official" library may allow only commentary contributions and reserve all other access to the advertiser's employees or consultants (e.g., only employees are allowed to contribute or modify library entries). Such access may be granted through an initial log-in function, or access may be granted through various other means such as passwords or the like. This functionality may be used to "ban" abusive users, potentially with respect to a particular library entry, a given category, or an entire library.

In one embodiment, a record of all previous instantiations of a given library entry (i.e., a "document history") may be stored and made accessible. These prior versions may be allocated to a revision history that tracks, for example, the changes made, when the changes were made, who made the changes, the status of such changes (e.g., has a change been approved by the relevant administrator as a permanent change), etc. In one embodiment, a revision history allows a library entry to be returned to a prior state. This may be useful, for example, if a particular library entry is vandalized. This feature may also be useful to library contributors for other reasons, including facilitation of the ability to schedule library entry "refreshment" according to a certain schedule (e.g., "Show all library entries that have not been modified in the last ninety days") or of collaborative contributions among multiple parties (e.g., "Show all changes made by User X in the last ten days").

The access provider may allow individual users to set a "watch list" that will provide notification (e.g., via email) when certain types or categories of changes are made). For example, the initial contributor of a given library entry may wish to be notified of every change within the library entry, whereas the contributor of a given item of supplemental content (e.g., the contributor of the retail price) may wish to be notified only when that specific item of supplemental content is modified.

The portion of a library entry that is relevant to a particular contributor (e.g., a particular merchant, supplier, or manufacturer who has contributed product information or the photographer of a particular photo) could be made accessible exclusively to the contributor through a password secured system so that the contributor can maintain and control the supplemental content contained in the relevant portion of the library entry.

Many aspects of the library and the library entries may be allocated by the access provider to third parties based on certain prioritization characteristics. Those characteristics include, among others, at least one of: the right to contribute to the library, the categorization of library entries (e.g., under how many categories will a particular item of supplemental content be listed), the prioritization of display of library entries to users of the library (e.g., which library entry for an MP3 player will appear at the top of the library search results list for the search term "MP3 player"), or which library entries will be listed with special emphasis (e.g., with a colored border around the library entry to make it more distinguishable from other library entries). These determinations may be made by various means, including by charging fees (either on a per contribution or a per contributor basis, e.g., a "partner" fee), by charging tiered commissions (e.g., providing higher entry prioritization in exchange for higher commissions being paid to the access provider), or by rewarding the magnitude and/or success of prior library entries (e.g., a particular contributor's library entries are awarded "preferred" status based on the aggregate success of the contributor's prior contributions in fostering large dollar transactions).

For purposes such as enabling the effective location of particular library entries of interest, a library entry may be characterized by any number of ways that may or may not relate directly to the substantive content of the items of supplemental content contained in the library entry. One example might be a characterization that does not relate to substantive content but that does characterize the library entries by their "featured product" or "retail price" supplemental content items, so that, for example, multiple library entries for a particular product could be listed from the lowest to highest retail price. One example of a characteristic that is only indirectly related to the substantive content of an item of supplemental content is the number of users who have elected to utilize all or a portion of a relevant library entry in the creation of specific mappings or the "effectiveness" of the library entry in providing supplemental content that has proven to be effective advertising (e.g., identifying those library entries containing items of supplemental content that induce higher rates of viewer interest).

At least a portion of the library may be made available by the access provider to various third parties to present to their specific user communities. For example, a seller who has contributed a number of library entries might wish to present those library entries on the seller's own website, so that visitors to the seller's website are informed of opportunities to utilize these library entries when creating mappings using the access provider. The access provider may make these library entries available via a "live link" system in which the third party is provided with an API to the library entries, or the library entries may be provided as "downloads" that require updating. The access provider may also make various combinations of entries available to third parties who seek to create branded libraries of interest to their users (e.g., a site that compiles "teen oriented" or "best performing" ads).

The library may be enabled to be accessed or "searched" in any number of ways. For example, library entries of interest may be located by typing in keywords, by searching by any of the characteristics of any of the categories of items of supplemental content (e.g., listing all library entries that include a photograph, that include a retail price greater than $10.00 and that generated viewer response in the top twenty percent of comparable library entries), by the characteristics of the library entry contributor (e.g., all library entries contributed by on-line shopping sites, but exclude all library entries by Site X), or by the newest contributions. Any of the search characteristics may be utilized in any combination (e.g., show me library entries contributed by Store A within the past ten days).

Certain third parties may wish to create libraries that are not formally connected with the access provider library, but that can be searched and/or accessed through the access provider. To facilitate these types of arrangements, the access provider may provide certain information that these third parties may include in their websites allowing their libraries to be searched by the access provider. For example, a site such as an online classifieds site may wish for all of its postings to be available for annotating media streams, but the site may not wish to force the people using the site to copy their listing information over to the access provider. Rather, the site could provide to its users and/or embed in its posting templates the codes necessary to enable search by the access provider.

In one embodiment, the supplemental content mapped to a given segment identifier identifying a segment of a media stream (where the supplemental content comprises anywhere between 1 and n individual items of supplemental content) is selected at least in part by an automated process, potentially in combination with actions taken by the access provider or by a content creator. For example, voice recognition technology may be used to generate a transcript of the verbal elements of the media stream, and the content creator may divide the transcript into logical segments, so that a given logical segment is allocated to supplemental content presenting appropriate phrases or sentences (e.g., subtitles). Alternatively, image recognition technology may be used to generate still images of all of commercial articles appearing in a media stream, and the content creator may utilize these still images to associate the media stream with product placement supplemental content (i.e., the automated process generates an image of a Brand X purse appearing in a video, and the content creator maps to a segment identifier identifying a segment of the video additional ad copy that is created by the content creator or is excerpted from a supplemental content library).

In one embodiment, automated tools are employed by the access provider or by others (e.g., a group of users) to populate pre-made, "template" composite items of supplemental content items by assembling one or more individual items of supplemental content from any number of sources. These templates may include certain combinations of "placeholders" for one or more aspects or characteristics of the composite item of supplemental content, such as a particular layout of information categories (e.g., an image to left, a URL hyperlink in the middle-center, and another image to the right), a particular layout of individual supplemental content types (e.g., "Product_Name" followed by "Retail_Price"), a particular graphical format (i.e., various shades of blue and red images) or the like.

In some embodiments, a content creator may specify a category of items (e.g., "men's, leather, belt, blue") and allow the method 700 to propose an optimal library entry or collection of library entries to select for the creation of a mapping (e.g., as determined by reference by the method 700, or by the content creator, where the optimal selection is made by reference to specific criteria dictated by the access provider or by the content creator). Criteria for selection of an optimal library entry (or entries) may include factors such as one or more of: the library entry containing supplemental content with the highest rate of viewer click-throughs per view when associated with similar or other media stream content, the library entry containing supplemental content with the highest number of total click-throughs, which library entry's contributor is willing to pay the highest referral commission in the specific context of this media stream and/or a particular viewer demographic, or other factors of interest.

Items of supplemental content may be characterized by any number attributes, such as the general "layout" of an item of supplemental content (e.g., product image on the left, ad copy on the right), the general "style" of the item of supplemental content as suggested through different fonts, graphics, and the like (e.g., hip-hop, versus country-western style), the particular product or product category that is featured in the item of supplemental content, the "color scheme" (e.g., "hot" colors such as red and yellow for the text and background, versus "cool" colors such as blue and green) and the like. In one embodiment, the access provider provides tools that allow users of a supplemental content library to streamline the mapping process by allowing the users to view multiple variations of the same basic composite item of supplemental content (e.g., by viewing a set of composite supplemental content items in which each composite item of supplemental content differs, for example due to changes to one or more of the supplemental content attributes). For example, a user who is creating a mapping using items of supplemental content found in a library entry relating to a Brand X MP3 player may wish to view composite items of supplemental content that include the same product image, but with multiple different resolutions, sizes, or background colors, or to view the composite item of supplemental content with text information regarding the product presented in multiple different fonts. Each variation may potentially be viewed simultaneously with all of the other potential variations (e.g., via a scrolling view screen), or may be viewed individually (e.g., sequentially as in "press "Next" to view the next variation).

In one embodiment, the present invention provides the content creator with access to a directed selection process that aids in the selection of the desired supplemental content variation (e.g., a library entry or specific item of supplemental content therein) by prompting the content creator with questions and then providing alternatives that match the content creator's responses to the questions. For example, the content creator may be prompted to specify whether he or she prefers "hotter" versus "cooler" background colors for the background and "photographic" versus "graphical" images of a product, and this information is then used to provide relevant variations for the content creator's consideration, further modification, and/or selection. Alternatively, the content creator may be provided with functionality to speed the selection via a "select A or B" option, so that the number of choices is quickly and efficiently pared down to the most desired choice. For example, initial selections may focus on the background colors, and once the optimal color is determined, the A/B selection process proceeds to managing selection of the most favored image. The tools may allow the content creator to select the order in which selections are made (e.g., work through the range of image options prior to presenting the background color choices). Such selection tools may utilize machine learning techniques that create options for the content creator based on analysis of prior interactions with the content creator or with other users under comparable circumstances. For example, machine learning might identify that supplemental content with given characteristics (e.g., advertising featuring peanut butter) is often deployed in conjunction with supplemental content having certain other characteristics (e.g., advertising featuring jelly).

In one embodiment, a content creator may map supplemental content simply by selecting a specific library entry or a specific item of supplemental content of interest using any combination of: a "drag-and-drop" tool, by checking a box, by typing in item numbers, and the like.

The access provider may provide tools to enable easy and effective delivery or uploading of pre-made supplemental content (individual or composite) from a user to the access provider. Such tools may allow various forms of information to be provided by the user to the access provider, and the access provider will utilize various processes to transform the information so that it may be utilized for additional customization (e.g., performed by the user or to be consistent with the format and attributes of supplemental content that can be presented by the access provider to viewers). For example, the .jpg format image component of an uploaded composite item of supplemental content may be converted to .gif format, and the particular font used for text information in the same composite item of supplemental content may be transformed into .gif format as well, and then both .gif files are transformed into single composite item of supplemental content that can be processed the media stream player used by the access provider. The transformation process may be aided by a menu system that allows a user to quickly identify the different items of supplemental content that are being uploaded, or by automated detection processes that analyze the items of supplemental content being uploaded and determine the items' attributes. Once identification is complete, the items of supplemental content may undergo various processes as necessary to prepare the items of supplemental content for final form (that may be utilized during the synchronization or mapping process discussed in greater detail below, and, ultimately, presented to viewers).

In one embodiment, the access provider allows users (e.g., content creators and other users) to create their own items of supplemental content. Such capability may be enabled in any number of ways, including allowing the user to contribute items of supplemental content of his/her own making or to contribute items of supplemental content obtained from a third party. In further embodiments, the user is enabled to select a single, unified library entry as a whole (e.g., a library entry or component thereof that comprises a sufficiently complete item of supplemental content), or to customize an item of supplemental content that is provided by the access provider by adding other items of supplemental content from the library (e.g., to create a new composite item of supplemental content).

In one embodiment, users are enabled to combine items of supplemental content obtained from the supplemental content library in various ways, potentially along with the user's own contributions, to create customized items of supplemental content for mapping purposes. The user may elect to use a composite item of supplemental content contained in a library entry as a whole (i.e., select an entire "pre-made" composite item of supplemental content) or may select various individual items of supplemental content from the library entry or from the composite item of supplemental content, potentially with additional material created by the user, to assemble a customized composite item of supplemental content. For example, a given library entry may be for a Brand X MP3 player. The "official" library entry supplied by Brand X may contain several images of the specific model of MP3 player, information regarding the MP3 player's physical and performance characteristics, the price of the MP3 player, a link to a point-of-sale website, and other similar information that may be relevant to a potential purchaser. The user may select one or more individual items of supplemental content from the library entry and combine the individual items with additional content of his/her creation (i.e., a graphical image, a clever saying, a reference to the media stream with which the supplemental content will be associated, etc.) to create a final composite item of supplemental content for a mapping. The individual items of supplemental content may be utilized in combination. For example, a user may upload a relatively generic item of supplemental content that he/she obtained from a third party (e.g., an item of supplemental content relating to a CD offered by a garage band), and then utilize tools provided by the access provider to supplement the generic item of supplemental content with his/her own content (e.g., a graphical image of the band's logo) and with items of supplemental content selected from several library entries (e.g., an item of supplemental content to characterize the finished composite item of supplemental content as "commercial", and an item of supplemental content consisting of a "button" image and a URL hyperlink that enables viewers to access a purchasing opportunity for the CD).

In one embodiment, the relevancy of automatically selected items of supplemental content is improved by asking the user to provide a minimal amount of information, such as the general subject matter of the media stream as it relates to appropriate advertising opportunity (e.g., a global warming video might be better identified as "environmental" material rather than as "how to buy a car" material), the identity of one or more articles appearing in the media stream (e.g., a particular hybrid automobile), and/or the demographic characteristics of the audience that is likely to view the media stream (e.g., adults, ages 25 and up). To obtain this minimal amount of information, the user may be asked for any of various forms of input. For example, the user may be asked to simply check one or more boxes from a list of choices provided by the access provider (where the category choices may be linked with specific library entry categories). These additional inputs would support automated advertising allocation that is superior to existing methods, because even the minimal amount of human input as described above focuses the automated system far more accurately than a fully-automated system. Thus, by requiring minimal additional effort on the part of the user, the relevancy of the supplemental content ultimately selected for a mapping (and, thus, the quality of the user experience and the revenue generated) would be enhanced.

This selection process may, for example, be organized in a "menu driven" or "wizard" system such that a user is queried about the media stream content (e.g., genre), target audience demographics, demographics of the user him/herself, or keywords/content tags defined by the user. An "expert" user may be enabled to access additional features that are more complex, but also more flexible or efficient. In one embodiment, the user may be provided with the option to stop at any point in the input process, and only the input that has been provided up to the stopping point is utilized for supplemental content targeting purposes (by an automated or other type of selection system). For example, the user may be presented with an initial menu that includes the general category of "Seasonal Supplemental Content." A user could simply check the box associated with that category and indicate that he or she does not wish to provide any additional information. Alternatively, the user could subsequently be presented with a sub-menu including "Christmas-related Supplemental Content," then another sub-menu including "Comedy Supplemental Content" (as opposed to, for example, "Sentimental Supplemental Content"), then another sub-menu including "Supplemental Content for Kids," then another sub-menu including "Supplemental Content With Reindeer," then another sub-menu including specific reindeer images, then another sub-menu including specific background colors, and so on. At any point in this process, the user could elect not to provide additional input, and the system would select supplemental content based on the available information.

Alternatively, the user could input to or select from a menu of classification choices, such as the demographic classifications that would likely view the media stream (e.g., "kids" versus "adults") or the general subject matter category of the media stream (e.g., "comedy" versus "sports clip—soccer") and the method 700 could then provide the user with items of supplemental content featuring the best-selling commercial articles for that audience.

The method may also suggest additional items of supplemental content based on an initial item or items of supplemental content selected by the user. In one embodiment, this suggestion is based on a comparison with items of supplemental content selected over an aggregation of users (e.g., "Users who selected this item of supplemental content also selected these other items of supplemental content").

Each of the different identification or classification options described above could be utilized alone or in any combination with other options, and the output of such selection processes described above may result in identifying either a final item (individual or composite) of supplemental content that is available for mapping or merely a "starting point" item of supplemental content that is intended to support further customization. For example, the process may identify an initial item of supplemental content related to a particular product, but the user may be prompted to further customize the item of supplemental content by selecting a specific image of the product from a range of possible images, to select a specific background color or font, etc.

One type of information that a user may wish to embed within a given item of supplemental content (or, potentially, such information from a particular item of supplemental content is embedded within a data file for the mapping-enabled media stream as a whole) is an instruction to alter certain aspects of the supplemental content based on data that is accessed by the mapping, such as data regarding certain conditions relating to the supplemental content. In one embodiment, the user may embed certain instructions within the supplemental content that will be triggered by specific input provided by the access provider for this specific purpose. For example, a third party website may be able to display a set of data that is invisible to the web site's visitors but that "triggers" appropriate responses within supplemental content that is viewed on the web site (e.g., such data may include the "dominant colors" of the web site, so that attributes of the supplemental content match the style of the web site; the "general age group" that accesses the web site, such as a web site primarily targeted to teenagers; or the specific volume at which sound effects emitting from supplemental content, and not from the primary media stream, will be made audible).

In another embodiment, the embedded instructions are triggered by information that is obtained by the access provider, without direct interaction or exchange of data with the third party web site or with a user. This information may be embedded within a template that was utilized by the content creator to create the mapping, and it need not be information that the user directly or even knowingly included in the mapping. For example, the instructions embedded within a given item of mapped supplemental content may require the automatic access of information provided to the item of supplemental content (e.g., perhaps generated by the media stream player, or perhaps generated during the transcoding stage of the method 700), such that the background color of the supplemental content is altered to be more consistent with either the general color scheme of the temporal segment of the media stream identified by the segment identifier to which the supplemental content has been mapped (e.g., if the media stream presents a night scene, a video processing system deployed by the access provider may detect that the primary colors are muted, and this information would trigger the background color of the supplemental content to be set to "dark blue" rather than the default color of "pale yellow"). As another example, the media stream player deployed by the access provider may "read" the HTML data presented by the web site to which the media stream player and annotated media stream have been deployed in order to determine the general color scheme, subject matter, or audience of the web site and to adjust the supplemental content accordingly.

One item of information that a content creator may include within a mapping or within a given item of supplemental content is information regarding the specific type of viewer to whom the given item of supplemental content should be presented. This feature could be used, for example, in situations where, in association with a given temporal segment of a media stream, the user prefers to show a first item of supplemental content to one type of viewer, and a second item of supplemental content to a different type of viewer (e.g., "Show Item A if the viewer is male, and show Item B the viewer is female"). To facilitate this capability, the content creator may include "determiner information" (e.g., determinations to be made based on demographic information about a viewer) within an item of supplemental content or within a mapping including the item of supplemental content that identifies the viewer demographics that are intended to activate the item of supplemental content (as opposed to other items of supplemental content potentially presented in association with the same temporal segment of the media stream). One or more determiners may be included by the content creator in a given item of supplemental content or a given mapping by having the content creator select some combination from a list of potential characteristics offered by the access provider (e.g., the user is enabled to insert an age range, check a box with respect to gender type, establish a minimum viewer income level, etc.).

This "generic" list of determiners may be linked by the access provider (in a manner that may or may not be visible to a user) to the specific information that is known (i.e., generated, gathered, or surmised) about the viewers within a specific context, such as a specific website. This linkage between a generic determiner and the counterpart to such determiner in the context of a specific web site is useful, because although many web sites collect data regarding specific viewers, there is typically no uniform manner for classifying such classifications. Thus, by enabling the access provider to keep a single, updated inventory of such classifications of data and links to relevant generic determiners, the correct processes are enabled at each web site. This also eliminates or reduces the need for users to provide multiple different codes to activate the same basic processes at different sites. For example, Web Site A may have access to the income level, age and gender of its visitors (who include viewers of the media streams presented on Web Site A), whereas Web Site B may only have access to the visitors' age information. As another example, Web Site A may collect visitor age data as a range of ages (e.g., twenty five to thirty years), whereas Web Site B may collect the specific age (e.g., twenty-eight years). In such a context, the access provider would link the demographic determiner (provided by the user) such that the specific item of supplemental content would elicit as much information as is available about the viewer at each web site. For example, the determiner would be able to process the broad age range information provided by Web Site A as well as the specific age information provided by Web Site B, while disregarding any of the other determiners with respect to Web Site B, due to the fact that these other determiners are not enabled by Web Site A. Enabling this type of functionality is an advantage for content creators, because the content creators are not required to seek out the information for each specific web site on which their annotated media stream may be shown (so long as the access provider has already linked the correct demographic determiner). Enabling this type of functionality is also an advantage for viewers, because the viewers are provided with more relevant supplemental content. Finally, enabling this type of functionality is an advantage for the access provider and for the web sites on which the annotated media stream appears, because it creates a superior viewing experience and higher levels of viewer interaction, which will hopefully lead to increased monetization of the content.

In addition to the approach whereby specific attributes of a given item of supplemental content or a given portion of a mapping may be made conditional with respect to viewing location, device types, viewer demographics, etc., as described above, attributes may also be made conditional on factors such as past viewer behavior (e.g., "Has the viewer previously been presented with Supplemental Content Item A more than X times?"), aggregate viewing statistics, or a random selection.

In one embodiment, as discussed above, a single item of supplemental content may include different attributes or components (e.g., multiple individual items of supplemental content combined within a composite item of supplemental content), such that the display of a particular attribute or component to a particular viewer is made dependent upon certain rules established by the content creator (e.g., the "price" attribute will be shown only to viewers over the age of 30, while all other viewers will be presented with the "third line of ad copy" attribute). In addition to such "intra-content" customization, in certain embodiments, more than one mapping between the media stream and (potentially different) items of supplemental content may be created. Such a plurality of mappings allows the media stream S to be displayed, for example, with a first set of supplemental content if embedded in a blog as opposed to with a second set of supplemental content if embedded on a social networking web site. Later, as described below, the appropriate mapping M1 or M2 will be selected for provision to a viewer in accordance with the posting location of the annotated media stream. Further, different mappings may be provided for display on different viewing devices (e.g., mapping M1 will be displayed to users viewing on a full-sized computer monitor, mapping M2 will be displayed to users viewing on a portable device such as a telephone or personal digital assistant, and mapping M3 will be displayed to users viewing on a television set). Further, different mappings may be provided for display with respect to specific viewer demographics (e.g., mapping M1 will be displayed to teenaged, female viewers, mapping M2 will be displayed to teenaged, male viewers, and mapping M3 will be displayed to viewers with any other demographic characteristics as a "default" mapping).

For example, a content creator who is mapping an advertising item of supplemental content featuring a diamond necklace may wish to present a "Treat Yourself!"-themed item of supplemental content to females and a "Show her you care!"-themed item of supplemental content to males. To facilitate the presentation of the relevant item of supplemental content, the content creator may designate a "set" of items of supplemental content that are intended to be presented in association with a specific temporal segment of the mapped media stream. This set of items of supplemental content may be assigned to another item of supplemental content that serves as a "placeholder" indicating that more than one item of supplemental content has been or may be mapped to the same segment identifier (identifying the same segment of the media stream). Such placeholder designation may be by direct instruction (e.g., "drag-and-drop" of each of the relevant items of supplemental content into one "basket") or indirect instruction (e.g., by mapping multiple items of supplemental content to a common segment identifier). The content creator may then indicate the rules, instructions, and/or criteria that will dictate which of the items of supplemental content will be presented in a specific context. As discussed above, these rules may rely on the specific characteristics of a viewer (e.g., age, gender), the technical/performance characteristics of the device on which the primary media stream is being displayed (e.g., a television versus a cellular phone), or the nature of the web site on which the annotated media stream is being displayed (e.g., a "kids-oriented" web site versus a "sports-oriented" web site).

In addition, as also discussed above, designations of items of supplemental content may be made conditional on any number of factors. For example, a plurality of attributes (or a plurality of items of supplemental content for a particular segment of a media stream) may be provided along with a choice regarding which specific attribute of an item of supplemental content to present: (1) the number of times a viewer has viewed the media stream; (2) the number of times the media stream has been viewed in total by all viewers or by a specific sub-set of viewers; (3) whether or not the viewer clicked on or otherwise expressed interest in a previously associated item of supplemental content in the mapping; (4) the average viewing time of the viewer (such as, for example, if the viewer typically views only the first thirty seconds of posted media streams); (5) the viewer's express or learned preferences with respect to factors such as the types of articles he or she is interested in or the "style" of supplemental content (e.g., advertising content) that he or she responds to best; (6) the actual amount of time that has passed since the item of supplemental content was first presented (such as with respect to an associated product that is "on sale" for only a set number of days); and (7) a random choice.

All conditional factors for determining the selection of items of supplemental content may be placed in a hierarchy of significance or otherwise "weighted" so as to achieve a particular emphasis (such as, for example, presenting the same item of supplemental content to a viewer at least X times before other factors are considered and processed). These factors and the respective significant weightings may be altered either in accordance with a set plan (potentially determined by the content creator or by standards established by the access provider) or randomly (with the results being collected and analyzed to facilitate the adjustments necessary to optimize the viewer's responses with respect to specific criteria, such as the rate of viewer click-throughs on a specific item of supplemental content). Multiple different combinations of weightings may be utilized (potentially as established by the user, by the access provider, or even automatically established by a system that has been programmed to apply different weightings), in order to observe the impact upon viewer response (such as measured by the rating that the viewer gives to the media stream or the click-through rate of specific items of supplemental content), and to use the impact information to select optimal weightings and/or optimal items of supplemental content to present to future viewers.

In one embodiment, items of supplemental content may be classified by the time period in which the item of supplemental content should be displayed before being replaced in favor of another item of supplemental content. For example, a given item of supplemental content may be an advertisement for a televised event such as a football game that is to be broadcast on February $6^{th}$ at 6:30 pm EST. An "expiration" date may be set for the advertisement to February $6^{th}$ at 5 pm EST, after which time the selected replacement item of supplemental content will be displayed to viewers (or, potentially, the advertisement will be removed entirely).

Further benefits to the access provider, to the content creator, and to advertisers and sellers may be provided by enabling selection of a generic product "type" item of supplemental content rather than a specific item of supplemental content (e.g., a placeholder), for which a specific item of supplemental content selected from a range of potential items of supplemental content would be selected and displayed to a viewer in a specific context. For example, a generic placeholder may include only a particular product's UPC (Universal Product Code), GTIN (Global Trade Item Number), or an equivalent unique identifier for the product. Advertisers and sellers can then pay (directly, or through an auction method) to have a specific item of supplemental content associated with media streams mapped (via segment identifiers) to placeholders that include that specific UPC, GTIN, or other unique identifiers. For example, a user may choose to feature a Brand X MP3 player in association with his/her media stream, with identifier N. At an auction to purchase the association for identifier N for a particular period of time, sellers offer a range from $1 to $4 per transaction (where transaction could be views, clicks, or purchases). The seller offering $4 is chosen by the auction, and for the particular period of time, that seller's selected item of supplemental content (e.g., advertising) will be included in the mapping.

In a more complex scheme, sellers could pay only for subsets of the product (e.g., identifier N for media streams viewed by a particular demographic). In this way, a number of sellers could be potentially associated with a particular media stream, but the display of any one seller's advertisement is optimized to meet the relative value placed on such placement by the advertiser. This optimization process could be combined with other optimization processes so that the actual item of supplemental content that is displayed to a viewer is determined by the seller that has offered to pay the highest price for such display, but only after taking into effect the relative click-through ratios as generated by previous viewers of the item of supplemental content. For example, Seller A may be willing to pay $1 per viewer click-through, and Seller B may be willing pay just $0.20 per click through. However, after the first 10,000 views of the video, the click-through rate generated by Seller B's item of supplemental content is more than five times greater than the click-through rate generated by Seller A's item of supplemental content. In such circumstances, the present invention may be optimized by presenting Seller B's item of supplemental content only to subsequent viewers (after the first 10,000), because the per-click revenue is lower (but the aggregate revenue generated will likely be higher if similar trends continue). In another embodiment, attributes within a given item of supplemental content may be allocated to sellers such that the item of supplemental content that is displayed to viewers remains largely or entirely unchanged, but other attributes of the item of supplemental content may change according to the highest bid price. For example, it is generally the case that any given article is available for purchase from a number of different sellers or sources (e.g., a given DVD may be available from the filmmaker's website, from the movie company, from various stores, from online sellers, or even from individuals such as those who auction used merchandise utilizing online auction web sites), and although there may be only one item of supplemental content relating to the article, any number of different sellers may be interested in being candidates for potential selection as the fulfillment source with respect to a particular click-through relating to the article.

In embodiments where the use of a given item of supplemental content involves a form of compensation (e.g., advertising revenue or e-commerce royalty), the present invention may be configured to offer the option to have the access provider automatically select the supplemental content to be included in a mapping, in return for the access provider keeping a larger portion of the compensation. This may be of particular interest to content creators who wish to minimize the amount of additional effort needed to monetize their media streams or, for example, to content creators who believe that the automated selections will be superior to what they would select. This automated allocation of supplemental content could be entirely randomized (such as, for example, matching an item of supplemental content that has been randomly selected from a supplemental content library and presenting the item of supplemental content to a viewer of the media stream for a random period of time consisting of between x and y seconds).

All factors considered in automated supplemental content selection can be automatically utilized in the optimization schema, so that various combinations of or alternative items of supplemental content are proposed until the optimum combination is determined (e.g., by referencing specific criteria). For example, the measuring criteria may include the number of items of supplemental content that are "clicked" by viewers of the media stream, the average length of time that a given media stream is viewed (e.g., few media streams are viewed to completion, and it may be the case the certain color combinations or supplemental content display frequency engenders greater average viewing times), the average quality "rating" awarded by viewers of the media stream or the volume of response (either words or number of submissions) generated by the annotated media stream. All of this information can be processed by an automated optimization system so that various combinations of items of supplemental content are proposed until the relevant measuring criteria are optimized.

Each of the optimization processes described above could be linked to a given media stream so that new supplemental content mappings are generated each time the media stream is accessed (i.e., the mappings are generated in substantially real time). Alternatively, the optimization processes could be set to run at various intervals so that, for example, x different versions of the mapping are generated (where each version contains supplemental content variations that will be analyzed for optimization purposes), and a viewer request to view the media stream will generate one of those mappings. When a predetermined number of views is completed, the optimization process will generate y different versions of the mapping and repeat the process. This latter approach would avoid the necessity to provide near-real time processing, but might increase the storage costs of storing multiple mappings for the same media stream.

In one embodiment, users are given the option to personally classify supplemental content according to one or more characteristics, such as by classifying the supplemental content as "advertising" (e.g., possibly including a purchase opportunity), "content complementary" (e.g., graphic images that complement the media stream), "navigation" (e.g., supplemental content in the form of a video that allows the viewer to easily navigate to another part of the media stream or to another media stream) or the like. This classification can be performed either automatically, by reference to certain criteria such as the by type of information or components that are included in the supplemental content (e.g., the inclusion of an item of supplemental content in the "Retail_Price" category of a library entry might indicate that the supplemental content is "advertising"), or manually such as by an employee or user of the access provider.

Such classification may also enable any number of additional processes that provide users (e.g., content creators) with additional control over the media stream and the access of viewers to the media stream. For example, the user may provide authorization for viewers to provide alternative supplemental content for a given category of supplemental content (e.g., viewers may suggest alternatives that include only advertisements that were created by the content creator and that have not yet produced X level of viewer response), while at the same time "locking" supplemental content of all other classifications (e.g., viewers cannot suggest alternatives to "artistic statements" created by the content creator as part of the overall multimedia experience). This would facilitate, for example, preserving the presentation of an artistically annotated media stream despite a potential tendency to increase the number of advertising-oriented items of supplemental content associated therewith as the media stream increases in popularity. It may also be possible, for example, for the user to, with respect to a given media stream, "open" or "lock" the association of specific types of supplemental content, such as blocking the ability for collaborators to provide supplemental content that is presented prior to the commencement of presentation of the primary media stream, while expressly encouraging the creation of supplemental content that allows the viewer to easily access a related media stream selected by the original content creator.

As another example, a user (e.g., a content creator) may provide an annotated media stream for which the first item of mapped supplemental content is an artistic (i.e., non-commercial) item of supplemental content that is displayed from time t=0 seconds to time t=10 seconds, the second item of supplemental content is an advertisement that is displayed from time t=10 seconds to time t=20 seconds, and the third item of supplemental content is a navigation assistant that is displayed from time t=20 seconds to time t=30 seconds. User A could utilize the authorization system to "open" only the advertisement (i.e., the second item of supplemental content) to syndication, so as to maximize potential revenue derived from the associated item of supplemental content, while at the same "locking" all other supplemental content categories, so as to ensure the preservation of the core viewer experience that User A seeks to create with the first and third items of supplemental content. This functionality would, for example, allow the user to "lock" the advertising that is meaningful to him/her (e.g., an advertisement for a specific snowboard that the user is riding in the media stream), while allowing others to provide advertising that is appropriate to other, more generalized aspects of the media stream (e.g., an advertisement for ski jackets that may or may not look similar to a jacket depicted in the media stream).

If the user has created a new item of supplemental content, the item of supplemental content can be uploaded or "authorized" to be included within the library so that when others view the library, they may also be presented with all or some of the individual items of supplemental content therein that have been derived from specific library entries. The user may provide the item of supplemental content subject to various conditions, such as allowing others who visit the relevant library entry to use the item of supplemental content "as is" (i.e., "locked") or, alternatively, allowing the item of supplemental content to be used for any purposes (including as a template for another user to modify and/or combine with additional items of supplemental content). Alternatively, items of supplemental content that meet certain criteria may be automatically included within the library (e.g., all items of supplemental content that generated click-through rates in excess of x % are placed within the library). This process of automatically including items of supplemental content may result in items of supplemental content being placed in a "holding" area of the library, in which the items of supplemental content are identified as items of supplemental content that have yet to be associated with a specific library entry. These items of supplemental content may be stored in the library with a particular library entry, potentially on a provisional basis that requires confirmation by other users or by an administrator. When an item of supplemental content is identified in this regard, a notification may be provided to the creator of the item of supplemental content. If the user fails to "claim" the item of supplemental content within a specific period of time, the access provider may label the item of supplemental content as an "access provider" item of supplemental content (for which the access provider receives the "creator" portion of any generated revenue), as a "community" item of supplemental content (for which no revenue is claimed or, alternatively, the creator portion of the revenue is placed in a specific account perhaps distributed to the community as a whole on a pro rata basis, donated to a charity, or some other purpose) or the like.

In one embodiment, this same type of approach that may be utilized to "open" or "lock" certain supplemental content categories (e.g., syndicators allowed only to change the advertisements) may be applied to specific components within a given item of supplemental content. For example, a user may "open" the ability for others to provide alternative "styles" of the item of supplemental content (e.g., allow the background color and fonts to be changed), but "lock" other attributes (e.g., the product image, retail price, and actual ad copy). This same functionality may be applied to specific library entries.

In one embodiment, items of supplemental content may be created and administered by an individual using tools provided by or hosted by the access provider. One such tool may include a set of procedures that allows a user to upload some individual components (e.g., fonts, images, etc.) of an item of supplemental content, select some individual components of supplemental content from the supplemental content library, transform one or more of the uploaded and/or selected individual components (e.g., by changing the colors, adding sound effects, etc.), and compile the customized individual components into a composite item of supplemental content that is formatted for compatibility with the media stream and with the technical needs of the access provider. This process may be conducted within a portion of the access provider that is made available to the user for his/her or his/her organization's personal use (e.g., a private "workspace"). Alternatively, the access provider may provide a public posting of "in-progress" items of supplemental content, whereby the tool allows certain approved groups or individuals (or even the general public) to contribute to the creation of items of supplemental content by offering commentary, additional individual components, modifying the in-progress item of supplemental content, offering alternative items of supplemental content, etc. It may be the case that a user would utilize a private workspace to create an alternative item of supplemental content, provide the alternative item of supplemental content to the public workspace for commentary and modification by the community, and then return the alternative item of supplemental content to his/her private workspace for final modifications. In one embodiment, this workspace tool enables a "revision history" function, so that the user and/or others can track the progress of an item of supplemental content's development, access prior instantiations, determine who made particular changes and when, etc.

Another tool may allow a user (e.g., a content creator) to designate a set of items of supplemental content as the "working library" of the items of supplemental content from which the user will create the annotated media stream (i.e., the combination of the media stream, the media stream player application, and the collection of items of supplemental content for the mapping). In one embodiment, the working library may be modified at any time, saved for access at a later date, shared with others, etc. in a manner similar to the workspace.

In one embodiment, the working library includes functionality such that if a user would like for more than one item of supplemental content to be available for mapping with respect to a specific temporal segment of the media stream (e.g., a first item of supplemental content will be shown to male viewers and a second item of supplemental content will be shown to female viewers and viewers of unknown gender), the user may utilize a "proxy" or "placeholder" to which multiple items of supplemental content may be assigned. The tool may allow the user to place the items of supplemental content in an order in which the user anticipates that the items of supplemental content will be displayed to a viewer (i.e., when the items of supplemental content are ultimately mapped to segment identifiers associated with the media stream), and to easily "mix-and-match" various combinations of items of supplemental content to determine the most suitable order, potentially via "drag-and-drop," numbering systems, or other methods for assigning the items of supplemental content to a sequence.

Figure 40:
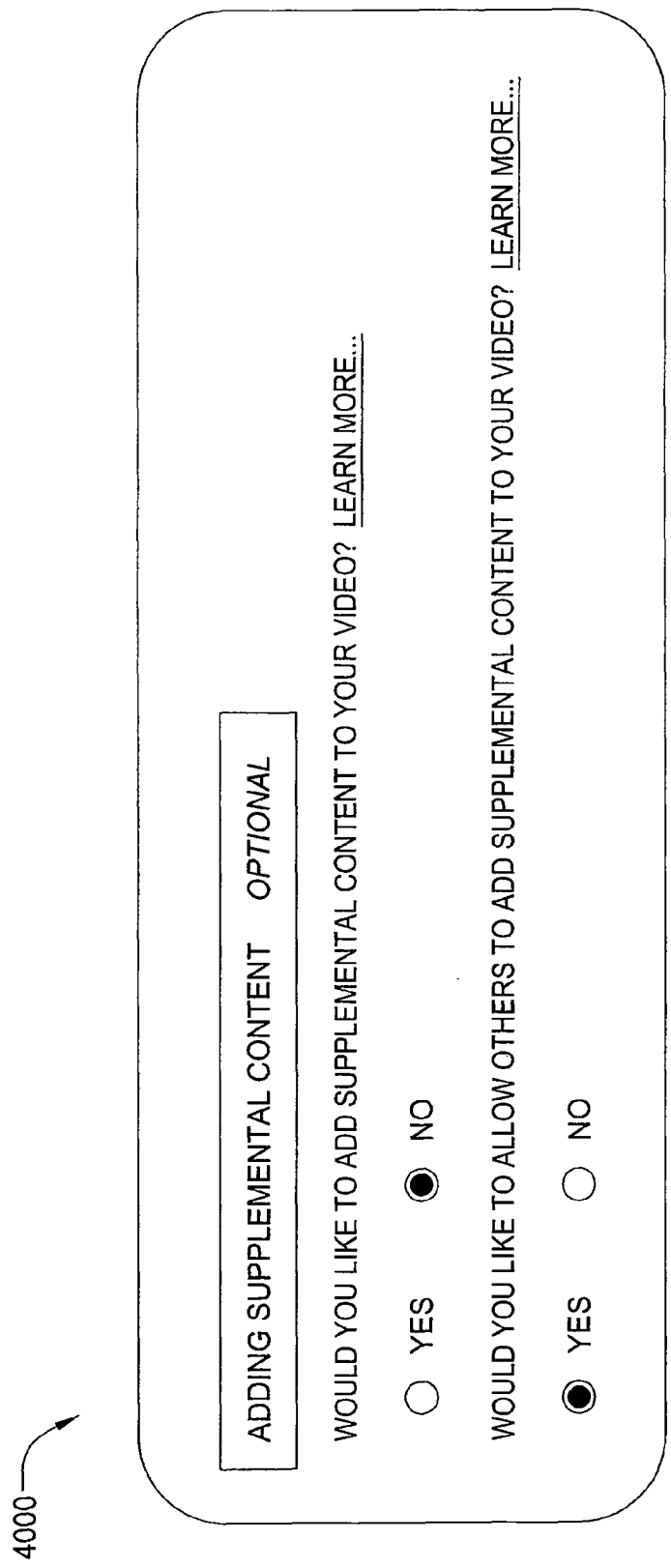
FIG. 40 illustrates an exemplary initial display for presentation to a content creator.

In one embodiment, users (e.g., content creators) are presented with simple menu selections to determine their interest level in providing items of supplemental content. For example, as illustrated in FIG. 40, which illustrates an exemplary initial display 4000 for presentation to a user, the user may be presented with yes or no questions such as "Would you like to add supplemental content to your video?" and/or "Would you like to allow others to add supplemental content to your video?" A "default" answer could be provided for these questions, so that users that are not interested in annotating their media streams need only take minimal additional steps. Providing a system that is easy to bypass may be very important, because a complicated system might deter all but the most dedicated users from contributing media streams.

In the course of creating items of supplemental content and mappings, a user may benefit from being able to keep track of the items of supplemental content that have been created and the items of supplemental content that may still be required. To facilitate this, the system may provide the user with the ability to make a list and/or notes regarding specific items of supplemental content, where individual listings and notes are severable into various workspaces or portions of a workspace. For example, one user may wish to create a list of all of the items of supplemental content that are envisioned for a particular media stream mapping, and then transmit the entire list to a group of potential contributors (potentially allocating responsibility for each item of supplemental content on the list to a specific member or members of the group). Alternatively, the system may provide the user with the ability to create "placeholders" for the items of supplemental content that he/she intends to create. For example, a user who is creating items of supplemental content for a mapping associated with a fishing-themed video may wish to create placeholders or proxies such as "title screen," "picture of boat," "map of the lake," "advertisement for fishing pole," "animation of fish towing a boat," "bait advertisement," "photograph of the fish dinner that night" and "closing screen." The present invention would then allow the user to create items of supplemental content and relate them (e.g., by "drag-and-drop," by numbering, etc.) to each of the placeholders. The present invention may also allow the user to relate multiple items of supplemental content to the same placeholder, so as to facilitate the content creator's ability to easily compare different versions of the same item of supplemental content. The collection of placeholders and items of supplemental content thus forms a "working library" that will facilitate the user's interactions with the items of supplemental content, either prior to or after the initial "release" of the annotated media stream for viewing. The system may also permit the user to designate a specific order of appearance for the placeholders (e.g., via "drag-and-drop," numbering systems, or otherwise assigning the placeholders to a sequence). In one embodiment, the system allows the content creator to take various actions with respect to the selected items of supplemental content and/or placeholders such as to add, delete, modify, rename or re-order such placeholders.

The method 700 thereby allows a user (e.g., a content creator) to create a mapping from segment identifiers associated with a media stream to one or more items of supplemental content. In one embodiment, mappings are made between segment identifiers identifying temporal segments of the media stream and one or more items of supplemental content (e.g., the first minute of the media stream may be associated with the first item of supplemental content, the second minute of the media stream associated with the second item of supplemental content and so on). In another embodiment, mappings between the segment identifiers and items of supplemental content are made with respect to an event or action such as when the viewer has "paused," or "fast-forwarded," or "stopped" the media stream, the amount of time that has elapsed since the "play" button on the media stream player was pressed, or upon completion of the media stream upload to the viewer's display device. For example, the user may configure the mapping so that when the media stream is paused, the viewer is presented with a specific item of supplemental content, regardless of the subject matter appearing in the particular scene of the media stream at which the media stream was paused. In another embodiment, mappings to items of supplemental content may be made with respect to metadata included in the encoding in the primary media stream or added to the encoding by the user or by the access provider (e.g., segment identifiers, cue points and the like).

Alternatively, the present invention may reference all items of supplemental content in the working library created by a user and automatically apportion the items of supplemental content to the segment identifiers in accordance with a default apportionment (e.g., each item of supplemental content is associated with a temporal segment equal to the total time of the media stream divided by the number of items of supplemental content being mapped). In one embodiment, the present invention allows the user to adjust the default mapping so that each item of supplemental content is associated precisely with those temporal or other segments (e.g., by "scene" or in a synchronization that creates a meaningful connection between the media stream and a given item of supplemental content) of the media stream, as desired by the user. This mapping adjustment process may be performed by various means such as by the input of segment identifiers (e.g., supplemental content item number 1 is mapped to the segment identifier identifying the segment that spans time t=1 second to time t=17 seconds) or by adjusting "bars" or other graphical user interface elements along a time line representing the entire length of the media stream (such that a first bar indicates the presentation of a first item(s) of supplemental content, a space between the first bar and a second bar represents the time in which the first item(s) of supplemental content will be presented to a viewer, and the second bar represents when the first item(s) of supplemental content will be replaced by a second item(s) of supplemental content).

Alternatively, items of supplemental content may be mapped to segment identifiers that are independent of a particular media stream. For example, a selection of items of supplemental content may be mapped to appear every fifteen seconds, with the total number of items of supplemental content presented to the viewer being determined solely by the length of the media stream with which the items of supplemental content are associated (e.g., if a mapping consists of a total of ten items of supplemental content, but the media stream associated with the mapping is only seventeen seconds long, only the first two items of supplemental content will be presented to viewers). Alternatively, all items of supplemental content that were mapped beyond the length of the media stream may continue to be displayed after the media stream concludes (i.e., the items of supplemental content continue to be presented, perhaps at a quicker pace as set by the user for post-media stream display).

In some embodiments, the method 700 may provide a tool whereby each item of supplemental content in a mapping is numbered from 1 to n. The user may associate the items of supplemental content with the media stream by simply watching the media stream and pressing the number(s) associated with the item(s) of supplemental content that should be mapped to the segment identifier(s) identifying that point. The association of the selected item(s) of supplemental content with the media stream would end when the next item of supplemental content is selected, thereby creating a temporal association from the start point to the end point with the selected supplemental content (i.e., the start point of the latter item of supplemental content necessarily defining the end point of the immediately preceding item of supplemental content).

Referring back to FIG. 7, in step 708, the method 700 synchronizes the supplemental content with the media stream, to produce an annotated media stream. Specifically, as discussed above, the method 700 maps the supplemental content to appropriate segment identifier, as indicated by the user. In one embodiment, the method 700 maps at least one segment identifier in the media stream to multiple items of supplemental content.

In optional step 710 (illustrated in phantom), the method 700 synchronizes system-selected supplemental content with the media stream. For example, if the supplemental content involves a form of compensation (e.g., advertising revenue or e-commerce royalties), the method 700 may be configured to automatically select specific articles to be mapped to the segment identifiers in the media stream, for example in exchange for keeping a larger portion of the compensation. Alternatively, advertising space may be bought from the user (i.e., the provider of the media stream) and resold to third parties (e.g., advertisers). In this embodiment, advertising space may be sold using a price list or an auction system.

The method 700 saves the annotated media stream in step 712 (e.g., upon indication from the user that annotation is complete), before terminating in step 714. In one embodiment, saving the media stream includes saving user-provided tags associated with the media stream (e.g., that describe the media stream, assign the media stream to a genre, or specify certain characteristics of the media stream such as the length, the content creator, the director, or the like). In one embodiment, saving the media stream includes encoding the media stream. In one embodiment, encoding is performed in a manner that allows both a program identifier (i.e., identifying the particular media stream) and a segment identifier associated with each segment of the media stream to be obtained. In a further embodiment, the saved annotated media stream is associated with one or more saved parameters, such as a cap on "click-throughs". This may be useful, for example, where a seller creates an annotated media stream for a specialized product. For example, if a seller cannot profitably sell more than one thousand units of a given article, the seller may not want to pay for full advertising once a certain number of click-throughs has been reached. In one embodiment, once the capped number of click-throughs is reached, the annotated content reverts to a more "bare bones" structure (e.g., just manufacturer and item name, but no purchase information or enablement).

Once the annotated media stream has been saved, it may be made available to viewers (for example, by publishing the annotated media stream on a web site or by providing the annotated media stream to an access provider). The method 700 therefore allows a user, such as a content creator, an ad buyer or a seller, to control the annotation of a media stream. Thus, the method 700 may function as a portal that provides a user with a means of creating annotated media streams (e.g., in the case of content creators) and of providing articles for use in media streams (e.g., in the case of sellers and/or ad buyers). In one embodiment, the method 700 executes in accordance with a local application on the user's computer. In another embodiment, the method 700 executes in accordance with a web-based application. In yet another embodiment, portions of the method 700 may be performed locally, while other portions of the method 700 are performed remotely via a networked computer.

Further embodiments of the method 700 enable outsourcing of the mapping tasks. That is, the party who uploads or provides the received media stream may not be the same party that performs the mapping tasks (e.g., such as selection of supplemental content). In one embodiment, the media stream may be received in a protected (e.g., encoded) form, or may be protected upon receipt, so that further steps of the method 700 (e.g., mapping of supplemental content, etc.) can be outsourced in a secure manner. In one embodiment, the protection prevents remote downloading of the media stream (i.e., the media stream can only be viewed). In another embodiment, the media stream is received in discrete "scenes" or sections to ensure that no individual performing subsequent mapping tasks is able to view more than one scene of the media stream. In this embodiment, an individual performing mapping tasks with regard to a given scene may leave "notes" for individuals performing mapping tasks with regard to other scenes of the same media stream, in order to inform the other individuals of mapping decisions that have been made.

In a further embodiment, a log in/log out system allows individuals to perform mapping tasks with regard to a given media stream. In one embodiment, this log in/log out system illustrates changes made during a prior log in session.

In one embodiment, selection of supplemental content for mapping purposes is optimized by enabling the access provider to access the records of an existing digital video recorder, video-on-demand service, or other type of "cache" in order to alter supplemental content already associated with media streams stored therein or already viewed by the viewer. Using the segment identifiers, it can be determined which the items of supplemental content did not produce a viewer response, and edits can be made to the mapping with relation to these segment identifiers. In this way, the supplemental content displayed in connection with a media stream might actually change from one viewing to another.

In one embodiment, viewers are prompted to provide additional information regarding their preferences with respect to supplemental content. This viewer information could be requested when, for example, a set top box is first hooked up, or at any time thereafter by the viewer accessing an online service account. The indicated viewer preferences could be matched with the viewer's actual behavior in order to determine if the viewer preferences provide sufficiently accurate data for the purposes of selecting supplemental content. If the preferences substantially match the behavior, the indicated viewer preferences are considered to be of very high value (in that data-mining predictions will have been, in essence, certified by the viewer's own actions and conscious preferences). This information could be used enhance the digital placement of particular articles into actual media streams (e.g., Brand X beer, not Brand Y beer), to enhance the use of specific types of music or other audio components (e.g., Hip Hop), to enhance the use of specific types of advertising (e.g., more "information rich" as opposed to "what your friends/viewers like you" are buying) and the like.

In one embodiment, viewer behavior could be guided by requiring viewers to "link" various tokens obtained through different actions. For example, a "game" could be implemented that takes advantage of various forms of video tokens (e.g., to get a discount for a given article, the viewer must collect tokens by watching each of three specific movies at a given movie theater, by watching a television show that features a specific brand of automobile, and by purchasing a particular article at a particular seller). In one embodiment, tokens must be collected in a specific order (e.g., in the example above, the viewer is required to first see the television show and then see the movies). In one embodiment, token functionality is utilized as a "scavenger hunt" in which the individual media stream and/or supplemental content associated therewith does not directly participate, but is nonetheless able to facilitate the search. For example, each item of supplemental content may be placed with an ontology. Therefore, a scavenger hunt could require the viewer to obtain one token from any television show featuring an article of category X of the ontology and one token from any theatrical release including a category Y article.

Sometimes, a particular group of viewers may be interested in receiving customized supplemental content with respect to a given media stream. Thus group could be provided with a mechanism to establish "private" supplemental content that is accessible only to the group. For example, there are many distance learning applications in which a school might send a video about a particular author out to all of its students. In one embodiment, this feature could be combined with a mechanism for tracking viewer response (e.g., a mechanism that verifies that each student clicked through all supplemental content so as to verify that he/she watched the entire video). As another example, individuals can create a customized annotation about a media stream segment, such as ranking the segment (e.g., 4.5 out of 5 stars) or making notes about the segment (e.g., "Sarah—that dress would look great on you").

It is increasingly the case that advertisements are being inserted into live media streams. For example, the area behind the batter in baseball broadcasts is often digitally edited to show different advertisements every few minutes. To facilitate the presentation of appropriate supplemental content with such media stream, a temporary mapping may be created so that a given segment references information that is specific to the "raw" segment, but also that is specific to what has been presented to a particular viewer.

Figure 14:
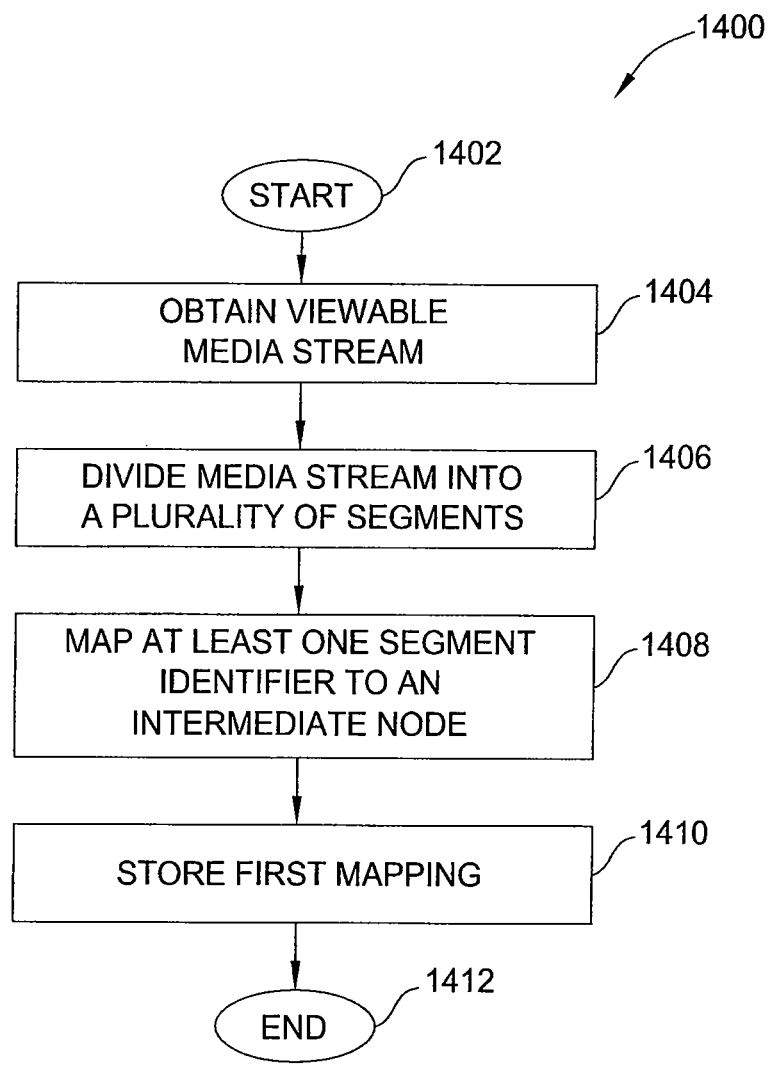
FIG. 14 is a flow diagram illustrating another embodiment of a method for annotating media streams, according to the present invention.

FIG. 14 is a flow diagram illustrating another embodiment of a method 1400 for annotating media streams, according to the present invention. The method 1400 may be implemented, for example, in its entirety by the stream annotation service provider 112 of FIG. 1. Alternatively, the method 1400 may be implemented by the stream annotation service provider 112 in conjunction with a content creator 102.

The method 1400 is initialized at step 1402 and proceeds to step 1404, where the method 1400 obtains a media stream. As described above, the media stream comprises at least one of: a video signal, an audio signal or a text signal, for distribution over a user device.

In step 1406, the method 1400 logically divides the media stream into a plurality of segments, wherein segment identified by a segment identifier (e.g., a unique segment identifier). As described above, these segments identifiers may comprise, for example, a segment number or set of segment numbers, a generated number, time-codes or other identifier. In one embodiment, the segment identifiers are embedded in the media stream.

In step 1408, the method 1400 maps at least one of the segment identifiers to at least one intermediate node representing an article, a concept or a class of concepts. This creates a first mapping. Thus, for example, the first mapping (to the intermediate node) may represent that the segment of the media stream identified by the segment identifier contains, suggests, implies or in some other way conveys the article, concept or class of concepts represented by the intermediate node. In turn, intermediate nodes are independently mapped via a second mapping to specific items of supplemental content. Thus, a segment identifier that is mapped to an intermediate node is also indirectly mapped (via the intermediate node) to supplemental content.

The mapping is stored in step 1410. In one embodiment, the mapping is stored in a store that is indexed according to a unique identifier for the media stream. The method 1400 then terminates in step 1412.

The use of the intermediate nodes in accordance with the method 1400 provides many advantages. For example, the use of intermediate nodes makes the remapping of supplemental content very efficient. To change an item of supplemental content (e.g., if the item of supplemental content becomes unavailable), only one mapping (i.e., from the intermediate node to the item of supplemental content) need be changed, and this change will map the new item of supplemental content to all segment identifiers that are mapped to the intermediate node. In situations where the supplemental content appears, say, thousands of times in hundreds of media streams, changing one mapping scales much more easily than changing thousands of mappings in each of the hundreds of media streams.

Additionally, because the specific items of supplemental content are not embedded in or with a media stream, the items of supplemental content do not need to be identified prior to any particular event such as the commencement of filming or encoding of the media stream. This allows the entire creation process to be much more flexible. For example, even if an item of supplemental content is unknown at encoding time, a segment identifier can be mapped to an intermediate node. If an item of supplemental content is later identified, the item of supplemental content can be mapped to the intermediate node and thus automatically (indirectly) mapped to all segment identifiers that are mapped to the intermediate node.

Furthermore, one can easily identify mappings from segment identifiers that do not have (indirectly) mapped supplemental content. As the approach embodied in the method 1400 allows for "half" mappings (i.e., a first mapping of a segment identifier to an intermediate node without a second mapping of the intermediate node to an item of supplemental content), one can easily search for intermediate nodes that are not mapped to items of supplemental content. This enables searching for "unused" or "unsold" intermediate nodes, and the straightforward subsequent addition of an item of supplemental content.

Consistency is important in order to most effectively utilize the intermediate nodes across a plurality of segment identifiers associated with a plurality of media streams. For example, if a first media stream is encoded to map segment identifiers identifying romantic segments to the intermediate node "romance", but a second media stream is encoded to map such segment identifiers to the intermediate node "love", some of the advantages of the method 1400 may not be fully realized. Hence, a carefully controlled vocabulary is preferentially used to constrain the first mapping of segment identifiers to intermediate nodes.

A constrained vocabulary will give rise to issues with homonyms. For example, is the intermediate node "glasses" related to a plurality of drinking glasses, or to a pair of eye glasses? To overcome this problem, the intermediate nodes in one embodiment are considered to be instances and classes of an ontology. The ontology provides a universe of possible intermediate nodes that are classes (abstract groups, sets or collections of objects) and instances (both concrete objects such as specific cars, and abstract objects such as numbers, words and themes). Instances are members of a class (e.g., a "Brand X four-wheel drive truck" is an instance of the class "truck"). In one embodiment, classes are arranged in a graph, providing at least an "is-a" (i.e., an instance "is-a" member of the class, and a class "is-a" member of the super-class). Such an "is-a" relationship thereby creates a hierarchical taxonomy. Each object (class or instance) in the ontology may have a number of attributes associated with it. For example, the class "business" may have an attribute of "location", as all business have a location.

In some embodiments, a "part-of" relationship, sometimes known as a meronymy relationship, is provided between classes (or between instances and classes), representing how objects (or classes of objects) combine together to form a composite object. For example, the instances "Jelly" and "Peanut Butter" are both "part-of" the instance "Peanut Butter and Jelly Sandwich". The ontology structure allows more than one parent node, under both the "is-a" and the "part-of" relationships, creating a directed acyclic graph of instances and classes.

Figure 8:
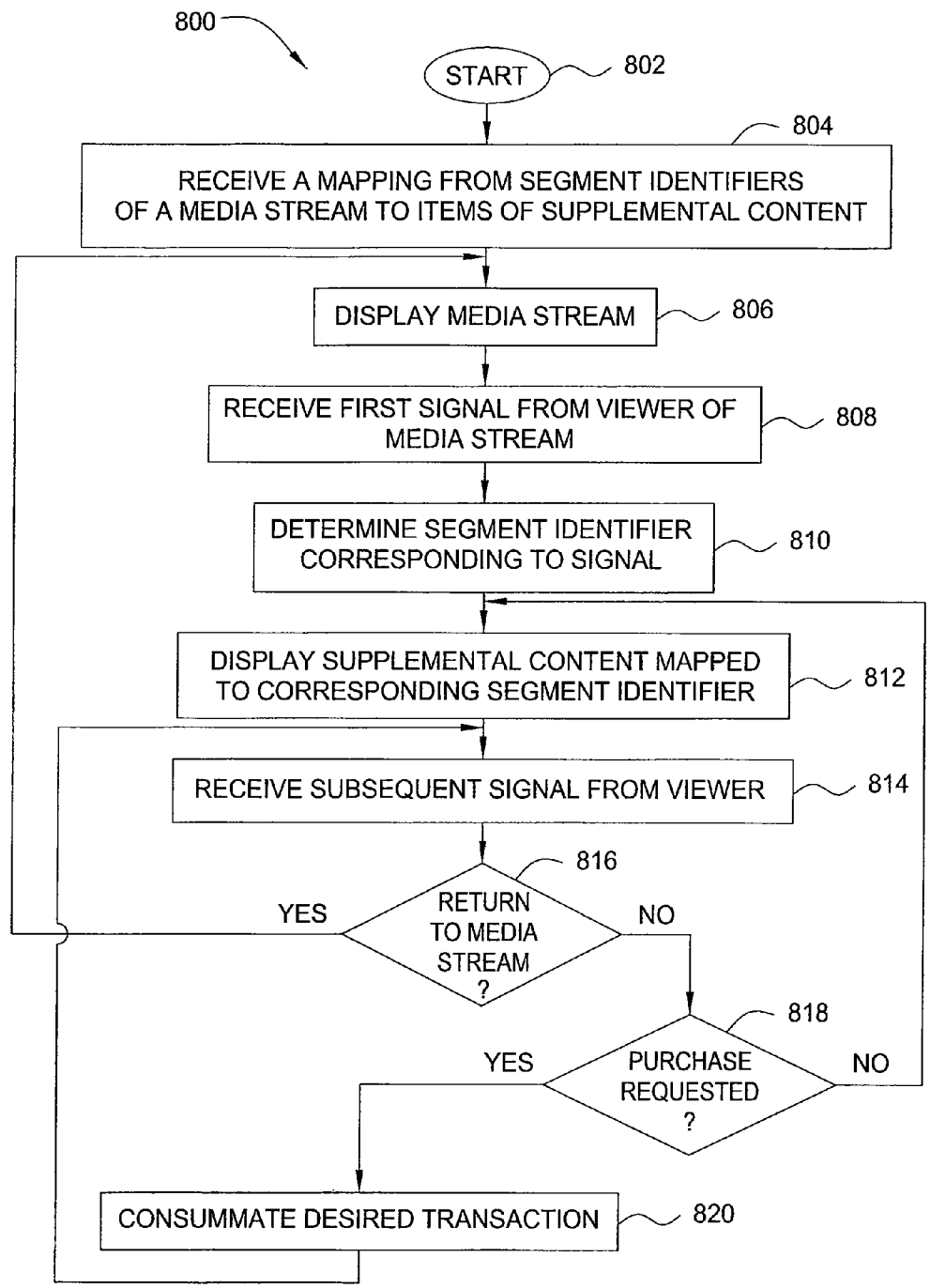
FIG. 8 is a flow diagram illustrating one embodiment of a method for providing annotated media streams to viewers, according to the present invention.

FIG. 8 is a flow diagram illustrating one embodiment of a method 800 for providing annotated media streams to viewers, according to the present invention. The method 800 may be implemented, for example, in its entirety by the access provider 106 of FIG. 1 (e.g., via a user device such as a television, a DVD player, a DVR, a set-top box, a portable media player, a personal digital assistant, a personal computer, a mobile phone, an in-flight or in-vehicle entertainment system, a video game console, a dedicated device or the like). Alternatively, the method 800 may be implemented by access provider 106 in conjunction with the stream annotation service provider 112.

The method 800 is initialized at step 802 and proceeds to step 804, where the method 800 receives a mapping of segment identifiers associated with a media stream to items of supplemental content. In one embodiment, the supplemental content comprises commercial information relating to one or more articles appearing in the media stream, as described above. In one embodiment, the mapping is received from a remote server (e.g., the stream annotation service provider 112), for example, via the Internet, via a cable network (e.g., where the remote server may be the cable head-end, or the head-end may mediate communications with the remote server) or via satellite. Particular embodiments may receive the mapping as an OpenCable application platform (OCAP) or digital video broadcasting (DVB) application, or as a private section with an MPEG transport stream. In a further embodiment, the mapping is received "on the fly" from a "director" (e.g., content creator 102 or stream annotation service provider 112) who creates a list of supplemental content relating to articles that may be relevant to the media stream, and, as the media stream is distributed or displayed, "activates" specific items of supplemental content from the list in substantially real time as the media stream conveys information about the related articles. In one embodiment, the mapping further includes the URL of one or more World Wide Web sites relating to one or more articles appearing in the media stream.

In step 806, the method 800 displays the media stream via a display device. In one embodiment, displaying the media stream includes presenting an indicator when the segment identifier identifying the currently displayed portion of the media stream (e.g., the currently displayed segment) is mapped to supplemental content. Thus, a viewer of the media stream would automatically know when additional information about one or more articles being displayed is available (e.g., as opposed to having to guess or query). In one embodiment, the indicator is presented when the segment identifier identifying the currently displayed portion of the media stream is mapped to supplemental content relating to information that is expected to be of interest to the viewer (e.g., based on demographic information, stated viewer preferences or previous viewer activity). In one embodiment, the indicator is a visual indicator, such as an icon overlayed on the display of the media stream or a (perhaps flashing) light on the media stream player (e.g., a set-top box, DVR or the like), on the display device or on a remote control. In further embodiments, the indicator may be an audible indicator or other sensory indicator (e.g., a vibrating remote control). In a further embodiment still, a "split screen" display may be employed that displays the media stream in a first portion of the display and data relating to currently accessible supplemental content in a second portion of the display.

Figure 26:
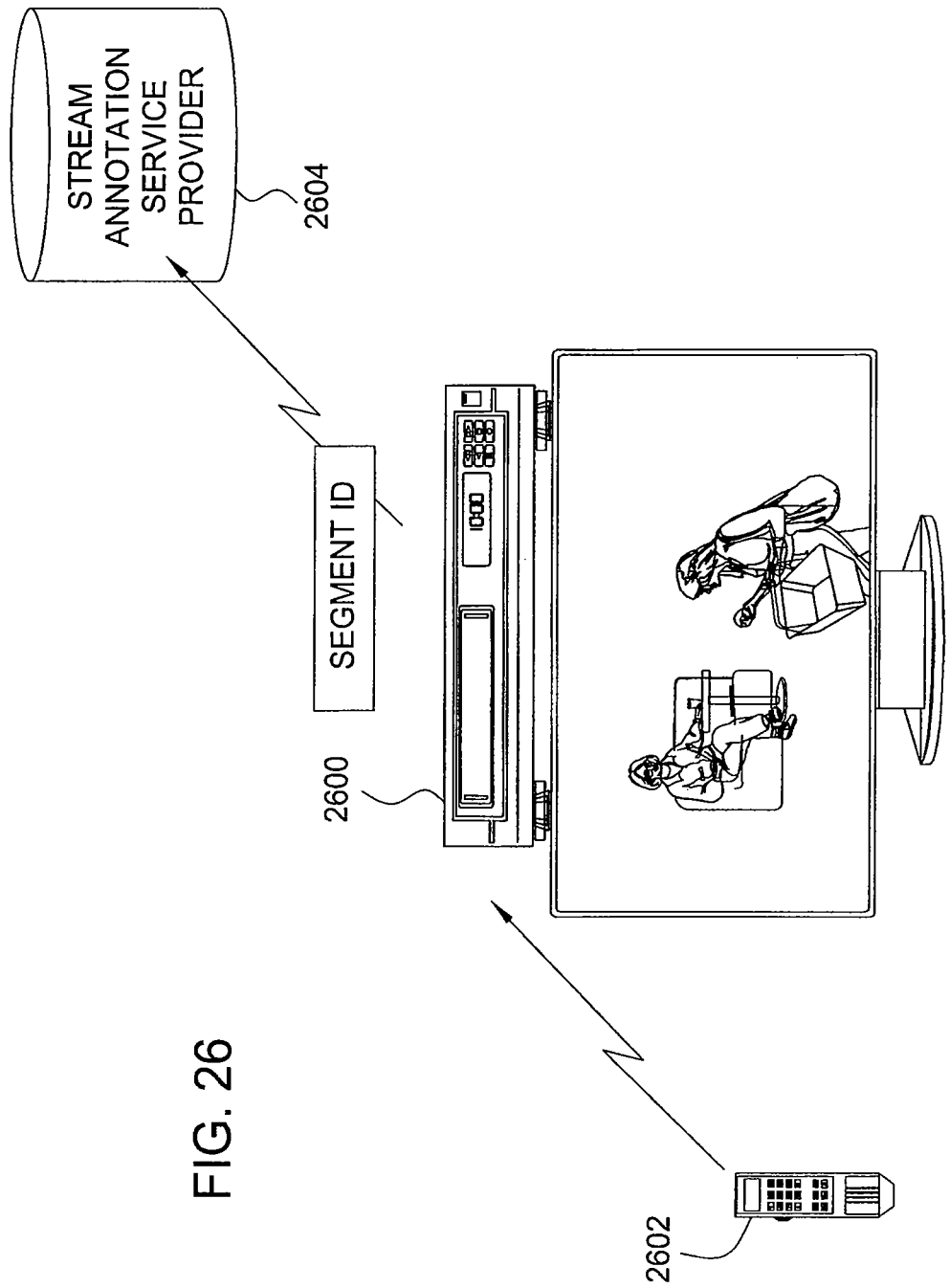
FIG. 26 illustrates an exemplary set-top box that interacts with user signals provided via a remote control.

The method 800 then proceeds to step 808 and receives a first signal from a viewer of the media stream. The first signal indicates that the viewer wishes to view at least a subset of the information embodied in the supplemental content. In one embodiment, the first signal is conveyed via the push of a button (e.g., on a remote control, a keyboard, a mouse, a light pen or a laser pointer) or via a spoken command (e.g., to a microphone, a mobile phone or a voice-over-IP handset). For example, FIG. 26 illustrates an exemplary set-top box 2600 that interacts with user signals provided via a remote control 2602. In one embodiment, the method 800 supports multimodal viewer interaction, meaning that two or more input modalities may be employed for receiving viewer signals. Multimodal interaction may be helpful, for example, in correcting errors in processing viewer signals. For example, errors in processing viewer signals may be corrected in accordance with the methods described in U.S. Pat. No. 6,742,021, which is herein incorporated by reference in its entirety.

Figure 31:
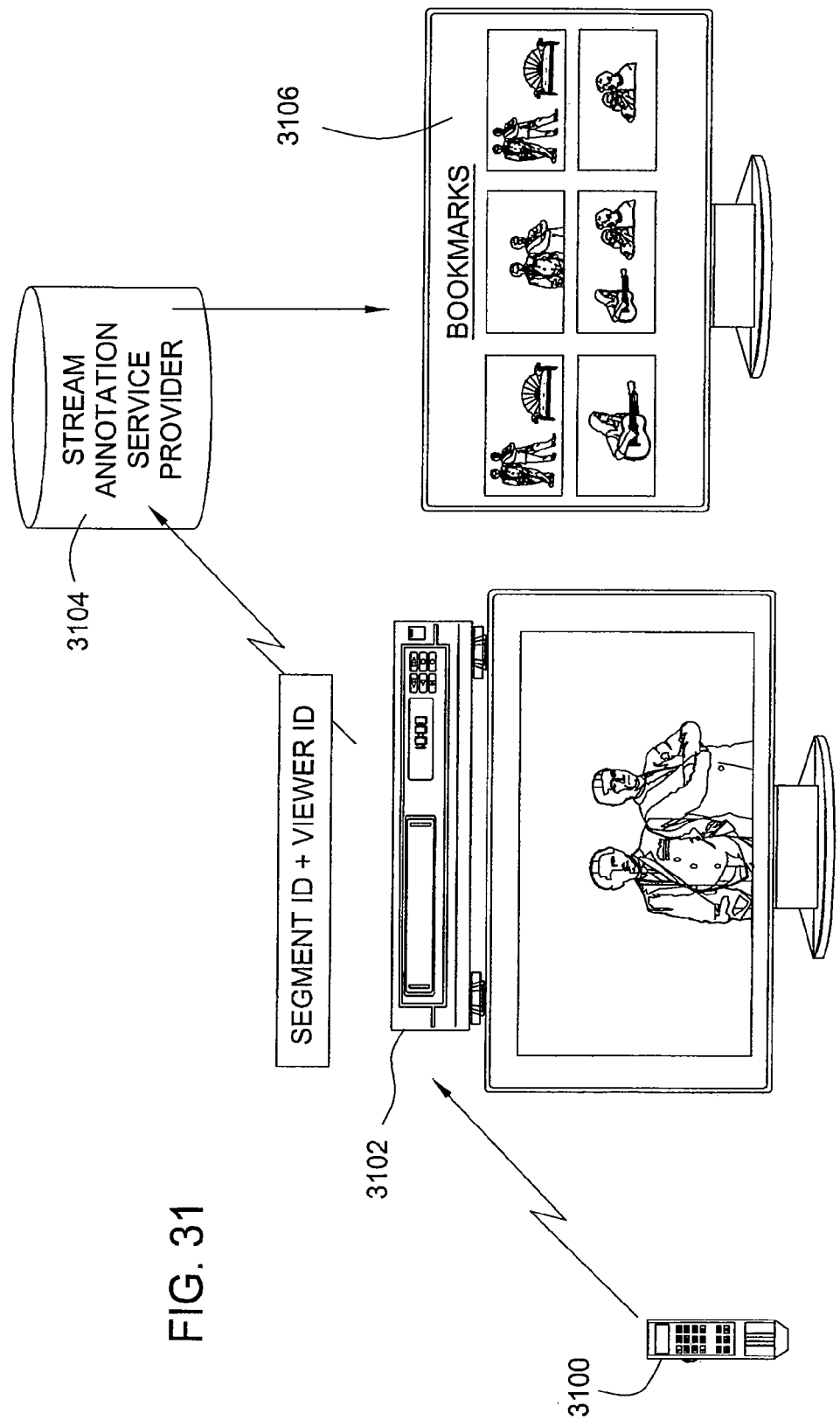
FIG. 31 illustrates an exemplary system in which a viewer signal indicates that the viewer wishes to "bookmark" supplemental content mapped to the current segment's segment identifier for later viewing.

In one embodiment, the first signal indicates that the viewer wishes to view the supplemental content immediately. In another embodiment, the first signal indicates that the viewer wishes to view the supplemental content at a later time (e.g., at the conclusion of the media stream). In further embodiments, the first signal indicates that the user wishes to save the present position in the media stream to view the supplemental content at a later time, without specifically identifying the article of interest (e.g., "mark for later"). For example, FIG. 31 illustrates an exemplary system in which a viewer signal (received, e.g., via a remote control 3100 to a set-top box 3102) indicates that the viewer wishes to "bookmark" supplemental content mapped to the current segment's segment identifier for later viewing. As illustrates, the set-top box retrieves the relevant segment identifier and the viewer's viewer identifier. The supplemental content mapped to the segment identifier is then retrieved from a database 3104 and sent to an account 3106 associated with the viewer identifier for later viewing.

Thus, in one embodiment, mappings or items of supplemental content therein may be "saved" (either automatically or on the viewer's initiative) for later viewing, either on the same display device on which the media stream is shown (e.g., after the media stream is played, the items of supplemental content are presented) or in on a different display device (e.g., sent to the viewer's account with an access provider or a third party). This may be particularly useful if the media stream is viewed on a display that is too small to display the items of supplemental content effectively or in their optimal size (e.g., such that advertising text is illegible for the average viewer), such as when the media stream is viewed on a cellular phone. If sent to another type of display device such as a television, an access provider may provide functionality for the items of supplemental content to be separated from the media stream and directed in another way, such as being sent to a viewer's email account for later viewing, presented as a "split screen" or "picture-in-picture" or in some other manner that is suitable for the display device.

In one embodiment, the functionality described above may be applied only to particular items of supplemental content. For example, the viewer may be permitted to block the presentation of all items of supplemental content featuring "adult" content or all items of supplemental content that include advertisements mapped segment identifiers identifying more than a specified percentage of the media stream's length. This functionality would allow the viewer to tailor his/her viewing experience to meet his/her preferences. An access provider could choose to make all such "blocking" features available solely to those viewers who met certain requirements (such as having paid a certain fee). The access provider may permit the establishment of a specific viewing account for which access privileges are defined by one viewer for all other viewers utilizing the account (e.g., a parent establishing an account on behalf of his/her child; a company establishing accounts on behalf of its employees so that the employees may view only company-provided media streams).

In step 810, the method 800 determines, in accordance with the mapping (e.g., mapping 2604 of FIG. 26), which segment identifier corresponds to the point in time at which the first signal was received (i.e., what segment of the media stream was being displayed when the viewer sent the first signal). In one embodiment (e.g., where segment identifiers comprise hash-generated identifiers), this determination is made by computing the hash of the current frame of the media stream, identifying the time associated with the computed hash, and retrieving the supplemental content for that time. In another embodiment, the time-code data from the current segment is used. In another embodiment, this determination accounts for a built-in time delay, as discussed above. For example, the first signal may be received at time $t_0$, but the viewer may be reacting to an article appearing in the media stream at time $t_{0-n}$ (i.e., the viewer's reaction time is slower than the progression of the media stream).

In another embodiment, data describing the actual segment (e.g., a screen capture image of the specific segment that was being displayed when the viewer signal was received) is received by the method 800, potentially along with additional information (either from an embedded program identifier or from the access provider) regarding the media stream being viewed and/or any available timing information (e.g., this segment was derived from x seconds into the media stream Y). The screen capture image could then be processed (e.g., "hashed") to determine the segment's unique digital signature (e.g., average luminance and color). This information can then be matched against a database of media stream information that had previously been: (a) encoded in each segment identifier; and (b) hashed in each segment to determine the unique signature. The hash from the viewer is then compared to the hashes available from the digital media stream (guided by the approximate timing information). This could occur very rapidly due to the fact that the set of hashes to compare would be relatively small given the time code information. The advantages of this approach are that: (a) nothing needs to be included in the media stream itself; (b) the content creator does not have to encode anything (all he/she need do is provide the media stream for encoding; and (c) the media stream itself does not include any data that could be misappropriated by others (e.g., using the data for unauthorized purposes).

The closed-captioning-related Extended Data Service (XDS, e.g., Electronic Industries Alliance (EIA)-708) data channel that is used to provide closed captioning operates by displaying particular sets of words beginning at particular points in a sequence of media stream segments. The initial segment containing this information (e.g., the first segment to which a particular combination of words is associated) can be utilized as a relatively fixed reference point within the media stream, and this is true regardless of segments that may have been edited out. In one embodiment, this closed captioning information is used in conjunction with an "inertial" location method described in more detail below in order to determine what supplemental content to provide. "'Inertial' location" refers to the fact that once a fixed point in a media stream is identified, a "stopwatch" function can be used to determine the specific segment in which a viewer signifies an interest at a later time. For example, the point in time occurring x seconds after the first segment in which the phrase "Save me, Superhero" appears can be equated to a specific segment identifier (or a relatively few number of segment identifiers) which, in turn, then map to specific items of supplemental content. In one embodiment, instead of "reading" the closed captioned transcript, voice recognition software could be used to recognize the speech. The recognized speech is then matched against a transcript to determine where in the media stream to start the inertial positioning. One significant advantage of this approach is that the media stream that is displayed to a viewer does not require special coding. Rather, aspects of the media stream itself are utilized to determine placement. In one embodiment, this information is matched against a version of the media stream that is encoded, so as to enable easier mapping.

In one embodiment, parameters are set for a relevant device (e.g., a set top box) to "read" the segment identifier(s) occurring at a precise moment in time or under a precise set of conditions or viewer criteria. In one embodiment, this is implemented by sending a "pull" instruction or signal to the relevant device with the instruction to transmit the segment identifier. The pull instruction could be sent out in accordance with a variety of parameters, including any one or more of the following: pulling segment identifiers from a national "statistically significant" sample in order to determine nationwide viewing habits; pulling segment identifiers from a specific demographic subset (e.g., determine what all viewers in towns of fewer than 10,000 people are watching); pulling segment identifiers from a specific subset of viewers over a period of time, in order to track the viewing habits of those viewers (potentially using the viewing habits to create new sub-sets of viewers, so that better sub-categories can be generated for the purposes of data mining); pulling segment identifiers from those viewers that have watched a given source of media streams in the prior Y weeks; pulling segment identifiers from those viewers that clicked-though on a particular item of supplemental content; pulling segment identifiers from those viewers whose profiles indicate that a given source of media streams is actually available to them through their access provider; pulling segment identifiers from those viewers currently watching pay-per-view or video on demand; pulling segment identifiers from those viewers who are currently logged onto the Internet; or pulling segment identifiers every x seconds for all viewers watching a particular media stream in order to determine when the viewers stopped watching the media stream.

In one embodiment, the segment identifiers that are pulled (or "polled") in a given context are stored so that the segment identifiers are accessible in bulk and not in substantially real time. For example, every time a viewer changes media streams that he/she is viewing, it may be helpful to know the media stream segment that appeared just prior to the channel change (i.e., that the viewer had been watching segment X of media stream Y before switching to media stream Z), as this may help to determine the factors that cause the viewer to stop viewing a given media stream.

Figure 27:
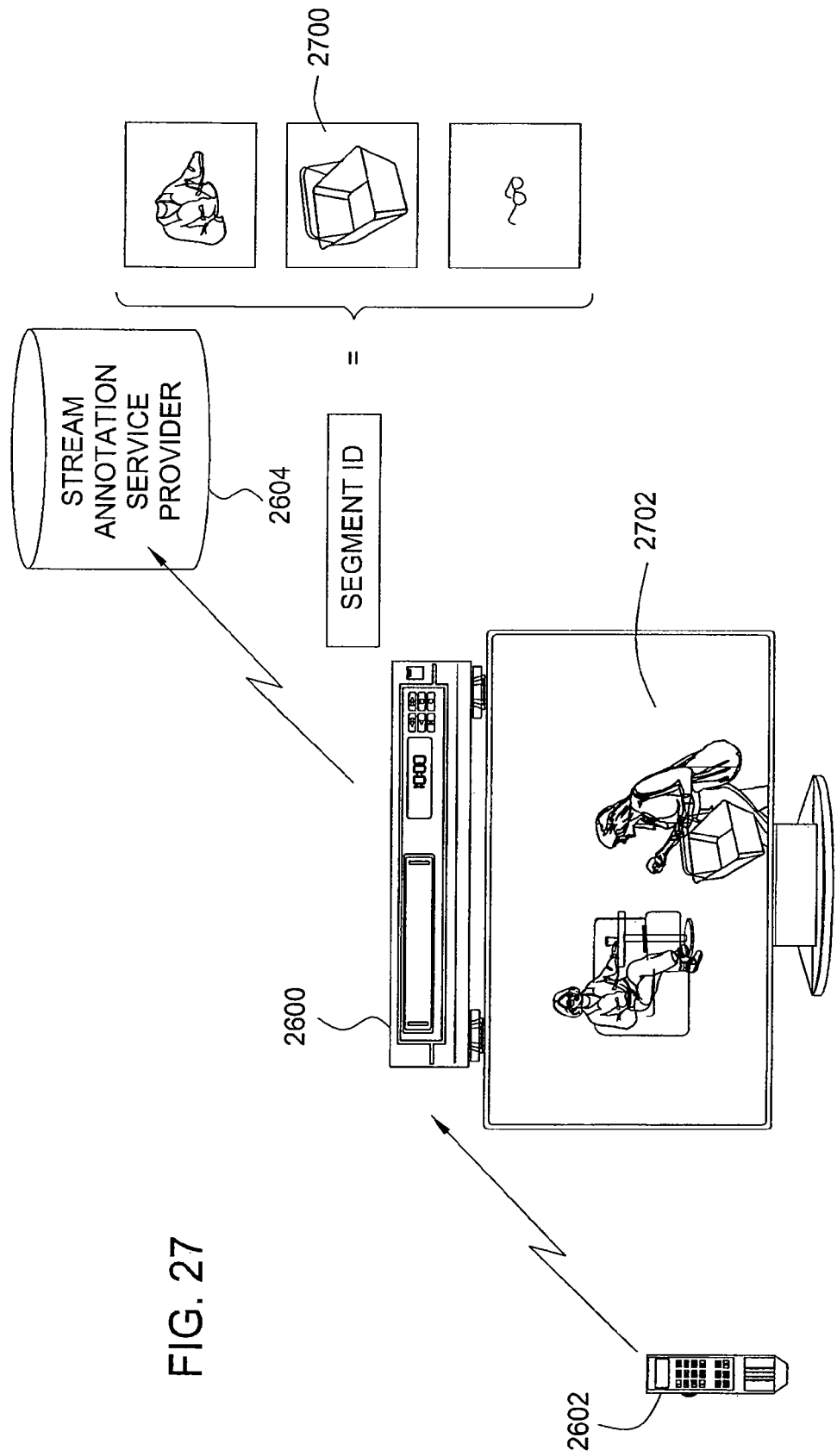
FIG. 27 illustrates the system of FIG. 26 after the supplemental content mapped to the segment identifier has been retrieved and displayed to the viewer via the display device.

The method 800 then proceeds to step 812 and displays, at the appropriate time (e.g., based on whether the user wishes to view the supplemental content immediately or at a later time), the supplemental content that is mapped to the corresponding segment identifier. In one embodiment (e.g., where the segment identifier is mapped to supplemental content relating to multiple items), the information is displayed in the form of a menu of selectable articles. For example, FIG. 27 illustrates the system of FIG. 26 after the supplemental content 2700 mapped to the segment identifier has been retrieved and displayed to the viewer via the display device 2702. As illustrated, the supplemental content 2700 is displayed as a menu including information for a purse, a sweater and a pair of sunglasses.

Thus, for instance, if the first signal was received at a time when one or more segments identified by the segment identifier depicted an actress, the supplemental content mapped to that segment identifier might include the actress's filmography and information about a sweater that the actress was wearing. Thus, the supplemental content displayed in response to the first signal might include an image of the actress and an image of the sweater, where each of the images comprises a hyperlink to World Wide Web page containing additional information. In one embodiment, the display of the media stream is paused while the supplemental content is displayed. In one embodiment, the supplemental content is displayed via the same display device as the media stream. In another embodiment, the supplemental content is displayed via a different display device (e.g., the media stream is being displayed via a television or mobile phone, and the supplemental content is displayed on the viewer's laptop computer or is sent to the viewer's e-mail account).

Figure 28:
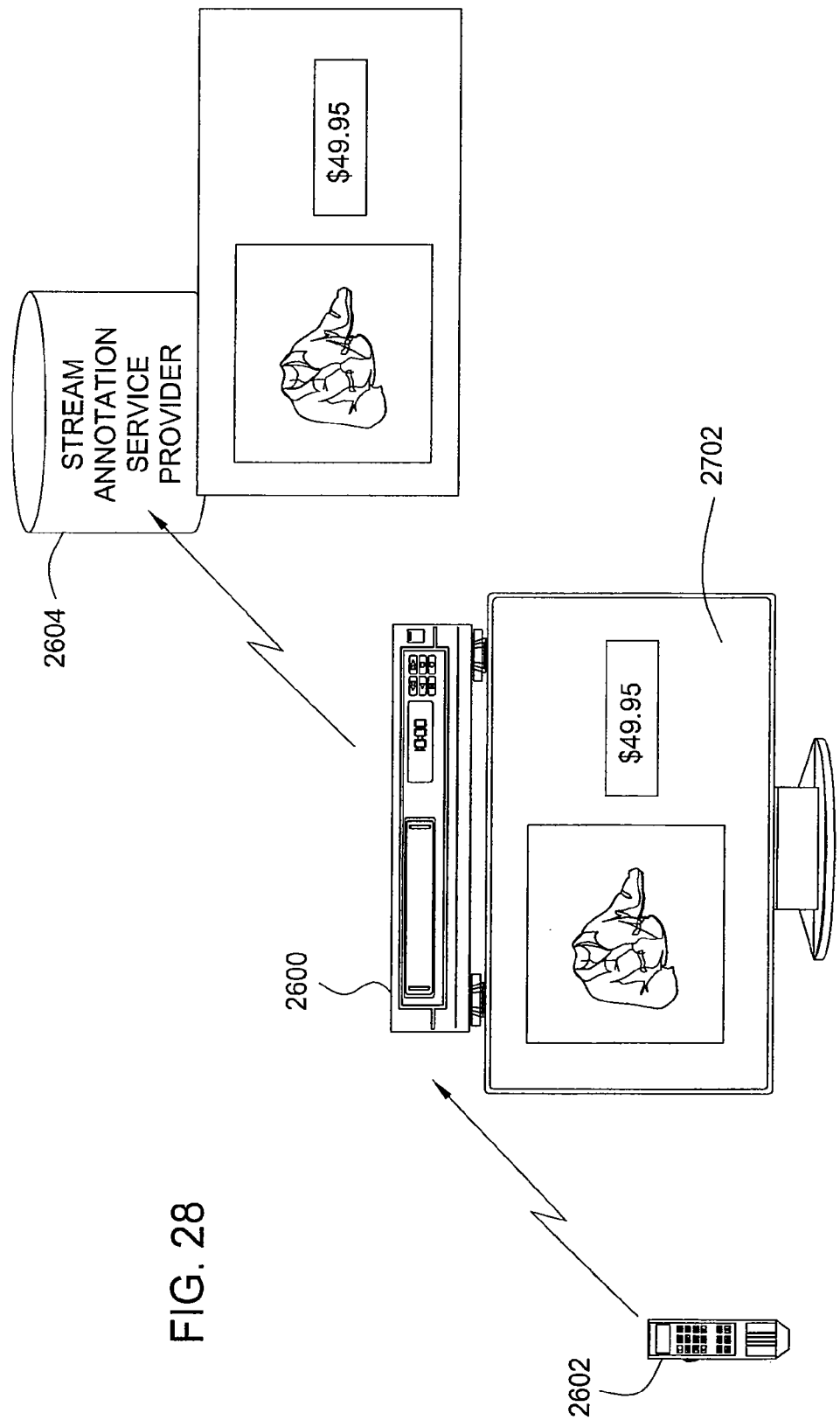
FIG. 28 illustrates the system of FIG. 26 after the viewer has indicated interest in a single article for which supplemental content is mapped.

In another embodiment, where the supplemental content is displayed as a menu or list of articles appearing in the media stream for which supplemental content is available, the mode of display may allow the viewer to "surf" through the mapped supplemental content without having to view the associated media stream. As illustrated in FIG. 28, which illustrates the system of FIG. 26 after the viewer has indicated interest in a single article for which supplemental content is mapped, the viewer may select any one or more of the articles displayed in the menu for further examination. For example, in this case, the viewer has chosen to request more information about the sweater displayed in FIG. 27.

In step 814, the method 800 receives a subsequent signal from the viewer. In one embodiment, the subsequent signal may be received in any of the ways in which the first signal was received. The method 800 then proceeds to step 816 and determines whether the subsequent signal indicates that the viewer wishes to return to the media stream (i.e., exit the currently displayed supplemental content without any further action). If the method 800 concludes in step 816 that the subsequent signal indicates that the viewer wishes to return to the media stream, the method 800 returns to step 806 and resumes displaying the media stream (e.g., unobstructed by the supplemental content). Thus, the method 800 ceases to display the supplemental content until and unless another signal to do so is received.

Alternatively, if the method 800 concludes in step 816 that the subsequent signal does not indicate that the viewer wishes to return to the media stream, the method 800 proceeds to step 818 and determines whether the subsequent signal indicates that the viewer wishes to purchase one or more articles represented by the supplemental content. Thus, the method 800 can provide an immediate purchase opportunity on demand. In one embodiment, the service that hosts the method 800 (e.g., a stream annotation provider, an access provider or an online access provider) receives some revenue each time a viewer sends a signal that indicates interest in one or more items depicted in the displayed supplemental content. In a further embodiment still, the access provider shares a portion of the revenue with the creator of the media stream (e.g., a content creator) or his/her collaborators, as described above.

If the method 800 concludes in step 818 that the subsequent signal does not indicate that the viewer wishes to purchase one or more items depicted in the displayed supplemental content, the method 800 returns to step 812 and continues to display the supplemental content. Alternatively, if the method 800 concludes in step 818 that the subsequent signal does indicate that the viewer wishes to purchase one or more items depicted in the displayed supplemental content, the method 800 proceeds to step 820 and consummates the desired transaction. In one embodiment, the service that hosts the method 800 receives some revenue each time a viewer purchases one or more items as a result of being presented with the supplemental content. In a further embodiment still, the access provider shares a portion of the revenue with the creator of the media stream.

Once the transaction is completed, the method 800 returns to step 814 and awaits a signal from the viewer indicating how to proceed (e.g., return to media stream or consummate another transaction). In further embodiments, additional options or actions may be associated with the subsequent signal. For example, the subsequent signal may trigger a push of additional supplemental content (optionally driven by demographics and/or learned user preferences, such as reviews by other users with similar preferences, consumer reports, etc.). In one embodiment, the additional supplemental content provides an opportunity for the viewer to view his or her purchase history or to edit preferences relating to the method 800.

By mapping supplemental content to the segment identifiers and displaying the supplemental content only when prompted by the viewer, product placement can be achieved in a manner that does not intrude substantially on the viewing experience. That is, the product placements are substantially invisible until the viewer takes some sort of affirmative action. Thus, artistic concerns and viewer expectations can be accommodated while providing ample opportunities for the presentation of commercial information. In addition, the user interface is much more user friendly than interfaces associated with conventional techniques. For example, because supplemental content is mapped to segment identifiers, and because the viewer may access the supplemental content simply by sending a signal at the appropriate time, there is no need to attempt to click on moving objects or react to "fast cut" editing techniques.

In one embodiment, the mapping, as well as the identifiers of any segments in which a viewer has indicated interest, may be cached locally at a user display device. This enables, for example, the use of portable and/or small form factor display devices, which may be read only or may, at times, lack network access. In this embodiment, the mapping is stored in cache until network connectivity is established. This might occur, for example, by "getting back in range" of a network (in which case, any portion of a segment identifier that was not previously transmitted is transmitted), or by accessing another device that is connected to the network (e.g., via hot-sync, where the mapping is transferred from the user device into the sync device, and then sent, for example, to a stream annotation service provider).

In one embodiment, segment identifier information is encrypted by the user device before being sent to the stream annotation service provider (e.g., so that third parties cannot intercept the transmission). Thus, even though the segment identifier may not be able to be encrypted, the actual transmission of the segment identifier can be encrypted. In this embodiment, the stream annotation provider, access provider, or other party providing annotation services is configured to decrypt these transmissions and provide the requested supplemental content.

In further embodiments, "hot-spotting" functionality is enabled whereby the viewer is enabled to select (e.g., by clicking on) a particular image appearing on the display device, so as to access supplemental content about the image (e.g., clicking on a sweater worn by an actress). Current approaches for implementing this type of functionality are computationally burdensome, time intensive, and costly. In such situations, it may be very valuable to be able to efficiently identify the "boundaries" of the image of a given article within a give segment of a media stream.

Data collected in accordance with the present invention, particularly with respect to the classification or description of segments of media streams, will enable the prediction not just of articles in which a viewer may be interested and how to best "present" these articles, but also of subject matter (i.e., types or genres of television, movies and the like) in which the viewer may be interested. This is particularly significant when multiple different platforms are utilized to review media streams and when media streams are available on-demand, because collected data may be utilized to provide (or to highlight to the specific viewer) media stream subject matter that is likely to be of interest. For example, if a given viewer has signaled an interest in an advertisement relating to tickets for a local baseball team's games, baseball information may be brought to the attention of the viewer, for example by highlighting upcoming baseball games in program guides, by recording baseball games as part of a "we thought you might like this" functionality, and the like.

In one embodiment, various "permutations" of a given media stream are "mixed" together either before the media stream begins or as the media stream is shown to a viewer, based on generated or collected data. For example, if the viewer tends to respond to advertising relating to articles that are categorized as "romance-related," then the "romantic" version of the media stream may be displayed to the viewer. As another example, the video component of the media stream may be unchanged, but the audio component including music that is played over particular scenes (or even over the credits) might be selected based on observed viewer preferences (e.g., old school rap, the latest rap hit, hip hop, etc.). Similar data may be used to target product placement within a previously filmed media stream utilizing computer graphics to replace generic article information in the original media stream with specific article information. For example, the collected data might indicate that for a particular viewer, displaying an actor wearing a Brand X watch (rather than, say, a Brand Y watch) will be more likely to induce the viewer to respond to the supplemental content.

Put another way, the functionality described above may result in the creation of multiple, potentially overlapping media stream segments being created under a single media stream heading, such that the optimal media stream (e.g., a specific version of a "base" media stream) for a particular viewer is determined by reference to the viewer's previous responses to supplemental content. In one embodiment, viewer data dictates the optimal set of sub-streams that are mixed together before the media stream is displayed. In one embodiment, the mixing of sub-streams occurs on the fly, potentially triggered by viewer interaction (or lack of interaction) with supplemental content featured earlier in the same media stream.

In one embodiment, a database may include information identifying "sets" of segments that are grouped together as a specific scene. Then, when the viewer sends a signal indicating interest in supplemental content during a particular scene, one of the options that is displayed to the viewer is "buy this scene for later viewing." The price charged could be specific to the viewer. The specific scene being shown would be detected and sent to the viewer's online account, to his/her digital video recorder, etc.

Content creators may not want to enable viewers to interrupt the continuity of their creative vision (i.e., as embodied in their media streams). Similarly, content creators may worry that a viewer jumping from, say, a television show to an e-commerce website might cause a loss of viewership. The mapping associated with a particular media stream may include a code signifying that, with respect to this particular media stream, mapped supplemental content can be accessed only in certain contexts. This could be enforced by sending signals to the viewer display device to "lock up" during display of a media stream (e.g., allow bookmarking of supplemental content only), by sending supplemental content only to the viewer's online account or by not allowing the supplemental content to be provided until after a certain date (e.g., to ensure that the critical "word of mouth" audiences in the early weeks of a release aren't distracted).

In one embodiment, an intermediary device that is able to read segment identifiers embedded in a media stream that flows therethrough is placed between the media access link (i.e., the access provider) and the viewer display device. When the user signals an interest in receiving supplemental content, the segment identifier is sent by the intermediary device back to the access provider. The intermediary device can also send specific information regarding the viewer (which may be obtained from input the viewer provides upon installing the intermediary device). The access provider then identifies and feeds the relevant information back to the intermediary device and/or to the viewer's online portal.

In one embodiment, the intermediary device sends a signal (via Wi-Fi, bluetooth, etc.) containing the segment identifier. The signal is received by a remote control device (e.g., a TV remote, an enabled cellular phone or other device). The remote control device then sends the signal (via Wi-Fi, wireless, etc.) directly to the access provider, triggering the processes described above.

In one embodiment, the intermediary device is operated using any one or more of multiple remote control devices, and the intermediary device also sends to a viewer ID code that matches the remote control device to the access provider, so that specific viewer signaling interest is identified (e.g., a mother, father, and child may each have their own remote control device).

In one embodiment, a single remote control device is used for a number of viewers, but the remote control device is set (e.g., via a touch screen menu, a button, etc.) to identify the specific viewer using the remote control device at that moment.

In one embodiment, each household or other location has a single intermediary device deployed at the location to which a media stream is delivered (a "master" intermediary device), and subsidiary receivers are placed with each display device in the household or other location to receive the viewer's signals and to transmit the signals back to the master intermediary device for transmission back to the access provider (either through the same delivery system, such as Internet Protocol Television (IPTV) or through another delivery system such as via cellular phone signal).

In one embodiment, the access provider would not rely solely on "which" remote control device associated with a given intermediary device provided the a signal, because viewers may choose to use another viewer's remote control device for various reasons. Thus, although remote control device identification would be the most dominant factor for determining viewer identity, this information could be combined with a statistical model and/or with viewer ability to override the default identity.

In one embodiment, at a viewer's request, all credit card approvals and similarly "sensitive" inputs are preceded by a password input to prevent the consummation of unauthorized transactions.

In one embodiment, speech recognition technology (e.g., using voice recognition/speaker identification to obtain a voice "fingerprint") is used in combination with the viewer's voice to activate the intermediary device. Thus, the remote control device would initially be programmed to differentiate among the various viewers who use the remote control device.

In one embodiment, the access provider may perform analysis in order to determine which viewers appear to be viewing media streams together (e.g., multiple members of a household watching television together) so that supplemental content (which will be customized) is targeted for the "mix" of likely viewers.

In one embodiment, instead of the individual viewer, the probable group of viewers is determined, which has its own targeted information. For example, if a group of viewers is predicted to be a hip-hop music loving son and a classical music loving father, then the supplemental content associated with a media stream being viewed by the group of users might be targeted to a more neutral demographic (rather than to either a hip hop demographic or a classical demographic).

In one embodiment, voice recognition technology may be used to improve one-click capabilities. Given a limited set of viewer voices associated with a given remote control device, one voice can be very reliably differentiated from other voices. This could be used to facilitate purchases—instead of having to type in a password or provide some other verification, each viewer's profile could be set to authorize only certain transactions, such as access to viewing certain types of media streams.

In one embodiment, the fact that an authorizing party authorized viewing of a particular media stream by other parties (e.g., a parent authorizing a media stream for viewing by his/her children) is recorded in some form and provided as verification to a third party that the authorizing party was viewing the program with the other parties. Such determination may be sold as a service to schools, for example. The media stream could prompt the authorizing party, at different times, for a vocal response in order to prevent the authorizing party from simply initiating the media stream and then leaving.

Some viewers have a strong aversion to advertising (or to certain advertisers), but might appreciate many of the other features that the present invention can enable. To this end, a viewer may be enabled to block particular types of supplemental content that he/she does not want to see (e.g., an animal rights activist may wish to block advertisements from fast food chains).

In one embodiment, prior to sending a mapped item of supplemental content back to a viewer in response to a signal, the present invention sends the supplemental content through a filter (perhaps created by the viewer or by the access provider) and removes any undesired information. For example, the filter may remove advertisements for particular articles, advertisements featuring particular types of music or supplemental content of certain genres (e.g., violent or adult-themed content). In one embodiment, this functionality could be used as a method of parental control.

In one embodiment involving video on demand services, one could use a database of filtered content to actually remove offending segments "on the fly" from media streams (e.g., using or segment-specific information and/or input from the content creator). This would enable different versions of the media stream (e.g., PG, PG-13, etc.) to be displayed to different viewers.

Figure 9:
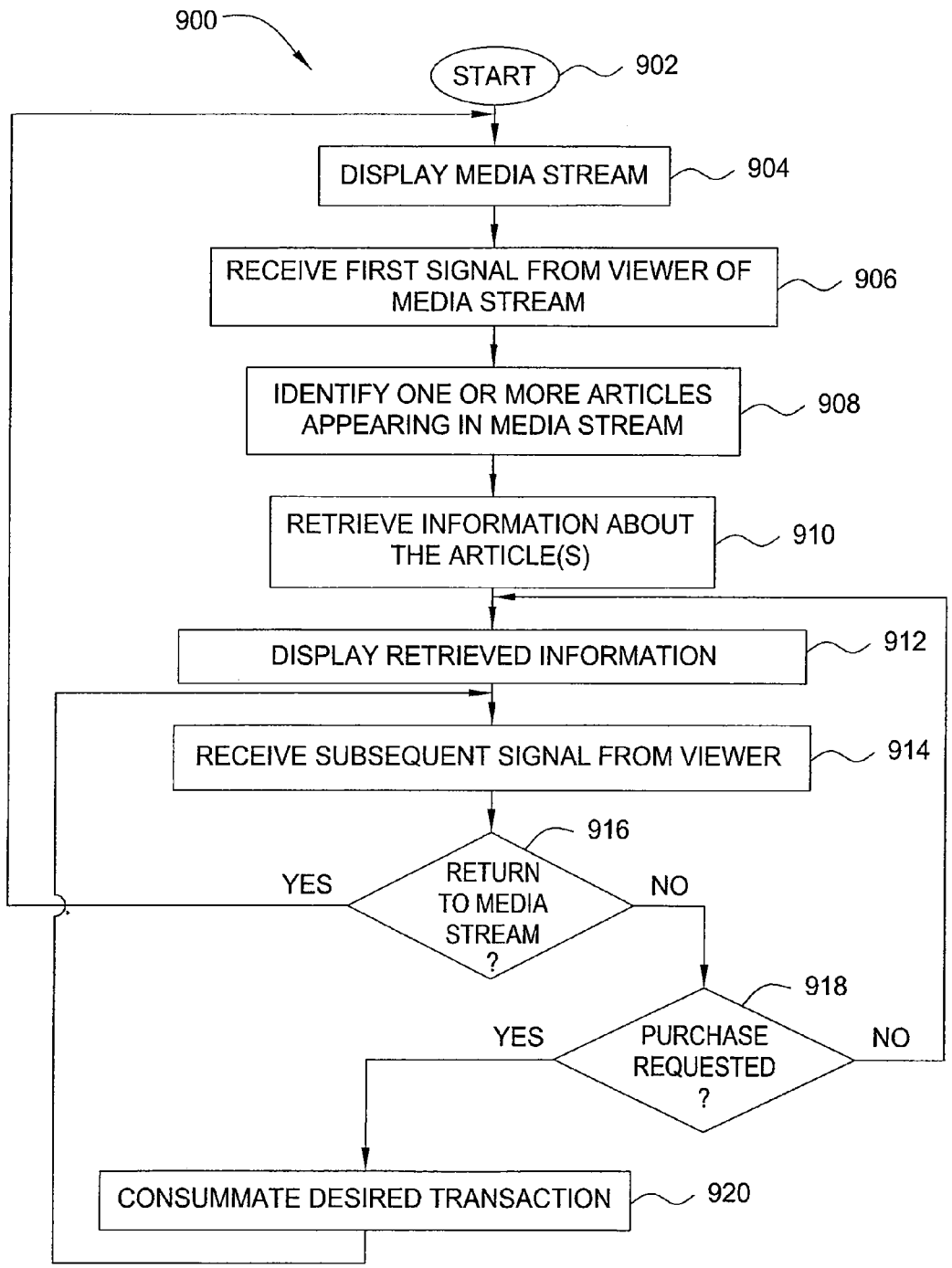
FIG. 9 is a flow diagram illustrating a second embodiment of a method for providing annotated media streams to viewers, according to the present invention.

FIG. 9 is a flow diagram illustrating a second embodiment of a method 900 for providing annotated media streams to viewers, according to the present invention. The method 900 may be implemented, for example, by a user device associated with the display of media streams. In particular, the method 900, unlike the method 800, allows for "on the fly" annotation (e.g., without the assistance of a pre-determined mapping).

The method 900 is initialized at step 902 and proceeds to step 904, where the method 900 displays the media stream via a display device. The method 900 then proceeds to step 906 and receives a first signal from a viewer of the media stream. The first signal indicates that the viewer wishes to view supplemental content relating to at least one article appearing in the media stream. In one embodiment, the first signal is conveyed via the push of a button or via a spoken command. In one embodiment, the method 900, like the method 800, supports multimodal viewer interaction. In one embodiment, the first signal indicates that the viewer wishes to view the supplemental content immediately. In another embodiment, the first signal indicates that the viewer wishes to view the supplemental content at a later time.

In step 908, the method 900 identifies, in substantially real time, one or more articles appearing in the media stream at or around the point in time at which the first signal was received (i.e., what portion of the media stream was being displayed when the viewer sent the first signal). In one embodiment, the method 900 identifies these articles by applying one or more optical character recognition (OCR) techniques to the images associated with the indicated portion of the media stream (e.g., video OCR, text recognition, object recognition, logo recognition, etc.). In this manner, text, logos, objects and individuals appearing in the media stream (and in which the viewer may be interested) can be identified.

The method 900 then proceeds to step 910 and retrieves supplemental content relating to one or more of the identified articles. In one embodiment, this supplemental content may be retrieved from a remote server or database such as a shopping or information portal (e.g., an Internet search engine or e-commerce World Wide Web site), for example via a connection through the Internet or a cable network. For example, the method 900 might perform a search on recognized text using an Internet search engine. In another embodiment, the remote server or database stores or has access to a mapping that maps supplemental content to segment identifiers identifying segments of the media stream (as described above). In this case, the remote server matches one or more segments identifiers identifying segments that correspond to viewer signals to the appropriate supplemental content.

In step 912, the method 900 displays, at the appropriate time (e.g., based on whether the user wishes to view the supplemental content immediately or at a later time), at least a portion of the retrieved supplemental content. Thus, for instance, if the first signal was received at a time when one or more segments of the media signal depicting credits (e.g., for a movie) were displayed, the method 900 might request supplemental content based on recognition of names appearing in the credits, and accordingly convert one or more of the credits into hyperlinks linked to additional information (e.g., a movie database entry) about the named individual(s).

Figure 10:
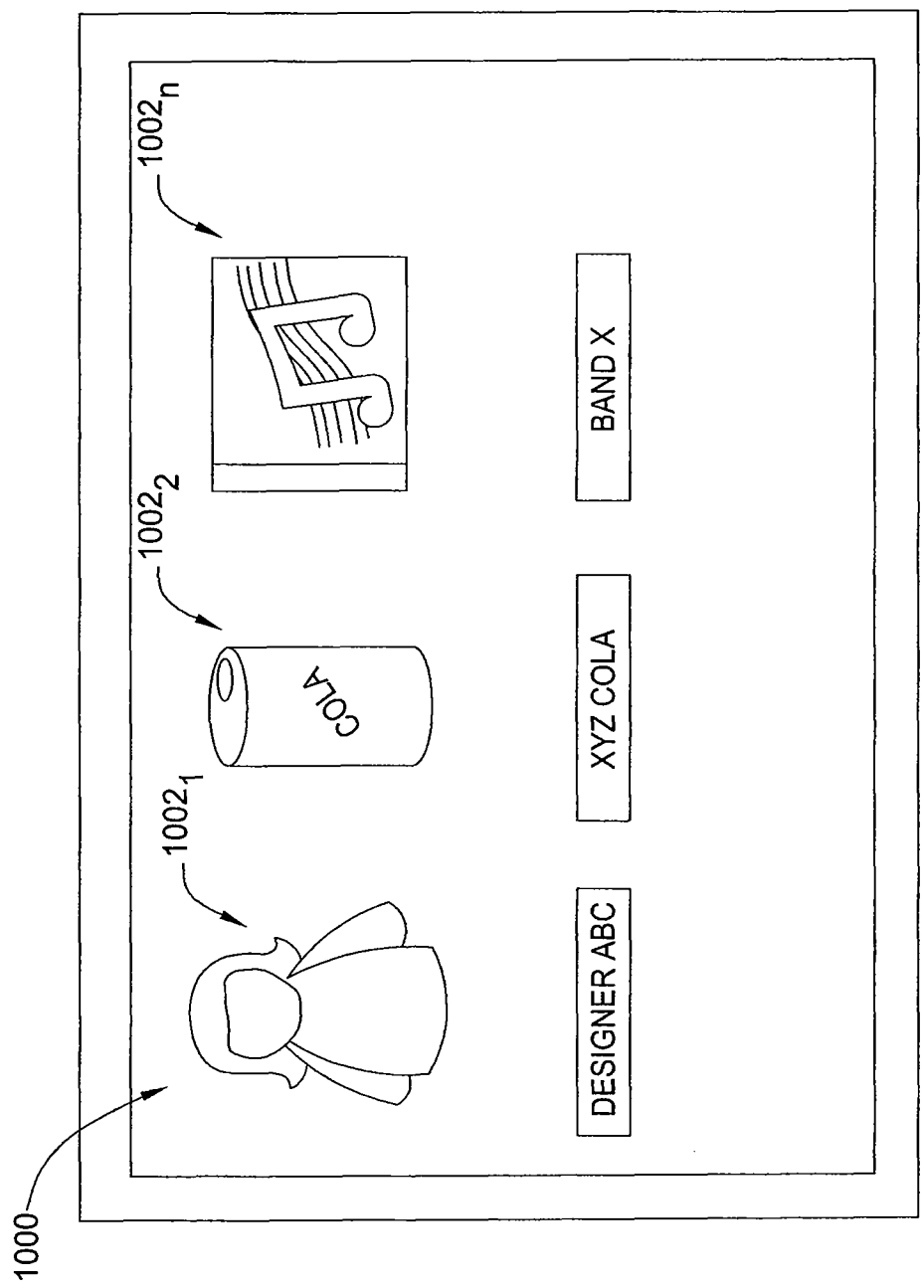
FIG. 10 is a schematic diagram illustrating an exemplary display for presenting retrieved information about articles appearing in a portion of a media stream.

For example, FIG. 10 is a schematic diagram illustrating an exemplary display 1000 for presenting retrieved supplemental content about articles appearing in a portion of a media stream. The display 1000 may be conveyed via a display device as described above. The display 1000 is arranged in a menu format and includes one or more images $1002_1$-$1002_n$ (hereinafter collectively referred to as "images 1002") depicting articles appearing in an associated portion of a media stream (e.g., clothing, beverages, compact discs). In one embodiment, the images 1002 include hyperlinks such that a viewer may retrieve supplemental content about the depicted article (e.g., content, price, purchasing opportunities) by selecting the article's associated image 1002. The selection of an image 1002 may be made by sending a signal to a device that retrieves the supplemental content.

In one embodiment, the display 1000 is prioritized according to some criteria (e.g., popularity with similar viewers, fees paid by sellers, etc.). For example, an image 1002 depicting an article that is statistically determined to be the article in which the viewer is most likely to be interested (e.g., "78% of viewers who sent a signal during frames X-Z clicked though to Y brand sneakers") may be displayed most prominently. Alternatively, article images may be displayed according to how much the sellers are willing to pay to advertise the articles (e.g., the more the seller pays for the advertising, the more prominently the article image is displayed). In one embodiment, the n highest priority articles are displayed as images, while the remainder of the articles depicted in the menu are displayed as text hyperlinks or grouped into one or more sub-categories.

In one embodiment, articles depicted in a menu display are prioritized by providing each article with a score, such that the scores of multiple articles may be compared to determine the relative priorities of the articles. In one embodiment, the score is a weighted combination of factors including at least one of: the article's level of popularity with viewers, the likelihood that a given viewer is interested in the article and the fees paid by the article's seller for each click-through. In one embodiment, the score, S, of an article for the purposes of determining priority in a menu of articles is calculated according to:

$$S=Cw_1+Vw_2+Pw_3$$

where C is the cost per click-through paid by a seller when the article is selected from a menu by a viewer, V is a statistical measure of a given viewer's likely interest in the article (based, for example, on the viewer's other observed interests) and P is a measure of the article's popularity with viewers in general. w1, w2 and w3 are weighing factors that may be selected, for example, by a provider of annotated media streams and associated services (e.g., a stream annotation service provider or an access provider).

Referring back to FIG. 9, in step 914, the method 900 receives a subsequent signal from the viewer. In one embodiment, the subsequent signal may be received in any of the ways in which the first signal was received. The method 900 then proceeds to step 916 and determines whether the subsequent signal indicates that the viewer wishes to return to the media stream (i.e., exit the currently displayed supplemental content without any further action). If the method 900 concludes in step 916 that the subsequent signal indicates that the viewer wishes to return to the media stream, the method 900 returns to step 904 and resumes displaying the media stream (e.g., unobstructed by the supplemental content). Thus, the method 900 ceases to display the retrieved information supplemental content until and unless another signal to do so is received.

Alternatively, if the method 900 concludes in step 916 that the subsequent signal does not indicate that the viewer wishes to return to the media stream, the method 900 proceeds to step 918 and determines whether the subsequent signal indicates that the viewer wishes to purchase one or more articles depicted in the supplemental content. Thus, the method 900 can provide an immediate purchase opportunity on demand.

If the method 900 concludes in step 918 that the subsequent signal does not indicate that the viewer wishes to purchase one or more articles depicted in the supplemental content, the method 900 returns to step 912 and continues to display the supplemental content. Alternatively, if the method 900 concludes in step 918 that the subsequent signal does indicate that the viewer wishes to purchase one or more articles depicted in the supplemental content, the method 900 proceeds to step 920 and consummates the desired transaction (e.g., via an Internet e-commerce site). Once the transaction is completed, the method 900 returns to step 914 and awaits a signal from the viewer indicating how to proceed (e.g., return to media stream or consummate another transaction).

In further embodiments, additional options or actions may be associated with the subsequent signal. For example, the subsequent signal may trigger a push of additional supplemental content (optionally driven by demographics and/or learned user preferences, such as reviews by other users with similar preferences, consumer reports, etc.). In one embodiment, the additional supplemental content provides an opportunity for the viewer to view his or her purchase history or to edit preferences relating to the method 900.

Figure 11:
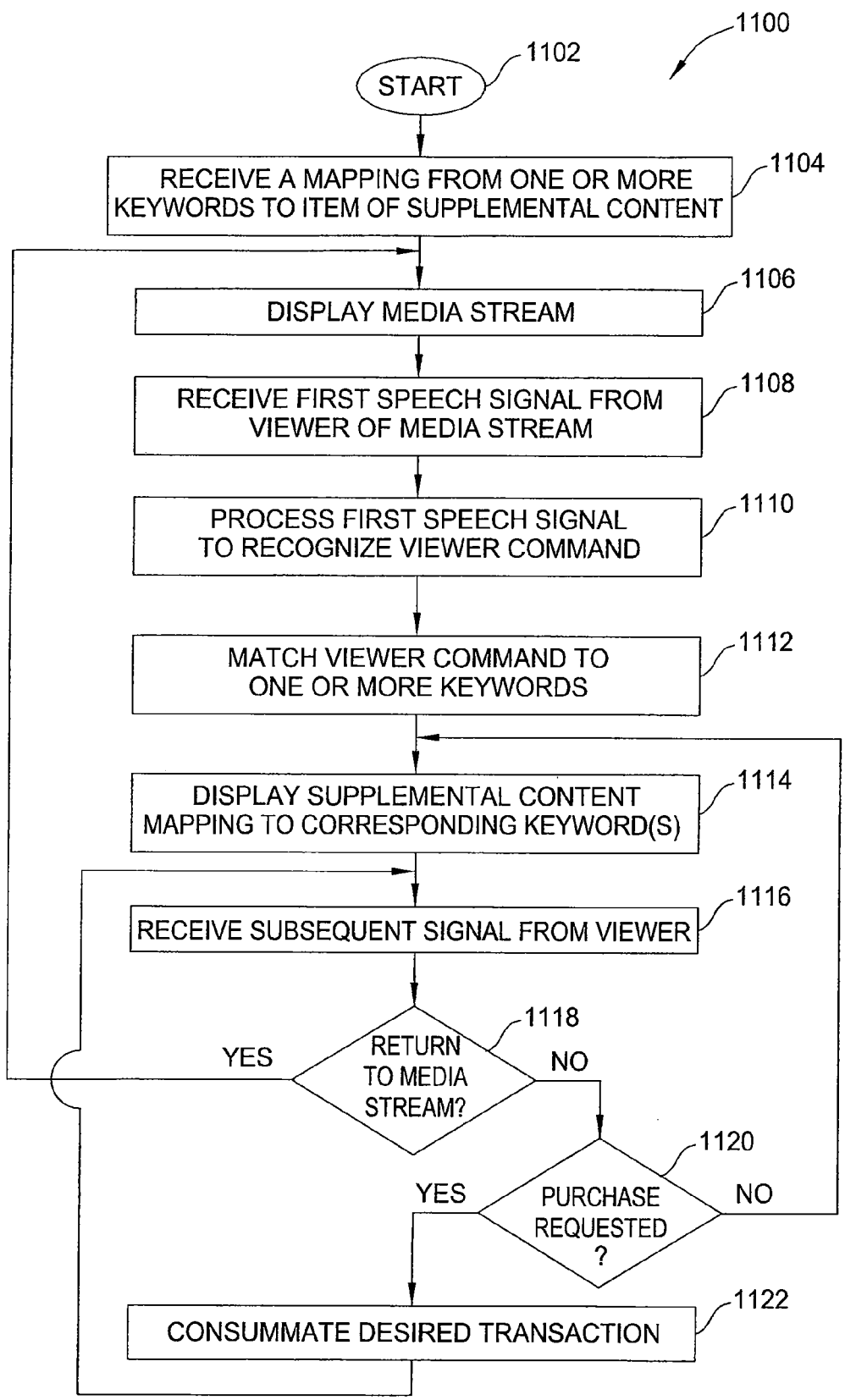
FIG. 11 is a flow diagram illustrating a third embodiment of a method for providing annotated media streams to viewers, according to the present invention.

FIG. 11 is a flow diagram illustrating a third embodiment of a method 1100 for providing annotated media streams to viewers, according to the present invention. Specifically, the method 100, unlike the methods 800 and 900 described above, is configured to support processing of spoken viewer signals. Like the methods 800 and 900, the method 1100 may be implemented by a user device (e.g., a television, a DVD player, a DVR, a set-top box, a portable media player, a personal digital assistant, a personal computer, a mobile phone, an in-flight or in-vehicle entertainment system, a video game console or the like) that has access to annotated media streams.

The method 1100 is initialized at step 1102 and proceeds to step 1104, where the method 1100 receives a mapping of one or more keywords to one or more items of supplemental content. In one embodiment, the supplemental content is associated with commercial information relating to one or more articles appearing in the media stream, as described above. In one embodiment, the mapping is received from a remote server, for example, via the Internet, via a cable network (e.g., where the remote server may be the cable head-end, or the head-end may mediate communications with the remote server) or via satellite. Particular embodiments may receive the mapping as an OpenCable application platform (OCAP) or digital video broadcasting (DVB) application, or as a private section within a Motion Picture Experts Group (MPEG) transport stream. In a further embodiment, the mapping is received "on the fly" from a "director" who views the media stream in substantially real time and maps supplemental content from a pre-set list to the keywords. In one embodiment, the mapping further includes the URL of one or more World Wide Web sites relating to one or more articles appearing in the media stream (e.g., to reduce subsequent lookup times).

In step 1106, the method 1100 displays the media stream via a display device. In one embodiment, displaying the media stream includes presenting an indicator when the segment identifier identifying the currently displayed portion of the media stream (e.g., the currently displayed segment) is associated with at least one item of supplemental content. Thus, a viewer of the media stream would automatically know when additional information about one or more articles being displayed is available (e.g., as opposed to having to guess or query). In one embodiment, the indicator is presented when the currently displayed portion of the media stream is associated with one or more items of supplemental content relating to information that is expected to be of interest to the viewer (e.g., based on demographic information, stated viewer preferences or previous viewer activity). In one embodiment, the indicator is a visual indicator, such as an icon displayed in the media stream or a (perhaps flashing) light on the media stream player (e.g., a set-top box, DVR or the like), on the display device or on a remote control. In further embodiments, the indicator may be an audible indicator or other sensory indicator (e.g., a vibrating remote control). In a further embodiment still, a "split screen" display may be employed that displays the media stream in a first portion of the display and data relating to currently accessible supplemental content in a second portion of the display.

The method 1100 then proceeds to step 1108 and receives a first speech signal from a viewer of the media stream. The first speech signal indicates that the viewer wishes to view supplemental content relating to one or more articles appearing in the media stream. In one embodiment, the first speech signal indicates that the viewer wishes to view the supplemental content immediately (e.g., "show car now"). In another embodiment, the first signal indicates that the viewer wishes to view the supplemental content at a later time, such as at the conclusion of the media stream (e.g., "save car for later"). In further embodiments, the first speech signal indicates that the user wishes to save the present position in the media stream to view the supplemental content at a later time, without specifically identifying the item of interest (e.g., "mark for later").

In step 1110, the method 1100 processes the first speech signal to recognize a viewer command embodied therein. In one embodiment, the first speech signal is processed in accordance with one or more automatic speech recognition and/or natural language understanding techniques. For example, in one embodiment, the first speech signal is processed in accordance with an automatic speech recognition technique that operates in conjunction with a defined vocabulary. In refinements of this embodiment, the defined vocabulary comprises the keywords contained in the mapping received at step 1104. In particular embodiments, the defined vocabulary is dynamically modifiable as the media stream is displayed, such that the vocabulary comprises the subset of the keywords that are presently "valid". In another embodiment, the first speech signal is processed in accordance with an automatic speech recognition technique that cancels ambient noise, such as that associated with the media stream itself (e.g., such as the method described in U.S. patent application Ser. No. 11/541,282, filed Sep. 28, 2006, which is herein incorporated by reference in its entirety). In another embodiment, the first speech signal is processed in accordance with a "lightweight" natural language processing technique such as topic spotting.

In one embodiment, the method 1100 supports multimodal viewer interaction, meaning that one or more additional input modalities (in addition to speech) may be employed for receiving viewer signals. Multimodal interaction may be helpful, for example, in correcting errors in processing speech signals. For example, errors in processing speech signals may be corrected in accordance with the methods described in U.S. Pat. No. 6,742,021, which is herein incorporated by reference in its entirety.

In step 1112, the method 1100 matches the viewer command to one or more keywords used in the mapping. In this way, the method 1100 can identify which item(s) of supplemental content corresponds to the keyword(s) uttered by the viewer. In one embodiment, if the viewer command cannot be matched to a known keyword, the method 1100 uses the viewer command to query a database such as a shopping or information portal (e.g., an Internet search engine or e-commerce Word Wide Web site). In this way, the viewer command can still be potentially matched to relevant supplemental content. In a further embodiment, the viewer command is parsed by a natural language understanding technique that chooses an appropriate portal to query. In certain embodiments, the step of searching a database is performed in accordance with the methods described in U.S. patent application Ser. No. 10/912,517, filed Aug. 5, 2004; and Ser. No. 11/063,357, filed Feb. 23, 2005, both of which are herein incorporated by reference in their entireties.

The method 1100 then proceeds to step 1114 and displays, at the appropriate time (e.g., based on whether the user wishes to view the supplemental content immediately or at a later time), the supplemental content that is mapped to the corresponding keyword. For example, if the uttered keyword is "car" or "automobile", the displayed information (as embodied in the supplemental content) might include the maker and/or dealers associated with a car appearing in the media stream. In one embodiment, the display of the media stream is paused while the supplemental content is displayed. In one embodiment, the supplemental content is displayed via the same display device as the media stream. In another embodiment, the information is displayed via a different display device (e.g., the media stream is being displayed via a television or mobile phone, and the supplemental content is displayed on the viewer's laptop computer or is sent to the viewer's e-mail account).

In a further embodiment (e.g., where the keyword is ambiguous or potentially corresponds to any one of multiple articles), the information is displayed in step 1114 in the form of a menu of two or more selectable articles. Thus, for instance, if the keyword "car" is uttered at a time when four different cars appear in the media stream, the supplemental content mapped to the keyword might include images of all four cars, each image being further associated with a respective, unambiguous keyword (e.g., "car A", "car B", "car C" and "car D"). The metadata mapped to each unambiguous keyword could include links to World Wide Web sites for the respective cars' manufacturers and/or dealers. In this manner, the method 1100 supports disambiguation.

In another embodiment, the information is displayed as a menu or list of articles appearing in the media stream for which information is available (and may be associated, for example, with a keyword such as "menu"). This would allow a viewer to "surf" through the mapped supplemental content without having to view the associated media stream.

In step 1116, the method 1100 receives a subsequent signal from the viewer. In one embodiment, the subsequent signal may be received in the form of a speech signal. In another embodiment, the subsequent signal may be received in a different manner, such as via a keystroke or the push of a button on a remote control. The method 1100 then proceeds to step 1118 and determines whether the subsequent signal indicates that the viewer wishes to return to the media stream (i.e., exit the currently displayed supplemental content without any further action). If the method 1100 concludes in step 1118 that the subsequent signal indicates that the viewer wishes to return to the media stream, the method 1100 returns to step 1106 and resumes displaying the media stream (e.g., unobstructed by the supplemental content). Thus, the method 1100 ceases to display the supplemental content until and unless another signal to do so is received.

Alternatively, if the method 1100 concludes in step 1118 that the subsequent signal does not indicate that the viewer wishes to return to the media stream, the method 1100 proceeds to step 1120 and determines whether the subsequent signal indicates that the viewer wishes to purchase one or more articles depicted in the displayed supplemental content. Thus, the method 1100 can provide an immediate purchase opportunity on demand.

If the method 1100 concludes in step 1120 that the subsequent signal does not indicate that the viewer wishes to purchase one or more articles depicted in the displayed supplemental content, the method 1100 returns to step 1114 and continues to display the supplemental content. Alternatively, if the method 1100 concludes in step 1120 that the subsequent signal does indicate that the viewer wishes to purchase one or more articles depicted in the displayed supplemental content, the method 1100 proceeds to step 1122 and consummates the desired transaction. Once the transaction is completed, the method 1100 returns to step 1116 and awaits a signal from the viewer indicating how to proceed (e.g., return to media stream or consummate another transaction). In further embodiments, additional options or actions may be associated with the subsequent signal. For example, the subsequent signal may trigger a push of additional supplemental content (optionally driven by demographics and/or learned user preferences, such as reviews by other users with similar preferences, consumer reports, etc.). In one embodiment, the additional supplemental content provides an opportunity for the viewer to view his or her purchase history or to edit preferences relating to the method 1100.

Figure 12:
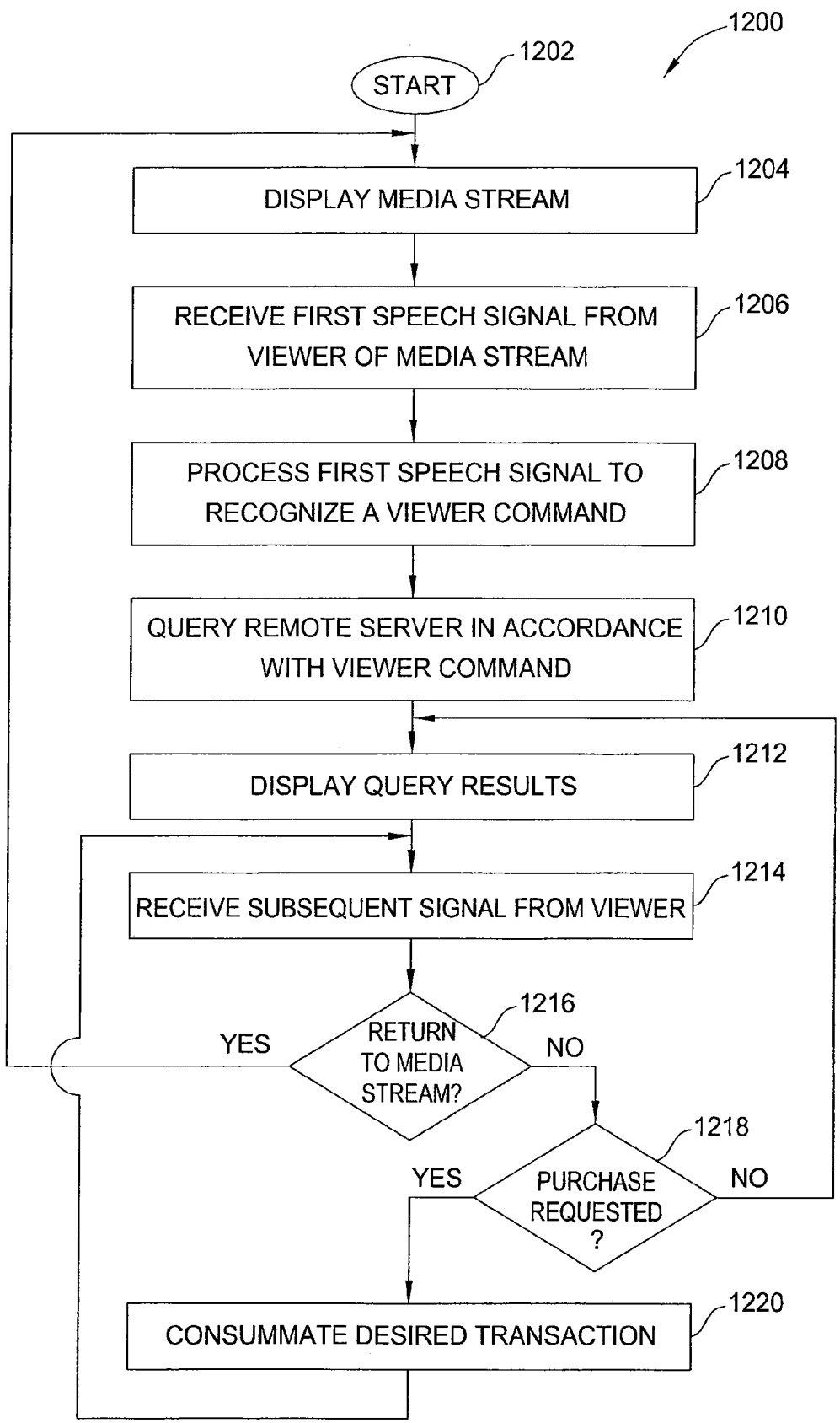
FIG. 12 is a flow diagram illustrating a fourth embodiment of a method for providing annotated media streams to viewers, according to the present invention.

FIG. 12 is a flow diagram illustrating a fourth embodiment of a method 1200 for providing annotated media streams to viewers, according to the present invention. The method 1200 may be implemented, for example, by a user device associated with the display of media streams. In particular, the method 1200, unlike the method 1100, allows for speech-supported "on the fly" annotation (e.g., without the assistance of a pre-determined mapping).

The method 1200 is initialized at step 1202 and proceeds to step 1204, where the method 1200 displays the media stream via a display device. The method 1200 then proceeds to step 1206 and receives a first speech signal from a viewer of the media stream. The first speech signal indicates that the viewer wishes to view supplemental content about at least one article appearing in the media stream. In one embodiment, the first speech signal indicates that the viewer wishes to view the supplemental content immediately. In another embodiment, the first speech signal indicates that the viewer wishes to view the supplemental content at a later time.

In step 1208, the method 1200 processes, in substantially real time, the first speech signal in order to recognize a viewer command embodied therein. In one embodiment, the first speech signal is processed in accordance with one or more automatic speech recognition and/or natural language understanding techniques. For example, in one embodiment, the first speech signal is processed in accordance with an automatic speech recognition technique that operates in conjunction with a defined vocabulary. In another embodiment, the first speech signal is processed in accordance with an automatic speech recognition technique that cancels ambient noise, such as that associated with the media stream itself (e.g., such as the method described in U.S. patent application Ser. No. 11/541,282, filed Sep. 28, 2006, which is herein incorporated by reference in its entirety). In another embodiment, the first speech signal is processed in accordance with a "light-weight" natural language processing technique such as topic spotting.

In one embodiment, the method 1200, like the method 1100, supports multimodal viewer interaction, meaning that one or more additional input modalities (in addition to speech) may be employed for receiving viewer signals. Multimodal interaction may be helpful, for example, in correcting errors in processing speech signals. For example, errors in processing speech signals may be corrected in accordance with the methods described in U.S. Pat. No. 6,742,021, which is herein incorporated by reference in its entirety.

The method 1200 then proceeds to step 1210 and queries a remote server in accordance with the recognized viewer command, for example via a connection through the Internet or a cable network. For example, the method 1200 might perform a search on recognized words in the viewer command using a database such as a shopping or information portal (e.g., an Internet search engine or e-commerce World Wide Web site). In one embodiment, querying in accordance with step 1210 includes selecting an appropriate query portal (e.g., search engine or e-commerce World Wide Web site) based on the recognized words. In another embodiment, the remote database stores or has access to a mapping that maps supplemental content to keywords (as described above). In this case, the remote server matches one or more words in the recognized viewer command to supplemental content. In certain embodiments, the step of searching is performed in accordance with the methods described in U.S. patent application Ser. No. 10/912,517, filed Aug. 5, 2004; and Ser. No. 11/063,357, filed Feb. 23, 2005, both of which are herein incorporated by reference in their entireties.

In step 1212, the method 1200 displays, at the appropriate time (e.g., based on whether the user wishes to view the supplemental content immediately or at a later time), at least a portion of the query results. Thus, for instance, if the first speech signal was received at a time when one or more segments of the media signal depicting credits (e.g., for a movie) were displayed, and an actor's name was recognized in the speech recognition processing step (i.e., step 1208), the method 1200 might display supplemental content (e.g., a movie database entry) about the actor.

In step 1214, the method 1200 receives a subsequent signal from the viewer. In one embodiment, the subsequent signal is a speech signal. In another embodiment, the subsequent signal is a non-speech signal, such as a keystroke or button press. The method 1200 then proceeds to step 1216 and determines whether the subsequent signal indicates that the viewer wishes to return to the media stream (i.e., exit the currently displayed supplemental content without any further action). If the method 1200 concludes in step 1216 that the subsequent signal indicates that the viewer wishes to return to the media stream, the method 1200 returns to step 1204 and resumes displaying the media stream (e.g., unobstructed by the supplemental content). Thus, the method 1200 ceases to display the retrieved supplemental content until and unless another signal to do so is received.

Alternatively, if the method 1200 concludes in step 1216 that the subsequent signal does not indicate that the viewer wishes to return to the media stream, the method 1200 proceeds to step 1218 and determines whether the subsequent signal indicates that the viewer wishes to purchase one or more articles depicted in the displayed supplemental content. Thus, the method 1200 can provide an immediate purchase opportunity on demand.

If the method 1200 concludes in step 1218 that the subsequent signal does not indicate that the viewer wishes to purchase one or more articles depicted in the displayed supplemental content, the method 1200 returns to step 1212 and continues to display the query results. Alternatively, if the method 1200 concludes in step 1218 that the subsequent signal does indicate that the viewer wishes to purchase one or more articles depicted in the displayed supplemental content, the method 1200 proceeds to step 1220 and consummates the desired transaction (e.g., via a retrieved Internet e-commerce site). Once the transaction is completed, the method 1200 returns to step 1214 and awaits a signal from the viewer indicating how to proceed (e.g., return to media stream or consummate another transaction). In further embodiments, additional options or actions may be associated with the subsequent signal. For example, the subsequent signal may trigger a push of additional supplemental content (optionally driven by demographics and/or learned user preferences, such as reviews by other users with similar preferences, consumer reports, etc.). In one embodiment, the additional information provides an opportunity for the viewer to view his or her purchase history or to edit preferences relating to the method 1200.

Those skilled in the art will appreciate that the methods of the present invention are not limited to the field of advertising. For instance, media stream segment identifiers may be pulled, in accordance with the present invention, to track certain parameters occurring at a precise moment in time or under precise conditions or viewer criteria. For example, the methods of the present invention may be adapted to identify a "statistically significant" sample (e.g., national or demographic- or subset-specific) to determine the viewing habits of a given population. Alternatively, the methods of the present invention may be adapted to determine when viewers "switch away" from a television show (e.g., by pulling segment identifiers every x seconds). In one embodiment, the segment identifiers occurring over a given period of time are stored in a user device (e.g., a set top box). In another embodiment, the user device is programmed to poll segment identifiers at given times or at a given rate. The user device may then transmit these segment identifiers to a third party (e.g., a stream annotation service provider or access provider) for further analysis.

In further embodiments, part of the supplemental content that is mapped to a segment identifier (and stored, for example, by a stream annotation service provider or access provider) comprises software that triggers a mini application or instruction set. For example, a trigger sent in response to a segment identifier might instruct a viewer set top box to activate a voting mini application in which the viewer is asked to vote for a favorite contestant on a game show. This software could be activated automatically (e.g., as frame x is displayed) or upon viewer signal (e.g., when the viewer sends a signal during frames x-z).

As discussed above, embodiments of the present invention may be extended to log viewer activity (e.g., for data mining purposes). For example, viewer requests for information about articles depicted in the media streams may be tracked, as may any viewer purchases made as a result of presenting the requested supplemental content. This data can assist in customizing the supplemental content that is made available in connection with given media streams. For example, the supplemental content made available could be customized according to a viewer's age, location, prior purchasing habits, viewing habits and the like. Moreover, the data can assist in determining a fee structure for when, where and how to place supplemental content relating to a given product or service.

Figure 15:
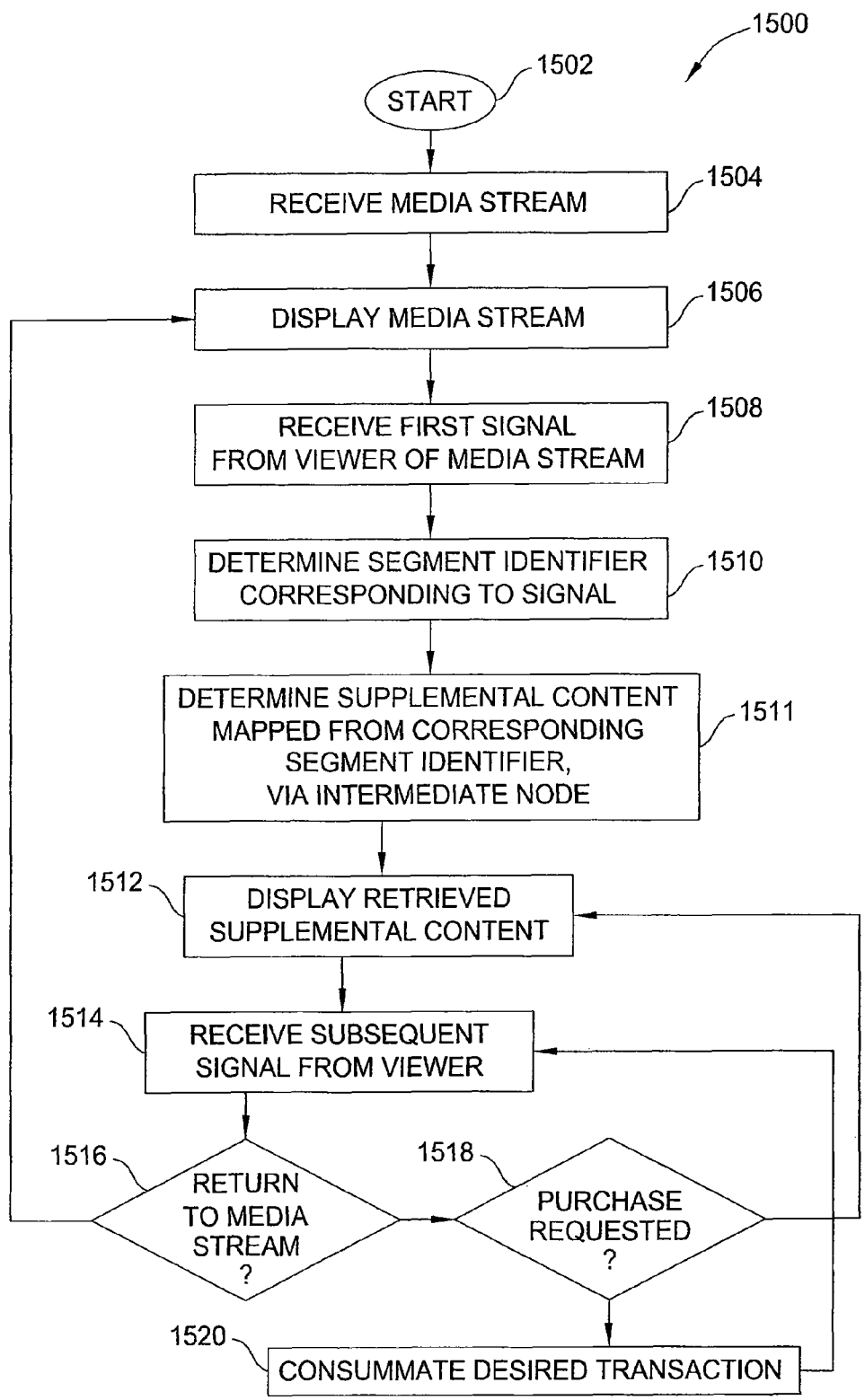
FIG. 15 is a flow diagram illustrating a fifth embodiment of a method for providing annotated media streams to viewers, according to the present invention.

FIG. 15 is a flow diagram illustrating a fifth embodiment of a method 1500 for providing annotated media streams to viewers, according to the present invention. The method 1500 may be implemented, for example, in its entirety by the access provider 106 of FIG. 1 (e.g., via a user device such as a television, a DVD player, a DVR, a set-top box, a portable media player, a personal digital assistant, a personal computer, a mobile phone, an in-flight or in-vehicle entertainment system, a video game console, a dedicated device or the like that has access to annotated media streams). Alternatively, the method 1500 may be implemented by access provider 106 in conjunction with the stream annotation service provider 112. In particular, the method 1500 is intended for providing annotated media streams in which segment identifiers identifying segments of the media streams are mapped to intermediate nodes, the intermediate nodes being in turn mapped to items of supplemental content (e.g., as described above).

The method 1500 is initialized at step 1502 and proceeds to step 1504, where the method 1500 receives a media stream. In embodiments where segment identifiers identifying segments of the media stream are mapped to intermediate nodes, the media stream also contains metadata, describing the segments that individual frames of the media stream belong to. In one embodiment, the metadata is not contained within the media stream, but is instead received from a remote server, for example, via the Internet, via a cable network (e.g., where the remote server may be a cable head-end, or the head-end may mediate communications with the remote server) or via satellite. Particular embodiments may receive the mapping as an OpenCable application platform (OCAP) or digital video broadcasting (DVB) application, or as a private section within an MPEG transport stream.

In step 1506, the method 1500 displays the media stream via a display device. The method 1500 then proceeds to step 1508 and receives a first signal from a viewer of the media stream. The first signal indicates that the viewer wishes to view any supplemental content that may be associated with the present position in the media stream (i.e., that is mapped to the corresponding segment identifier). The first signal may be conveyed via the push of a button (e.g., on a remote control, a keyboard, a mouse, a light pen or a laser pointer) or via a spoken command (e.g., to a microphone, a mobile phone or a voice-over-IP handset). In one embodiment, the method 1500 supports multimodal viewer interaction, meaning that two or more input modalities may be employed for receiving viewer signals. Multimodal interaction may be helpful, for example, in correcting errors in processing viewer signals. For example, errors in processing viewer signals may be corrected in accordance with the methods described in U.S. Pat. No. 6,742,021, which is herein incorporated by reference in its entirety. In one embodiment, the first signal indicates that the viewer wishes to view the supplemental content immediately. In another embodiment, the first signal indicates that the viewer wishes to view the supplemental content at a later time (e.g., at the conclusion of the media stream). In further embodiments, the first signal indicates that the user wishes to save the present position in the media stream to view the supplemental content at a later time, without specifically identifying the article of interest (e.g., "mark for later").

In step 1510, the method 1500 determines, in accordance with the metadata, which segment identifier corresponds to the point in time at which the first signal was received (i.e., what portion of the media stream was being displayed when the viewer sent the first signal). In one embodiment (e.g., where the segment identifiers comprise hash-generated identifiers), this determination is made by computing the hash of the current frame, and identifying the segment associated with the computed hash. In embodiments where time offset (either from the beginning of the media stream or from some internal boundary) is used as the index for segments, metadata need not be provided, and an internal clock of the display device or associated hardware may be utilized to calculate the running time of the media stream. In another embodiment, a time-code datum or other internal information already present in the current frame is used to determine the present segment and corresponding segment identifier.

In step 1511, the method 1500 then determines, in accordance with the mapping, what supplemental content is mapped from the current segment identifier. Step 1511 may be performed directly by the user's device, or may be performed by a remote computer upon request by the user's device. First, the intermediate node mapped from the current segment identifier is obtained (e.g., via a first mapping). Then, in one embodiment, items of supplemental content mapped from the obtained intermediate node (e.g., via a second mapping) are retrieved for display in step 1512.

The method 1500 next proceeds to step 1512 and displays, at the appropriate time (e.g., based on whether the user wishes to view the supplemental content immediately or at a later time), the retrieved supplemental content. In one embodiment (e.g., where there are multiple retrieved items of supplemental content), the supplemental content is displayed in the form of a menu of selectable articles. Thus, for instance, if the first signal was received at a time when one or more frames of the media stream depicting an actress were displayed, the supplemental content mapped (indirectly) from those frames might include the actress's filmography, and information about a sweater that the actress is wearing. Thus, the supplemental content displayed in response to the first signal might include an image of the actress and an image of the sweater, where each of the images may be associated with a hyperlink to a World Wide Web page, containing additional information and an opportunity to purchase goods or services. In one embodiment, the display of the media stream is paused while the retrieved supplemental content is displayed. In one embodiment, the retrieved supplemental content is displayed via the same display device as the media stream. In another embodiment, the retrieved supplemental content is displayed via a different display device (e.g., the media stream is being displayed via a television or mobile phone, and the retrieved supplemental content is displayed on the viewer's laptop computer, or is sent to the viewer's e-mail account).

In step 1514, the method 1500 receives a subsequent signal from the viewer. In one embodiment, the subsequent signal may be received in any of the ways in which the first signal was received. The method 1500 then proceeds to step 1516 and determines whether the subsequent signal indicates that the viewer wishes to return to the media stream (i.e., exit the currently displayed supplemental content without any further action). If the method 1500 concludes in step 1516 that the subsequent signal indicates that the viewer wishes to return to the media stream, the method 1500 returns to step 1506 and resumes displaying the media stream (e.g., unobstructed by the supplemental content). Thus, the method 1500 ceases to display the supplemental content until and unless another signal to do so is received.

Alternatively, if the method 1500 concludes in step 1516 that the subsequent signal does not indicate that the viewer wishes to return to the media stream, the method 1500 proceeds to step 1518 and determines whether the subsequent signal indicates that the viewer wishes to purchase one or more articles depicted in the displayed supplemental content. Thus, the method 1500 can provide an immediate purchase opportunity on demand.

If the method 1500 concludes in step 1518 that the subsequent signal does not indicate that the viewer wishes to purchase one or more articles depicted in the displayed supplemental content, the method 1500 returns to step 1512 and continues to display the supplemental content. Alternatively, if the method 1500 concludes in step 1518 that the subsequent signal does indicate that the viewer wishes to purchase one or more articles depicted in the displayed supplemental content, the method 1500 proceeds to step 1520 and consummates the desired transaction. Once the transaction is completed, the method 1500 returns to step 1514 and awaits a signal from the viewer indicating how to proceed (e.g., return to media stream or consummate another transaction). In further embodiments, additional options or actions may be associated with the subsequent signal. For example, the subsequent signal may trigger a push of additional supplemental content (optionally driven by demographics and/or learned user preferences, such as reviews by other users with similar preferences, consumer reports, etc.). In one embodiment, the additional supplemental content provides an opportunity for the viewer to view his or her purchase history or to edit preferences relating to the method 1500.

The method 1500 continues processing, awaiting signals from the user, until the display of the media stream is complete.

As noted earlier, a major disadvantage of prior art approaches is that the information (e.g., supplemental content) relating to product placements in media streams tend to be fixed. There is no straightforward way to provide differentiated information regarding articles depicted in a media stream to a viewer of the media stream based on criteria such as demographic, gender, and the like. Further, if no particular information is associated with a particular video segment, there is no way of calculating what items of information may be most relevant and compelling. These significant disadvantages are overcome in the present approach by calculation over the ontology of intermediate nodes.

For example, consider a situation where a particular segment identifier is mapped via a first mapping to the intermediate node representing the ontology instance "Brand X Strawberry Jelly," and there is no item of supplemental content mapped from this intermediate node via a second mapping. However, there is an item of supplemental content, "Grocery Store A Coupon" mapped to the intermediate node representing the ontology concept "Jelly." If the ontology in this example contains "is-a" relationships, such that the instance "Brand X Strawberry Jelly" is understood to be a member of the class "Jelly," then the method 1500 can calculate that, with respect to the ontology, returning the supplemental content "Grocery Store A Coupon" is appropriate when a mapping to the intermediate node "Brand X Strawberry Jelly" is presented.

In general therefore, in certain embodiments, when the method 1500 determines that a segment identifier is mapped to an intermediate node N via a first mapping, and that the intermediate node N has no second mapping to any articles (or perhaps a second mapping that is undesirable under constraints, as discussed later), items of supplemental content can be searched for by, in effect, "walking" the ontology to locate an item. By walking "up" the ontology from instances to classes, and from classes to super-classes, items of supplemental content may be located that are mapped to a more general concept, as in the earlier example of "Jelly". There, by proceeding from the specific instance node to the containing class, the coupon is located and may then be returned to the user. Thus, the relationships between instances and classes maintained in the ontology enable a computation of the item to be returned to the user.

Inversely from the example above, the method 1500 can also walk "down" the ontology from classes to sub-classes, and from classes to instances, to provide an item of supplemental content mapped from an intermediate node representing a more specific part of the ontology. For example, assume a segment identifier is mapped via a first mapping to an intermediate node representing an ontology class "Paint," with a color attribute set to "Green," and an instance of this class is present that represents "Brand X Lime Green Paint," with an associated item of supplemental content. By walking the ontology to more specific items, the method can locate and retrieve this item of supplemental content. Further, one can also "walk" to siblings of an instance or class (i.e., those instances and classes that share a common immediate superclass) in a similar manner, and combine up, down, and sibling walks in various combinations. Constraints are preferentially provided to control how far from a mapped node to a sibling node the method is permitted to walk. For example, it may be too remote to walk up two super-classes in a particular ontology, meaning that it would be difficult for a user to comprehend why the method retrieved a particular item of supplemental content. The precise constraints are established according to exercise of judgment, in reference to a particular ontology used in a particular embodiment.

In ontologies where a "part-of" relationship is provided in addition to an "is-a" relationship, search for items of supplemental content to return can also include matching a whole from its parts. For example, consider a segment identifier, S, that is mapped to two intermediate nodes, representing the ontology concepts "Crunchy Peanut Butter," and "Strawberry Jelly," respectively. The example ontology provides "is-a" relationships, such that it is known that "Crunchy Peanut Butter" is part of the class "Peanut Butter," and "Strawberry Jelly," is part of the class "Jelly." Further, the example ontology provides a "part-of" relationship such that the classes "Peanut Butter," and "Jelly," are the two parts of the class "Peanut Butter and Jelly Sandwich." In searching for items of supplemental content, when walking the ontology as described earlier to super-classes, if the class relationship is a "part-of" relationship, the choice to visit the super-class may be made in several ways. First, the super-class may be walked to only if at least one item from each part subclass is present (e.g., only return an item linked to "Peanut Butter and Jelly Sandwich" if at least one member of each of "Jelly" and "Peanut Butter" is mapped from the present segment identifier). Alternatively, the super-class may be walked to if any of the parts are mapped from the present segment identifier.

In the embodiments described so far, it has been implicitly assumed that the mapping from an intermediate node to an item of supplemental content was applicable in all circumstances. However, in some embodiments the capacity to present a particular item from a choice between items is desirable (e.g., to provide item A to teenagers and the alternative item B to younger children). Such a choice can be accomplished by mapping an intermediate node to many items of supplemental content, and providing constraints on the mappings. For example, consider an intermediate node N that is mapped to three items of supplemental information P1, P2, and P3. Each such mapping has associated constraints, C1, C2, and C3. In a first approach, the constraints are interpreted as Boolean conditionals, such that the meaning of the constrained mappings is "IF C1 THEN P1," and so on. The constraints do not need to be mutually exclusive, allowing more than one item of supplemental content to be returned for any particular set of conditions. Further, the constraints do not need to be exhaustive—under a particular set of conditions, no constraint may evaluate to true, and no item of supplemental content may be returned. A "default" constraint may also be supplied, such that if no other item of supplemental content is returned under the conditions, the default item will be returned. The constraints can include Boolean operators, numerical and string comparators, and have multiple sub-terms.

Constraints are contemplated to include variables describing knowledge regarding the viewer viewing the media stream, including demographics, device type, and the like. For example, constraints may include "viewer's age >30," "viewer's income >$100,000," "viewer's zip code=94025," "viewer's language=Español," "viewer's device=DVR or cellular telephone." Constraints can also include the attributes associated with a particular instance or class in the ontology.

In further embodiments, constraints can be probabilistic. This allows for the situation where information about the viewer is not known, but has been inferred from viewer behavior by learning approaches. Learning can be applied to a viewer's viewing habits, click through and purchasing habits, and the like. For example, a probabilistic constraint might be "(Probability that the viewer >30 years old)>75%."

In addition to, or in place of, "hard" constraints in an IF X THEN Y format, "soft" constraints may be employed, where the conditionals provide a weight. The item(s) returned are then those with the lowest (or highest) total weight(s). For example, consider an intermediate node N that is mapped to two items of supplemental content, I1 and I2. The mapping from node N to item I1 has three soft constraints: "viewer's age >30, weight=1;" "viewer's income <$60,000, weight=4;" "viewer's state=Arizona, weight=−3." The mapping from node N to item I2 also has three soft constraints: "viewer's age >50, weight=1;" "viewer's income >$100,000, weight=−2;" "time of day >12:01 am AND time of day <5:00 am, weight=−3." To choose between the two items, the method 1500 calculates the sum of the weights for each constraint. Under the knowledge that the viewer is a 40 year old in Arizona, who earns $75,000 per year, the weight for the mapping to item I1 would be −2. The weight for the mapping to item I2, at 11 am, would be 0. At 3:00 am, the weight for the mapping to item I2 would be −9. Hence, at 11:00 am item I1 has the lowest weight and would be retrieved. At 3:00 am, item I2 has the lowest weight and would be retrieved instead of item I1.

Figure 29:
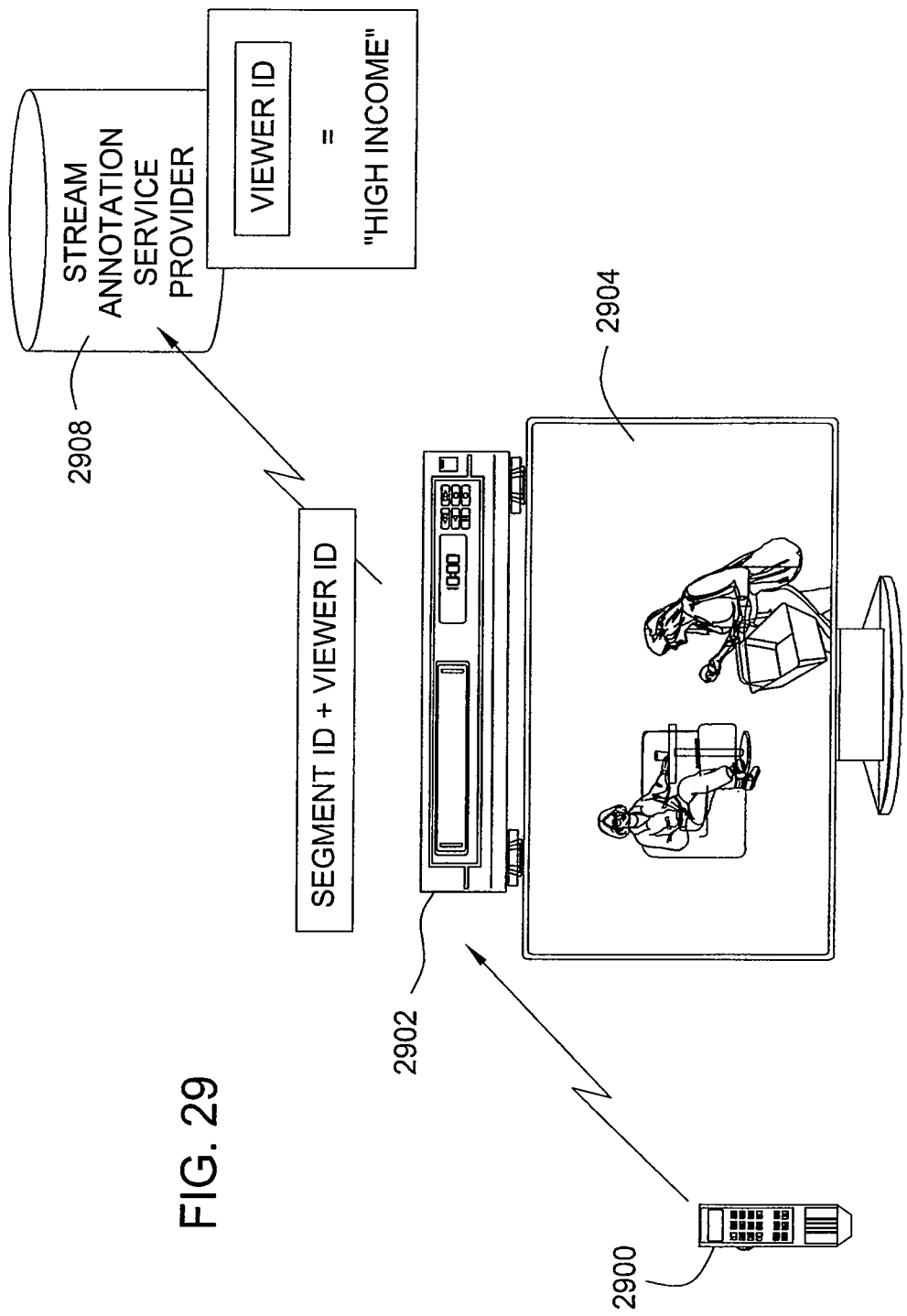
FIG. 29 illustrates the use of viewer-driven constraints in the display of supplemental content.

FIG. 29 illustrates the use of viewer-driven constraints in the display of supplemental content. For instance, a viewer of a media stream may send a signal (e.g., via a remote control 2900 to a set-top box 2902) indicating that he/she is interested in viewing supplemental content relating to the segment identifier of the media stream currently depicted on his/her display device 2906. In accordance with this signal, the set-top box 2902 may read both a segment identifier identifying the currently displayed segment of the media stream and a viewer identifier identifying the viewer. As illustrated, the viewer identifier is mapped to information in a database 2908 indicating that the viewer has a "high" level of income.

Figure 30:
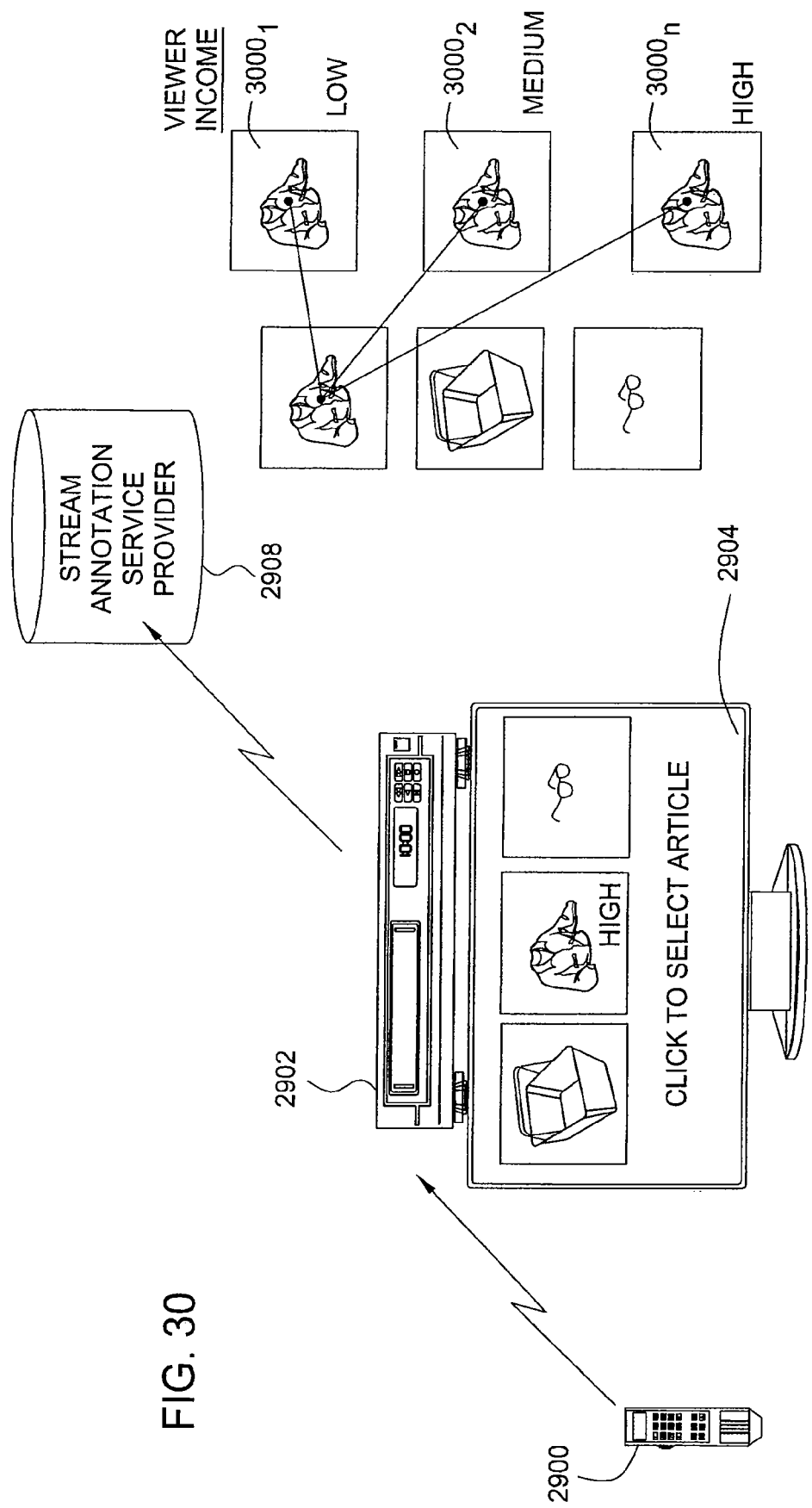
FIG. 30 illustrates the results of using viewer-driven constraints to select supplemental content.

FIG. 30 illustrates the results of using viewer-driven constraints to select supplemental content. Continuing the example of FIG. 29, suppose the segment identifier was mapped to supplemental content relating to a purse, a sweater and a pair of sunglasses. Further, suppose the sweater is associated (e.g., via a generic "sweater" node in an ontology) with several different items $3000_1$-$3000_n$ (hereinafter collectively referred to as "items 3000") of supplemental content: a first item $3000_1$ relating to a sweater to display to low income viewers, a second item $3000_2$ relating to a sweater to be displayed to middle income viewers and a third item $3000_n$ relating to a sweater to be displayed to high income viewers. Because the viewer's viewer identifier identified him/her as being a high income viewer, the third item $3000_n$ of supplemental content (relating to the sweater to be displayed to high income viewers) is retrieved and displayed when the viewer requests more information about the sweater.

The approach described herein with reference to FIGS. 14 and 15 of maintaining an ontology describing the interrelationships between mapped intermediate nodes, may be advantageously used in performing advanced data mining. In a naïve data mining approach, one can calculate the number of viewers that expressed interest in a particular item of supplemental content (e.g., by "clicking through" or consummating a commercial transaction). However, such an approach misses a large amount of information that can be obtained within the present framework. For example, one can determine the interest shown in a particular type of article by aggregating the interest shown in all subclasses and instances contained within the ontology class that represents that type of article.

Further, correlations can be computed. It is desirable that the ontology contain classes and instances that allow a mapping to intermediate nodes that not only describes the information being conveyed by a segment of a media stream in the sense of visible articles, but also in terms of concepts related to the segment. For example, concepts may include the "mood" of the segment (e.g., action, car chase, romance), the background music, a genre of the media stream (e.g., drama, horror, humor), and the like. In embodiments where such concepts are used, a data mining process can correlate articles, types of articles, and concepts, and the demographics of the viewer. For example, by separately aggregating interest shown in the class "sports car," between the mood concepts of "car chase" and "action," one could determine if viewers express interest in sports cars more often during chase scenes than in generic action scenes. By providing this information, if the mapped items of supplemental content comprise advertising, an advertiser can determine what types of scenes their product receives the most attention in, and target their advertising budget appropriately—both to the particular viewer and to demographically similar viewers. Further, movie makers and advertisers can use the mined information to better determine the price that should be charged for particular product placement opportunities.

In further embodiments of the present invention, the mapping or provision of supplemental content can be performed by the same individual or entity that creates or provides the media stream. Such embodiments are especially well suited for the distribution of media streams over a network such as the Internet (e.g., through a service that hosts media streams uploaded by users). Implementing aspects of the present invention in connection with such a service would allow the service to generate a robust revenue stream, which in turn would allow the service to provide the bandwidth and storage necessary to accommodate the volumes of multimedia content. In addition, the present invention would allow content creators to monetize the content they have created, by sharing in the revenue realized by the access provider.

Figure 16:
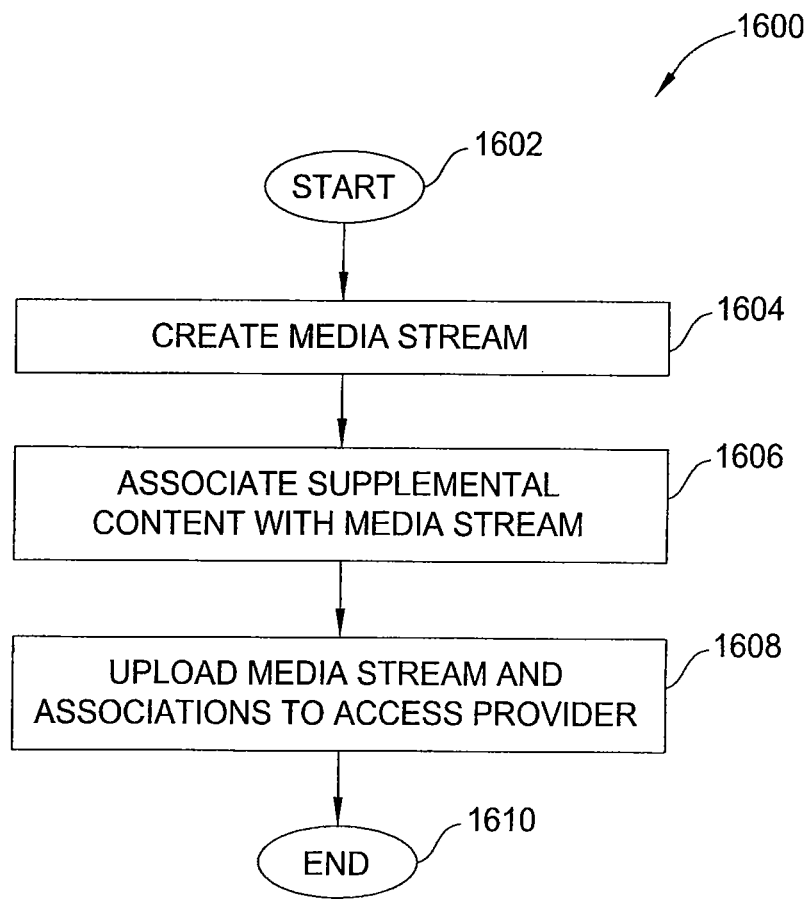
FIG. 16 is a flow diagram illustrating one embodiment of a method for associating supplemental content with a media stream, according to the present invention.
Figure 32:
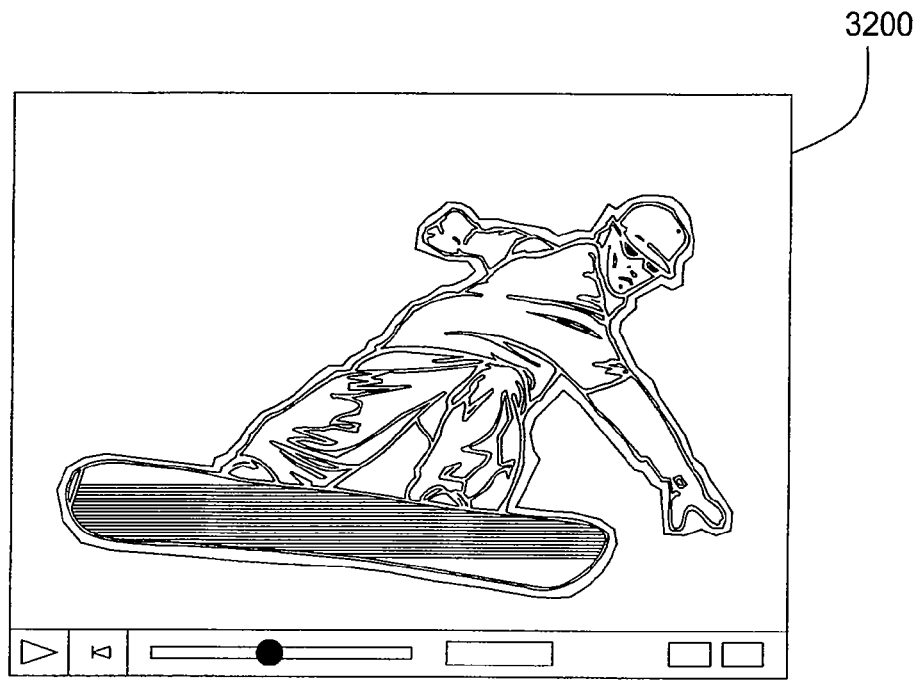
FIG. 32 illustrates an exemplary media stream that has been loaded onto a computing device.

FIG. 16, for example, is a flow diagram illustrating one embodiment of a method 1600 for associating supplemental content with a media stream, according to the present invention. The method 1600 may be implemented, for instance, by a user of an access provider (e.g., a content creator or uploader). The method 1600 is initialized at step 1602 and proceeds to step 1604, wherein a media stream (e.g., a video) is created (optionally including editing and other production steps) and loaded onto a computing device (e.g., a personal computer, a mobile telephone, a personal digital assistant or the like), in a digital format such as MPEG. FIG. 32, for example, illustrates an exemplary media stream 3200 that has been loaded onto a computing device. The exemplary media stream 3200 comprises a snowboarding video.

Figure 33:
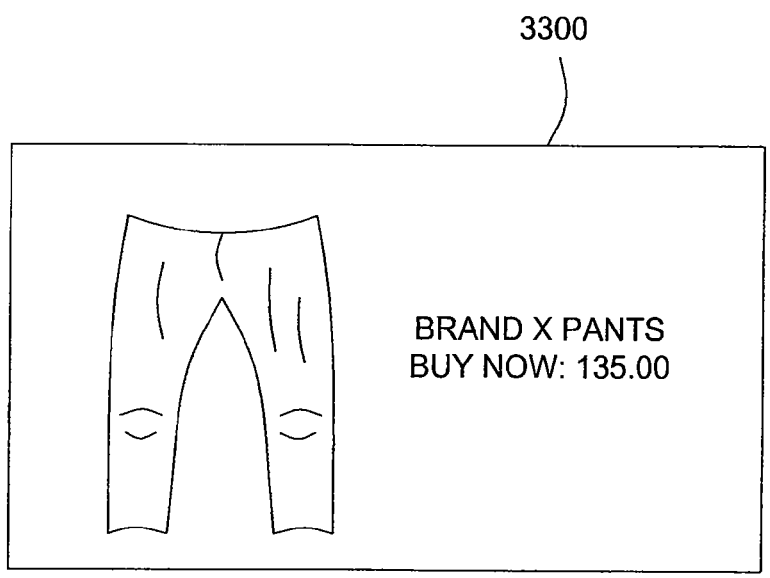
FIG. 33 illustrates an exemplary item of supplemental content that may be mapped to the media stream illustrated in FIG. 32.

In step 1606, supplemental content is mapped to the media stream. Supplemental content may be any form of additional content, including text, video material, multimedia presentations, photographs, web links (URLs) and advertising copy. In one embodiment, the supplemental content is selected from a library of content provided, for example, by the access provider, as described above. In another embodiment, the user provides his/her own supplemental content. FIG. 33, for example, illustrates an exemplary item 3300 of supplemental content that may be mapped to the media stream 3200 illustrated in FIG. 32. Specifically, the item 330 of supplemental content is an advertisement/purchase opportunity for a specific brand of snowboard pant.

Figure 34:
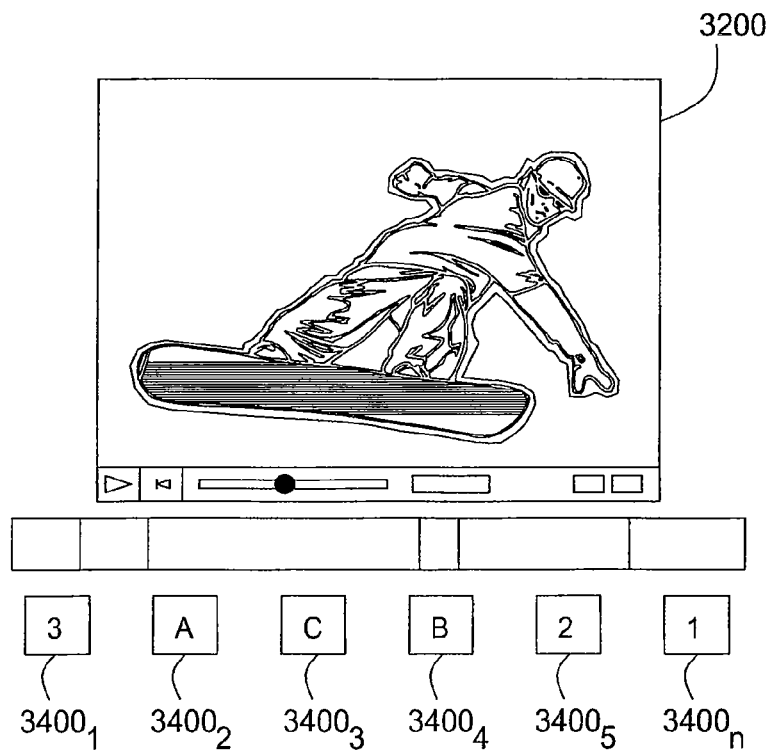
FIG. 34 illustrates the exemplary media stream of FIG. 32, where the media stream has been logically divided into temporal segments to facilitate mapping of supplemental content.

In one embodiment, supplemental content is mapped with respect to temporal segments of the media stream (e.g., the segment identifier identifying the first one minute of the media stream may be mapped to a first item of supplemental content, while the segment identifier identifying the second minute of the media stream is mapped to a second, different item of supplemental content). FIG. 34, for example, illustrates the exemplary media stream 3200 of FIG. 32, where the media stream 3200 has been logically divided into temporal segments $3400_1$-$3400_n$ (hereinafter collectively referred to as "segments 3400") to facilitate mapping of supplemental content. In another embodiment, mappings of supplemental content are made with respect to metadata included in the media stream encoding (e.g., segment identifiers, cue points, and the like).

Figure 35:
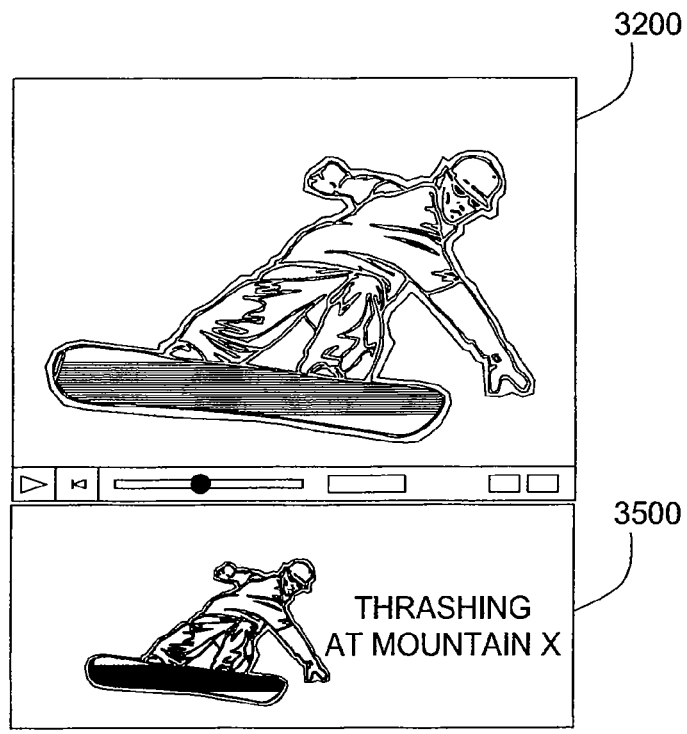
FIG. 35 illustrates the exemplary media stream of FIG. 32, wherein an item of supplemental content is mapped such that the item of supplemental content is displayed simultaneously with at least a segment of the media stream.

As described in further detail below, supplemental content mapped to the segment identifiers will be displayed either simultaneously (e.g., in a separate frame of the same display) with the media stream or "saved" and displayed later, in some embodiments on a different platform in addition to or instead of the platform used to view the media stream. If the supplemental content is to be displayed simultaneously with the media stream, the items of supplemental content will need to appear on the screen for a sufficient period of time so that a viewer of the media stream has a chance to view the items. Items of supplemental content may provide the capability to click thereon and receive further information related to the item, perhaps by opening a web browser to a relevant web page. Such additional information could also encompass a commercial opportunity (e.g., to enable purchase of a product that was advertised in the clicked-upon item of supplemental content). Additional information may either be pre-existing information, such as an e-commerce website or web encyclopedia, or may be information created specifically for this purpose (e.g., a custom e-commerce store, perhaps created to showcase a particular set of articles, for example articles created by the user him or herself). FIG. 35 illustrates the exemplary media stream 3200 of FIG. 32, wherein an item 3500 of supplemental content is mapped such that the item 3500 of supplemental content is displayed simultaneously with at least a segment of the media stream 3200.

Step 1606 thereby allows a user to create a mapping from segment identifiers identifying segments of the media stream to one or more items of supplemental content. In certain embodiments, the user may create more than one mapping between the segment identifiers and (potentially different) items of supplemental content. For example, the user may create different mappings according to the web site on which the media stream will be hosted, such that a particular media stream S will have mapping M1 for display on web site W1 and mapping M2 for display on web site W2. Such a plurality of mappings allows the media stream S to be displayed, for example, with alternate supplemental content if embedded in a blog as opposed to on a web site. Later, with respect to step 1708 of method 1700, the appropriate mapping M1 or M2 will be selected for provision to a viewer in accordance with the posting location of the media stream. Further, different mappings may be provided for display on different display devices (e.g., mapping M1 will be displayed to users viewing on a computer, mapping M2 to users viewing on a portable device such as a telephone or personal digital assistant, and mapping M3 to users viewing on a television set).

In addition to mappings that are conditional on demographics and device types, as described above, mappings may also be conditional on user behavior, aggregate viewing statistics, or a random selection. For example, a plurality of mappings (or a plurality of items of supplemental content mapped to a particular segment identifier) may be provided, where a choice regarding which to present is dependent on at least one of: (1) the number of times a viewer has viewed the media stream; (2) the number of times the media stream has been viewed in total; (3) whether or not the viewer clicked on or otherwise expressed interest in a previously associated item of supplemental content in the mapping; (4) the average viewing time of the viewer (do they typically only view the first 30 seconds of a clip?); (5) the viewer's express or learned preferences; and (6) a random choice.

In further embodiments, a user may wish for multiple items of supplemental content to be simultaneously displayed with the media stream. Step 1606 enables this functionality by allowing: (1) the creation of multiple mappings between segment identifiers and items of supplemental content (where subsequent mappings may be created by a different user than the user/content creator who created an initial mapping); and/or (2) the mapping of a single segment identifier to a plurality of items of supplemental content (e.g., including a primary item of supplemental content and one or more secondary items of supplemental content). Secondary items of supplemental content can allow for commentary on a primary item of supplemental content, for example where a second user creates an additional mapping to comment on the associations made in an initial mapping by an original user (e.g., content creator). They can also allow for different users to create different mappings or sets of associations, providing different viewpoints on the same media stream subject matter.

In such an embodiment, mapping supplemental content in accordance with step 1606 includes embedding rules within the mapped supplemental content. These rules allow the subsequent display of the supplemental content (i.e., during viewing of the media stream) to be optimized in accordance with specified criteria (e.g., viewer demographics, time of day or the like). In one embodiment, a rule dictates what specific information to display about an item of supplemental content (e.g., "If X=TRUE, display the price of the depicted product rather than the name"). In another embodiment, a rule dictates which of two or more potential items of supplemental content to display (e.g., "If X=TRUE, display item A; otherwise, display item B").

Certain embodiments of the method 1600 further enable a user to arrange the individual items of supplemental content (e.g., advertisements) into a large set of items that will be displayed together. A user is then able to advantageously map this set to the appropriate segment identifiers, instead of mapping each individual item of supplemental content (e.g., a pair of eyeglasses and a set of earrings would likely be depicted in many of the same segments of a media stream, given their physical proximity to each other when they are worn).

In one embodiment, supplemental content is selected from a library of items of supplemental content (provided, for example, by the access provider and/or by other users), as described above. Selecting items from the library may be performed using any combination of a "drag-and-drop" tool, by checking a box, by typing in article numbers, and the like. In some embodiments, a user may specify a category of articles (e.g., "men's, leather belt, blue") and allow the method 1600 to propose a specific item of supplemental content according to, for example, the most popular article for specified category, the article for which advertisers will paying the highest referral commissions, or other criteria of interest.

A particular library of supplemental content (e.g., pre-approved advertising information) may comprise a variety of information about a given article, such as one or more of: an image of the article, information about the article, a short "commercial" about the article, and a link to immediately purchase the article. This information can be obtained from "affiliate" programs with existing online merchandisers and aggregators, and the library may further comprise custom advertising. Inclusion of item of supplemental content in the library may be subject to a "finder's fee" negotiated with each advertiser by the access provider. For example, a certain seller's affiliates may receive as much as x % of the purchase price of any article sold to a customer, when the customer was directed to the seller's site by the seller's affiliate's site.

Embodiments of the invention allow third parties (all, or an authorized group of users) to map supplemental content to segment identifiers identifying segments of a given media stream, providing a syndication-like system. Revenue from syndicated media streams can be split between the originator of the media stream (i.e., the content creator) and the syndicator who mapped the supplemental content. In this way, the value of the media stream is increased because the task of realizing value is spread across a number of different people (e.g., the content creator may have no interest in creating mappings, whereas others are very interested but lack suitable media stream content).

In one embodiment, third-party syndicators are provided with ratings, for example according to their success in monetizing media stream content or according to other factors. By monitoring viewer response, statistics can be generated to indicate that a particular syndicator generates high viewer interest in their association mapping for this "type" of media stream. Media stream "type" in this context could be based, for example, on the content tags (e.g., Elvis) or on the demographics of the people watching the media stream when it is first launched (e.g., a video clip being watched primarily by teenage girls). A marketplace is therefore enabled to match media stream creators/uploaders with syndicators. Embodiments of the present invention further allow the media stream creator to control the syndication of his or her media stream, for example by setting certain minimum performance metrics such that if the mapping provided by a syndicator does not generate sufficient results, the mapping will be removed from public availability. In one embodiment, performance metrics include absolute thresholds (e.g., "must generate at least 1,000 viewer responses in the first 10,000 views") or relative metrics for media streams with more than one syndicator mapping (e.g., "only the top three syndicator mappings are retained after forty-eight hours). New syndicator mappings could be added for a trial period to compete in the relative metrics, either on a random basis or on a percentage basis (e.g., 90% of views will receive the currently best performing mapping, and 10% will receive a new syndicator mapping), and after a certain period of time the performances of the various syndicator mappings are compared, with the winner becoming the new best performing mapping.

In one embodiment, the access provider facilitates a beneficial division of labor by enabling individual syndicators to form and work together in syndication teams. One benefit of such teams is that they can be structured to bolster the standard viewer-driven optimization process for determining the most compelling items of supplemental content by providing a "pre-screen" in the form of a team pre-approval process. For example, each member of the team who wishes to provide an item of supplemental content may be required to submit the item of supplemental content to the team for review. In this approval process, the various team members may provide commentary (e.g., through written comment or verbally such as by voice over internet protocol or VoIP) by modifying the submitted item of supplemental content (potentially through a shared workspace as described earlier herein), or even by proposing alternative items of supplemental content. The team may require that submitted items of supplemental content reach a certain threshold of acceptance among the team members before the items of supplemental content can be submitted on behalf of the team. For example, a team may require that an item of supplemental content receive a certain percentage of "Yes" votes from team members (potentially with additional criteria such as requiring that the total number of votes cast must be at least a minimum percentage of team members). Such rules may require that voting be closed only after the item of supplemental content has been presented to the team for a set period of time, in order to ensure sufficient opportunity for review. This type of process will help to ensure that higher quality items of supplemental content are submitted and also will tend to limit the number of items of supplemental content that are offered, thereby helping avoid "overwhelming" automated optimization processes. The access provider may also provide access point "multipliers" of various sorts to encourage specific types of behavior (e.g., "double points" for being the first user or collaborator to map items of supplemental content to a given media stream, having a items of supplemental content "win" an optimization process, etc.).

The access provider, or even the creator of the media stream, may be enabled to impose certain requirements for or limitations on syndicator submissions. For example, a content creator may require that syndication teams follow certain guidelines (e.g., minimum voting requirements) or have certain characteristics (e.g., teams comprised of more than 10 members, where teams holding at least X access points will be permitted to submit items of supplemental content to the queue once the media stream has reached a certain level of popularity). In one embodiment, syndicators may be permitted to "buy around" such limitations by agreeing to a pay fee (or, for example, by agreeing to receive a lesser percentage commission from generated revenue) in exchange for gaining exemption for the standard submission rules.

To facilitate team formation, the access provider may provide a selection of various types of team structures around which teams may be formed. For example, one team structure may be governed by complete majority rule, with all decisions (e.g., whether or not to contribute a particular item of supplemental content, how to divide commissions, etc.) open to a community vote. Another example of team structure may be controlled by a board of directors who make all decisions, or a structure that is led by a single individual, such that most members may only submit items of supplemental content for consideration and but may not be granted a vote. Various structures may be combined (e.g., a board of directors set to make all decisions, except that the decision to change any commission procedures must be made by majority rule).

Figure 39:
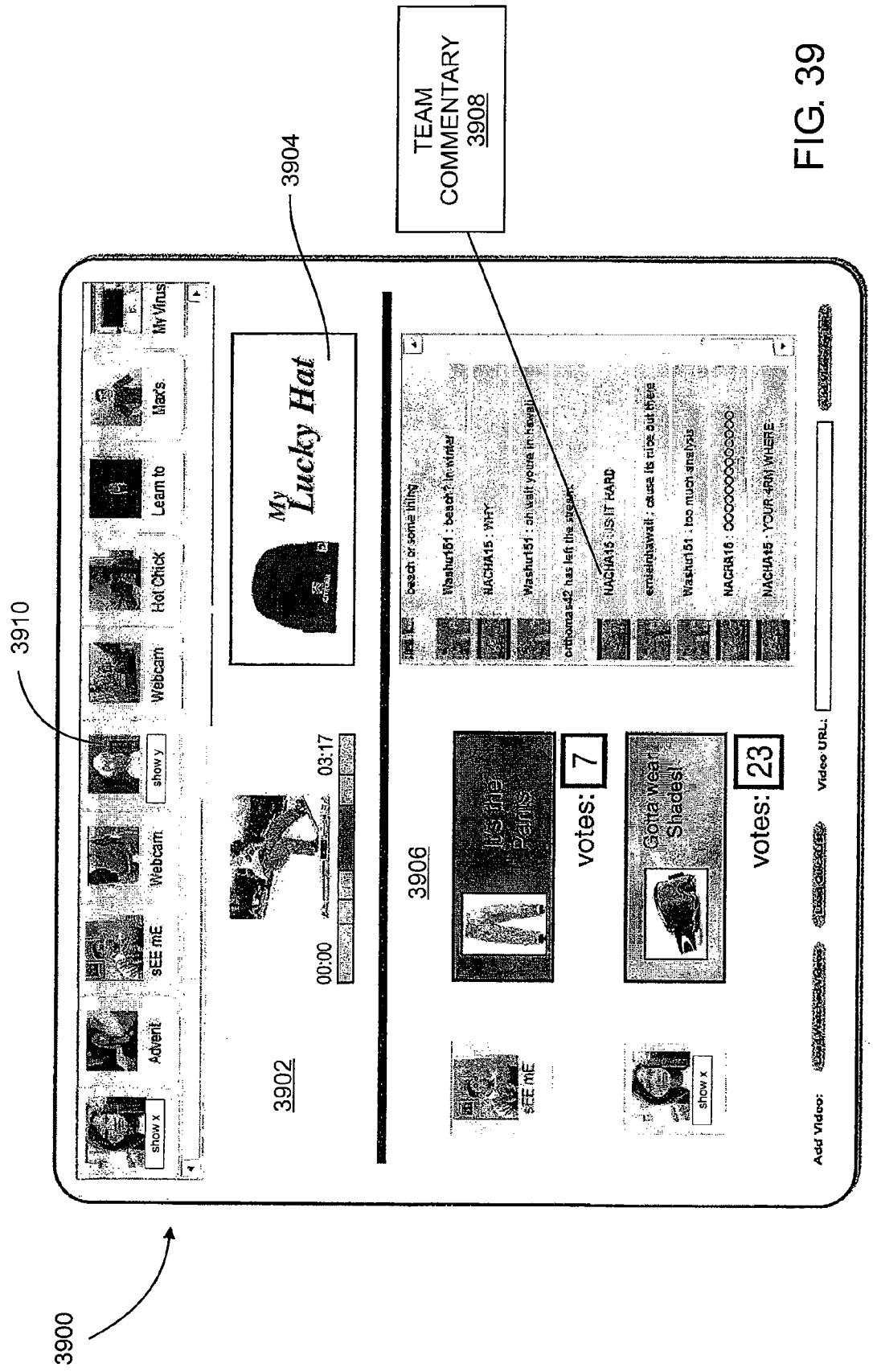
FIG. 39 illustrates the dynamics of an exemplary syndication team, according to the present invention.

FIG. 39 illustrates the dynamics of an exemplary syndication team, according to the present invention. Specifically, FIG. 39 illustrates an exemplary display 3900 for conveying syndication team data. For example, the display 3900 may comprise a first area 3902 for displaying the media stream under analysis (or segments thereof) and a second area 3904 for displaying an item of supplemental content associated with a currently displayed segment of the media stream (i.e., currently displayed in the first area 3902 of the display 3900). Additionally, the display 3900 includes a suggestion area 3906 in which team members can suggest alternate items of supplemental content for association with the currently displayed segment of the media stream and a commentary area 3908 for commenting on the suggestions in the suggestion area 3906.

As illustrated, each suggestion in the suggestion area 3906 includes a suggested item of supplemental content (e.g., "It's the pants" versus "Gotta wear shades!") and a vote counter that tracks the number of team members who have voted for selection of the suggested item of supplemental content. As described above, the suggested item of supplemental content garnering the greatest number of votes is typically selected for the mapping.

In addition, the display 3900 may include a plurality of avatars 3910 or other icons or identifiers, one for each member of the syndication team.

The access provider may wish to encourage team formation, since pooling the perspectives and knowledge of various team members (e.g., by selecting items of supplemental content by majority vote) and/or specializing in certain types of media streams and/or items of supplemental content (e.g., videos about soccer or items of supplemental content relating to high-fashion advertising) may ultimately produce more compelling mappings. In order to encourage syndicators to form teams, the access provider may offer to pay team-submitted items of supplemental content a higher percentage of commissions. In addition, the access provider may allow teams to aggregate the "access points" (as described above) earned by team members so as to gain faster access to the most popular media streams. In the point aggregation approach, it is likely that the access provider would impose a higher access point threshold on teams with respect to each category of media stream; however, the threshold would not be so high as to discourage individual syndicators to form teams. For example, the access provider may require that in order to earn the right to submit items of supplemental content for the top 100 most popular media streams currently hosted by the service, an individual syndicator may be required to hold at least X number of access "points," teams of five people or fewer must have at least 3X points, teams of six to twenty people must have 10X points and teams over twenty must have at least 20X points.

In one embodiment, the access provider or a third party creates a "marketplace" in which various users and teams may buy, sell, auction, barter for, or otherwise exchange "access points" with others. For example, a content creator who has provided a relatively small number of media streams may gain access points that he/she has no use for, given that he/she does not plan to provide any additional media streams or items of supplemental content. This content creator may sell or auction his/her access points to other users, such as to a team of syndicators that wishes to reach the next level of media stream access. The host for the auction may charge a fee for such transactions. The access provider may also impose an exchange rate, so as to encourage individual users to retain their access points and, hopefully, encourage these users to participate actively in the community. For example, the access provider may require that access points sold by one user to another individual user are reduced in half by the transaction (i.e., ten access points becomes five access points upon transfer), and may potentially impose a different exchange rate for points transferred to teams (e.g., ten access points becomes two access points), so that teams are less likely to dominate the entire community.

Once a media stream is opened for syndication, the content creator or others may be permitted to delete or block certain items of supplemental content offered by syndicators. This is an important feature, given that fewer content creators will want to open their media streams to syndicators if doing so causes them to lose all control over their media streams. However, assuming that content creators would receive a smaller commission on items of supplemental content proposed by syndicators (i.e., there is likely a financial incentive for the content creator to open the primary media stream to syndicators, as well as an incentive for syndicators to offer items of supplemental content), the access provider may require that once a content creator opens a media stream to syndication, the content creator will thereafter receive no commission higher than he/she would receive from a syndicated item of supplemental content. Otherwise, content creators would have an incentive to observe which items of supplemental content proposed by syndicators were successful and then replace lower commission-paying items of supplemental content with virtually identical supplemental content that does not entail sharing commissions with a collaborator.

In some embodiments, step 1606 is configured with constraints regarding the permitted mappings to supplemental content (e.g., the minimum and maximum time for which a particular item of supplemental content may be displayed, or the minimum and maximum number of commercial versus non-commercial supplemental content mappings). In some embodiments, synchronization may be constrained (perhaps with user consent) such that gaps of M seconds must exist between synchronizations made by the user. The intervening M seconds may then be automatically filled by supplemental content automatically selected by the access provider, and revenue from these intervening items potentially shared with the user.

At step 1608, the user uploads the media stream and at least one mapping (associating the media stream with supplemental content) to the access provider. In one embodiment, step 1608 includes requiring the user to sign a statement confirming that he or she is also the content creator and owner of the copyrights in the uploaded media stream. In one embodiment, the user is also provided with the options of providing "tags" that describe the media stream with certain keywords, assigning the media stream to one or more categories by genre (e.g., comedy), length, type of creator (e.g., professional), and the like.

Some embodiments of step 1608 will allow the content creator to define the look and feel of the media player that will display their media stream. For example, the creator of a nature-related video might select a green, leafy media player motif that features wood textured play, pause, and fast-forward buttons. A hip-hop oriented creator might elect a more contemporary "bling" player.

The method 1600 then terminates in step 1610.

In some embodiments of method 1600, a local application on the user/content creator's computing device is used to implement the method 1600. In other embodiments, a web-based application is used to implement the method 1600. In such web-based embodiments, the step 1608 may be performed in two parts, where the uploading of the media stream occurs before the associating step 1606, and the uploading of associations follows step 1608 as a separate step. In further embodiments, parts of the method 1600 are performed locally and other parts are performed remotely on a networked computing device.

Embodiments of the method 1600 incorporate mechanisms for reducing the uploading of pirated content (i.e., copyrighted content uploaded by an individual other than the copyright holder). For example, when an access provider is notified (e.g., by the copyright holder) that a given media stream may be violating certain laws or regulations, the access provider may find it necessary or useful to automate certain processes that derive from this situation. In one embodiment, if the access provider finds it necessary to remove a media stream from its offerings, the removal may trigger a number of related actions, including one or more of: temporarily banning the user who provided the media stream from using service provided by the access provider, reporting the user who provided the media stream to an account administrator and notifying the user who provided the media stream and any collaborators and who contributed thereto (e.g., by assisting in the creation of a mapping of supplemental content or by actually providing the supplemental content) of the removal. Furthermore, a summary of financial information generated by the media stream (e.g., monetization until the point of removal) may be generated and delivered to various stakeholders, and any funds currently held by the access provider and owed to the user who provided the media stream may be placed on hold.

Figure 46:
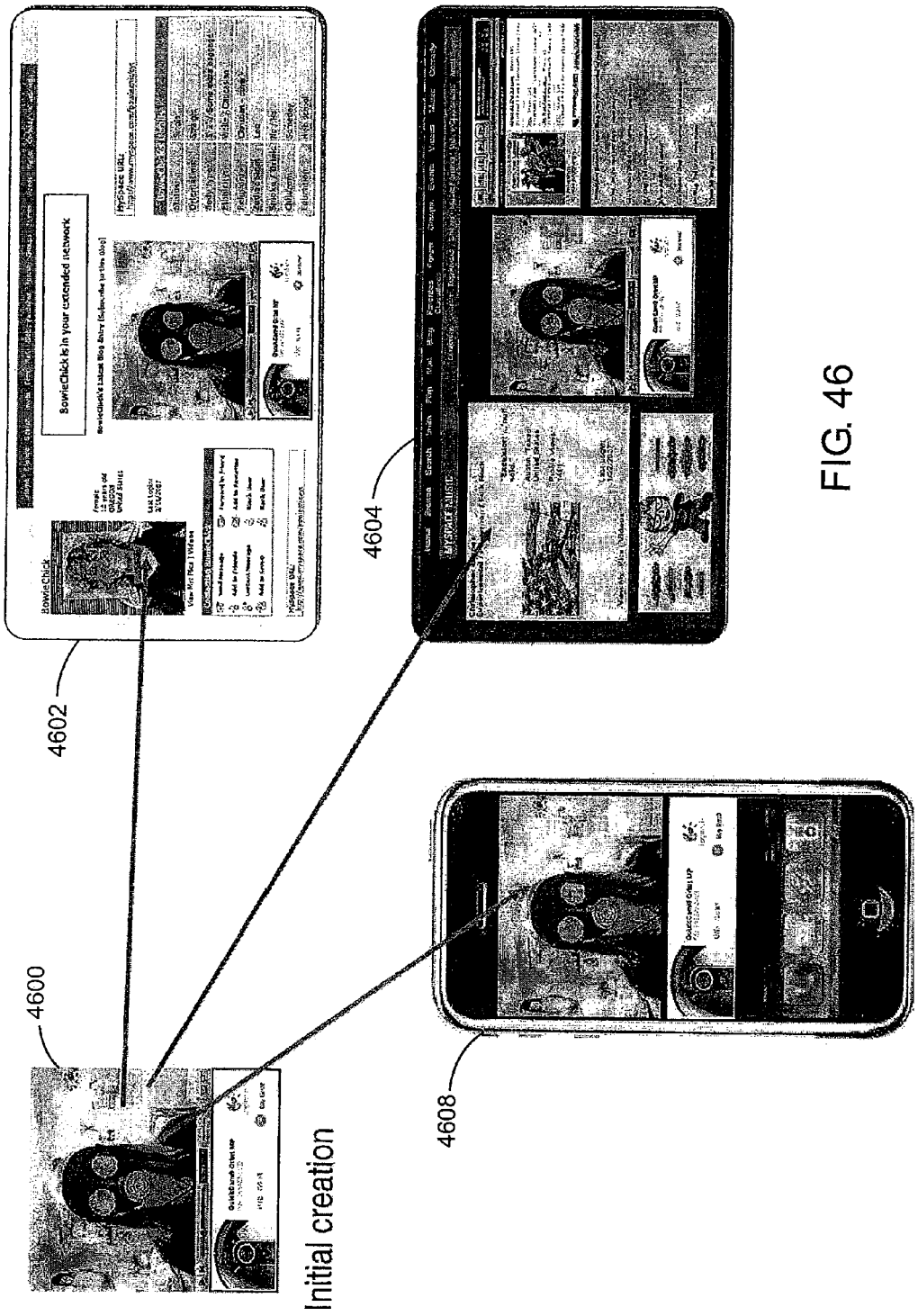
FIG. 46 illustrates the use of an initial annotated media stream across various platforms including a social networking website, a web log and a portable media player.

In one embodiment, supplemental content associated with a media stream in accordance with the method 1600 is embedded with the media stream such that any monetization (e.g., click-throughs) associated with the media stream reverts to the content creator, regardless of the platform(s) to which the media stream may be exported. FIG. 46, for example, illustrates the use of an initial annotated media stream 4600 across various platforms including a social networking website 4602, a web log ("blog") 4604 and a portable media player 4608. As illustrated, regardless of the platform 4602, 4604 or 4606 to which the initial media stream 4600 is exported, any supplemental content associated therewith remains associated.

Figure 17:
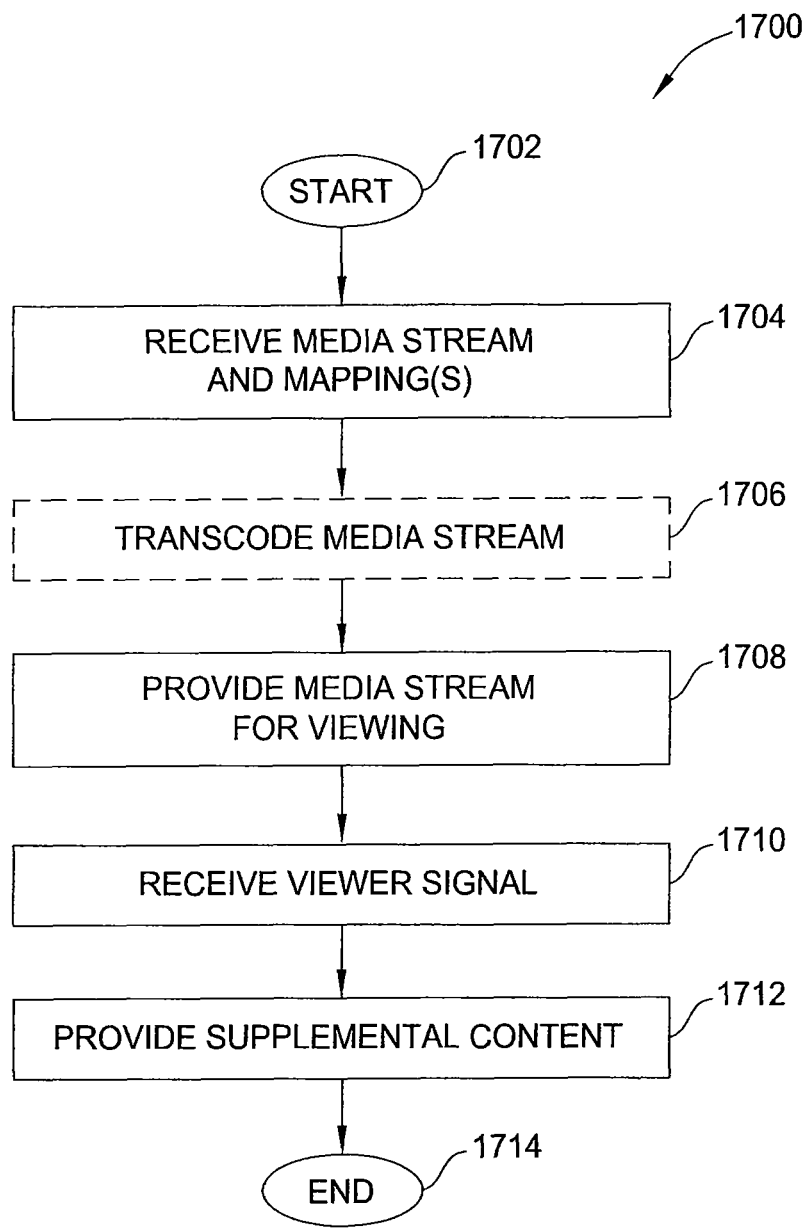
FIG. 17 is a flow diagram illustrating one embodiment of a method for providing a service for hosting a media stream with at least one mapping to supplemental content.

FIG. 17 is a flow diagram illustrating one embodiment of a method 1700 for providing a service for providing access to a media stream with at least one mapping to supplemental content. The method 1700 may be implemented, for example, by a web site that hosts media streams uploaded by users/content creators. The method 1700 is initialized at step 1702 and proceeds to step 1704, wherein a media stream and one or more mappings associating the media stream with supplemental content are received by the service provider.

In some embodiments, when the media stream is uploaded, the method 1700 is enabled to obtain both the program identifier (e.g., identifying the particular media stream) and a segment identifier associated with each segment of the media stream. The method 1700 may then additionally receive from the user/content creator various forms of metadata associated with the segment identifiers such as scene changes, "mood" changes, shot changes, etc. and allow those inputs to be stored for later use by the user or by the access provider.

In optional step 1704 (illustrated in phantom), the media stream is transcoded from the source format into the preferred format of the hosting service, if required. For example, the hosting service may prefer to store all media streams in Flash format (a video format supplied by Adobe, Inc., of San Jose, Calif.), wherein the method 1700 would, in step 1704, transcode an uploaded MPEG video into the Flash format.

In step 1706, the method 1700 makes the media stream available to viewers, and transmits the media stream, association mapping(s), supplemental content, and a viewing program to the viewer, on demand. In one embodiment, this is accomplished by posting the media stream and other material on a web site, embodied in a single application (e.g., a Flash application) that provides a simple user interface for playing, pausing, seeking, and stopping the media stream, adjusting the volume of the audio track, and displaying the associated supplemental content in accordance with the mapping.

In certain embodiments, the access provider may allow operators of other sites to link to a particular media stream and include that media stream on the other sites. In one embodiment, this is configured such that the media stream is only linked along with the mechanisms for displaying the mapped supplemental content, ensuring that viewing of the media stream on the third party website will include display of the mapped supplemental content. In one embodiment, a revenue model for this embodiment involves a negotiated sharing of revenue between the third party host and the original access provider for any viewer purchases or other revenue-generating click through activity.

If multiple mappings to supplemental content are available for a particular media stream (e.g., the media stream was syndicated for others to create mappings), many mappings may have been created, but typically only one mapping will be displayed with the media stream at a time. As discussed earlier, some embodiments may tag particular mappings according to viewer device type, demographics, and so on. In such embodiments, the mapping is chosen, or a subset of available mappings selected, based on such criteria, in accordance with data provided by the viewer's device (e.g., as part of an HTTP request header, IP address to geographical mapping, and the like), or by preferences for types of mappings set by a viewer. If this does not yield a single mapping, the method 1700 may choose which mapping to present on a down-selection basis. For example, assume that a given media stream is syndicated and five different mappings are created. Those five mappings could be shown equally to the first N number of viewers, with the least popular (aggregate less clicks, or lower revenue-generating) mapping being down selected at each subsequent N number of views, until only the most popular mapping is shown. By monitoring viewer selections, the method 1700 may further determine the better mappings to be shown to particular demographics, even though the mappings themselves did not include demographic targeting information. For example, user responses might suggest that a given mapping is popular with teenagers, in which case the method 1700 would provide the mapping to teenagers, while a different mapping may be shown to thirty-something's.

At step 1710, a signal is received from a viewer, who is watching a particular media stream and mapping and who selects (e.g., clicks on) an item of associated supplemental content (e.g., advertisement).

At step 1712, the method 1700 provides supplemental content to the viewer (e.g., a web page configured to provide fulfillment of a purchase for the article depicted in the associated supplemental content).

As described above, in certain embodiments when the provision of supplemental content results in the viewer making a purchase or performing other activity (e.g., click through activity) that accrues revenue to the access provider, the access provider will pass along a portion of the revenue that it receives to the user/content creator who posted the media stream whose mapping initiated the revenue as a commission.

The commission paid to posting user may be a percentage calculated from the specific sales consummated.

In certain embodiments, the access provider simply tracks the number of click-throughs that result from a specific media stream and divides that number by the total number of click-throughs generated across all media streams hosted by the access provider during a given period of time, yielding a percentage of click-throughs attributable to the specific media stream. Then, the total pool of commissions that are available to be distributed by the access provider for such period may be allocated to the posting users/content creators according to this calculated percentage share. The access provider might choose to provide a graduated or hierarchical form of commissions to encourage specific activities. For example, the access provider might pay a higher commission to posting users/content creators who provide three or more media streams during a given period that attract at least a predetermined threshold number of clicks. Also, as an alternative to paying a cash commission to posting users/content creators, the access provider might provide some form of "credit" or "coupon" that could be redeemed for various goods or services provided by the access provider or third parties.

In certain embodiments, the access provider may wish to provide incentives for users to include non-commercial items of supplemental content, so as to counter the naïve belief that monetization may be enhanced simply by increasing the volume of advertising-related supplemental content presented to a viewer. This may be because a higher ratio of non-commercial to commercial items of supplemental content increases viewer satisfaction and/or leads to greater overall monetization. For example, the access provider may wish for users to deploy items of supplemental content that potentially direct viewers to other portions of the access provider site such as special "branded" pages, pages featuring "pay-per-view" videos, and the like. To encourage such deployment, the access provider may choose to pay a fee to the user for every time such a navigation-oriented item of supplemental content is either viewed or clicked upon by a viewer. Similarly, the access provider could link payment to the viewer's subsequent behavior in response to such link (e.g., pay the user a commission only with respect to each viewer who selects to view a pay-per-view video), in what may be termed a "cost-per-action" or CPA model.

The access provider may also wish to provide incentives for content creators to provide intra-media stream content tagging (i.e., identifying various categories of content within a given media stream to improve viewer search). To induce this behavior, the access provider may provide a fee or commission for each time that an intra-media stream or other form of tagging results in a viewer actually locating and/or viewing a media stream. For example, if a content creator has included an intra-media stream content tag for "Eiffel Tower" and a viewer conducting a search is presented with the thumbnail pertaining to this content tag and/or the viewer clicks and views the associated media stream, the content creator may receive a small commission or other compensation for any one or all of the various aspects that this/her tagging enabled.

In all cases in which the access provider may choose to share revenue, it may be useful to set certain threshold levels for when payments are calculated, reported, paid, and the like. For example, given the administrative cost and burden of handling a large volume of very small monetary amounts, the access provider may decide to display all such information but refrain from making any payments until a certain threshold is reached, such as a given item of supplemental content is viewed by more than X number of viewers or a given user is entitled to receive at least ten dollars. The access provider may also impose such thresholds for the purpose of limiting the ability of others to manipulate the payment system by providing fraudulent click-throughs. For example, the access provider may decide to pay a relatively low X % commission for the first Y viewer interactions with an item of supplemental content, and 20X % for the next Z viewer interactions, which represents a threshold of interactions that would be very difficult without a large number of people participating in such manipulative enterprise. Such a tiered commission system would provide added incentives for users to create highly-compelling items of supplemental content. As discussed above, however, the access provider may determine that providing lower commissions for more popular media streams may be beneficial in terms of encouraging greater syndicator emphasis on providing items of supplemental content for less popular media streams.

In one embodiment, the access provider may provide a commission to the user who posted a library entry or a component thereof in the supplemental content library that was utilized by another user in creating an item of supplemental content and/or that generated revenue. This would encourage contributions to the library. Certain thresholds may also be implemented in this context, so that contributions are remunerated only if they generate a very high level of revenue. The access provider may not wish to discourage users from accessing the library, but at the same time, the access provider may wish to induce users to make highly compelling contributions.

Advertisers who wish to select a "cost per impression" (CPM) model in a particular context (i.e., the advertiser will pay the access provider for advertisements that are viewed, but not necessarily clicked on) may be provided with a tiered pricing model, such that items of supplemental content mapped to earlier segments of a media stream are priced higher than items of supplemental content mapped to later segments of the media stream. This model considers the fact that viewers may be more likely to respond to items of supplemental content associated with the early seconds or minutes of a media stream and/or that many viewers will not watch an entire media stream (and, therefore, may never actually view a later-mapped item of supplemental content).

As discussed above, any of the revenue sharing models could be enabled to share revenue across a "team" of people who provide relevant items of supplemental content. In this manner, users specializing in one aspect of the process (e.g., selecting a product to feature) may couple their contributions with users specializing in another aspect (e.g., creating forceful graphics) so that the overall end-product is more compelling to viewers and therefore generates higher revenue. For example, with respect to a single item of supplemental content mapped to a single media stream, it may be the case that a certain aggregate commission percentage of X is paid by the access provider to all of the contributors to the revenue opportunity. Thus, a portion of commission X may go to, among others, individuals or groups that have contributed the following aspects of the revenue generation process: uploading the media stream; intra-media stream content tagging; contributing certain components that appeared in the item of supplemental content (e.g., a particular graphical image in a composite item of supplemental content); providing the specific item of supplemental content; and hosting a link that directed the viewer to view the media stream. In such a context, the individual or group that provided the media stream would potentially receive a commission with respect to most or all activities relating to such media stream, whereas the individual or group providing a particular item of supplemental content would receive a commission only with respect to revenue derived from the item of supplemental content. In all of these cases, revenue may be paid by the access provider service into a "team" account.

To facilitate the revenue tracking and payments systems described above, the access provider may embed within a given item (e.g., an annotated media stream, an item of supplemental content, a library entry) an identifier that identifies the contributor of such item. Thus, a given annotated media stream may include identifiers for a potentially large number of contributors. Each contributor identifier may be linked to a file of information about the identified contributor to facilitate payment, such as the contributor's social security number, desired mechanism for payment, and the like.

As described above, the access provider may allow various teams or groups of individuals to participate in the creation of any of the various aspects of an annotated media stream. To encourage the formation of teams, the access provider may provide a mechanism for each team to personally determine how the revenue accruing to the team will be shared among the various team members. For example, the access provider may allow a team to decide if all members share equally in all revenue, or whether a certain portion of revenue will be allocated to key members of the team (e.g., the member who contributed a particular item of supplemental content, media stream or the like or members that have reached a certain threshold of seniority, performance, or the like) with the remainder provided to be split among the team as a whole.

In one embodiment, the method 1700 tracks the responses of the viewer, including the signal indicating interest in an item of supplemental content received at step 1710, and the user's behavior in response to any additional information provided in step 1712 (e.g., consummating a commercial transaction). The tracked data may be aggregated to provide statistics regarding each media stream, each mapping, and each item of supplemental information, to enable users of the system to determine popular media streams and successful mappings. This response tracking information could be provided to one or more stakeholders (e.g., the content creator or all sellers whose articles are depicted in the media stream) based on one or more criteria (e.g., syndicators gain access to "professional level" statistics only after a history of success). Multi-tier reporting regimes could be implemented such that additional data requires either payment or attainment of certain performance levels (e.g., volume of clicks or transactions). Conversely, it might be useful (perhaps at the uploader's option, or as a "professional" mode of the player) to allow the display of viewer response to a given mapping or individual associated of supplemental content on the video player itself. This would provide viewers with information as to what their "peers" are interested in, and thereby provide feedback on how to generate a successful mapping.

The method 1700 then terminates in step 1714.

One of the advantages of the present invention is that, as described above, previously unrelated individuals may be brought together by the prospect of contributing to a common experience (i.e., improving the creative value of a given media stream) and/or by the prospect of earning money. The access provider will benefit financially by creating more compelling viewer experiences due to the fact that higher quality experiences attract more viewers and more relevant supplemental content will increase viewer response to a particular media stream (and/or the supplemental content mapped thereto). In order to bolster the creation of such content, the access provider may wish to provide a direct monetary incentive to all individuals who add value.

Moreover, supplemental content is provided to viewers of a media stream without requiring any explicit involvement or instruction from the viewer. However, the supplemental content may be easily ignored by a viewer who is not interested in viewing the supplemental content; thus, the mapping of supplemental content does create any undue intrusion on the viewing experience. It is to be noted, however, that viewer interaction may enhance the viewer experience by allowing the supplemental content provided to a given viewer to be tailored to his/her preferences. For example, the viewer may select or indicate a type of supplemental content in which he/she is most interested (e.g., fashion, recipes, music, movie plots, director's cut videos or the like), or such selections may be learned.

Figure 18:
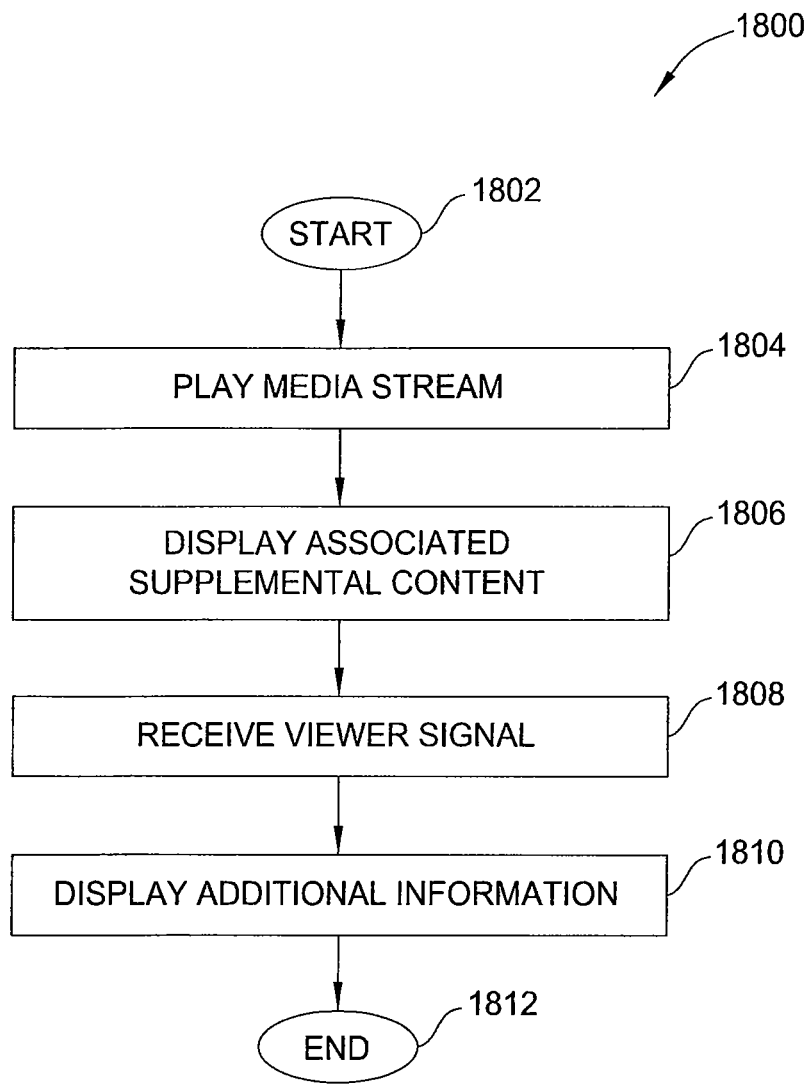
FIG. 18 is a flow diagram illustrating one embodiment of a method for displaying a media stream with mapped supplemental content to a viewer.
Figure 19A:
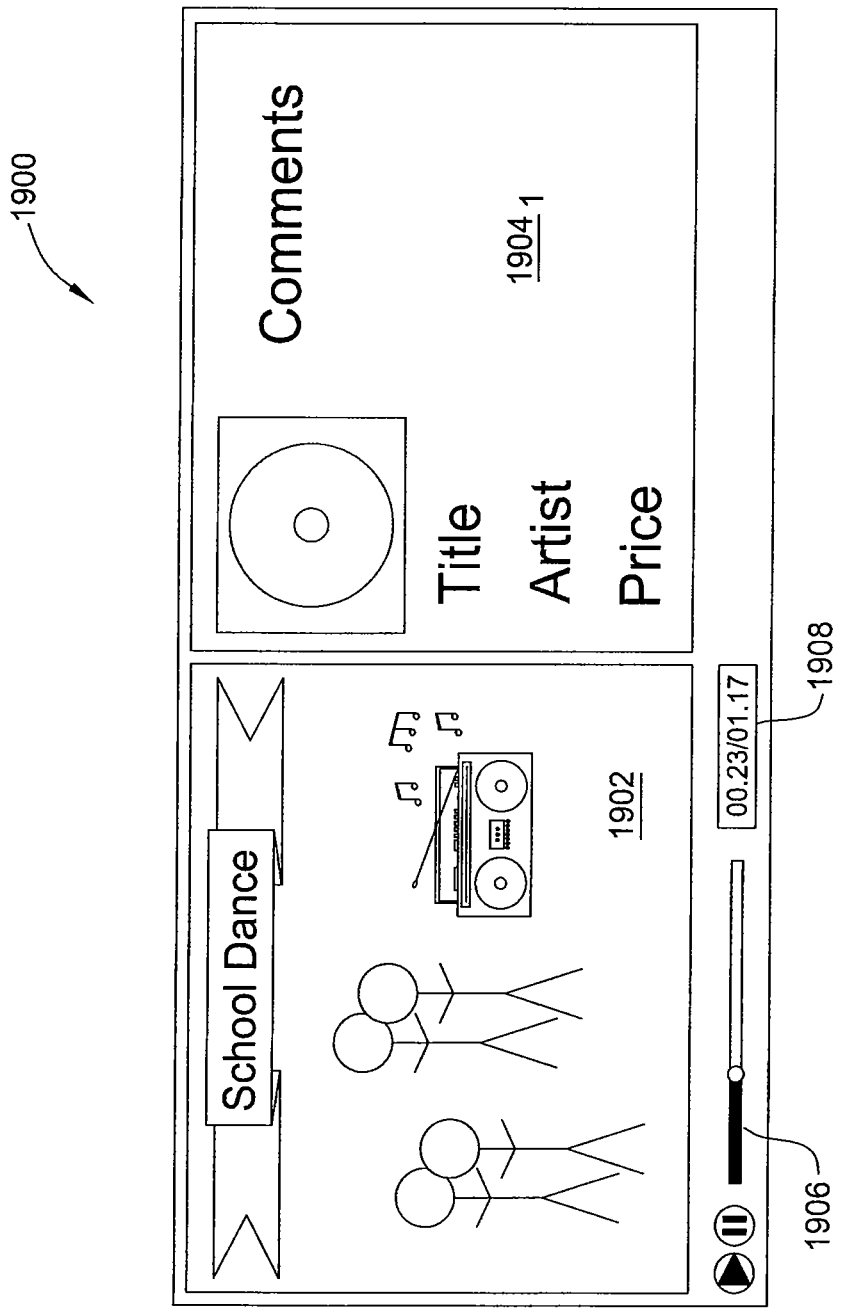
FIG. 19 depicts an exemplary display device.
Figure 19B:
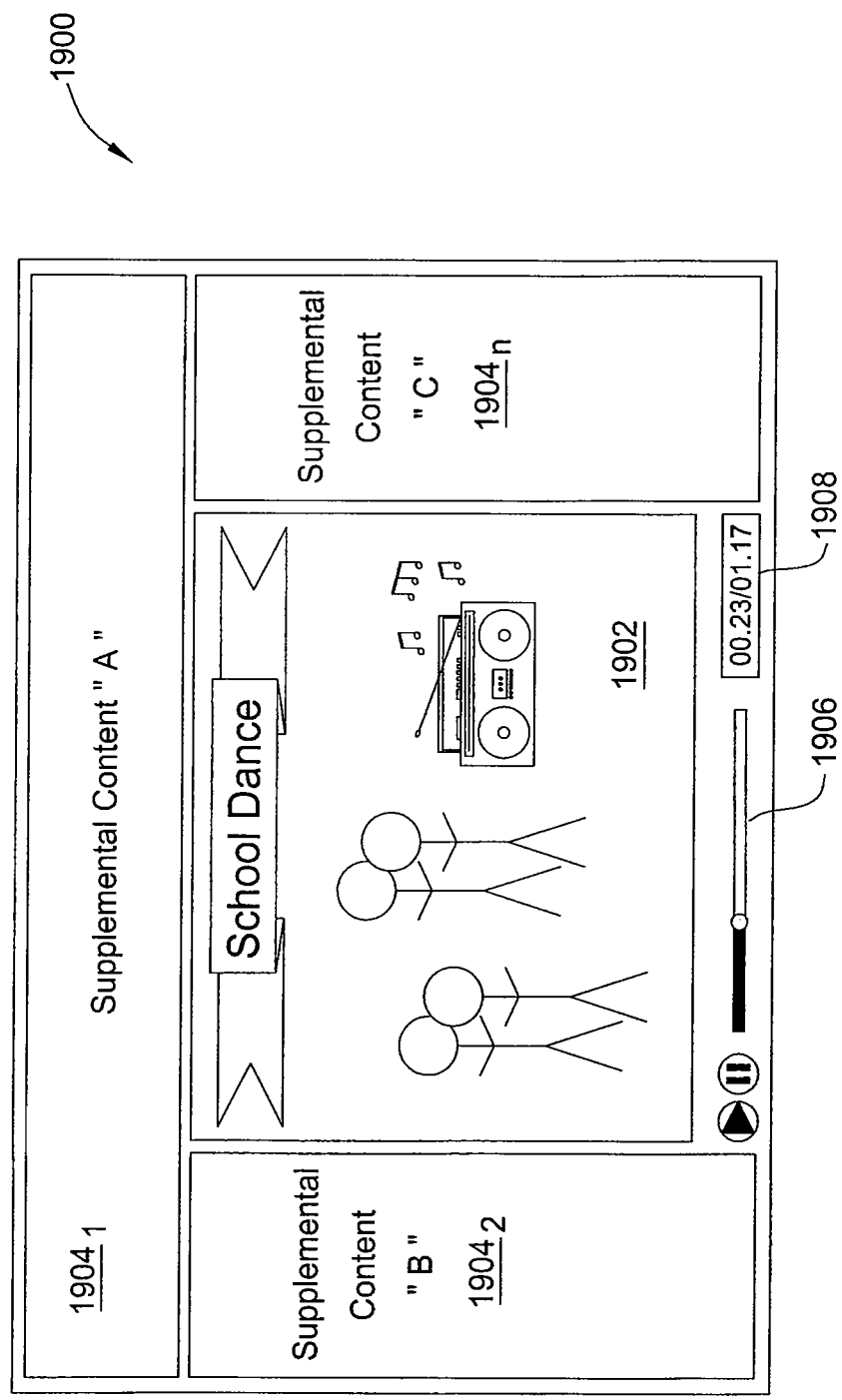
Figure 19C:
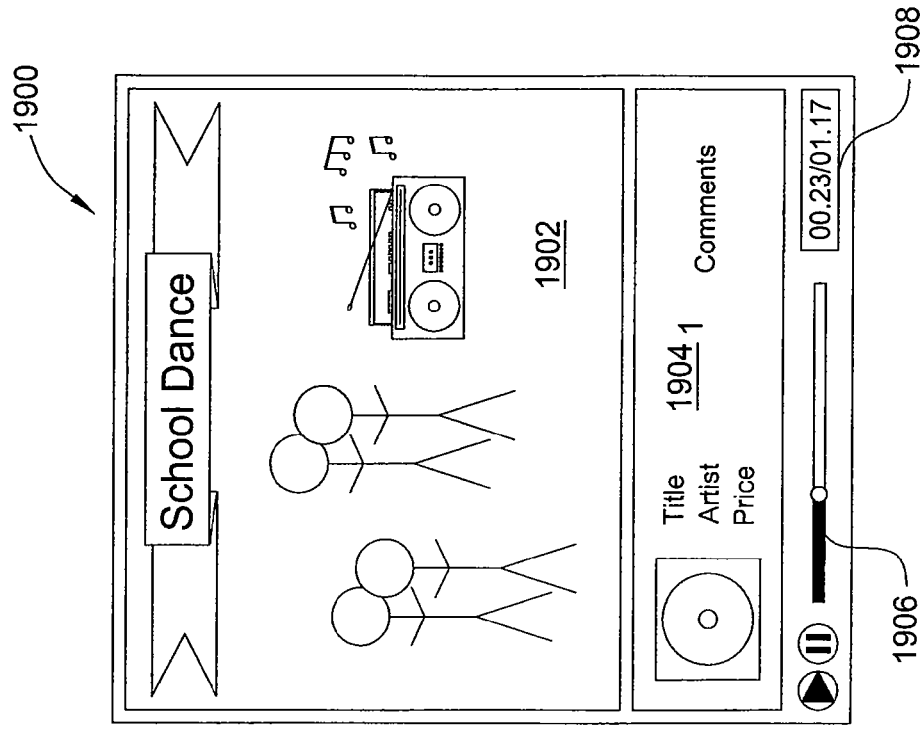
Figure 19D:
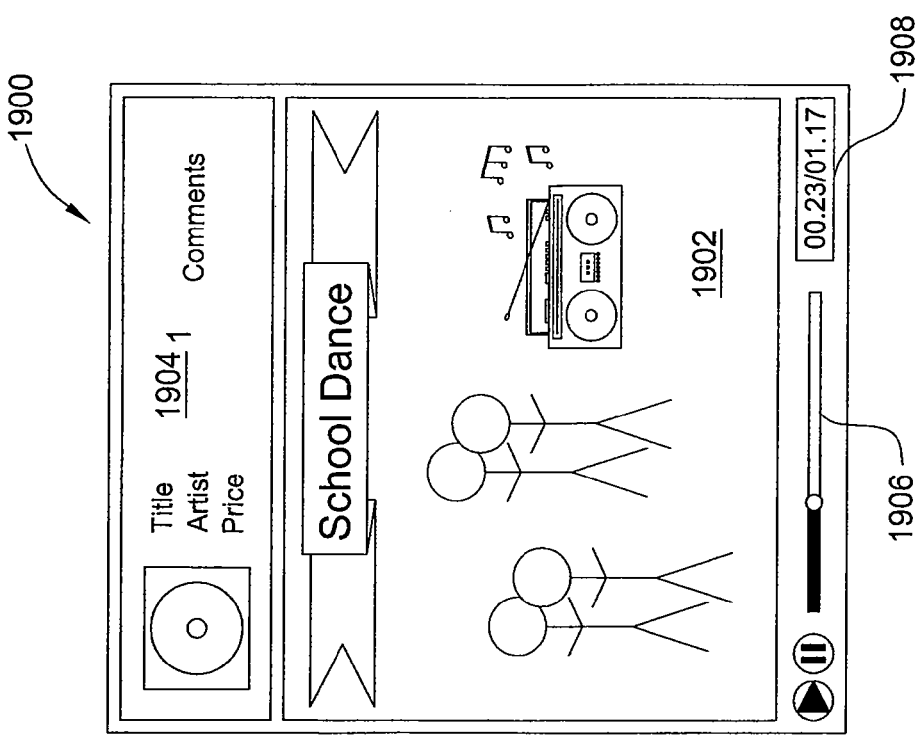

FIG. 18 is a flow diagram illustrating one embodiment of a method 1800 for displaying a media stream with mapped supplemental content to a viewer. The method 1800 may be implemented, for example, by a service (e.g., web site) that hosts and displays media streams, on demand.

The method 1800 is initiated at step 1802 and proceeds to step 1804, wherein a media stream is displayed to a viewer (e.g., at the request of the viewer). In some embodiments, the method 1800 enables viewers to search for media streams containing specific items. For example, a viewer might use a key word search to find all media streams that feature an advertisement for the key word "Brady Bunch." In one embodiment, the method 1800 supplies information to the remote computer providing the access provider regarding the viewer's display device type and capability (e.g., screen resolution, computational capacity, network bandwidth or the like). Further information may be supplied regarding demographics or geographies of the viewer (e.g., his or her location). Further information may be supplied based on viewer-selected preferences for particular types of mapping (e.g., that the viewer prefers "humor" supplemental content, or likes supplemental content that contains discount coupons).

In certain embodiments, when a media stream is viewed in full-screen mode or on a small screen, the displaying allows the viewer to elect (e.g., by pressing a button) to send information regarding supplemental content mapped to the media stream to a website for later viewing, or to simply send the information back to the screen from which he selected the media stream.

At step 1804, supplemental content that is mapped to the media stream is displayed to the viewer. In one embodiment, the supplemental information is displayed to the viewer in a frame or display location adjacent to the playing media stream (such that the viewer can simultaneously view both the displayed media stream and the supplemental content), and not as an overlay or other intrusive interface device. An exemplary display device 1900 is depicted in FIGS. 19A-19D, which respectively illustrate various formats for displaying supplemental content. Display device 1900 comprises a main display area or pane 1902 for displaying the media stream, which, in the exemplary case of FIGS. 19A-19D, is a video of a school dance. At least one supplemental pane $1904_1$-$1904_n$ (hereinafter collectively referred to as "supplemental panes 1904") is provided for synchronized display of the supplemental content associated with the video, which in the exemplary case FIGS. 19A-19D is presently an advertisement for a music CD, perhaps of the music presently playing at the school dance at the present time in the video. Media streams controls 1906 are provided for the standard operations of playing, pausing, and seeking the media stream content, and the present time position within the displayed media stream is shown in counter 1908, along with the total length of the media stream.

Figure 45:
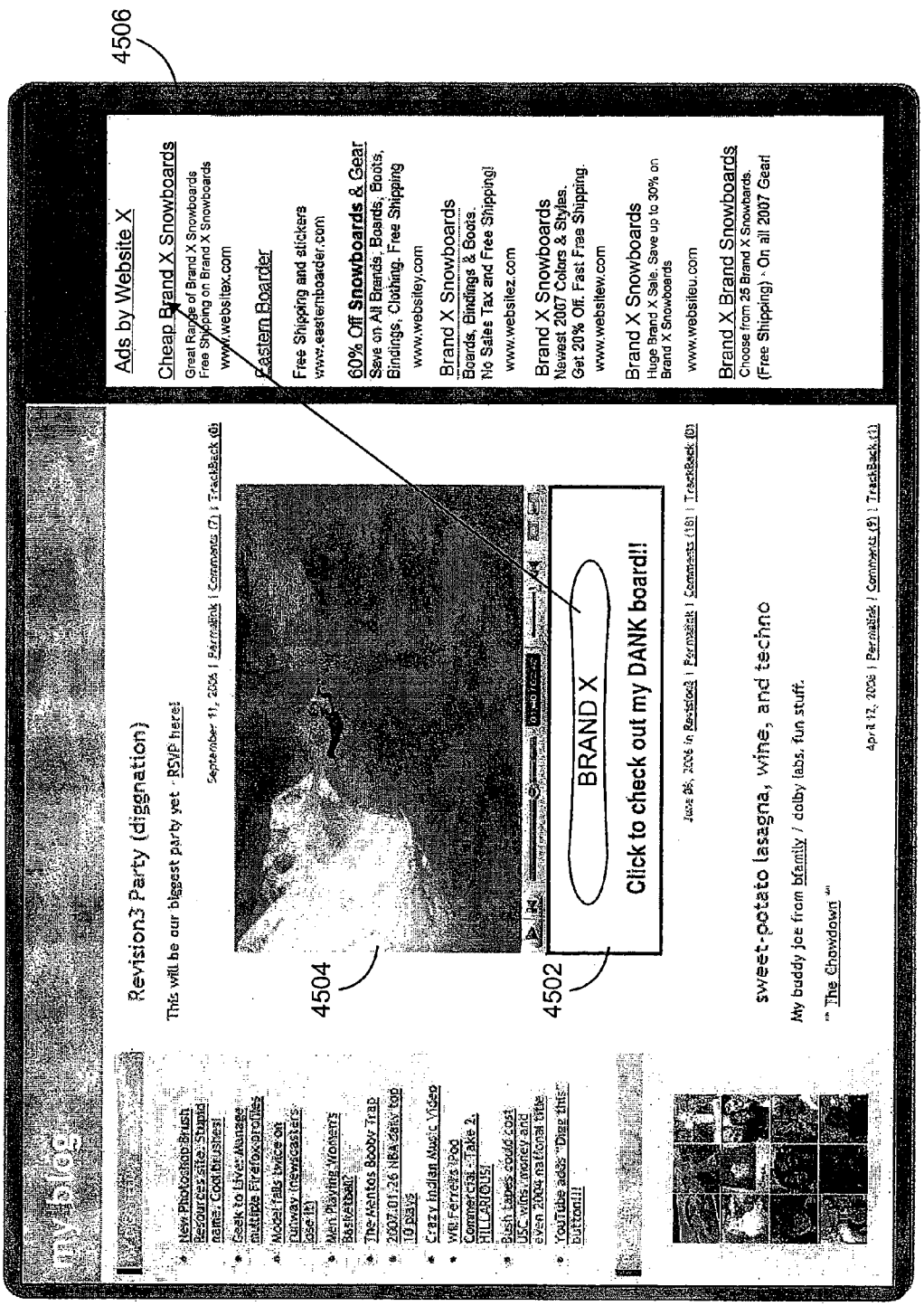
FIG. 45 illustrates an exemplary display in which the supplemental content associated with a media stream is used to generate related banner advertising.

As illustrated in FIG. 19, the display of the supplemental content is synchronized with the display of the media stream, in accordance with the association information. For example, assume a first item of supplemental content is mapped to the segment identifier identifying the segment that spans time t=10 to time t=40, and a second item of supplemental content is mapped to the segment identifier identifying the segment that spans time t=20 to time t=30. At time t=10, the first item of supplemental content is displayed to the viewer. At time t=20, both the first and second items of supplemental content are displayed. At time t=30, only the first item of supplemental content is displayed, and at time t=40 neither the first nor second items of supplemental content are displayed. No specific viewer intervention is required to activate the display of the supplemental content (i.e., the supplemental content is displayed automatically in accordance with the synchronization established by the posting user/content creator, taking into account any pausing, seeking and stopping of the media stream by the viewer). In certain embodiments, more than one set of supplemental content may be displayed simultaneously (e.g., by adding additional supplemental panes), and all displayed supplemental content is similarly synchronized with the media stream.

Where the media stream player is embedded in another content pane (e.g., a web page, a blog or the like), other content displayed on the containing pane may be selected in accordance with the media stream or associated supplemental content. For example, banner advertisements displayed on the containing pane may be selected based on keywords associated with the media stream, based on the target demographic of the media stream, based on the supplemental content mapped to the media stream, based on the position of an item of supplemental content in a hierarchy of a library, or based on viewer information collected by the system to determine which mapping to use for a particular viewer (e.g., demographic, geographic or device information, or prior interactions with supplemental content). For instance, FIG. 45 illustrates an exemplary display 4500 in which keywords in the supplemental content 4502 associated with a media stream 4504 are used to generate related banner advertising 4506.

In one embodiment, each time that a media stream is accessed for viewing, the method 1800 may gather various relevant data (e.g., if the mapping(s) for the media stream includes placeholders; the determiners that may be embedded in various alternative items of supplemental content; the demographic information provided by the website from which the viewer is accessing the media stream, etc.) and, either prior to displaying the media stream or in near real time with display of the media stream, determine the specific items of supplemental content to be displayed. Once this data is gathered, the method 1800 may stream the media stream and then simultaneously stream the mapped items of supplemental content into a single stream or application. Alternatively, the method 1800 may automatically determine all of the different possible combinations of supplemental content (e.g., all possible combinations of the supplemental content that are linked to placeholder) and create a separate data stream for each combination. Each separate data stream so created may be combined with the media stream or maintained separately from the media stream. In this embodiment, when the viewer accesses the media stream, the method 1800 determines which version of the supplemental content mapping (or which version of the combined mapping and media stream) that is presented to the viewer.

In one embodiment, the mapping is entirely independent of the media stream that is presented to the viewer, without any direct connection with or access to data from the media stream. For example, the media stream may be offered by a first access provider, and a second access provider that offers the mapping may make the mapping available to any third party who requests the mapping (e.g., by providing the "identifier" of the media stream that the second access provider utilizes to select the mapping). To ensure synchronicity with the media stream, it may be the case that the media stream and the mapping are presented to the viewer via two separate player devices (e.g., with the player that is playing the supplemental content linked to the player that is playing the media stream such that, when commands like "fast forward" and "pause" are given by the viewer to the media stream player, the same commands are mirrored in the player displaying the supplemental content. This functionality will allow the supplemental content to be in sync with the media stream, but allows the supplemental content to be hosted by a service other than the service hosting the media stream. This may be advantageous, because the bandwidth costs or other requirements for hosting media streams may differ from the requirements for hosting mappings, and, therefore, there may be advantages to separating these two functions.

In certain embodiments, the access provider may allow operators of other websites to link to a particular media stream and to include the media stream on their other websites. In one embodiment, this is configured such that the media stream is only linked along with the mechanisms for displaying the associated items of supplemental content, ensuring that viewing of the media stream on the third party websites will include display of the items of supplemental content. In such a context, all viewer interaction with the supplemental content (e.g., a viewer clicking on a given item of supplemental content) may be transferred back to the access provider. Alternatively, the viewer interactions are enabled on the third party websites, potentially so that a record of the interactions is shared with the access provider. The revenue models associated with these embodiments may involve a negotiated sharing of revenue between the third party host and the primary access provider for any viewer purchases or other revenue-generating click-through activity.

Once the items of supplemental content are mapped to a media stream, the method 1800 may create a log listing of the particular library entries and/or components thereof that are presented in the media stream (as well as the temporal segments of the media stream in which the library entries appear). When the media stream is activated by a viewer, the method 1800 can thereby record all of the items of supplemental content that were presented to the viewer, and not merely those items of supplemental content that were "clicked" by the viewer. This will aid the access provider in charging advertisers or others parties for presenting information in addition to facilitating situations in which viewers take specific action with respect to the presentation of information (such as clicking on an item of supplemental content to access additional information).

Referring back to FIG. 18, at step 1808, the method 1800 receives a signal from the viewer indicating interest in a particular item of associated supplemental content. The signal is passed to the access provider (or other third party) for fulfillment of the request, and at step 1810, further information regarding the signaled request is displayed to the user (as described from the viewpoint of the access provider earlier in relation to steps 1710 and 1712 of method 1700).

The method 1800 then terminates in step 1814.

The methods herein described may thus be implemented to transform a simple media stream access provider into one that enables additional user creativity, and rewards the posting user/content creator for the activities induced in the viewers.

The access provider and advertisers or other providers of supplemental content may also derive revenue from such a system.

It may often be the case that a particular media stream has a "life span", but may also be "reborn." For example, a cute puppy video is both very compelling and very forgettable (and/or supports repeated viewing). Thus, an operator of an access provider may automatically, or at the posting user's request, "shelve" a media stream for a set period of time and have it reposted on the site at a later date that is either predetermined (i.e., the media stream is released automatically) or upon action by the posting user. The access provider might also monitor "viewing patterns" for specific media streams and send out automatic emails to the posting user suggesting that they might wish to remove their media stream for a period of time. The access provider might allow such media streams to still be available to viewers utilizing one form of search (e.g., the puppy clip would appear in response to a specific keyword search) but would not appear in response to certain other search methodologies (e.g., it would not appear on the "most watched" lists). This would help the access provider to avoid appearing "stale" by having the same media streams appear at the top of lists. One way to do this would be to use an algorithm that combined the "most watched" with a concept of "most recently watched." This approach would, for example, result in a World Series-related video being removed from the most-watched category (even though it was widely viewed during a short period of time) in June in favor of a "fresher", but less watched, NBA finals video.

Figure 41:
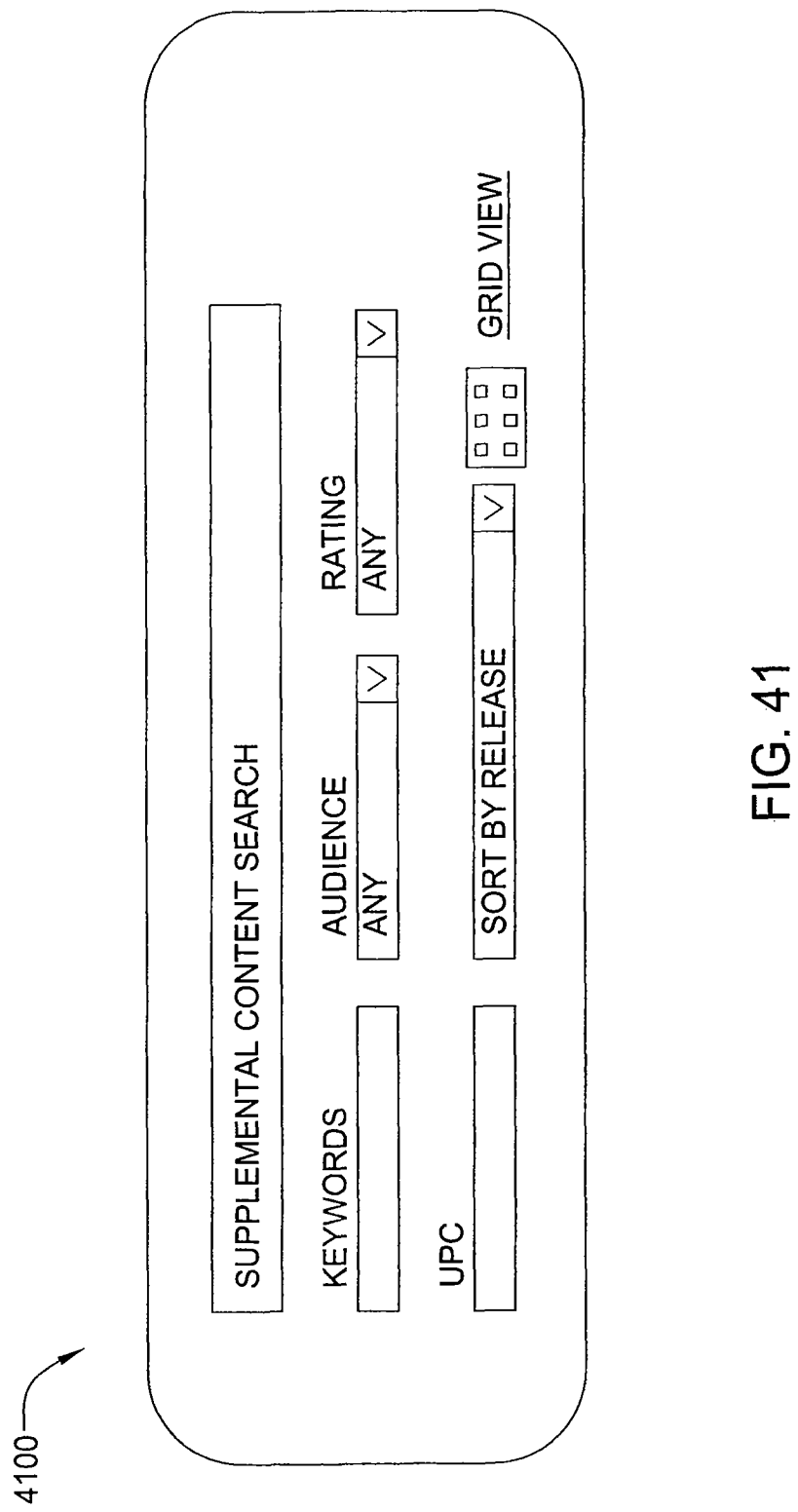
FIG. 41 illustrates an exemplary display that may be presented to an advertiser to allow search of media streams associated with a given item of supplemental content.
Figure 43:
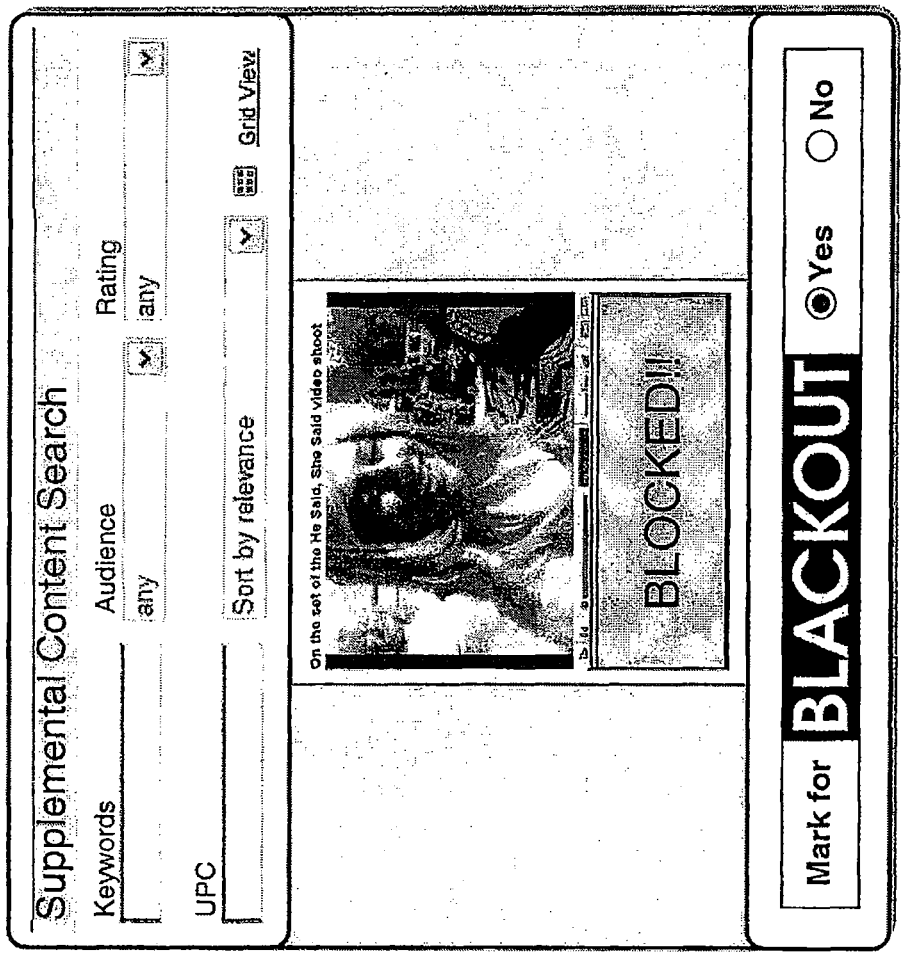
FIG. 43 illustrates an exemplary display in which an advertiser is enabled to block association of an item of supplemental content with a given media stream.

In some embodiments, an access provider may allow advertisers or other providers of supplemental content to "pull" (i.e., remove or block the presentation of) their items of supplemental content if they are not pleased with a particular association. For example, an automobile manufacturer might not want to allow their SUV advertisement to be associated with a video about global warming. To enable this, a search function may be provided to determine all media streams with which a particular item of supplemental content is associated, and the ability to remove an association is subject to a security-enabled process (e.g., a password system) so that only the rightful provider has this ability. For example, FIG. 41 illustrates an exemplary display 4100 that may be presented to an advertiser to allow search of media streams associated with a given item of supplemental content. FIG. 42 illustrates an exemplary display 4200 in which results of a search such as that enabled by the display 4100 of FIG. 41 are presented. FIG. 43 illustrates an exemplary display 4300 in which an advertiser is enabled to block association of an item of supplemental content with a given media stream.

In an embodiment using libraries of supplemental content, portions of the library may be marked as appropriate only for association with particular types of media streams. This marking may be advisory in nature, or may be enforced by the system such that association with the marked content will not be permitted. Content may also be marked with particular viewer demographics (e.g., such that content directed to, or unsuitable for, particular age ranges is only, or not, available for mappings provided to such demographic). Further, during presentation of a media stream and its associated supplemental content, a method may be provided for the viewer to flag potentially improper or undesirable associations for human review, either on the initial flagging by a viewer or when a certain absolute or percentage number of viewers flag the association.

Figure 37:
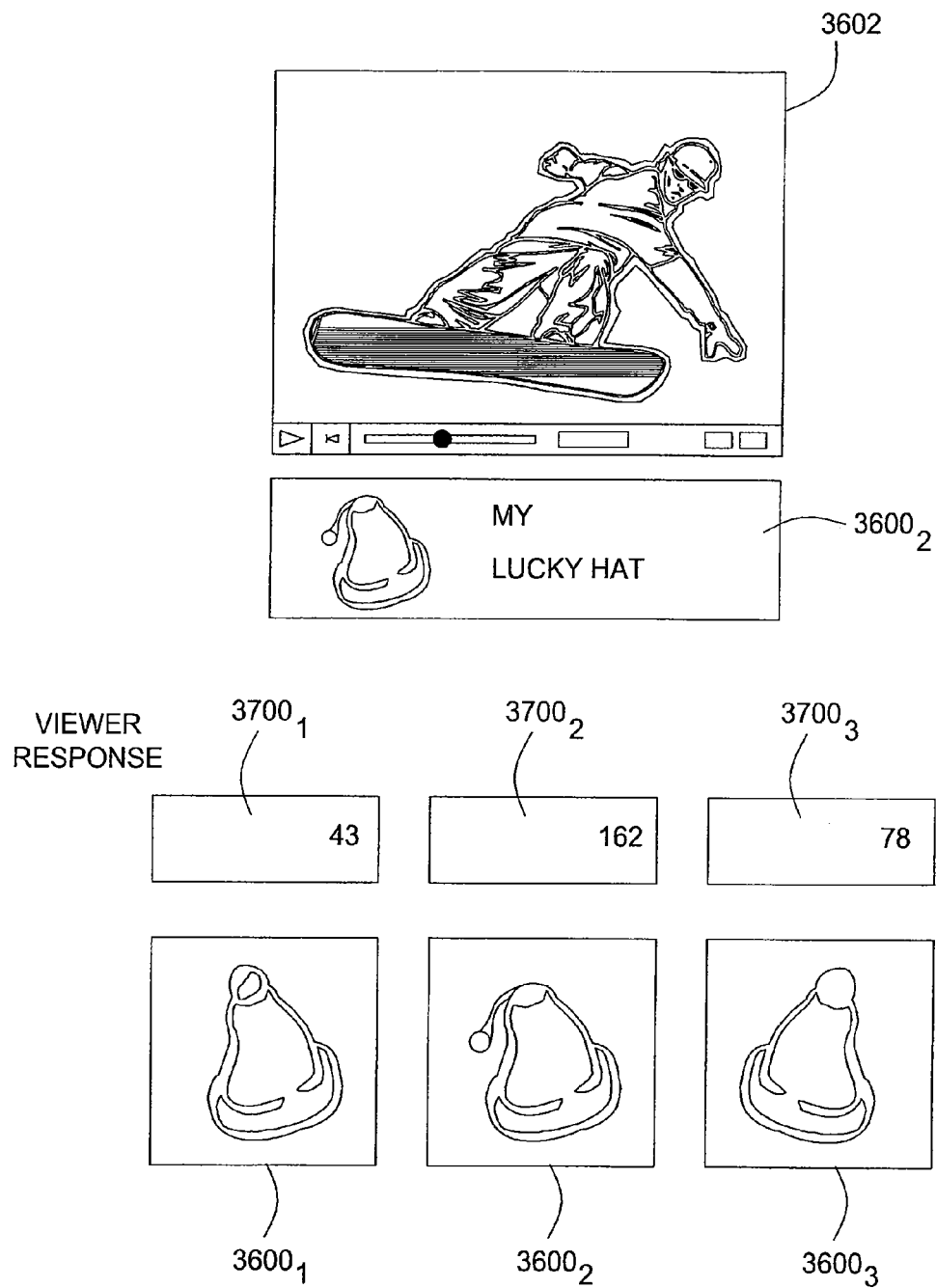
FIG. 37 illustrates click-through counters for each respective item of rotated supplemental content illustrated in FIG. 36.

In certain embodiments, where multiple mappings to supplemental content are available, a rotation method may be employed to select mappings for presentation to a viewer. Referring, for example to FIG. 36, which illustrates three items $3600_1$-$3600_3$ (hereinafter collectively referred to as "items 3600") of similar supplemental content for potential mapping to a segment identifier associated with a segment of a media stream 3602, if three different mappings M1, M2, and M3, are available for a particular media stream, the mappings may be rotated such that the first viewer of the media stream receives mapping M1, the second viewer of the media stream receives mapping M2, and the third viewer of the media stream receives mapping M3, each thereby receiving potentially different items of supplemental content at different synchronization times in accordance with the received mapping M1, M2 or M3. A fourth viewer of the media stream will then receive mapping M1, and so on. The provided mappings may then be narrowed, such that after N views of each mapping, the mapping yielding the highest viewer interest (e.g., measured by number of clicks on items of supplemental content, the number or value of commercial transactions consummated as a result, etc.) is chosen as the only mapping for subsequent provision in connection with the media stream. For example, referring to FIG. 37, which illustrates click-through counters $3700_1$-$3700_3$ (hereinafter collectively referred to as "click-through counters 3700") for each respective item of rotated supplemental content illustrated in FIG. 36, item $3600_2$ generated the highest number of click-throughs among the three items 3600 out of 383 click-throughs. Thus, item $3600_2$ is selected for display with the relevant segment of the media stream 3602.

As illustrated in FIG. 38, which illustrates click-through counters $3800_1$-$3800_3$ (hereinafter collectively referred to as "click-through counters 3800") for different respective items $3802_1$-$3802_3$ (hereinafter collectively referred to as "items counters 3802") of rotated supplemental content, a similar process can be implemented in which collaborators suggest various items of supplemental content for potential mapping to the media stream 3602. In the exemplary illustration, a first collaborator has suggested an item $3802_1$ relating to a pair of ski goggles; a second collaborator has suggested an item $3802_2$ relating to a ski hat; and a third collaborator has suggested an item $3802_3$ relating to a pair of ski pants. The item 3802 of supplemental content receiving the highest click-through rate (in this case, the third item $3802_3$) after a number of rotations is selected for final mapping.

Alternatively, the mapping with the lowest viewer interest may be removed from the rotation, and the surviving mappings rotated until there is only one mapping remaining after subsequent rounds of rotation and removal. Rotation and removal/selection may be performed for all viewers of a media stream, or just for specific demographics (e.g., one mapping for male viewers and a rotation approach to select among a plurality of available mappings for female viewers).

Where multiple mappings are provided for a particular media stream, each mapping to a different set of supplemental content, a user may wish to compare the success of particular associations for particular segments of the media stream. In cases where the associations are not precisely synchronized at the same time in each mapping, the comparison operation may track user interest within a certain time window before and after the presentation of a particular item of supplemental content, to harmonize the lack of exact synchronization.

Traditional media stream access providers provide rankings of media streams in terms of "most watched," "highest rated," "most commented upon," and the like, in order to provide viewers a key into potentially interesting and entertaining content. In embodiments of the present invention where data is available regarding viewer interest in the supplemental content associated with a particular media stream, the data may be used to provide a ranking system for media streams. Rankings such as "most clicked," "most commercially successful," and the like may be provided, providing feedback and hints to new media stream providers/content creators on what constitutes a successful set of associations. In some embodiments, such rankings are provided in a finer grained form (e.g., most successful commercial associations for a particular demographic).

As described herein, with respect to the selection of specific items of supplemental content to display to given viewers of media streams (perhaps in a given context), any number of factors may be referenced in order to make this selection. For example, the selection may be based on information about a group of viewers (e.g., all viewers in a given geographic area), potentially as aggregated in a profile of the "typical" viewer or profiles for groups of viewers. This approach would enable the presentation of relevant supplemental content without necessitating the computationally burdensome approach of determining the optimal supplemental content to show to each individual viewer. Other examples include determining the selection of supplemental content by referencing information about the viewing context (e.g., time of day, location), or the viewer's behavior in other mediums or contexts (e.g., internet searches, retail store purchases as determined through referencing activity represented on the viewer's credit card report). Other examples include: the general mood or tone of a given segment of the media stream (e.g., sentimental, patriotic, romantic, depressed, hopeful, paranoid); the specific actor or actors in the segment (i.e., Viewer X loves to watch actress A, particularly when she's appearing in a scene with actor B); type of music (e.g., country, classical, rock, hip-hop); type of action (e.g., violent, sports, dancing, kissing, eating); prevalence of product placements (e.g., Viewer X has never clicked on a "subtle" product placement); the characteristics of the segments before the segment in which viewer interest was signaled (e.g., Viewer X responds well to segments of violence followed by moods of regret); time of day (e.g., Viewer X doesn't usually watch television at this time of day, so he/she may have an illness); and supplemental content that is selected after referring to data provided by a third party (e.g., weather data for a particular viewer zip code). The various factors listed above can be paired with conventional clickstream data obtained from the viewer's use of the Internet, demographic data (i.e., zipcode, GPS coordinates), data regarding other viewers within the same household, and the like.

With respect to an automated system to aid the selection of supplemental content, as the system becomes more accurate over time, it may continue to be the case that system's statistical models, etc. will never predict perfectly those items of supplemental content that may be most of interest to a given viewer. In one embodiment, for a set number or percentage of the items of supplemental content that are "predicted" to be of interest to a viewer (i.e., perhaps one percent), the system will select an item of supplemental content that is either randomly determined or is determined to be almost certainly not of interest to the viewer. Given the sheer number viewer experiences, a small number of these "chance" offerings will be selected by a viewer (i.e., serendipity). In one embodiment, the system will note this serendipity, and will then feed that same item of supplemental content to all other viewers with similar interests, and in this way may unlock previously unidentified "niche" interests.

In one embodiment, whenever a media stream is being displayed, the viewer display device (or an intermediary device connected thereto) periodically looks ahead in the media stream (or across a set of media streams being pieced together) by referring to the segments and/or other information provided by the content creator or access provider. Then, whenever the viewer fast forwards through the media stream, any standard supplemental content associated therewith is replaced with a different version of the supplemental content that reads much better at high speeds (e.g., uses large logos that are on the screen for an extended period of time). This combats the issue of viewers fast-forwarding through standard commercial feeds, which can be a problem for advertisers. In one embodiment, a viewer's history of fast forwarding past supplemental content is reviewed. If the viewer tends to frequently fast forward through supplemental content, then all of the supplemental content sent to the viewer will be replaced as described.

In one embodiment, the distributed signal for advertisements (e.g., television commercials) is actually sent in a first stream and a second stream. If the advertisement is enabled to play normally, the standard, first stream plays. If the advertisement is fast forwarded, the replacement second stream plays. Put another way, the fast forward instruction simply triggers the cutting back and forth between the first and second streams.

In one embodiment, the viewer is enabled to set a default setting so that the fast forwarding initiates automatically, but does not stop automatically. Thus, the viewer must pay attention to stop the fast forwarding. A preset default would make it easier for replacement content to be cached and available.

In one embodiment, the actual period of time over which fast forwarding occurs is randomly assigned (within a range of parameters) to encourage the viewer to watch closely as he/she fast forwards (which is why the average person has an approximately 21% recall rate of fast forwarded ads). This could be accomplished by adding duplicate segments.

The present invention's infrastructure and approach can be used to "hyperlink" virtually the entire world, and to place articles therein within a searchable ontology. In one embodiment, each point of interest (e.g., a particular product display within a store or a particular spot at a national park, zoo or museum) would "register" to be assigned a unique identifier. Then, a website would be created that would enable anyone to create their own website, article feed. Then, the identifier is transmitted continuously (e.g., via ultrasound, Wi-Fi or the like) and received by a viewer's portable device. Thus the viewer can see the information immediately or can bookmark the location for review later (e.g., on his/her online account).

In one embodiment, the viewer's device could send the signal necessary to retrieve the desired information. For example, movie theatres might send (e.g., broadcast) a signal so that an audience can bookmark, but not immediately view, supplemental content associated with a movie being screened.

Consider a world in which many articles are tagged with RFID information. For example, all of the articles in a store could be catalogued in a database. Then, assume that the location of a "reader" of RFID tags is known (e.g., the reader is a cellular phone that includes integrated GPS capability). Thus, the database could log the location of a specific article at a time when the article's tag was last read. Put another way, the location of the reader is know, and this knowledge can be used to determine the location of the article Conversely, the location of the article may be known, and this knowledge could be used to establish the location of the viewer who is reading the article. In one embodiment, the viewer's location (and changes and sequences in locations) are tracked by tracking the viewer's interaction with specific articles for which the database includes location data. This location data may be stored and used as part of the viewer's profile with respect to consumer behavior or the like.

In one embodiment, when a reader interrogates an article, the database updates a map of the location of all articles in the database. Then, the reader can make various queries based on those locations and/or various forms of information can be sent to the reader. For example, if the viewer interrogates an article in a supermarket, the database can tell him/her the price of the article and the stores to go to in his/her vicinity to find the same article. Alternatively, the viewer can find an article on the Internet and then query the database to determine where that article may be located.

The viewer device could directly transmit its GPS coordinates and compare this information with other articles known to be in the area via the location determination methods described above. This data could be combined with other data known about the viewer such as his/her consumer preferences (e.g., as determined by past click throughs, purchases, search activity, etc.) or characteristics (e.g., physical measurements) and this information could be used to direct the viewer to specific articles in his/her physical proximity. For example, the viewer device might display a screen with the statement: "You might like the XL blue dress shirt that is ten feet to your left."

In one embodiment, the viewer device used to access the database could also send a signal containing information about the viewer, where the information can be used to trigger personalized displays in stores. In one embodiment, the viewer device contains only the viewer's ID, which matches the viewer's profile that is stored in the database. For example, the database might include the viewer's income level and a seller might sponsor a customized transaction (e.g., "If you buy the shirt to your left, the store will give you a ten percent discount if you show them this screen.")

Given the number of people in any particular store or on a busy street (e.g., Times Square), it will be impossible to provide each viewer with his/her own content, given that a large number of people can view the same content simultaneously. Conversely, it may be unsettling to a viewer if all content he/she receives is too perfectly personalized. In one embodiment, an abstract of a viewer's demographic and of other characteristics of all viewers in a particular area is created, and this abstract is utilized to select the best advertising for the largest number of viewers. For example, Times Square billboards could detect, during the morning hours, that most people in the area are commuting professionals (e.g., triggering advertisements for insurance services); that, during the afternoon, most people in the area are tourists (e.g., triggering advertisements for cheap Broadway tickets); and that, during the evening, most people in the area are teenagers from New Jersey (e.g., triggering athletic shoe advertisements featuring their favorite music).

It may be the case that pointing an RFID detector of a viewer device at a group of articles (e.g., a collection of articles in a store display) may, because of the lack of specificity in RFID tags, cause a number of articles to be triggered in the database, and the viewer will need to select the article in which he/she is interested. In one embodiment, the viewer interrogates a group of articles, and the database is accessed. The database then sends a list (e.g., words or pictures) of the articles in the vicinity to the viewer device. The viewer selects the article(s) in which he/she is interested, and the revised query is sent back to the database, which returns more complete information.

In one embodiment, the database is provided with information regarding all articles identified by RFID within a particular location, including a graphical representation of each article. Then, within a particular location (e.g., a supermarket), sensors are placed that can triangulate on (or in some other way determine) the relative location of the articles within the location. This data may be used to create a virtual world that simulates the location and the articles found there. An avatar of the viewer can then "visit" the virtual location, and the advertising within the location will be customized for the viewer.

In one embodiment, the articles are found within a particular location, but the online virtual location has a different look/feel from the actual location. In other words, the virtual location can be re-arranged to suit the viewer's preferences. Then, when the viewer visits the actual locations, the GPS capability integrated in the viewer device guides the viewer to the actual locations of the articles. For example, a store could be re-arranged for a delivery person who wants to know if certain articles need to be restocked.

In one embodiment, using the above-described data, simulations of the location layout and the advertising can be run to determine how the likely viewers in the area would respond to certain articles, prices, advertising displays and the like.

Moreover, although many embodiments of the present invention have been described within the context of media streams distributed via television or via the Internet, those skilled in the art will appreciate that the concepts of the present invention can be applied to other forms of media stream distribution as well, including movie screenings and video games. For example, each segment of a movie to be screened will be linked with a unique identifier that is mapped to a range of supplemental content. A movie theater screening the movie may transmit the segment identifier information to the entire theatre (e.g., via Wi-Fi or ultrasound), so that any viewer with a device capable of reading the segment identifier can capture the segment of interest. This information could provide immediate supplementation content or could be bookmarked for later (e.g., post-screening) review. Alternatively, if segment-by-segment identifier transmission proved impractical, only a single ultrasound or code identifying the movie could be transmitted, and then timecodes could be used, because there is no potential for commercial interruption to "throw off" the timing.

In one embodiment, the viewer device is a portable device that can be docked (for example, in a car) and receive transmissions remotely. For instance, the viewer device may be a cellular phone that includes the reader necessary to receive segment identifiers and/or to cause a device at which the cellular phone is pointed to send the segment identifier. In the remote access context, each transmitter location (e.g., in museums, national parks, malls and the like) is described along with a variety of parameters (e.g., outdoors or indoors, scenic or not scenic, urban or rural, type of information conveyed (for example, a scenic view of a waterfall in Yosemite park or a billboard on the side of the New Jersey Turnpike) and parameters (color, size, content, approach etc.) of connected advertising content). This description provides useful information as to the viewer's behavior, reactions and the like.

In one embodiment, the transmitter description input is matched to additional information available from other sources. For example, it may be possible to know the general weather conditions at a given time and location. As another example, the viewer might be responding to a highway billboard, and it would be useful to know the speed of the viewer's car (or the general traffic speed), as this might suggest that the billboard is effective only at certain speeds.

In another embodiment, the concepts of the present invention are applied in the context of a computer or video game.

Each location and article of relevance within a particular game may be assigned a unique identifier to the segment identifier typically used. The database would store information about the locations or articles (or the combinations of the locations and articles) that is similar to the segment classification data (e.g., type of environment, type of game, font used, image used, etc.) Further, the avatars (i.e., the computer embodiments of the gamers) in proximity to the supplemental content space in the game would also be reported. Then, the same approaches described above are applied in the game environment (e.g., determining the "optimal" supplemental content to feed to that location given the demographic mix and preferences of viewers gathered at that location). The supplemental content could include billboards, live videos embedded in the background, articles left on the street or in a store window that the avatar could click on (e.g., a specific automobile that the avatar drives in a video game) and the like. The advantages of using this approach are the same as for video: (1) the supplemental content need not be embedded into the game (for those games that aren't "hosted" centrally); (2) the supplemental content can be targeted to the individual viewer/player; (3) the service provides an entire infrastructure for the supplemental content; and (4) the targeting is able to leverage data that is generated by the viewer's/player's interactions with other media (e.g., what the viewer has "clicked" with respect to advertising in the video context).

Furthermore, as described above, the concepts of the present invention may be advantageously applied for the purposes of data mining. For example, the unique statistics captured by segment identifiers, viewer demographics, past viewer responses and the like may support data mining for any number of purposes that are unrelated to the viewer's direct interaction with media streams. Put another way, the database mapped to segment identifiers has the potential to translate many different aspects of a given segment into various numerical information. Similarly, viewer interactions can be translated into numerical information. From this basis, statistical modeling can be utilized to predict the response that a given media stream is likely to generate from a given group (or, conversely, the type of content to which that given group is more likely to respond positively).

In one embodiment, a number of templates of proxy media streams are created, where the proxy media streams simulate different types of media streams. This may help advertisers in determining the types of media streams in which they should place articles or supplemental content related thereto. Once these statistics are obtained, actual media streams may also be examined prior to viewing. In this way, a bidding system can be arranged to auction advertising space and the like.

Figure 47:
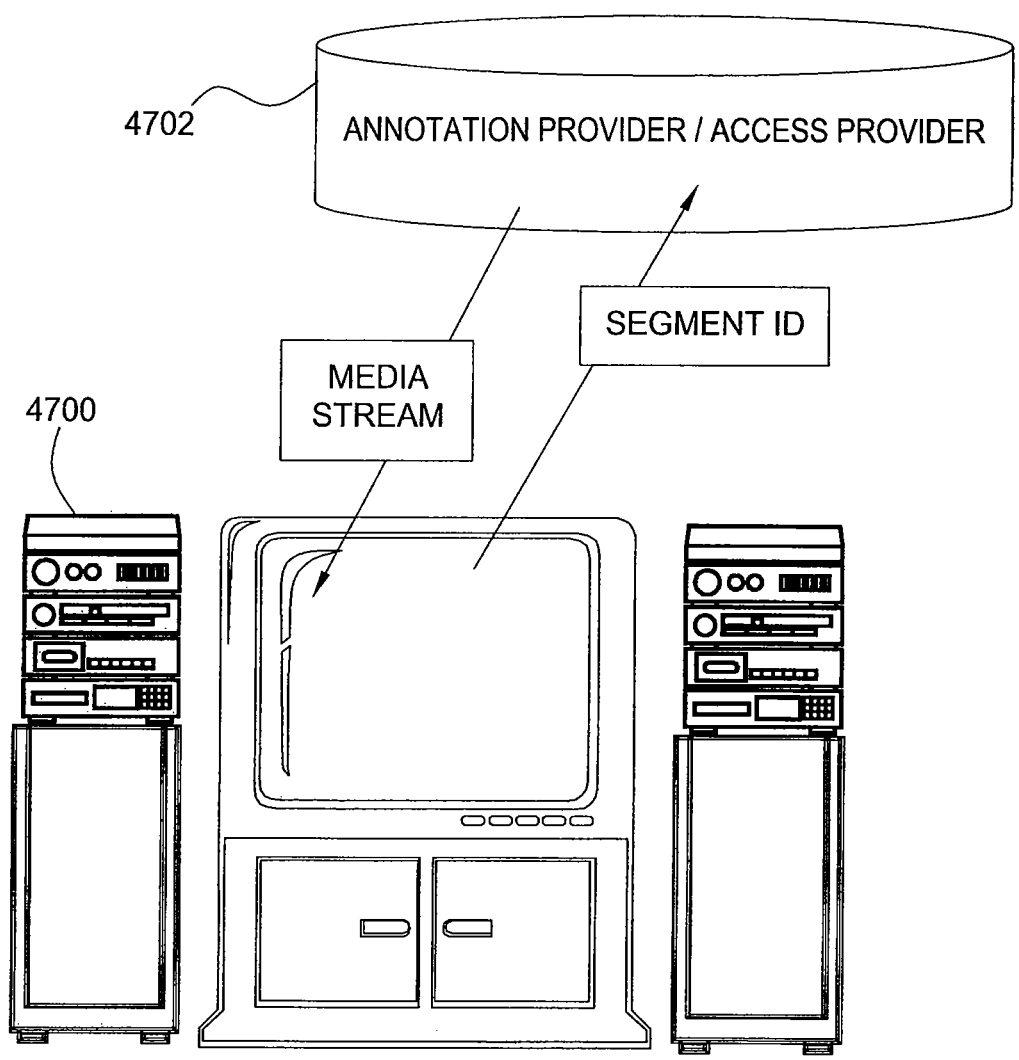
FIG. 47 illustrates another application of aspects of the present invention.
Figure 48:
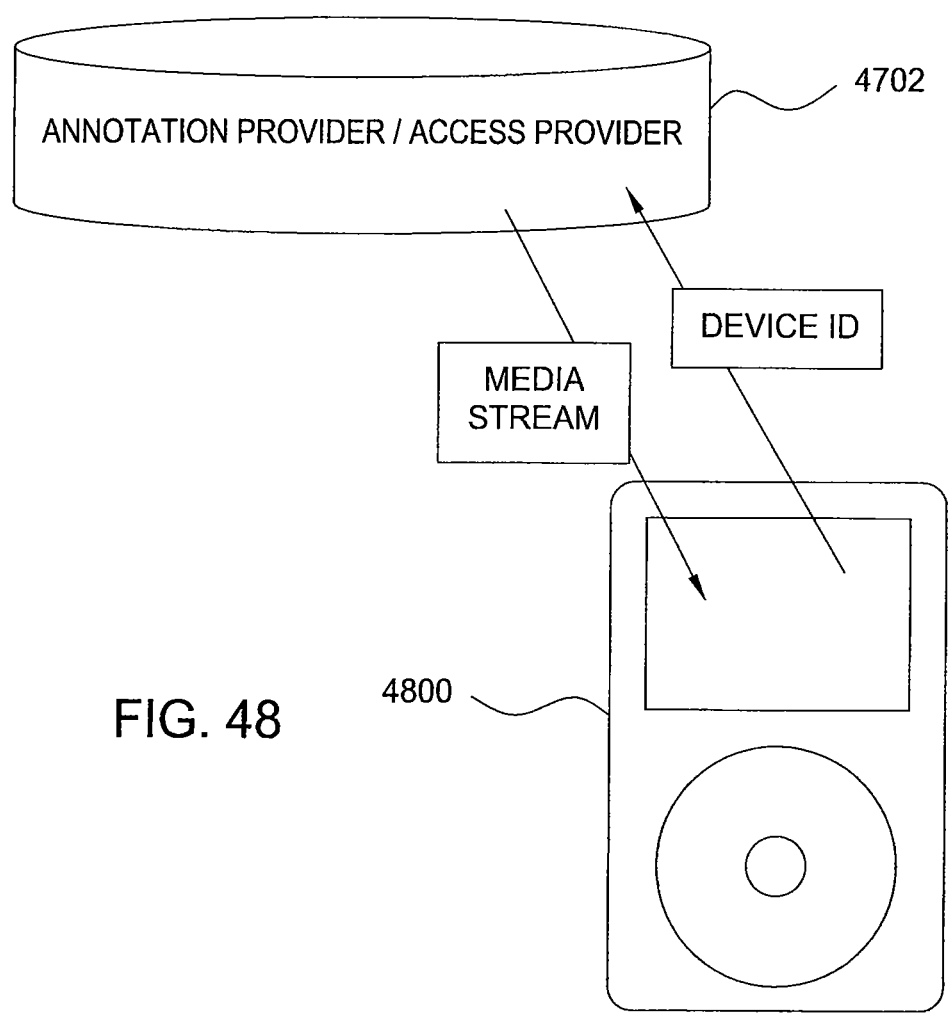
FIG. 48 illustrates another application of aspects of the present invention.

FIGS. 47 and 48 illustrate another application of aspects of the present invention. Specifically, as illustrated in FIG. 47, a viewer viewing a media stream on a home theater viewing device 4700 may choose to pause the media stream and send the segment identifier identifying the current segment of the media stream to his/her account with an access provider 4702. As illustrated in FIG. 48, the viewer may later request to receive the media stream (potentially via a new display device 4800, such as a portable media player), resuming at the segment at which he/she paused the media stream. The access provider 4702 would then read the segment identifier stored in the viewer's account to retrieve the requested segment(s) of the media stream and distribute the requested segment(s) to the viewer.

Figure 13:
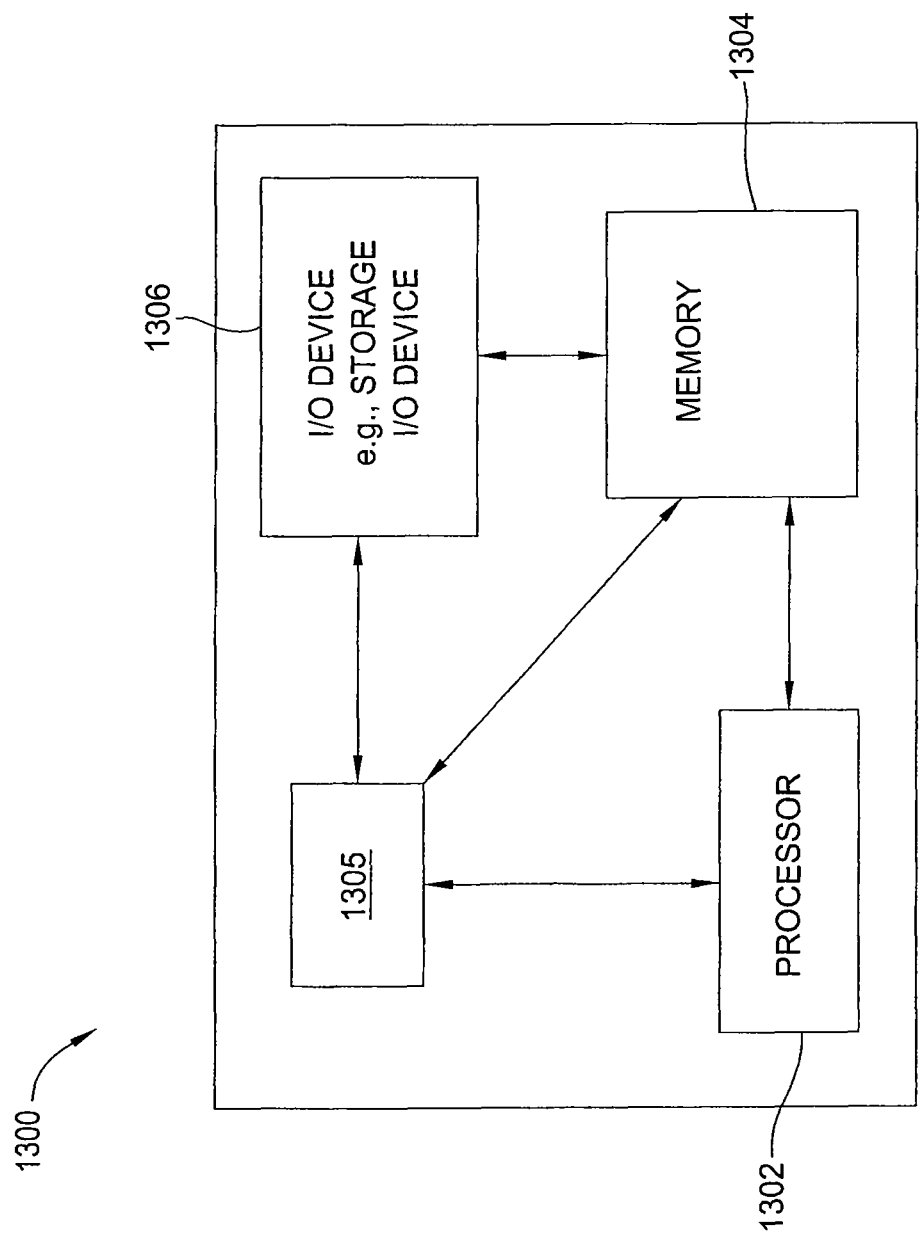
FIG. 13 is a high level block diagram of the media stream annotation method that is implemented using a general purpose computing device.

FIG. 13 is a high level block diagram of the media stream annotation method that is implemented using a general purpose computing device 1300. In one embodiment, a general purpose computing device 1300 comprises a processor 1302, a memory 1304, an annotation module 1305 and various input/output (I/O) devices 1306 such as a display, a keyboard, a mouse, a modem, and the like. In one embodiment, at least one I/O device is a storage device (e.g., a disk drive, an optical disk drive, a floppy disk drive). It should be understood that the annotation module 1305 can be implemented as a physical device or subsystem that is coupled to a processor through a communication channel.

Alternatively, the annotation cancellation module 1305 can be represented by one or more software applications (or even a combination of software and hardware, e.g., using Application Specific Integrated Circuits (ASIC)), where the software is loaded from a storage medium (e.g., I/O devices 1306) and operated by the processor 1302 in the memory 1304 of the general purpose computing device 1300. Thus, in one embodiment, the annotation module 1305 for mapping metadata to media streams described herein with reference to the preceding Figures can be stored on a computer readable medium or carrier (e.g., RAM, magnetic or optical drive or diskette, and the like).

Thus, the present invention represents a significant advancement in the field of multimedia distribution and advertising. Embodiments of the invention enable content creators, advertisers and other parties to mark up media streams such as television shows, commercials, infomercials, trailers, shopping channel segments, music videos, movies, VHS or DVD recordings, video-on-demand content, video games (e.g., interactive television games, personal computer games, online games, handheld games and console-based games), online hosted video and the like with supplemental content relating to articles that appear in the media streams (e.g., commercial articles, actors, songs, etc.). Thus, information and advertising content (such as product placements) may be implemented in a manner that is computationally simplified from a technical perspective and substantially unobtrusive from a viewer perspective.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for distributing an annotated media stream created by a first user, comprising:

selecting a media stream under instruction from the first user, wherein the media stream is associated with an index of one or more segment identifiers that are associated with one or more segments of the media stream;

selecting at least one item of supplemental content under instruction from the first user;

mapping the at least one item of supplemental content to at least one of the one or more segment identifiers, such that the media stream remains substantially unaltered, wherein the mapping is performed under instruction of the first user to produce a mapping;

storing the media stream and the mapping;

receiving a first request from a second user, different from the first user, to view the media stream;

distributing the media stream and the mapping over a network to a first display device operated by the second user, wherein the media stream and the mapping produce the annotated media stream when utilized together, such that the at least one item of supplemental content and a segment of the one or more segments of the media stream indicated by the one or more segment identifiers are displayed simultaneously in a time-synchronized manner such that the at least one item of supplemental content relates to a localized context specific to the segment, where the at least one item of supplemental content and the segment are displayed in separate, non-overlapping viewing panes;

separating the at least one item of supplemental content from the media stream;

sending the at least one item of supplemental content, independent of the media stream, to a second display device operated by the second user for later viewing without requiring an input from the second user or from the second display device;

collecting a commission when the annotated media stream is viewed by the second user;

providing a first portion of the commission to the first user, wherein an amount of the first portion of the commission is calculated, at least in part, based on a number of times the annotated media stream has been viewed; and providing a second portion of the commission to one or more individuals who selected the at least one item of supplemental content for mapping, wherein an allocation of the second portion of the commission among the one or more individuals is dictated by the one or more individuals.

2. The method of claim 1, wherein the at least one item of supplemental content relates to an article, a person, or a concept, and the at least one item of supplemental content comprises at least one of: text, audio, video, a multimedia presentation, a photograph, an image, a uniform resource locator, a computer application, data, commentary, advertising copy, a keyword, a tag, an element that encourages interactive participation by the viewer, variable data, raw data, stylized information, or a placeholder.

3. The method of claim 2, wherein the article, person or concept is depicted in or suggested by the media stream.

4. The method of claim 1, wherein the at least one item of supplemental content is displayed after the media stream has concluded.

5. The method of claim 1, further comprising:
receiving a first signal from the second user in response to the at least one item of supplemental content.

6. The method of claim 5, further comprising:
logging the first signal.

7. The method of claim 6, further comprising:
reporting the first signal to at least one of: the first user or a provider of the at least one item of supplemental content.

8. The method of claim 5, further comprising:
providing information to the second user in response to the first signal, the information relating to the at least one item of supplemental content.

9. The method of claim 6, further comprising:
logging a response of the second user to the information provided as a second signal.

10. The method of claim 9, further comprising:
providing the second signal to at least one of: the first user or a provider of the at least one item of supplemental content.

11. The method of claim 1, wherein the annotated media stream comprises at least one of: a video component, an audio component, or a text component.

12. The method of claim 1, wherein the at least one item of supplemental content is selected from among a plurality of potential items of supplemental content mapped to the at least one of the one or more segment identifiers, a selection of the at least one item of supplemental content being based at least in part on information relating to the second user.

13. The method of claim 12, wherein the information relating to the second user comprises at least one of: demographic information about the second user, information about past viewing habits of the second user, information about past interactions the second user has had with other items of supplemental content, a number of times the second user has viewed the annotated media stream, an average time for which the second user has viewed other media streams, second user preferences as expressed by the second user and learned second user preferences.

14. The method of claim 1, wherein the at least one item of supplemental content is selected from among a plurality of potential items of supplemental content mapped to the at least one of the one or more segment identifiers, a selection of the at least one item of supplemental content being based at least in part on a device on which the annotated media stream is displayed.

15. The method of claim 1, wherein the at least one item of supplemental content is randomly selected from among a plurality of potential items of supplemental content mapped to the at least one of the one or more segment identifiers.

16. The method of claim 1, wherein the at least one item of supplemental content is selected from among a plurality of potential items of supplemental content mapped to the at least one of the one or more segment identifiers, a selection of the at least one item of supplemental content being based on a rotating schedule.

17. The method of claim 16, wherein after cycling through the rotating schedule a number of times, the selection is based at least in part on a response of the second user to the plurality of potential items of supplemental content.

18. The method of claim 17, wherein the selection is based at least in part on which of the plurality of items supplemental of supplemental content generated a highest degree of viewer interest.

19. The method of claim 1, wherein the at least one item of supplemental content is selected from among a plurality of potential items of supplemental content mapped to the at least one of the one or more segment identifiers, a selection of the at least one item of supplemental content being based at least in part on a context in which the displaying takes place.

20. The method of claim 1, wherein the at least one item of supplemental content is selected from among a plurality of potential items of supplemental content mapped to the at least one of the one or more segment identifiers, a selection of the at least one item of supplemental content being based at least in part on a general tone of the at least a portion of the media stream.

21. The method of claim 1, further comprising:
displaying banner advertising with the displayed annotated media stream on a common display device, where content of the banner advertising is selected in accordance with at least one of: a keyword associated with the annotated media stream, a target demographic of the annotated media stream, the at least one item of supplemental content, a position of the at least one item of supplemental content within a hierarchy of a library of supplemental content, or information about the second user.

22. The method of claim 1, wherein the media stream and the at least one item of supplemental content are retrieved from different sources prior to the displaying.

23. The method of claim 1, further comprising:
detecting that the second user is fast forwarding through the annotated media stream; and
replacing the at least one item of supplemental content with a replacement item that is more easily viewable during fast forwarding.

24. The method of claim 1, wherein the selecting the media stream comprises:
receiving the media stream from the first user over a network.

25. The method of claim 1, wherein the separate, non-overlapping viewing panes are displayed on a common display.

26. The method of claim 25, wherein a viewing pane of the separate, non-overlapping viewing panes in which the segment of the media stream is displayed has a frame size that remains substantially consistent throughout a display of the media stream.

27. A non-transitory computer readable medium containing an executable program for distributing an annotated media stream created by a first user, where the program performs steps of:
selecting a media stream under instruction from the first user, wherein the media stream is associated with an index of one or more segment identifiers that are associated with one or more segments of the media stream;
selecting at least one item of supplemental content under instruction from the first user;
mapping the at least one item of supplemental content to at least one of the one or more segment identifiers, such that the media stream remains substantially unaltered, wherein the mapping is performed under instruction of the first user to produce a mapping;
storing the media stream and the mapping;
receiving a first request from a second user, different from the first user, to view the media stream;
distributing the media stream and the mapping over a network to a first display device operated by the second user, wherein the media stream and the mapping produce the annotated media stream when utilized together, such that the at least one item of supplemental content and a segment of the one or more segments of the media stream indicated by the one or more segment identifiers are displayed simultaneously in a time-synchronized manner such that the at least one item of supplemental content relates to a localized context specific to the segment, wherein the at least one item of supplemental content and the segment are displayed in separate, non-overlapping viewing panes;
separating the at least one item of supplemental content from the media stream;
sending the at least one item of supplemental content, independent of the media stream, to a second display device operated by the second user for later viewing without requiring an input from the second user or from the second display device;
collecting a commission when the annotated media stream is viewed by the second user;
providing a first portion of the commission to the first user, wherein an amount of the first portion of the commission is calculated, at least in part, based on a number of times the annotated media stream has been viewed; and
providing a second portion of the commission to one or more individuals who selected the at least one item of supplemental content for mapping, wherein an allocation of the second portion of the commission among the one or more individuals is dictated by the one or more individuals.

28. System for distributing an annotated media stream created by a first user, comprising:
a first user device for selecting a media stream and at least one item of supplemental content under instruction from the first user, wherein the media stream is associated with an index of one or more segment identifiers that are associated with one or more segments of the media stream, and wherein the first user device is also for mapping the at least one item of supplemental content to at least one of the one or more segment identifiers, such that the media stream remains substantially unaltered, wherein the mapping is performed under instruction of the first user to produce a mapping;
a server for storing the media stream and the mapping, the server being further configured for receiving a first request from a second user device, different from the first user device, to view the media stream and for distributing the media stream and the mapping to the second user device over a network, wherein the media stream and the mapping produce the annotated media stream when utilized together, such that the at least one item of supplemental content and a segment of the one or more segments of the media stream indicated by the one or more segment identifiers are displayed simultaneously in a time-synchronized manner such that the at least one item of supplemental content relates to a localized context specific to the segment, where the at least one item of supplemental content and the segment are displayed in separate, non-overlapping viewing panes, the server being further configured for separating the at least one item of supplemental content from the media stream and sending the at least one item of supplemental content, independent of the media stream, to a third user device different from the first user device and the second user device without requiring a user input or a signal from the third user device and wherein the server is also for collecting a commission when the annotated media stream is viewed on the second user device and for providing a first portion of the commission to the first user and a second portion of the commission to one or more individuals who selected the at least one item of supplemental content for mapping, wherein an amount of the first portion of the commission is calculated based at least in part on a number of times the annotated media stream has been viewed, and an allocation of the second portion of the commission among the one or more individuals is dictated by the one or more individuals.

29. A method for distributing an annotated media stream created by a first user, comprising:
selecting a media stream under instruction from the first user, wherein the media stream is associated with an index of one or more segment identifiers that are associated with one or more segments of the media stream;
selecting at least one item of supplemental content under instruction from the first user;
mapping the at least one item of supplemental content to at least one of the one or more segment identifiers, such that the media stream remains substantially unaltered, wherein the mapping is performed under instruction of the first user to produce a mapping;

distributing the media stream and the mapping to a first display device operated by a second user, different from the first user, wherein the media stream and the mapping produce the annotated media stream when utilized together, wherein the distributing comprises displaying the at least one item of supplemental content and at least a portion of the media stream in a simultaneous, time-synchronized manner such that the at least one item of supplemental content relates to a localized context specific to the segment, wherein the at least one item of supplemental content and a segment of the one or more segments of the media stream indicated by the one or more segment identifiers are displayed in separate, non-overlapping viewing panes;

separating the at least one item of supplemental content from the media stream;

sending the at least one item of supplemental content, independent of the media stream, to a second display device operated by the second user for later viewing without requiring an input from the second user or from the second display device;

collecting a commission when the annotated media stream is viewed by the second user;

providing a first portion of the commission to the first user, wherein an amount of the first portion of the commission is calculated, at least in part, based on a number of times the annotated media stream has been viewed; and providing a second portion of the commission to one or more individuals who selected the at least one item of supplemental content for mapping, wherein an allocation of the second portion of the commission among the one or more individuals is dictated by the one or more individuals.

30. The method of claim 29, wherein the collecting requires further action on a part of the second user.

31. The method of claim 30, wherein the further action is a selection of a hyperlink contained in the at least one item of supplemental content.

32. The method of claim 30, wherein the further action is a consummation of a commercial transaction.

33. The method of claim 29, further comprising:
providing at least a portion of the commission to a contributor of the at least one item of supplemental content.

34. The method of claim 29, wherein the commission is a monetary commission.

35. The method of claim 29, wherein the commission is in a form of a redeemable coupon or credit.

36. The method of claim 29, wherein the commission is collected from a provider of the at least one item of supplemental content.

37. The method of claim 29, wherein the commission is collected from a seller of an article represented by the at least one item of supplemental content.

38. The method of claim 29, wherein the at least one item of supplemental content relates to an article, a person, or a concept, and the at least one item of supplemental content comprises at least one of: text, audio, video, a multimedia presentation, a photograph, an image, a uniform resource locator, a computer application, data, commentary, advertising copy, a keyword, a tag, an element that encourages interactive participation by the viewer, variable data, raw data, stylized information, or a placeholder.

39. The method of claim 38, wherein the article, person or concept is depicted in or suggested by the media stream.

40. The method of claim 29, wherein an amount of the commission is dictated by a provider of the commission prior to the second user viewing the annotated media stream.

41. The method of claim 29, wherein the selecting the media stream comprises:
receiving the media stream from the first user over a network.

42. The method of claim 29, wherein the separate, non-overlapping viewing panes are displayed on a common display of a device used by the second user.

43. The method of claim 42, wherein a viewing pane of the separate, non-overlapping viewing panes in which the at least a portion of the media stream is displayed has a frame size that remains substantially consistent throughout a display of the media stream.

44. A non-transitory computer readable medium containing an executable program for distributing an annotated media stream created by a first user, where the program performs steps of:

selecting a media stream under instruction from the first user, wherein the media stream is associated with an index of one or more segment identifiers that are associated with one or more segments of the media stream;

selecting at least one item of supplemental content under instruction from the first user;

mapping the at least one item of supplemental content to at least one of the one or more segment identifiers, such that the media stream remains substantially unaltered, wherein the mapping is performed under instruction of the first user to produce a mapping;

distributing the media stream and the mapping to a first display device operated by a second user, different from the first user, wherein the media stream and the mapping produce the annotated media stream when utilized together, wherein the distributing comprises displaying the at least one item of supplemental content and at least a portion of the media stream in a simultaneous, time-synchronized manner such that the at least one item of supplemental content relates to a localized context specific to the segment, wherein the at least one item of supplemental content and a segment of the one or more segments of the media stream indicated by the one or more segment identifiers are displayed in separate, non-overlapping viewing panes;

separating the at least one item of supplemental content from the media stream; and sending the at least one item of supplemental content, independent of the media stream, to a second display device operated by the second user for later viewing without requiring an input from the second user or from the second display device;

collecting a commission when the annotated media stream is viewed by the second user;

providing a first portion of the commission to the first user, wherein an amount of the first portion of the commission is calculated, at least in part, based on a number of times the annotated media stream has been viewed; and providing a second portion of the commission to one or more individuals who selected the at least one item of supplemental content for mapping, wherein an allocation of the second portion of the commission among the one or more individuals is dictated by the one or more individuals.

45. System for distributing an annotated media stream created by a first user, comprising:
a first user device for selecting a media stream and at least one item of supplemental content under instruction from the first user, wherein the media stream is associated with an index of one or more segment identifiers that are associated with one or more segments of the media stream, and wherein the first user device is also for mapping the at least one item of supplemental content to at least one of the one or more segment identifiers, such that the media stream remains substantially unaltered, wherein the mapping is performed under instruction of the first user to produce the annotated media stream; and a server for distributing the media stream and the mapping to a second user device, different from the first user device, wherein the media stream and the mapping produce the annotated media stream when utilized together, wherein the distributing comprises displaying the at least one item of supplemental content and at least a portion of the media stream in a simultaneous, time-synchronized manner such that the at least one item of supplemental content relates to a localized context specific to the segment, wherein the at least one item of supplemental content and a segment of the one or more segments of the media stream indicated by the one or more segment identifiers are displayed in separate, non-overlapping viewing panes, the server being further configured for separating the at least one item of supplemental content from the media stream and sending the at least one item of supplemental content, independent of the media stream, to a third user device different from the first user device and the second user device without requiring an input from the second user or from the third user device, and wherein the server is also for collecting a commission when the annotated media stream is viewed on the second user device and for providing a first portion of the commission to the first user and a second portion of the commission to one or more individuals who selected the at least one item of supplemental content for mapping, wherein an amount of the first portion of the commission is calculated based at least in part on a number of times the annotated media stream has been viewed, and an allocation of the second portion of the commission among the one or more individuals is dictated by the one or more individuals.

* * * * *